(12) United States Patent
Niizuma et al.

(10) Patent No.: US 6,324,603 B1
(45) Date of Patent: *Nov. 27, 2001

(54) DATA TRANSMISSION SYSTEM AND GAME SYSTEM USING THE SAME

(75) Inventors: Naoki Niizuma; Atsunori Himoto, both of Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/247,286

(22) Filed: Feb. 9, 1999

Related U.S. Application Data

(63) Continuation of application No. 09/125,382, filed on Aug. 17, 1998.

(30) Foreign Application Priority Data

May 16, 1997 (JP) .................................................... 9-127654

(51) Int. Cl.[7] .................................................... G06F 13/00
(52) U.S. Cl. ................................ 710/72; 710/16; 710/65; 332/100; 332/101
(58) Field of Search ................................ 710/72, 16, 65; 332/100, 101

(56) References Cited

U.S. PATENT DOCUMENTS 3,909,541  9/1975  Bobilin ................................ 370/505

FOREIGN PATENT DOCUMENTS

| 0 378 401 | 7/1990 | (EP) . |
| 0 684 058 | 11/1995 | (EP) . |
| 0 834 962 | 4/1998 | (EP) . |
| 0 268 441 | 5/1998 | (EP) . |
| 2 704 987 | 11/1994 | (FR) . |
| 56-88342 | 7/1981 | (JP) . |
| 62-232233 | 10/1987 | (JP) . |
| 1-144752 | 6/1989 | (JP) . |
| 1-152843 | 6/1989 | (JP) . |
| 02197066 | 8/1990 | (JP) . |
| 4-167896 | 6/1992 | (JP) . |
| 9-46378 | 2/1997 | (JP) . |
| 96/32831 | 10/1996 | (WO) . |

OTHER PUBLICATIONS

"Nikkei Electronics", Nov. 4, 1996, No. 675, pp. 170–171 in Japanese; English Translation attached.
Philips Semiconductors, "The $I^2$–bus and how to use it (including specifications)", Apr. 1995, pp. 1–24.
Philips Semiconductors/ $I^2$–bus Internet Webpages, "$I^2$–bus: the worldwide standard for IC communication" and "About $I^2$ –bus".

Primary Examiner—Thomas Lee
Assistant Examiner—Tammara Peyton
(74) Attorney, Agent, or Firm—Keating & Bennett, LLP

(57) ABSTRACT

To provide a new data transmission system between a game device and related peripheral devices, and a device using same.

Serial transmission data is divided into an odd-numbered bit sequence and an even-numbered bit sequence. Each bit of the odd-numbered bit sequence data is distributed respectively between pulses of a first pulse sequence signal having a constant interval, thereby forming a first pulse sequence signal (SDCKA). Each bit of the even-numbered bit sequence data is distributed respectively between pulses of a second pulse sequence signal having a constant interval, thereby forming a second pulse sequence signal (SDCKB). The respective time axes are adjusted such that the clock component of the first pulse sequence signal is located in the data section of the second pulse sequence signal, the clock .component of the second pulse sequence signal is located in the data section of the first pulse sequence signal. Data is transmitted using these adjusted first and second pulse sequence signals (SDCKA, SDCKB).

35 Claims, 78 Drawing Sheets

START PATTERN   END PATTERN

START PATTERN WITH CRC OPTION

SDCKB OCCUPANCY PATTERN

RESET PATTERN

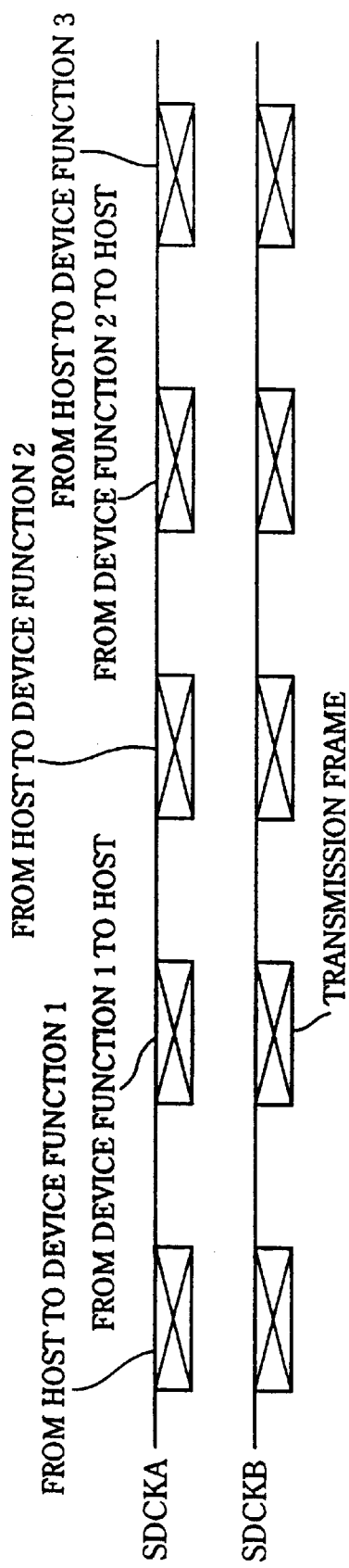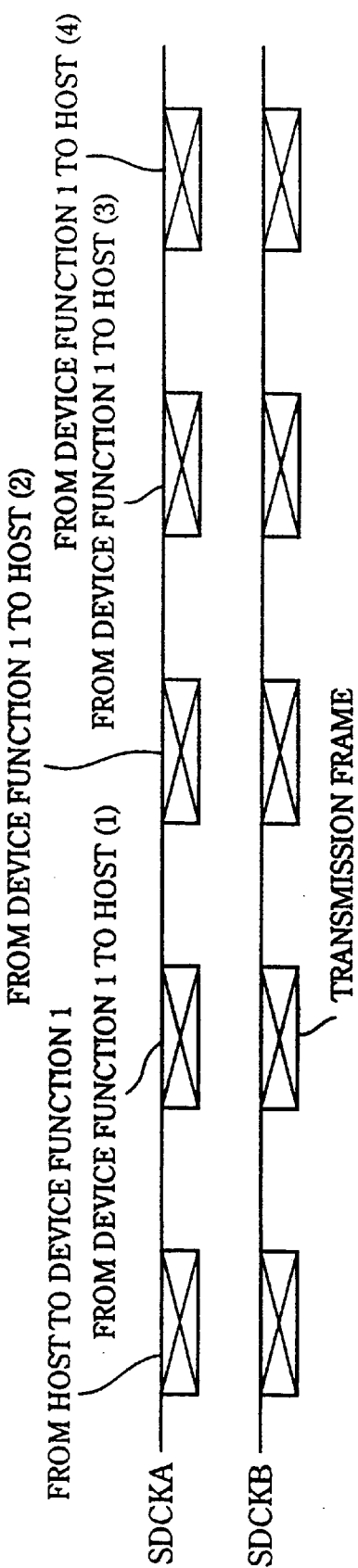

SDCKB OCCUPANCY PERMISSION PATTERN

RESET PATTERN

STANDARD FORMAT

GENERAL VIEW OF DATA TRANSMISSION

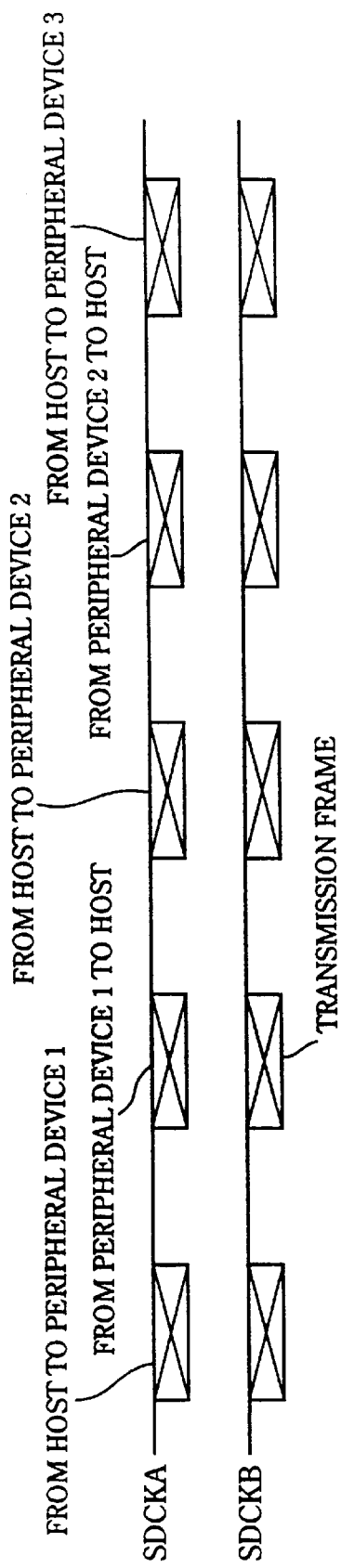
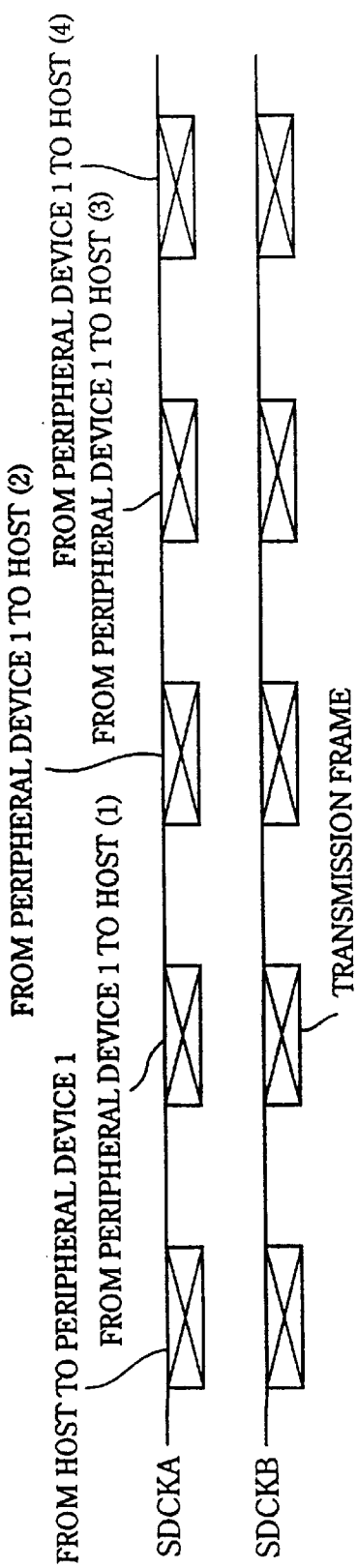

FIG.58 BASE DEVICE AP SETTING PROCEDURE

BLOCK DIAGRAM OF EXPANSION DEVICE MIE

WHEN DATA OF GREATER VOLUME THAT TRBF CAPACITY IS RECEIVED

Device Kill

Data Transfer

Get Condition

Get Media Info

Block Read

Block Write

Get Last Error ns of ze# DATA TRANSMISSION SYSTEM AND GAME SYSTEM USING THE SAME This is a Continuation of U.S. patent application Ser. No. 09/125,382 filed on Aug. 17, 1998.

TECHNICAL FIELD

The present invention relates to interface technology for providing mutual connection between data processing devices, which conduct data processing, and peripheral devices, which conduct input/output of information, and the like, and more particularly, it relates to a new interface technology standard relating to connections between game devices and related peripheral devices.

BACKGROUND ART

Data transmission methods for use in data communications between the main unit of an image processing device and peripheral devices related thereto include the following.
Philips, I²C Bus System In this system, serial data and a serial clock are transmitted by two wires. The data and clock are physically separated, and data transmission/reception and reproduction are possible by the simplest method. The I²C bus is described, for example, in Philips' I²C bus instruction manual (January 1992).
SGS—Thomson DS Link System In this system, a data signal and strobe signals are transmitted by two wires. A clock signal is reproduced by means of the data signal and strobe signal. When the transmitted data changes to a different value, only the data signal changes. When the transmitted data is the same value, only the strobe signal changes. For example, if the transmitted data in the data signal changes from "0"→"1", or "1"→"0" then the strobe signal does not change. If the transmitted data in the data signal does not change, e.g., "0"→"0", or "1"→"1", then the strobe signal only changes. Therefore, by adopting an exclusive-OR operation for the data signal and strobe signal, it is possible to reproduce a clock signal. The DS link system is introduced in *Nikkei Electronics*, Vol. 675, (Nov. 4$^{th}$, 1996, pp. 167–171). In consumer-oriented devices, such as game devices, it is necessary to use a data transmission system and interface connection standard which can be implemented at low cost. However, in the aforementioned I²BUS system, since the transition edge of the data signal has the same timing as the transition edge of the clock, it is not possible to use the clock signal directly on the data reproducing (demodulating) side. Furthermore, in the latter DS link system, exclusive-OR logic is applied to the data signal and strobe signal, to reproduce a synchronizing clock. The data signal must be sampled using this clock. Therefore, the level of simplicity of the interface circuit structure does not adequately satisfy the conditions for domestic game devices, where low cost is a very important requirement.

Consequently, it is an object of the present invention to provide a data transmission system for an interface having an inexpensive circuit composition, which can be applied to an image processing device, such as a domestic game system. It is a further object of the present invention to provide a data transmission system for an interface, whereby data can be separated from a signal carrying data by means of a simple circuit composition.

It is a further object of the present invention to provide a game device and a related peripheral device comprising interfaces, whereby data can be separated from a signal carrying data by means of a simple circuit composition.

It is a further object of the present invention to provide basic technology for developing various types of peripheral devices, by proposing novel interface technology between a game device and peripheral device.

DISCLOSURE OF THE INVENTION

In order to achieve the aforementioned objects, the data transmission system according to the present invention is a data transmission system for transmitting data by distributing one item of serial data into first and second data signals, wherein the first data signal contains each of the odd-numbered bits of the serial data, respectively distributed between pulses of a first clock formed by means of a pulse sequence having a uniform interval; the second data signal contains each of the even-numbered bits of the serial data, respectively distributed between pulses of a second clock formed by means of a pulse sequence having the same frequency as the first clock signal; the first data signal is transmitted such that the pulse edge of its clock signal component is located in the data section of the second data signal on the time axis; and the second data signal is transmitted such that the pulse edge of its clock signal component is located in the data section of the first data signal on the time axis (FIG. 10, FIG. 11, FIG. 50, FIG. 54). Furthermore, in a data transmission system wherein a data frame defined according to a transmission format comprising, at the least, a start pattern carrying data start information, a data pattern carrying serial data, and an end pattern carrying data end information, are transmitted by distributing the data frame between a first and a second data signal, the data transmission system according to the present invention is a data transmission system; wherein the start pattern is created by setting the first data signal to a constant value and setting the second data signal as a first pulse sequence signal; the data pattern is created by forming the first data signal by distributing each of the odd-numbered bits of the serial data respectively between pulses of a second pulse sequence signal having a constant interval, and forming the second data signal by distributing each of the even-numbered bits of the serial data respectively between pulses of a third pulse sequence signal, which is shifted by a prescribed amount from the position on the time-axis of the second pulse sequence signal; and the end pattern is created by setting the second data signal to a constant value, and setting the first data signal as a fourth pulse sequence signal. (FIG. 11, FIG. 12, FIG. 50, FIG. 54)

By means of this composition, it is possible to create a communications interface wherein the modulation and demodulation circuits can be composed relatively simply by means of a small number of data lines (namely, two data lines).

Preferably, the superimposed data is isolated by latching the level of one data signal of the first and second data signals at the pulse edge of the clock signal component of the other data signal. Thereby, it is possible to isolate the superimposed data by means of a simple circuit composition (FIG. 10, FIG. 28, FIG. 29, FIG. 50).

In a game device which requests transmission or reply of information required for a game by transmitting two data signals (SDCKA, SDCKB) simultaneously to a single or plurality of peripheral devices by means of a signal transmission path, the game device according to the present invention comprises: start pattern creating means for creating a start pattern represented by two data signals, wherein a first data signal is set to a constant value (or fixed value) state during a first time period, and a second data signal is set to a clock signal state during the first time period (FIG. 13(a), FIGS. 14, 58, 204c); data pattern creating means for creating a data pattern represented by two data signals, wherein data to be transmitted to the peripheral device is divided into two data sequences, and a first data signal is created by inserting each bit of the first data sequence respectively between pulses of a first clock signal, and a second data signal is created by inserting each bit of the second data sequence respectively between pulses of a second clock signal having the same frequency as, and a prescribed phase difference from, the first clock signal (FIGS. 10, 204e); end pattern creating means for creating an end pattern represented by two data signals, wherein the second signal is set to a constant value (or fixed value) state during a second time period, and the first signal is set to a clock signal state during the second time period (FIGS. 13, 58, 204c); and frame creating means for creating a frame represented by two data signals, containing the start pattern, the data pattern and the end pattern, and transmitting the frame as a transmission unit to the peripheral device (FIGS. 58, 204c).

Preferably, the data is serial data, the first data sequence is a data sequence comprising the odd-numbered bits of the serial data, and the second data sequence is a data sequence comprising the even-numbered bits of the serial data.

Furthermore, the prescribed phase difference is determined such that the pulse edge of the clock signal contained in one data signal of the two data signals representing the data pattern is located in the data section of the other data signal on the time axis, and the pulse edge of the clock signal contained in the other data signal is located in the data section of the aforementioned data signal on the time axis (FIGS. 10, 50).

The game device for implementing the foregoing data transmission method can readily separate out the data since either one or both of the two data signals comprises a transmission clock component. The modulation and demodulation circuit can be constructed relatively simply.

Preferably, the data pattern comprises a command and a parameter, and the parameter comprises, at the least, the address of the peripheral device connected to the signal transmission path which is to receive the frame (FIG. 7, FIG. 48). Since the signal format for data communications between the game device and peripheral device is standardized by a frame format, compatibility between the game device and a plurality of types of peripheral device can be readily guaranteed.

For the signal transmission path, wired data signal lines, or wireless radio communications channels (FIG. 95), or optical communications channels (FIG. 96), or a combination of these, can be used.

In a peripheral device for a game device which sends information required for a game to a game device having one input/output port or a plurality of input/output ports by transmitting two data signals simultaneously, the game device according to the present invention comprises:

start pattern creating means for creating a start pattern represented by two data signals, wherein a first signal is set to a constant value (or fixed value) state during a first time period, and a second signal is set to a clock signal state during the first time period; data pattern creating means for creating a data pattern represented by two data signals, wherein data to be transmitted to the game device is divided into two data sequences and each bit of the first data sequence is inserted respectively between pulses of a first clock signal, and each bit of the second data sequence is inserted respectively between pulses of a second clock signal having the same frequency as, and a prescribed phase difference from, the first clock signal; end pattern creating means for creating an end pattern represented by two data signals, wherein the second signal is set to a constant value (or fixed value) state during a second time period, and the first signal is set to a clock signal state during the second time period; and frame creating means for creating a frame represented by two data signals, containing the start pattern, the data pattern and the end pattern, and transmitting the frame as a transmission unit to the game device.

Preferably, the data is serial data which is readily divided into two data sequences, the first data sequence is a data sequence comprising the odd-numbered bits of the serial data, and the second data sequence is a data sequence comprising the even-numbered bits of the serial data. As well as serial data, block data can also be handled by means of a buffer for gathering data.

Preferably, the prescribed phase difference is determined such that the pulse edge of the clock signal contained in one data signal of the two data signals representing the data pattern is located in the data section of the other data signal on the time axis, and the pulse edge of the clock signal contained in the other data signal is located in the data section of the one data signal on the time axis (FIG. 10, FIG. 50). Thereby, it is possible readily to isolate the data superimposed on one data signal by means of the other clock.

Preferably, the data pattern comprises a command and a parameter, and the parameter comprises, at the least, the address of the input/output port of the game device which is to receive the frame (FIG. 48, FIG. 57).

Preferably, the data pattern comprises a command and a parameter, the parameter comprises, at the least, a source address indicating the address on the transmission path of the peripheral device transmitting the frame, and this source address is created on the basis of peripheral device identification information representing the type of the peripheral device already recorded by the peripheral device, and information relating to the input/output port to which the peripheral device is connected as indicated by the game device (FIG. 58).

In a peripheral device for conducting data communications with a game device comprising one input/output port or a plurality of input/output ports by means of a data transmission path connecting to-one of the input/output ports of the game device, the peripheral device according to the present invention comprises: first storage means for previously storing identification information for the peripheral device representing the type of the peripheral device; second storage means for storing input/output port information representing the input/output port to which the data transmission path is connected, as indicated by the game device; and source address creating means for creating a source address for the peripheral device which is appended to the data to be transmitted to the game device, on the basis of the peripheral device identification information and the input/output port information (FIG. 58).

By means of this composition, the game device is able to identify from the received transmission data the address of the peripheral device on the data transmission path and the type of that peripheral device.

In a peripheral device for conducting data communications with a game device by means of a data transmission path connecting to any one of a single input/output port or plurality of input/output ports provided in the game device, the peripheral device according to the present invention comprises: a single base connector which connects to the data transmission path; a single expansion connector or plurality of expansion connectors which connect to the data transmission path via the base connector, in order to connect other peripheral devices to the data transmission path; and an input/output controller for conducting data communications with the game device via the base connector; wherein the input/output controller comprises: first storage means for previously storing peripheral device identification information representing the fact that the device is a peripheral device which is to be connected directly to the game device; second storage means for storing input/output port information representing the input/output port to which the data transmission path is connected, as indicated by the game device; connection identifying means for creating connection information representing the connection status of other peripheral devices by identifying whether or not a further peripheral device is connected to any of the expansion connectors; and source address creating means-for creating a source address containing the peripheral device identification information, the input/output port information and the connection information, which is to be appended to the transmission data (FIG. 58).

Preferably, the identifying means determines whether or not there is a connection at the expansion sockets by identifying the voltage level of a particular terminal of the expansion connectors, which is connected to a level shift circuit composed such that a bias voltage is supplied by the further peripheral device.

In an expansion peripheral device which connects to an expansion connector of the aforementioned peripheral device, the expansion peripheral device according to the present invention comprises: first storage means for storing connector identification information representing the number of an expansion connector as indicated by the input/output controller via the expansion connector, after connecting to the expansion connector; second storage means for previously storing expansion peripheral device information representing the fact that the device is a peripheral device which is to be connected to the expansion connector; third storage means for storing input/output port information representing the input/output port to which the data transmission path is connected, as indicated by the game device by means of the data transmission path, the base connector and the expansion connector; and source address creating means for creating a source address containing the expansion peripheral device information, the input/output port information, and the connection information, which is to be appended to transmission data (FIG. 59).

In a game device comprising a single input/output port or a plurality of input/output ports for connecting via a main data transmission path (M bus) a base peripheral device composed such that a single expansion peripheral device or a plurality of expansion peripheral devices can be connected thereto via auxiliary data transmission paths (LM bus), the game device according to the present invention comprises: an input/output controller for conducting intermittent data communications with any of the peripheral devices by means of frame signals; wherein data communications are conducted according to a format whereby a relevant peripheral device responds to instructions from the input/output controller; the frame signals comprise: a start pattern representing the start of a data pattern, a data pattern carrying transmission data, and an end pattern representing the end of a data pattern; the data pattern comprises a command and a parameter; the parameter comprises a destination address and a source address; and both the destination address and the source address are created by including information relating to the main data transmission path used in communications, the base device/expansion device classification of the peripheral device involved in communications, and the auxiliary data transmission path used in communications (FIG. 58, FIG. 59).

Preferably, the auxiliary data transmission paths are connected respectively in parallel to the main data transmission path, and direct data communications are conducted between the game device and expansion peripheral devices.

Preferably, the base peripheral devices and the expansion peripheral devices each respectively hold inherent information containing information on the type of peripheral device and information inherent to the device, and the game device reads out this inherent information by means of the data transmission. The game device can identify compatibility between the game application and the peripheral device by referring to the inherent information.

Thereby, it is possible to avoid the use of game devices which are incompatible with so-called "plug and play" systems or applications.

Preferably, the main data transmission path is constituted by two data lines, and two data signals formed by dividing the frame signal are used to transmit the two data lines, respectively. Thereby, it is possible to apply the data transmission method according to the present invention to a game device.

Is In a base peripheral device for a game device, to which a single expansion peripheral device or a plurality of expansion peripheral devices can be connected by means of respectively provided auxiliary data transmission paths, and which is connected to a game device comprising a single input/output port or a plurality of input/output ports by means of a main data transmission path, the base peripheral device according to the present invention comprises an input/output controller for conducting intermittent data communications with the game device by means of frame signals; and the data communications are conducted according to a format whereby the input/output controller responds to instructions from the game device; the frame signals comprise: a start pattern representing the start of a data pattern, a data pattern carrying transmission data, and an end pattern representing the end of a data pattern; the data pattern comprises a command and a parameter; the parameter comprises a destination address and a source address; and both the destination address and the source address are created by including information relating to the main data transmission path used in communications, the master/slave classification of the peripheral device involved in communications, and the auxiliary data transmission path used in communications (FIG. 58 and FIG. 59).

The base peripheral for a game device according to the present invention further comprises a connector for connecting to the main data transmission path, and a plurality of expansion connectors for connecting the main data transmission path to the auxiliary data transmission paths in parallel by means of the connector.

Preferably, the base peripheral device comprises storage means for storing inherent information including the type of peripheral device and information inherent to the device, and this inherent information is transmitted by means of the data communications in response to a request from the game device.

Preferably, the base peripheral device uses the data transmission method according to the present invention by means of a composition wherein the main data transmission path is constituted by two data lines, and two data signals formed by dividing the frame signal are used to transmit the two data lines, respectively.

By connection to a game device having a plurality of input/output ports, the peripheral device of the foregoing composition conducts data communications with the game device, and creates a source address for itself on the data transmission path by means of information relating to the input/output port as indicated by the game device, and information representing the type of peripheral device held by the device itself.

In an expansion peripheral device for a game device which connects to a game device by means of an auxiliary data transmission path, a base peripheral device to which expansion peripheral devices can be connected, and a main data transmission path, the expansion peripheral device according to the present invention comprises an input/output controller for conducting intermittent data communications with the game device by means of frame signals; and data communications are conducted according to a format whereby the input/output controller responds to instructions from the game device; the frame signals comprise: a start pattern representing the start of a data pattern, a data pattern carrying transmission data, and an end pattern representing the end of a data pattern; the data pattern comprises a command and a parameter; the parameter comprises a destination address and a source address; and both the destination address and the source address are created by including information relating to the main data transmission path used in communications, the base device/expansion device classification of the peripheral device involved in communications, and the auxiliary data transmission path used in communications (FIG. 59).

Preferably, the main data transmission path is constituted by two data lines, the auxiliary data transmission path is constituted by two data lines in the upstream direction and two data lines in the downstream direction, and two data signals formed by dividing the frame signal are used to transmit the two data lines, respectively.

The expansion peripheral device of the foregoing composition conducts data communications with a game device comprising a plurality of input/output ports by means of a peripheral device (base peripheral device) having a plurality of expansion connectors connected in parallel to any one of the input/output ports. It creates a source address used in data communications by means of information relating to the input/output port, as indicated by the game device, and information relating to the expansion connector used, as indicated by the peripheral device. The source address is not simply an address, but also contains certain information. This type of function of the peripheral device is suitable for plug and play systems, and the like.

The information storage medium according to the present invention stores programs for causing a computer system to operate as the aforementioned game device (host) or peripheral device.

DESCRIPTION OF THE DRAWINGS

FIG. 18(a) is a diagram illustrating an aspect of the M bus where data communications are conducted intermittently according to a format whereby the device functions respond to commands from a host;

FIG. 18(b) is a diagram illustrating an example where the data to be transmitted is long, and the data is transmitted intermittently using a plurality of transmission frames;

FIG. 56(a) is a diagram illustrating how data communications are conducted intermittently by means of a format whereby devices respond to commands transmitted to the devices by the host;

FIG. 56(b) is a diagram illustrating an example where data to be transmitted is divided into a plurality of data and transmitted intermittently by means of a plurality of transmission frames, when the data to be transmitted is larger than the volume that can be[]transmitted by a single transmission frame;

BEST MODE FOR CARRYING OUT THE INVENTION

Summary of Composition

Figure 1:
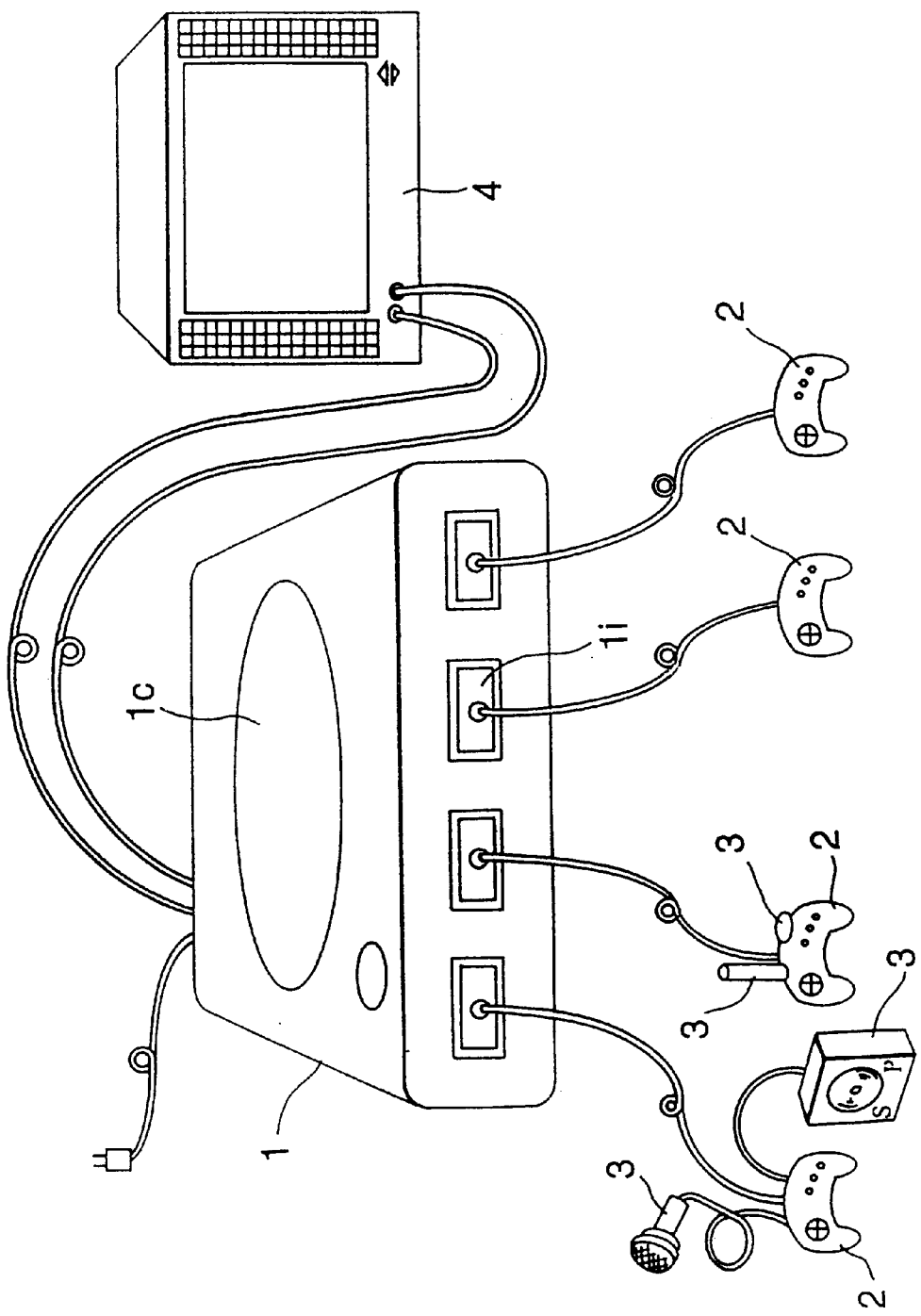
FIG. 1 is an illustrative diagram showing examples of a host (game device) 1, peripheral device 2 and expansion peripheral device 3.
Figure 2:
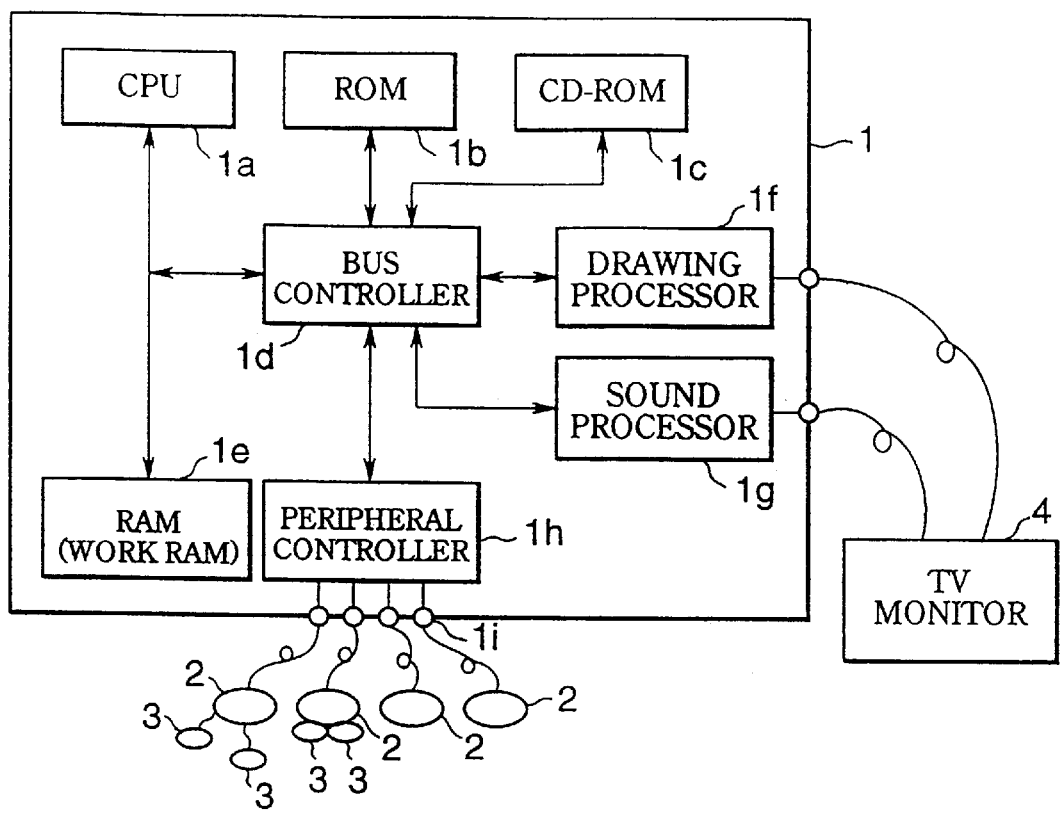
FIG. 2 is a block diagram showing a host control system.

Firstly, an outline of the system composition is described with reference to FIG. 1 and FIG. 2. FIG. 1 is an illustrative diagram for describing a game device comprising a computer system. FIG. 2 is a block diagram for describing a control system for this game device.

The game device (host) 1 comprises: a CPU 1a for executing game programs, and the like; a ROM 1b for storing control programs, data, OS, and the like, for the game device; a CD-ROM device 1c for storing game application programs and data; a bus controller 1d for controlling data transfer between the CPU 1a and other sections; a RAM 1e for storing programs and data for the CPU 1a, which is used in data processing; a drawing processor if for generating image signals from drawing data; a sound processor 1g for forming sound signals from sound data; a peripheral interface 1h for relaying data transfer between the CPU 1a and external peripheral devices; and the like. A portion of the RAM 1 e is used as a working RAM for peripheral data processing, thereby enabling a so-called DMA operation. An image signal and sound signal are supplied to a monitor 4 (e.g. TV monitor), and video images and sounds are output. The peripheral devices comprise basic peripheral devices 2 and expansion peripheral devices 3. The basic peripheral devices 2 are connected to the peripheral interface 1h via a connector 1i, and the expansion peripheral devices 3 are connected to the basic peripheral devices 2. The basic peripheral devices 2 and expansion peripheral devices 3 are connected electrically (or by logic structure) to the host in parallel. The basic peripheral devices 2 are, for example, game controllers, and the expansion peripheral devices 3 are, for example, sound input devices, sound output devices, light ray gun modules, vibrating devices, memory devices, or the like.

Here, in the first mode of implementation (first interface standard) described below, the peripheral devices are investigated in terms of the function that they perform, and they are divided into U device function and L device function. This classification takes into account the fact that, in addition to cases where a single peripheral device forms a single function, there are also cases where a plurality of functions are formed by a single peripheral device, and cases where a single function is realized by a plurality of peripheral devices.

On the other hand, in the second mode of implementation (second interface standard) described below, the peripheral devices are divided into basic peripheral devices and expansion peripheral devices according to-the-connection relationships between the devices.

The modes for implementing the present invention are broadly classified into a first mode of implementation and second mode of implementation.

First Mode of Implementation

Initially, the meaning of terminology used in the first interface standard according to the present invention is described with reference to the drawings.

Firstly, data obtained by expanding data on a time series is called "serial data". A signal line which exchanges data in the form of serial data is called a "serial bus". A serial bus which connects a game device and peripheral devices by means of the interface standard according to the present invention is called an M bus (M-Bus).

The registration system identification number allocated initially to the device function of each peripheral device is called the "device ID". A plurality types, for example, 256 types of device ID can be prepared. It is also possible to have a plurality of the same device numbers at a single port.

The section whereby a peripheral device can be connected to the peripheral controller of the game device via the M bus is called a "port". The M bus enables-the active connection of a plurality of ports. It is, for example, possible to support 16 ports, but this mode of implementation relates to an example where four ports (port A, port B, port C, port D) are supported.

Figure 3:
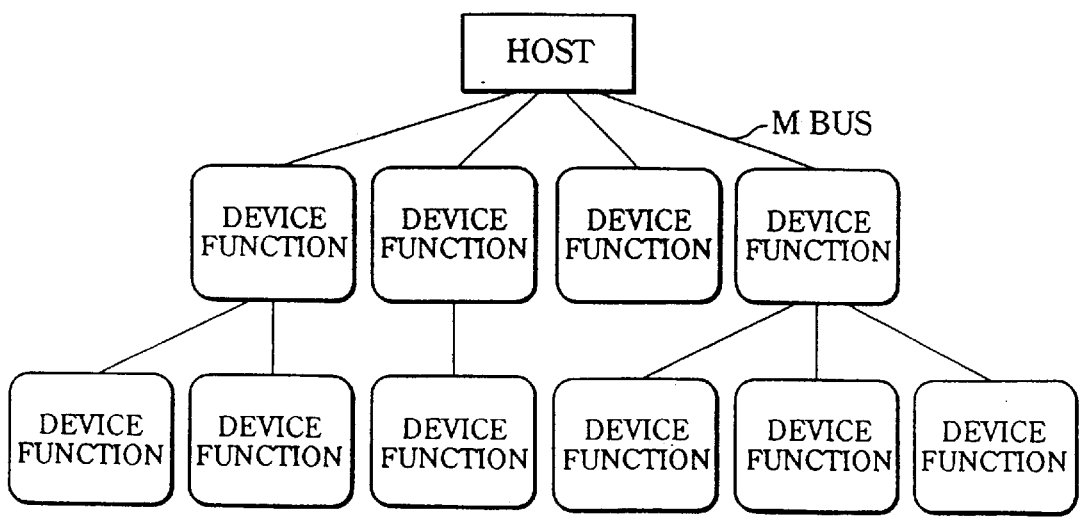
FIG. 3 is a block diagram illustrating connection relationships between a host and devices.

As shown in FIG. 3, the game device is called the "host", and one function of a peripheral device connected thereto is called a "device function". Since "device function" indicates a function of a device, rather than the device (product) itself, in addition to cases where a single function is realized by a single device, it is also possible to divide the function of a single device into a plurality of functions, each of which is taken as a device function. On the M bus, there is one host device, which is connected to device functions in a tree configuration. Each device function appears as though it is present on the same M bus. A plurality of device functions, for example, 14 device functions, can be connected to a single port. The device functions allow the peripheral devices of the game device to function as, for example, a game controller, game pad, joys tick, keyboard, imitation control device, imitation gun, recording device, sound device, and the like.

Figure 4:
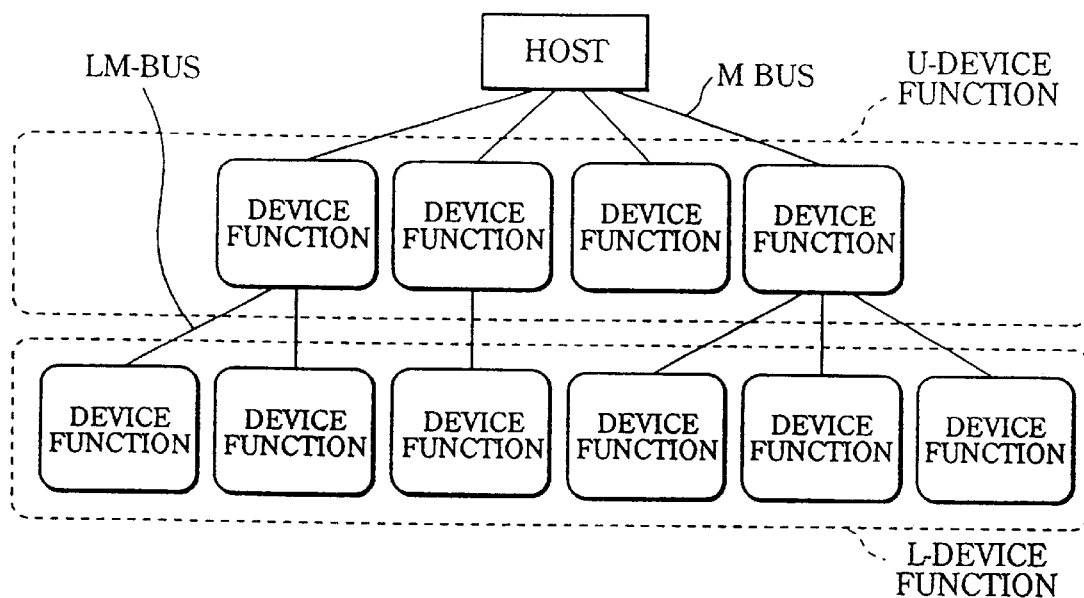
FIG. 4 is a block diagram illustrating relationships between a host, upper devices and lower devices.

As shown in FIG. 4, the device functions are divided into two types: "upper (U) device function" and "lower (L) device function". The U-device functions can be connected to the host. The U-device functions have the capacity to control L-device functions. The L-device functions are based on the premise that they are connected, (or can connect) with a U-device function. An M bus which links an L-device function to a U-device function is called an "LM bus".

Unless at least one U-device function is provided at a port, that port cannot be used. Principally, game device controllers form U-device functions, and expansion (peripheral connected) devices form L-device functions. The M bus can be connected, for example, to a maximum of 14 L-device functions.

Furthermore, it is possible to connect a U-device function to a U-device function. In this case, the connected U-device function becomes an L-device function. It is unnecessary for the U-device functions and L-device functions to be separated physically, and it is possible for a further device function separated logically within a U-device function to form an L-device function.

For example, within the device function-controlling ICE (e.g., microcomputer or micro-controller) of the peripheral device, the digital control sections and the analogue control sections can be set by function as U-device functions and L-device functions, respectively and when an analogue control section, namely, an L-device function, is not in use, it is possible to disable that section.

Figure 5:
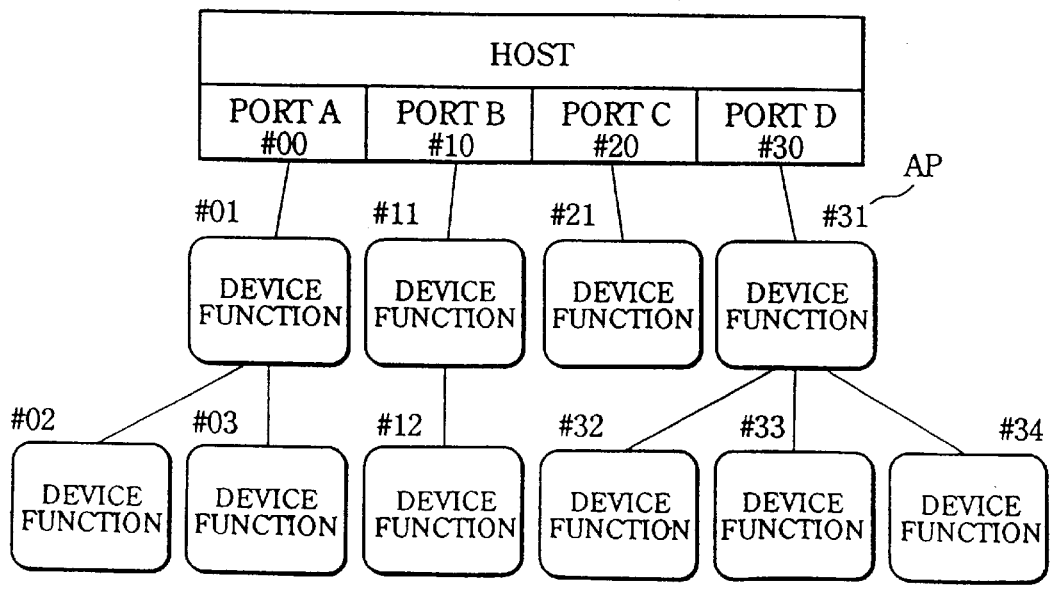
FIG. 5 is a block diagram illustrating the allocation of absolute positions.

As FIG. 5 shows, numbers are allocated to each device function in order from port A, such that any one of plurality of device functions can be accessed directly by the host at each port of the host. The identification number (or symbol) for access allocated to each device function is called the "absolute position (AP)".

On the M bus, a plurality of device functions are allocated to a single port of the host. The relationship between the number of ports on the M bus and the number of APs is expressed by the following equation:

(Maximum number of ports)×(Maximum number of APs allocated to one port)=constant In the M bus according to the mode of implementation, the "constant" is taken to represent one byte. In this case, (4 ports (max. 16 ports))×(APs for max. number of ports)=1 byte.

Of the 16 APs, one AP is reserved for the host port, so there is a maximum of 15 APs allocated to any single port. Therefore, a maximum of 15 device functions can be used at a port. Moreover, since one U-device function is connected to a port, the maximum number of L-device functions at any port will be 14.

The number range that can be used at a port is determined for each port by the APs allocated to the device functions. For example, the AP will be composed as follows:

Bit 76543210

AP pppp - - -

Here, "pppp" is the port number (port A="0000", port B="0001", port C="0010", port D="0011"), and "- - -" is the serial number ("0000" (denary of "0")–"1111" (denary of "15")). Accordingly, the APs for a maximum of device functions is fifteen, and fifteen device functions can be set at one port.

Indicated in binary values, the AP value of the device function is "00000001"–"00001111" at port A, "00010001"–"00011111" at port B, "00100001"–"00101111" at port C, and "00110001"–"001111111" at port D.

Indicated in denary values, the above values are 1–15, 17–31, 33–47, 49–63, and in hexadecimal values, #01–#0F, #11–#1F, #21–#2F, and #31–#3F.

The AP of each port of the host viewed from the device function is always the smallest AP value usable at that port, and at port A, it is #00, at port B, it is #10 (16), at port C, it is #20 (32), and at port D, it is #30 (48). The device function and host can identify the port to which it is connected by the leading four bits of. the AP. Access to a device function specifies a device function which is accessed by this AP.

Figure 6:
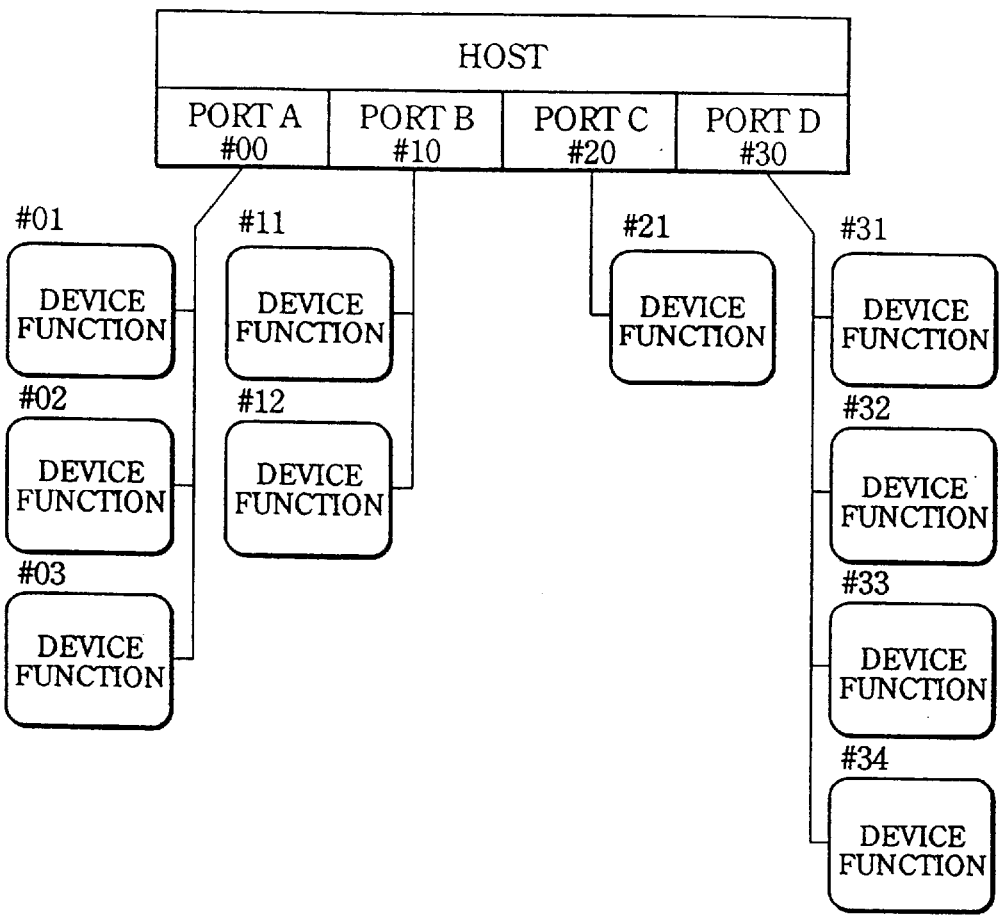
FIG. 6 is a block diagram illustrating that the devices have positional permeability when viewed from the host.

As designating an AP allocated to each device function is at the same time the designation of a device function, the host can access each device function of the peripheral device directly. Therefore, as shown in FIG. 6, viewed from the host, the host appears to be connected to each device function directly. In other words, each device appears to be connected to the same bus.

The data exchange between host and device function is not conducted by conventional one-way communications, but rather by using certain specific instructions, such that data appropriate to that time and place can be transmitted and received. These instructions are called "commands". The command data is called a "parameter".

Figure 7:
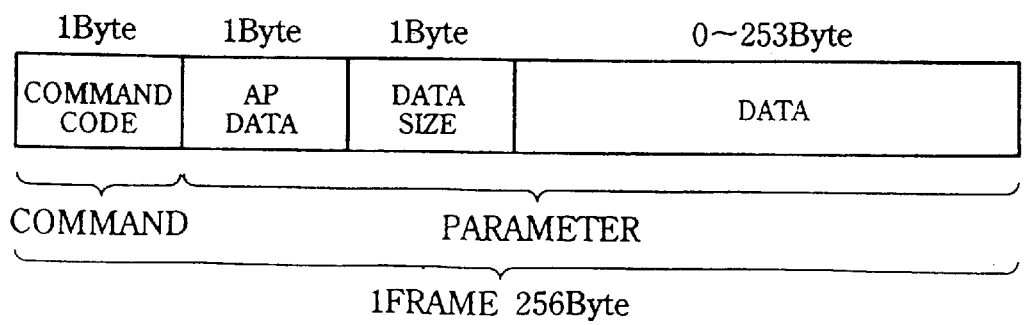
FIG. 7 is a diagram illustrating the composition of one frame of transfer data.

One cycle of transmission data is constituted by one frame (e.g., 256 bytes) comprising a command+parameter, as shown in FIG. 7. The parameter may include AP data, data size, and data, or data may be omitted.

In principle, the host accesses a device function by issuing a command. When the device function has prepared the corresponding data, it issues a command to the host and sends the data. On the M bus, a maximum of 254 commands, for example, can be prepared, and a maximum of 253 bytes of data can be transmitted.

A location for connecting an expansion device for expanding the functions of the peripheral device, such as a game controller functioning as a game operating input device, is called an "expansion socket." In principle, L-devices are connected to expansion sockets. A standard game controller may comprise two expansion sockets, for example. The M bus may be provided with an equal number of expansion sockets to the number of L-device functions, for instance, 14 in the case of this mode of implementation.

A circuit which converts certain data to serial data for the M bus, such that it can be communicated via the M bus, is called an "M bus I/F engine" (MIE)". M bus standard devices all comprise MIEs of this kind. The host incorporates a host MIE, the U-device functions, a U-device function MIE, and the L-device functions, an L-device function MIE.

Figure 8:
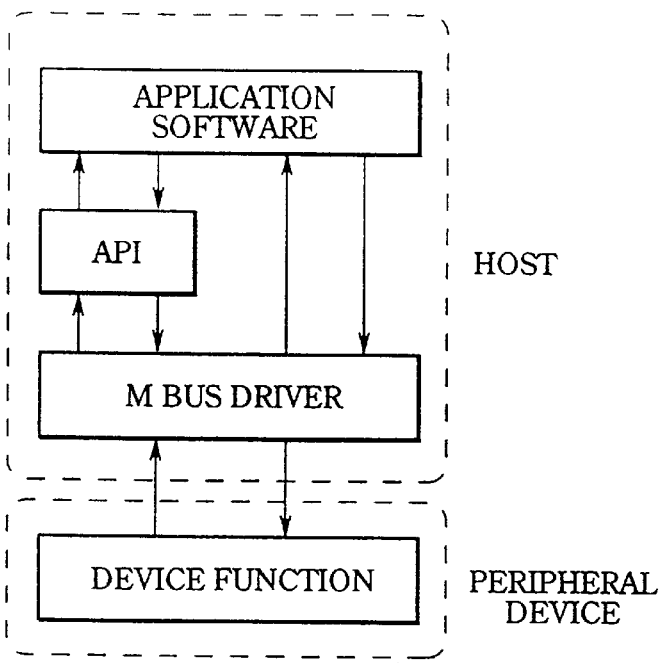
FIG. 8 is a block diagram illustrating the composition of an interface the software side.

As shown in FIG. 8, in order for the host to access a device function, it is always necessary to operate via software (M bus driver) which exercises general control over the device functions. The device functions are controlled and managed by the M bus driver. This M bus driver manages the device ID (function identification number), AP (absolute position), and port, etc., and it controls and manages the reception and transmission of commands, the data format, and the like. Commands can be increased by improving (upgrading) and augmenting the M bus driver.

On the M bus, all device functions are obliged to have information particular to themselves (inherent information) recorded according to a prescribed format. This device function information is called "device status".

The device status records the product name, device ID, license, model number, destination, LM bus number, and the like, as management data, and the standby current consumption and maximum current consumption, etc., as electrical data (hardware information). The device status is managed and utilized by the M bus driver and application program interface (API); for example, it enables the product name and connection capacity of a peripheral device to be identified, and allows the current for all ports to be controlled, on the basis of the maximum current consumption, and the like.

Figure 9:
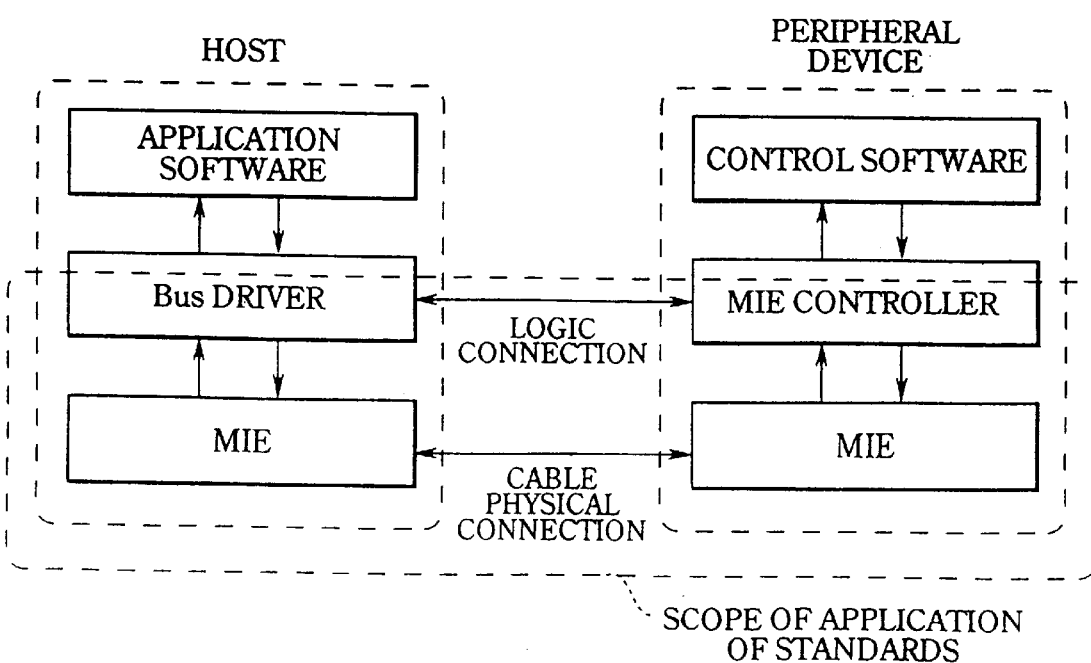
FIG. 9 is a block diagram illustrating transmission protocol levels between a host and device.

FIG. 9 gives an approximate illustration of the proposed scope of the present interface standard. The application software performed in the host conducts the data communication with the device functions in the peripheral devices via the software called API, or directly by giving instructions to the M bus driver. Commands formed by the M bus driver in accordance with the instructions are supplied via the host MIE, cable, peripheral device MIE, and MIE controller to control software, which forms the nucleus of the device functions of the peripheral device. This control software sends a reply corresponding to the command in question to the application software performed in the host, via the MIE controller, peripheral device MIE, cable, host MIE, and M bus driver. It is possible to provide a plurality of device functions in a peripheral device, and in this case, it is possible for each device function to share use of an MIE. Here, the MIEs and connecting cables, etc. represent physical levels, and the M bus driver and MIE controller represent logic levels.

Next, data transmission on the M bus will be described. On the M bus, data transmission is carried out by a synchronized serial system. The connecting cables comprise a total of four lines: a power line pair (Vcc, GND), and a data line pair (SDCKA, SDCKB: two-way). If necessary, a shield wire for shielding the connecting cable in order to prevent noise is added. Data transmission and reception uses a two-way communications half-duplex system, which is set to an appropriate data transfer speed, for example, 2 Mbps.

Figure 10:
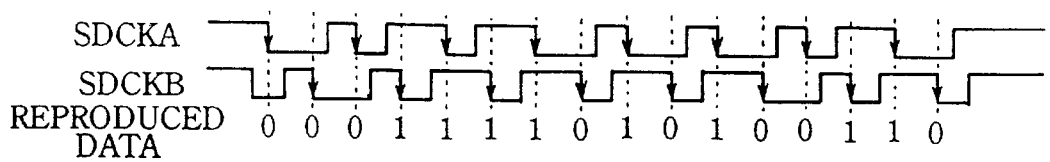
FIG. 10 diagram illustrating a data transmission system.

The principles of data transmission are now described with reference to FIG. 10. Data is transmitted by means of a serial data clock (SDCK)A and serial data clock (SDCK)B, which propagate a data line. When transmitting data, the serial data clocks A and B comprise a clock component, and they alternately form a negative edge (falling edge), as shown in FIG. 10. In other words, as shown in the data pattern section shown in FIG. 11, data bits are inserted between each pulse of the transmission clock pulse sequence, and the serial data clocks A and B are shifted relatively to each other by an appropriate amount on the time axis (a time shift whereby the pulse edge of one signal is positioned in the data section of the other signal). On the receiving side, the data section of one signal is latched in accordance with the negative edge timing of the waveform of the other signal, and this data section is read out to produce data (reproduction data). The data is transferred starting from the most significant bit (MSB), for example. A circuit for carrying out data transmission in this way can be;constructed relatively simply. Moreover, the data latch timing may also be based on the positive edge (rising edge) of the signal.

According to this system, it is possible to lower the transmission frequency in a data transmission path, compared to an $I^2$BUS or DS-link system. For example, in order to transmit at a data transfer speed of 10 Mbit/s using an $I^2$BUS or DS-link system, it is necessary to operate the data transfer medium at 10 MHz. However, using the present system, since 10 Mbit of data is transmitted by dividing it between two data lines which carry 5 Mbit each, theoretically, it is possible to obtain a data transfer rate of 10 Mbit/s using a 5 MHz data transfer clock on the data lines. Furthermore, since the pulse width is lengthened by the insertion of data between the clock pulses, in the corresponding sections, the transmission frequency falls by an equivalent amount. Since a lower transmission speed is satisfactory, circuit design is simplified.

Figure 11:
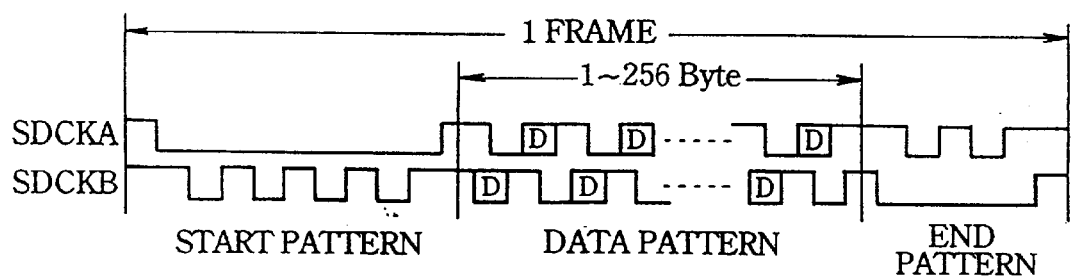
FIG. 11 is a diagram illustrating a standard format of a transmission frame.
Figure 12:
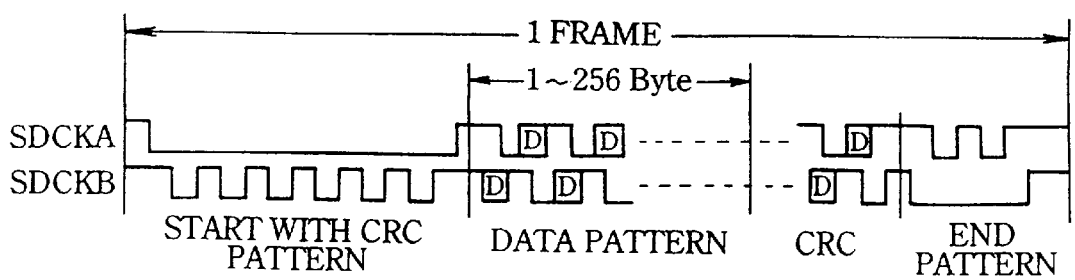
FIG. 12 is a diagram illustrating a transmission frame format comprise a CRC option.

FIG. 11 and FIG. 12 show examples of signal transmission formats. A transmission format comprises: a start pattern, data pattern, and end pattern, and if necessary, CRC (Cyclic Redundancy Check) bits are added.

FIG. 11 shows a standard transmission format Data transmission is conducted in frame units (smallest unit). The composition of one frame in the standard format begins with a start pattern (START), which indicates the start of data transmission, and then comprises a 256-byte-long data pattern (DATA), and an end pattern (END). The "D" symbols shown in the data pattern represent sections carrying the "0" and "1" bit information of the data.

FIG. 12 shows an example of a format which incorporates the CRC option, wherein an error correction function is added to the standard data format. A cyclic redundancy check (CRC), for example, may be used as an error correction method. In data transmission using a CRC option, a CRC code pattern is added after the data which is the object of the CRC, as illustrated in the data pattern in FIG. 12.

Figures 13A, 13B:
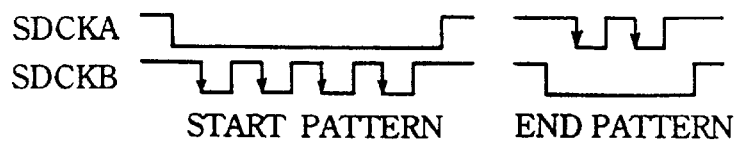
FIG. 13 is a diagram illustrating (a) a start pattern and (b) an end pattern of a synchronizing pattern.
Figure 14:
FIG. 14 is a diagram illustrating a CRC option start pattern.

The portions outside the data pattern in the transmission format described above form information patterns which carry specific information. The information patterns are defined by the number of signal pulses (transmission clocks) for which either of the data lines SDCKA or SDCKB propagate the other signal line whilst in an "L" level state. Information patterns may include, for example, synchronizing patterns, data line occupancy permission patterns, reset patterns, and the like. Synchronizing patterns include: start patterns as illustrated in FIG. 13(a), end patterns as illustrated in FIG. 13(b), and start patterns with CRC option as illustrated in FIG. 14.

A start pattern is a synchronizing pattern transmitted prior to the aforementioned data pattern. If the MIE on the receiver side detects four negative edges of data line SDCKB whilst the data line SDCKA is at level "L", the subsequent pattern is read as a data pattern and buffered using a memory. The end pattern indicates the end of the data pattern. If the MIE on the receiver side detects two negative edges of data line SDCKA whilst the data line SDCKB is at level "L", then this confirms that the data pattern has ended and indicates proper completion of the process.

The start pattern with CRC option represents the START pattern when a CRC option is added. If the MIE on the receiver side detects six negative edges of the SDCKB line whilst the data line SDCKA is at level "L", then it is identified as data transmission comprising a CRC option. Error inspection is conducted with respect to the data section, using the 16 bits prior to the END pattern as CRC data.

Figure 15:
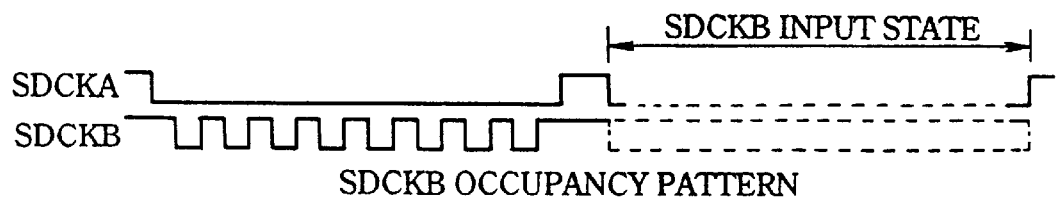
FIG. 15 is a diagram illustrating an SDCKB occupancy permission pattern.

FIG. 15 shows an example of a data line occupancy permission pattern whereby the host permits the receiver side to occupy one of the data lines. In an occupancy permission pattern relating to occupancy of data line SDCKB, the SDCKB line has 8 negative edges whilst SDCKA is at level "L". When the MIE on the receiver side detects the SDCKB occupancy permission pattern, then it is possible to occupy SDCKB whilst SDCKA is at "L", starting from the subsequent negative edge of SDCKA. The occupancy of SDCKB is cancelled by the following positive edge of SDCKA.

For example, it is possible to send output data from a light gun used in a shooting game device to the game device by occupying the data line SDCKB. Data is transferred by using only the data line SDCKB, and data line SDCKA indicates the occupancy time (period).

Figure 16:
FIG. 16 is a diagram illustrating a reset pattern.

FIG. 16 shows a reset pattern. The reset pattern comprises 14 negative edges of data line SDCKB whilst data line SDCKA is at level "L". When the MIE on the receiver side detects the reset pattern, it identifies this as a reset request from the host. The device then initializes the MIE and erases the AP. No data apart from this is initialized.

Figure 17:
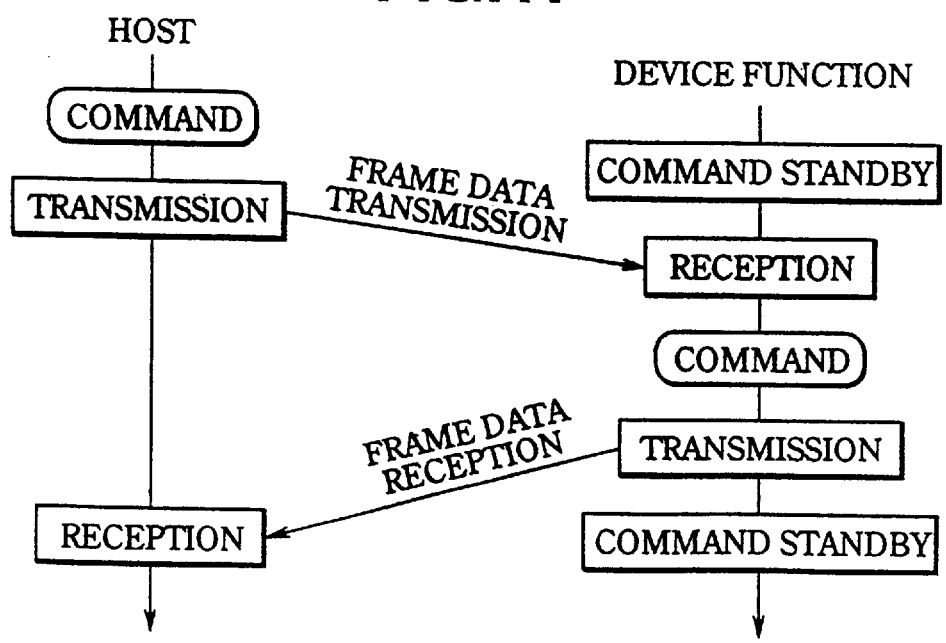
FIG. 17 is a diagram illustrating a communications mode between a host and device function.

Next, the transmission protocol in data communications between host and device is described with reference to FIG. 17.

Firstly, in principle, the host has the right of priority to transmit commands. Communications are conducted in a form whereby a corresponding device function responds to a command from the host. Therefore, all transmission protocols start with transmission of a command from the host. FIG. 18(*a*) gives an illustration of this. Data is transmitted from the host to the device function when the need arises. Therefore, on the M bus and LM bus, intermittent data communication is carried out between the host and a plurality of device functions. If the data to be transmitted exceeds the prescribed length for one transmission frame, then the data is divided into a plurality of sections as shown in FIG. 18(*b*), and each of the divided data sections is transmitted by a plurality of transmission frames (see FIG. 70 described below).

The host application program accesses the bus driver in order to obtain data from the device function of a particular peripheral device. The driver creates an AP, forming an address, and a command, and the MIE sends frame data carrying the AP and command to the M bus. In a normal state, the device functions connected to the bus are at standby awaiting a command from the host. The MIE at the peripheral device receives the frame data, and transfers the command to the control program of the device function via the MIE controller.

If the control program detects its own AP, it sends back a response to the relevant command via the MIE controller. The MIE creates frame data containing the return command and the host AP, and outputs this to the bus. The host receives this frame data, thereby obtaining a response to the transmitted command. The device function returns to a command standby state.

In this way, the host can obtain required information from a device function.

Figure 19:
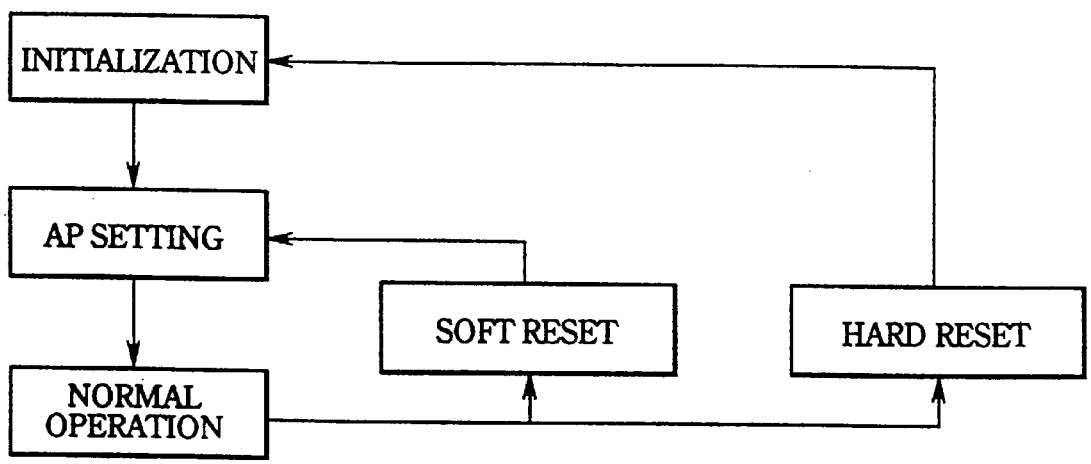
FIG. 19 is a diagram giving an approximate illustration of the operation of a device.

Next, an overview of the processing implemented in the device functions is described with reference to FIG. 19. When a power line is connected to the peripheral device and power is supplied, the device function executes an initialization process for setting initial hardware values, and the like. Thereupon, an AP setting process is implemented to set the AP value of the device function. In the AP setting process, the connected device functions are identified, and APs are allocated to the device functions, etc. By giving the device function an AP, it is possible to conduct communications between the host and device function using the AP, thus realizing a normal operational state.

In a normal operational state, when a device function receives a reset command from the host, the AP is reset (software reset). When a bus reset command is received, all the device functions connected to the bus at the corresponding port are initialized, and the APs are reset (hardware reset). The host can also order an operation to be prohibited or suspended, by transmitting a command to each device function.

Figure 20:
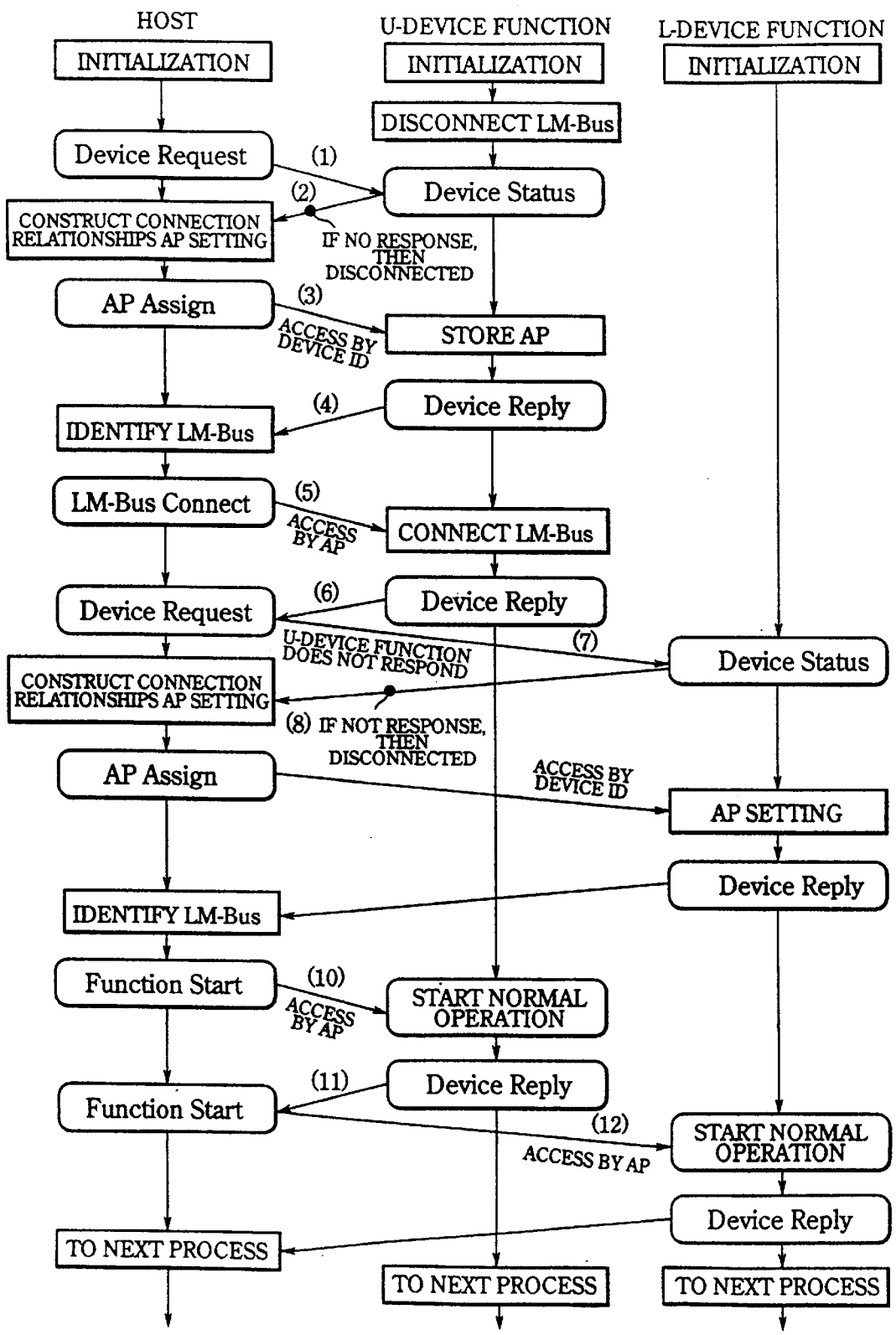
FIG. 20 is a diagram illustrating an absolute position (AP) setting procedure.

The process of AP setting in the device functions is now described with reference to FIG. 20.

(1) After completing initialization, the host transmits a Device Request in sequence starting from port A, to confirm whether any device functions are connected to the ports. The Device Request is a command which requires any device function which has not been allocated an AP to send back its Device Status, which gives the information inherent to the device. It is transmitted in sequence starting from port A and ending at port D.

(2) After completing initialization, a U-device function disconnects the LM bus from the M bus and waits for a Device Request from the host. If it receives a Device Request from the host, it sends back a Device Status to the host in response. At this stage, there is only one device function at a port receiving a device request at any one time. There is no response from device functions which have not been allocated an AP.

(3) When the host receives a Device Status from a device function, it determines the-connection relationship and device attributes on the basis of this data, and it allocates an AP to the device function and transmits an AP Assign carrying the allocated AP value to the device function. APs a reallocated consecutively within a set range for each port, and the host detects the relationship between the AP and device function. If the device function attributes are not those expected by the applicational software (outside range of use), then the operation of that device function-can be-terminated by sending a Device Kill command. If the device function is a U-device function, then the L-device functions connected thereto are also terminated, thereby allowing the whole port to be disabled.

(4) The device function reads in the AP Assign from the host, stores its allocated AP, and then transmits a Device Reply to the host as a response from the device function. Thereafter, the host accesses the device function using the device ID and AP.

(5) Since the host detects the number of device function LM buses currently set from the device status, if there is an LM bus, the host will transmit LM-Bus Connect such that one of the LM buses connects to a device function. If there is no LM-Bus Connect, then the processing in (10) below is implemented.

(6) When a U-device function receives-LM-Bus Connect, it connects one LM bus to the M bus. It then sends a Device Reply to the host.

(7) When the host receives a Device Reply, it transmits a Device Request. In this case, since the U-device function has already been allocated an AP, it does not respond.

(8) When an L-device function receives a Device Request from the host, it sends a Device Status to the host in response.

(9) The processing from (3) to (8) is repeated until all LM buses are connected (APs are allocated to all device functions).

(10) The host sends a Function Start in order to start the operation of each device function.

(11) When the device function receives Function Start, it transfers from the AP setting operation to normal operation. After transferring, the device function sends a Device Reply to the host.

(12) Upon receiving the Device Reply, the host sends a Function Start to the next AP.

(13) Each device function is activated in sequence by repeating the processing in (11) and (12), until the device function at the final AP transmits a Device Reply whereupon the AP setting process is completed.

(14) The device functions having transferred to normal operation, the host proceeds with AP setting for the next port.

In this way, an AP is set for each device function connected to a particular port.

Next, the processing involved when a cable is connected or disconnected whilst the host is operating (active line connection/disconnection) is described.

(1) The host transmits a Device Request to each port at prescribed intervals. Ports not in use can be excluded from the access operation.

(2) If a Device Status is transmitted from a port which was not previously connected, the host recognizes that a device function has been connected. Upon recognizing this, it outputs a reset pattern to that port, and erases the APs for all device functions. It then carries out an AP setting process to renew the APs and rebuild the connection relationships.

(3) If the host transmits a command to a device function and there is no response from the device function, the host recognizes that that device function has been disconnected. If a device function is disconnected, the host erases the APs and rebuilds the connection relationships.

Next, data transmission and reception processing during normal operation is described.

(1) Right of Priority of Command Transmission

A command is always transmitted initially by the host, and the device functions respond to this command. If a device function initially transmits a command to the host, this is not recognized. The host-does not retransmit commands unless there is a request from the device function side.

(2) Data Format

The transmission and reception data is constituted by commands and parameters (AP data, data size, data). When a signal is actually transmitted along a data line, the MIE adds a start pattern and an end pattern to it, before the command and at the end of the parameters, respectively. Thereby, a single frame is constructed and transmitted in the order:

"start pattern"+"command pattern"+"AP data"+"data size"+ "data"+"end pattern".

The frame is analysed by the MIE of the receiving side, thereby confirming the start pattern and end pattern. The details of the commands and parameters are described later.

(3) Host

The MIE used by the host is governed by the M bus driver. Read-out of device function data is not carried out automatically by the MIE, but rather is implemented by the respective software via the M bus driver. Respective software shall herein mean software of an upper level compared to the M bus driver, for example, library software or game software. In a single access operation, it is possible to communicate with one device function having the specified AP. In order to read in data from a plurality of device functions in 1 INT, the corresponding number of device functions are accessed. 1 INT (interrupt) is a timing unit of the TV screen rewriting, namely approximately $1/60$ seconds. The port connection check transmits a Device Request to unconnected ports, and if there is a reply, that port is set to "connected". When not transmitting, a port is always set to input (reception) mode. The type of command to be used differs according to the device function and the time and circumstances, so it is set according to the device function specification.

(4) Device Functions

The MIEs for peripheral devices are controlled via an MIE controller by the CPU, or the like, which executes the device function programs. The device functions maintain a reception state until a command is transmitted by the host. The device functions then generate their own data necessary for communications. Furthermore, asynchronously to the access from the host, the device functions create data to be output as the function of that particular device (e.g., operation input device such as a control pad or joystick). If there is a request from the host, the data is transmitted within a prescribed period of time. The host transmits the same command to all device functions connected to the same port. The device functions analyze the received command and parameters, and send back a command only if this matches their own AP. If it does not match their own AP, they must not respond to the host. The type of command used differs according to the device function, and the time and circumstances, so the details thereof are determined according to the device function specification.

(5) Prohibited Operations

Direct access from one device function to another device function connected to the same port is prohibited. Communication between device functions must be conducted via the host. Furthermore, commands which can only be issued by the host must not be used.

Exceptional processing will now be described. Exceptional processing is special processing prepared for devices wherein data transmission and reception cannot be controlled by commands. An example of such a device is a light gun used in a shooting game.

(1) If the host recognizes that the device function has a light gun device ID, then it switches the M bus from normal mode to SDCKB occupancy mode. Mode switching is not possible from the device function side. Prior to switching, the host transmits a mode change, and after confirming that a light gun is connected, it switches the M bus mode to SDCKB occupancy pattern.

Upon entering SDCKB occupancy mode, all devices at that port assume SDCKB occupancy mode, and device functions other that those operating in SDCKB occupancy mode do not receive commands. For example, if a light gun, memory card and vibrating unit are connected to port A, the device function operating in the SDCKB occupancy mode is only the light gun. During the occupancy mode, only the light gun is controlled by the host, and the other device functions, namely the memory card and vibrating unit, do not operate (cannot be controlled by the host).

(2) To return from SDCKB occupancy mode, the host carries out cancellation processing. When the SDCKB occupancy mode is terminated, the system immediately returns to normal mode.

(3) In the case of a light gun, the time period for screen rewriting in 1 INT omitting the vertical blanking period, in other words, the time period for drawing the TV screen, forms the SDCKB occupancy mode.

When the period of drawing the screen is finished and the blanking period has started, the system switches directly to normal mode, and data transmission and data reception is conducted for the device functions at other ports.

(4) In order to achieve a light gun function, a section containing a photoreceptor element is taken as one device function, and sections containing a trigger and direction keys, analogue keys, and the like, are taken as a further device function. In this way, it is possible to eliminate conventional problems, such as disabling of the direction keys when the light gun is used. Furthermore, since the light gun forms a single device function unit, it can be connected to other expansion devices. By this means, it is possible to provide game applications having new functions.

Next, examples of commands are described. Commands can be divided broadly into control commands and error commands. Control commands comprise the basic commands of: Device Request, Status Request, All Status Request, AP Assign, LM-Bus Connect, Function Start, Host Data Transmit, Data Request, All Data Request, Mode Change, Device Sleep, Device Request, Device Kill, Device Status, Device Reply, Device Data Transmit, and the like. In addition, there are expansion commands which do not belong to these basic commands. Expansion commands differ according to the device function and M bus driver.

Device Request is a command from the host requesting a device function which does not have an AP allocated to send back a Device Status.

Status Request is a command from the host requesting a device function specified by an AP to send back a Device Status (this data is inherent device information (Fixed Device Status)).

All Status Request is a command from the host requesting all device status (namely, both Fixed Device Status and Free Device Status) from a device function specified by an AP. The device function sends back the Fixed Device Status followed by the Free Device Status by means of Device Data Transmit.

AP Assign is a command whereby the host allocates an AP to a device function. It can only be executed during the AP setting process. If the device function is in normal operation, it does not process the command but sends back a Command Refusal.

LM-Bus Connect is a command from the host requesting a device function to connect one LM-Bus to the M Bus. Upon receiving LM-Bus Connect, the device functions connect the LM-Bus pertaining to them, one bus for each function. If a device function is in normal operation, it does not process the command, but sends back a Command Refusal.

Function Start is a command from the host causing a device function-specified by its AP to start normal operation. If the device function receives this command and starts normal operation, it sends back a Device Reply. No initialization takes place. If the device function is in normal operation, it does not process the command, but sends back a Command Refusal.

Host Data Transmit is a command whereby the host transmits data to a device function. The data contents differ depending on the device function. The details of this data are determined by the device function specification. If the data size is 0, then the device function does not receive and it sends back a Command Refusal. During AP setting also, the device function does not receive, and sends back a Command Refusal.

Data Request is a command from the host requesting a device function to transmit specified data. A plurality of request data numbers can be specified in the data region. If the data size is 00h, then the device function does not process the command and sends back a Command Refusal. During AP setting also, the device function does not process the command and sends back a Command Refusal.

All Data Request is a command from the host requesting a device function to transmit all its data. During the AP setting process, the device function does not receive the command and sends back a Command Refusal.

Mode Change is a command whereby the host switches the mode of the port M bus. When switching to SDCKB occupancy mode, after a Mode Change command has been issued, the Device Reply is confirmed and the specified port is switched to SDCKB occupancy mode. If the device function does not correspond to the operations in SDCKB occupancy mode, then it does not process the mode change and sends back a Command Refusal. During the AP setting process also, the device function does not process Mode Change, but sends back a Command Refusal.

Device Sleep is a command whereby the host temporarily suspends a specified device. When a device function has been suspended, it sends back a Device Reply and thereafter can only receive Function Start. During the AP setting process, the device function does not process Device Sleep, but sends back a Command Refusal.

Device Reset is a command whereby the host applies a software reset to a specified device function to initialize it. Software reset is not a resetting (initializing) which uses hardware functions such as IC reset terminals, but is for example the initializing of internalizing RAMs or registers on programs (software). As software reset enables the selection of portions to be reset in the program, it is possible to retain portions, such as the set state of the IC terminal, for which initialization is not desired. AP values which have already been allocated are not initialized. After initialization, the device function sends back a Device Reply and starts normal operation. During AP setting, the device function does not process Device Reset, but sends back a Command Refusal.

Device Kill is a command whereby the host forbids the operation of a device function. The device function can only process this command before AP Assign in the AP setting sequence. The device function waits at standby current consumption, and cannot receive any commands. In order to activate the device function, the hardware must be reset or the power turned off. Hard reset is conducted by resetting (initializing) using hardware functions such as IC reset terminals. It is also possible to conduct an equal initialization processing in the program. This processing is equal to the power on reset at the start of power supply which performs IC initialization at the same time. In contrast to the soft reset, no selection of the portion to be initialized is possible. If the device function is in normal operation, it will not process this command, but send back a Command Refusal. To suspend a device function temporarily during normal operation, the Device Sleep command is used.

Device Status is a command whereby a device function sends a Fixed Device Status to the host. This Fixed Device Status is described later.

Device Reply has a wide range of use as a device function reply transmitted by a device function. The AP in the data contents indicates the device function's own AP, thereby specifying the source of the Device Reply. Device Data Transmit is a command whereby a device function transmits data in accordance with a request from the host. The data contents differ depending on the device function. If the data size is 00h (h indicates hexadecimal notation), the host will not process the command, but will send back a Command Refusal. Depending on circumstances, a command such as a retransmission, Device Status, or the like, may be issued.

Next, the error commands will be described. Error commands comprise basic commands, such as Command Refusal, Command Unknown, Transmit Again, LM-Bus Error, Device Error, and the like. In addition to this, there are also expansion commands, which are intrinsic to the device function and M bus driver. Intrinsic commands herein do not mean standard commands held by the driver but commands prepared for specific device functions.

Command Refusal is a command whereby the host or device function refuses to receive data corresponding to an incoming command. This command is also transmitted if a command which is incompatible with the host or function's operation is received. This command prohibits improper access.

Command Unknown is a command transmitted from a device function to the host when the device function receives a command from the host which it does not recognize.

Transmit Again is a command sent by the host or a device function requesting the same data to be transmitted once again, when there has been an error of some kind in the data received.

LM-Bus Error is a command from a device function to the host giving notification that an error has occurred in the LM bus. This command is sent to the host in cases where, for instance, LM-Bus Connect is received from the host, but there is no LM bus to connect.

Device Error is a command from a device function notifying the host that an error of some kind has occurred in the device function and that the device function is in the process of resetting.

The Device Status information mentioned above will now be described. The Device Status stores data directly such that it cannot be rewritten or erased. For example, it is not permitted to calculate a certain value to give a status value or text.

The Device Status comprises: Fixed Device Status and Free Device Status.

Fixed Device Status relates to a permanent device status which is an essential description of the device, e.g., total 108-byte format. Unless all items are described, operation and connection of the device cannot be guaranteed.

The Free Device Status relates to a device status which can be used freely depending on the individual device function. For example, the capacity must be 148 bytes or less.

Fixed Device Status comprises the following items:
(1) Device ID
This describes the ID and attributes of the device function. By previously registering and assigning an ID to each device function, the host is able to identify what type of device function is connected by reading its ID. Therefore, those used by the M bus are registered by product in advance for those having an M bus license.
(2) Maximum Data Size
This describes the maximum size of data output by the device function.
(3) Number of LM Buses
This describes the number of LM buses held by the device function.
(4) Product Name
The product name is described in English or romaji using ASCII code. This may be different from the actual commercial name. The product name is also subject to prior registration.
(5) Destination Code
This describes the region of sale of the product. For example, North America, Europe, Japan, etc. This code makes it possible to determine compatibility between peripheral devices and game applications for particular target regions.
(6) Licence
This shows the product licence in English or romaji using ASCII code.
(7) Standby Current Consumption
This describes the current consumed during temporary. suspension, in units of 0.1 mA.
(8) Maximum Current Consumption
This describes the maximum current consumed, in units of 0.1 mA.

On the other hand, Free Device Status relates to areas of information which can be set freely by the product planners, developers, designers, programmers, or the like. The host can obtain this information from a device function by means of the All Device Request command. When this information region is used in application software, and the like, it is necessary to ensure compatibility of data sequences, etc. in advance.

Figure 21:
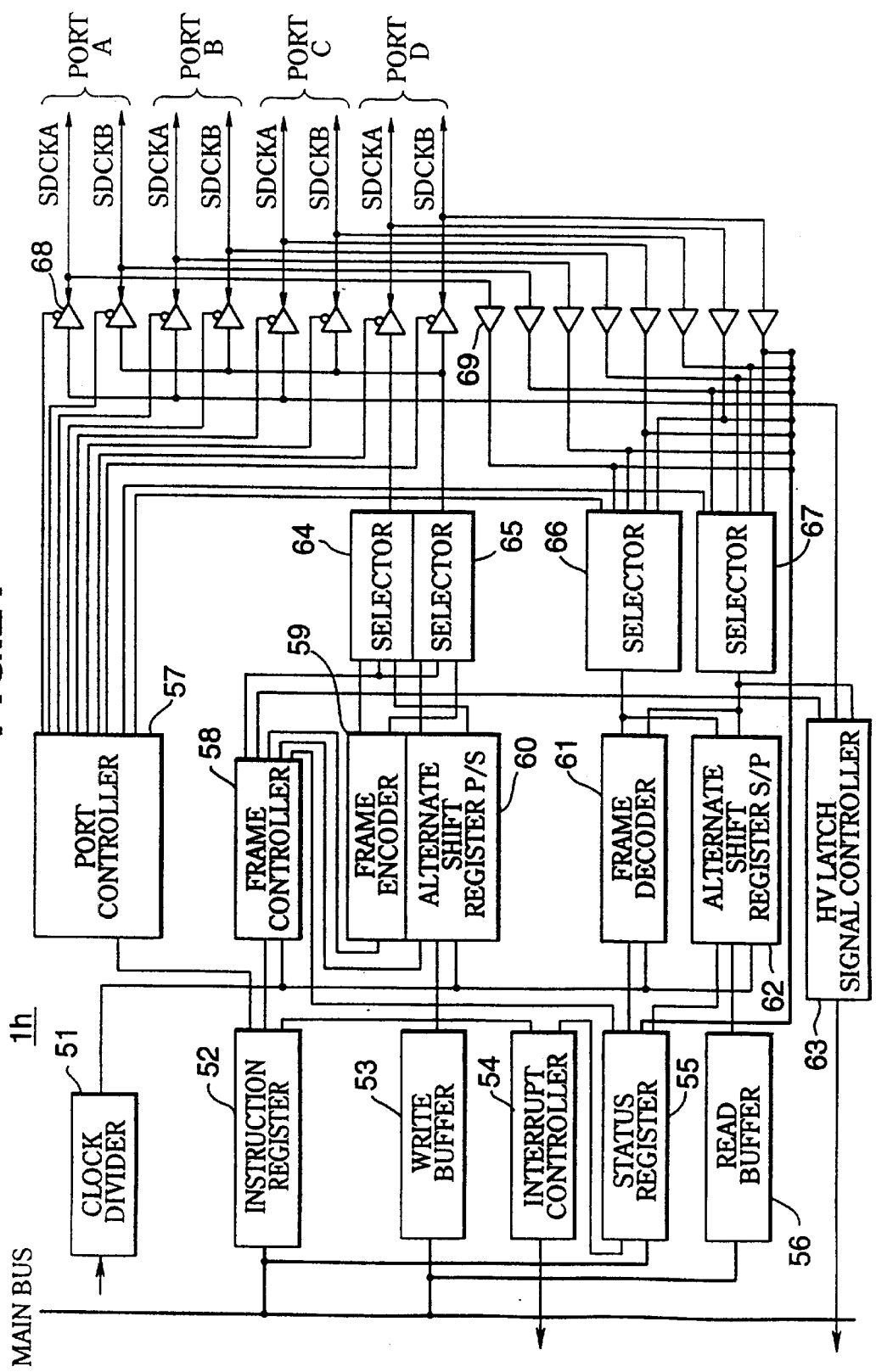
FIG. 21 is a block circuit diagram illustrating a host MIE.

The MIE of the host shall be specifically called a peripheral controller. FIG. 21 shows an example of a block circuit diagram for a peripheral controller (MIE) provided at the host.

In this diagram, a clock divider 51 creates a clock for supplying to each processing block of the controller from a system clock, and by varying the frequency ratio of the supplied clock, it is possible to alter the transmission (transfer) rate, and the like.

Instruction register 52 is a 32-bit register into which instructions sent from the application etc. to the peripheral devices are written via the main bus. The contents written to this register are transferred to a port controller 57 and frame controller 58.

Write buffer 53 is a 256-byte RAM into which data for transfer is written.

Interrupt controller 54 is a controller for controlling interrupts due to transmission, reception, or errors of different kinds.

Status register 55 is a 32-bit register indicating the status of the main controller.

Read buffer 56 is a 256-byte RAM for holding received data.

Port controller 57 is a controller for controlling ports involved in data transmission and reception. By controlling a three-state buffer 68 of a transmission port selected by a command, outputs SDCKA and SDCKB of a first and a second selector 64 and 65 are directed to the selected port. A reception port is selected by controlling a third and a fourth selector 66 and 67.

Frame controller 58 is a controller for controlling frame composition in terms of output pattern, data length, and the like.

Frame encoder 59 is controlled by the frame controller 58 and it generates and outputs information patterns.

Alternate shift register 60 is controlled by the frame controller, and it is a register for (P/S) converting parallel data in the write buffer to serial data, and alternately outputting data and a clock to SDCKA and SDCKB. A CRC calculating section is provided within the alternate shift register, and CRC processing is applied to the data in accordance with commands from the frame controller.

The first selector 64 is controlled by the frame controller 58, and it outputs SDCKA by selecting the outputs of the frame encoder 59 or the output of the alternate shift register 60.

The second selector 65 is controlled by the frame controller 58, and it outputs SDCKB by selecting the output of the alternate shift register 60 or the output of the frame encoder 59.

The third selector 66 selects a reception port in accordance with commands from the port controller 57, and it supplies SDCKA received via a buffer amp 69 to a frame decoder 61 and alternate shift register 62.

The fourth selector 67 selects a reception port in accordance with commands from the port controller 57, and it supplies SDCKB received via a buffer amp 69 to a frame decoder 61 and alternate shift register 62.

Frame decoder 61 analyzes the. composition of received frames, reflects this in the Status Register 55, and controls alternate shift register 62.

Alternate shift register 62 is controlled by the frame decoder 61, and is an (S/P) register for converting received serial data to parallel data. The alternate shift register 62 also comprises a CRC calculating circuit for carrying out error inspection of the received signal.

The HV latch signal controller is activated by the frame controller 58. For example, when the frame controller 58 has transmitted an SDCKB occupancy permission pattern, the frame decoder is deactivated and the HV latch signal controller is activated. When the HV latch signal controller receives SDCKB after an SDCKB occupancy permission pattern has been transmitted, a latch signal is supplied to an HV counter (omitted from drawing). The HV counter comprises a horizontal position counter and vertical position counter, which output values corresponding to a position on a screen. For example, in a shooting game, when the trigger of a gun aimed at a TV screen is pulled, SDCKB is output by the gun. This SDCKB is used to identify the aim (shooting) position of the gun on the screen by means of the HV counter.

Figure 22:
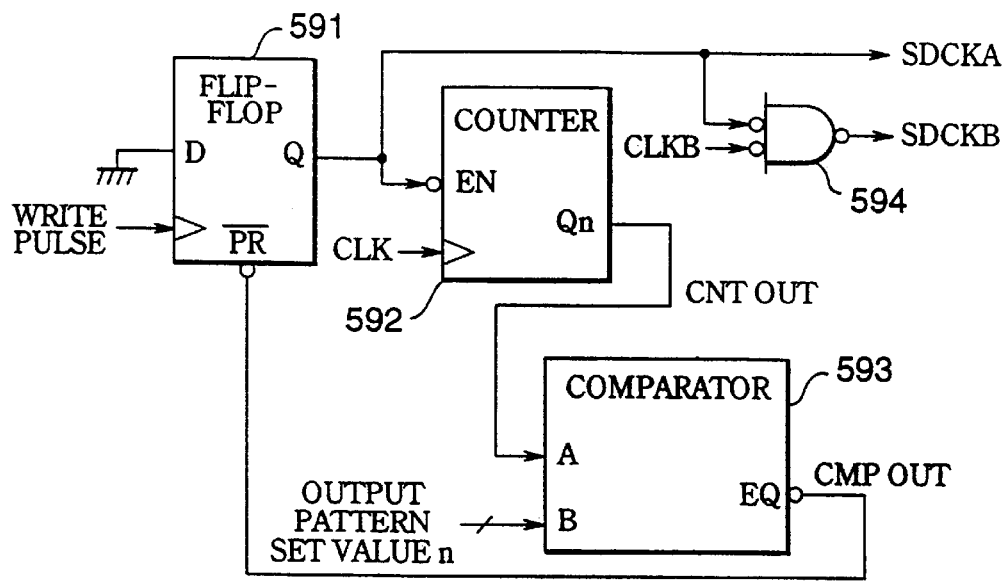
FIG. 22 is a block circuit diagram illustrating the operational principles of a frame encoder.

FIG. 22 is a circuit diagram illustrating the operational principles of the frame encoder 59. In this diagram, 591 is a flip-flop, 592 is a counter, 593 is a comparator and 594 is a logic gate.

Figure 23:
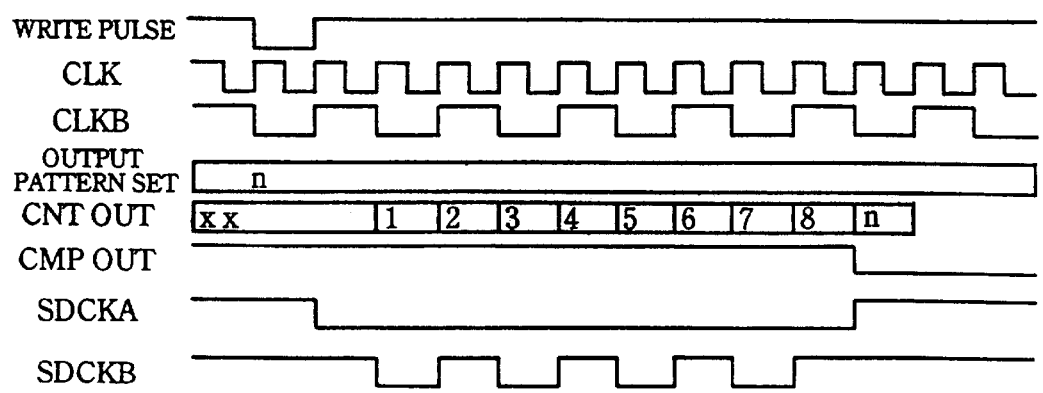
FIG. 23 is a timing chart illustrating the operation of a frame encoder.

FIG. 23 is a timing chart for describing the operation of the frame encoder 59.

When a write pulse is supplied to the frame encoder 59, this circuit assumes an active state. The SDCKA at output Q of the flip-flop 591 is set to level "L" by the rising edge of the write pulse. SDCKA forms an enable input to the counter 592, which starts a count of the clock CLK supplied thereto. The counter 592 advances a count value CNT OUT through "0", "1", "2", . . . "7", "8". This count value is supplied to comparison input A of the comparator 593. An output pattern set value n is supplied to the comparison reference input B of the comparator 593. For example, if a "start pattern" is generated, then the frame encoder 59 decodes this command and supplies "9" as a set value n. If the two inputs match, the comparator 593 outputs CMP OUT from output terminal EQ, which is supplied to preset terminal/PR of the flip-flop 591. Thereby, the SDCKA at output Q of the flip-flop 591 is set to level "H". SDCKB is obtained by synthesizing SDCKA and a CLKB signal having half the frequency of clock signal CLK at the OR gate 594.

In this way, output pattern set values corresponding to a start pattern, reset pattern and end pattern, etc. are supplied, and when a write pulse is input, the SDCKA is set to level "L", and for SDCKB a pattern signal having a prescribed number of falling edges can be obtained.

Figure 24:
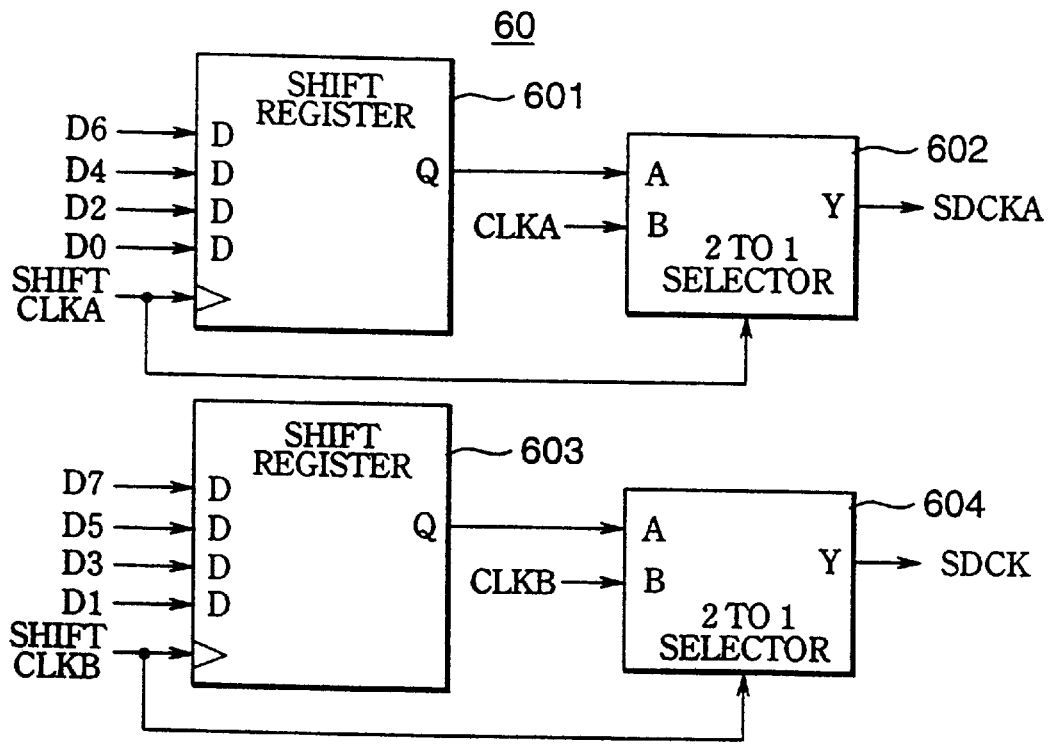
FIG. 24 is a block circuit diagram illustrating the operational principles of an alternate shift register.

FIG. 24 is a circuit diagram illustrating the operational principles of the alternate shift register 60. In this diagram, 601 is a shift register for converting parallel data to serial data; 602 is a dual-input selector; 603 is a shift register for converting parallel data to serial data; and 604 is a dual-input selector.

Figure 25:
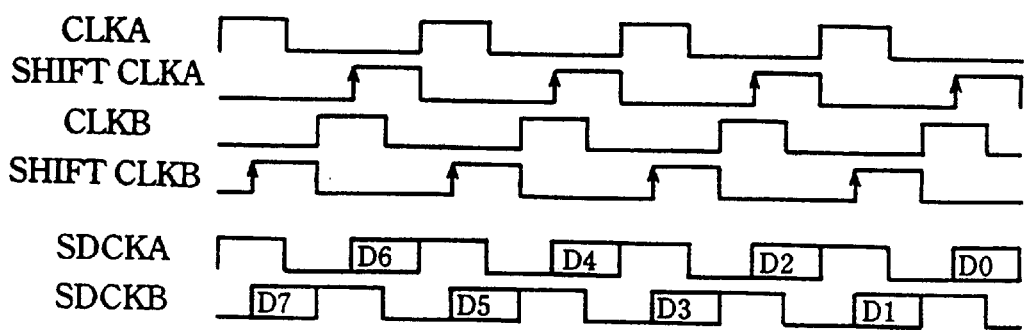
FIG. 25 is a timing chart illustrating the operation of an alternate shift register (parallel-to-serial conversion)

FIG. 25 is a timing chart describing the operation of the alternate shift register 60.

A plurality of even-numbered bits D6, D4, D2, D0 for data transmission are supplied respectively to a plurality of D input terminals of the shift register 601, and the data is shifted by means of a shift clock SHIFT CLKA having the timing illustrated in the diagram, and it is supplied from output terminal Q to the A input terminal of the selector 602 as serial data. A clock CLKA as shown in the diagram is input to the B input terminal of the selector 602. The selector 602 selects the serial data from output terminal Q in accordance with level "H" of the shift clock SHIFT CLKA, and it selects clock CLKA in accordance with level "L" of SHIFT CLKA.

Therefore, an SDCKA signal, wherein data D6, D4, D2, D0 are superimposed on clock CLKA at prescribed intervals, is obtained at output terminal Y of the selector 602. Similarly, a plurality of odd-numbered bits D7, D5, D3, D1 for transmission are supplied respectively to a plurality of D input terminals of the shift register 603, and the data is shifted by means of a shift clock SHIFT CLKB having the timing illustrated in the diagram and supplied from output terminal Q to the A input terminal of the selector 604 as serial data. A clock CLKB as shown in the diagram is input to the B input terminal of the selector 604. The selector 604 selects the serial data from output terminal Q in accordance with level "H" of the shift clock SHIFT CLKB, and it selects clock CLKB in accordance with level "L" of SHIFT CLKA. Therefore, an SDCKB signal, wherein data D7, D5, D3, D1 are superimposed on clock CLKB at prescribed intervals, is obtained at output terminal Y of the selector 604. The sections "D0" . . . "D7" shown in signals SDCKA and SDCKB have a level "H" or a level "L" depending on their data value.

Figure 26:
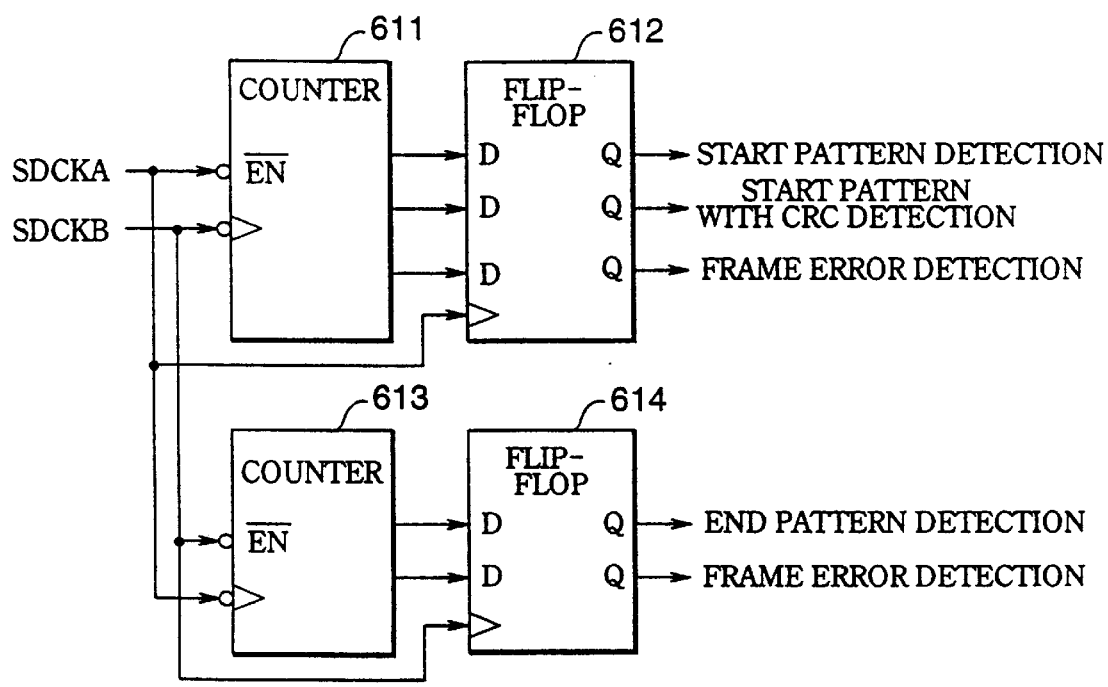
FIG. 26 is a block circuit diagram illustrating the operational principles of a frame decoder.
Figure 27:
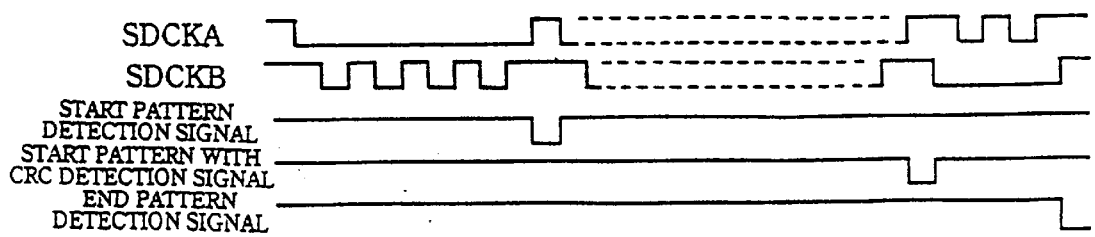
FIG. 27 is a timing chart illustrating the operation of a frame decoder.

FIG. 26 is a circuit diagram showing a compositional example of a frame decoder 61. In this diagram, 611 is a counter, 612 is a composite flip-flop consisting of a plurality of flip-flops, 613 is a counter, and 614 is a composite flip-flop consisting of a plurality of flip-flops. FIG. 27 is a timing chart describing the operation of the frame decoder 61.

Of the elements in the diagram, the counter 611 and flip-flop 612 operate in the detection of a start pattern. When the SDCKA is at level "H", the counter operation is disabled. When SDCKA takes level "L", the counter operation is enabled, and the falling edges of SDCKB are counted. By counting the number of falling edges of SDCKB whilst SDCKA is at level "L", a count output is supplied to the flip-flop. The counter output is supplied to the flip-flop 612 at the rising edge of SDCKA.

As shown in FIG. 27, if the number of falling edges of the SDCKB is four during the period in which SDCKA is at "L" level (start pattern, cf. FIG. 13), flip-flop 612 outputs the start pattern detection.

For detecting the end pattern, the number of falling edges of the SDCKA whilst SDCKB is at "L" level is counted via the counter 613 and flip-flop 614. Through this rising edge of the SDCKB, the count output 613 is incorporated in the counter 613. As shown in FIG. 27, when two falling edges of the SDCKA are counted whilst SDCKB is at "L" level, the flip-flop 612 outputs the end pattern detection. When the number of falling edges of the SDCKA during the period in which the SDCKB is at "L" level is unspecified, the flip-flop 614 outputs a frame error detection. In the normal operation mode, the data pattern and the end pattern with two falling edges of the SDCKA follow the start pattern with four falling edges of the SDCKB (cf. FIG. 11).

Furthermore, although not illustrated in FIG. 27, after commencement of the reception, when the counter 611 detects six falling edges of the SDCKB whilst SDCKA is at "L" level, the flip-flop 612 outputs the detection of a start pattern with CRC (FIG. 14). In the operation mode using the CRC, the data pattern, CRC data, and the end pattern follow the CRC start pattern with six falling edges of the SDCKB (cf. FIG. 12).

Furthermore, if the counter 611 detects the falling edges of the SDCKB eight times whilst SDCKA is at "L" level, then the flip-flop 612 outputs the detection of SDCKB occupancy permission pattern (cf. FIG. 15). When the pattern is detected, the operation mode shifts to the SDCKB occupancy permission operation mode. In the SDCKB occupancy permission operation mode, light-gun is useable. The SDCKB occupancy permission mode is reset by the SDCKB occupancy permission operation mode reset pattern (rising edge of the SDCKA).

If counter 611 detects the falling edges of the SDCKB fourteen times whilst SDCKA is at "L" level, the flip-flop 612 outputs the detection of reset pattern (cf. FIG. 16). The detection allows the reset operation.

If the number of falling edges of the SDCKB is unspecified, the flip-flop 612 outputs the detection of frame error. The pattern detection outputs from flip-flops 612 and 614 are held in status register 55.

Figure 28:
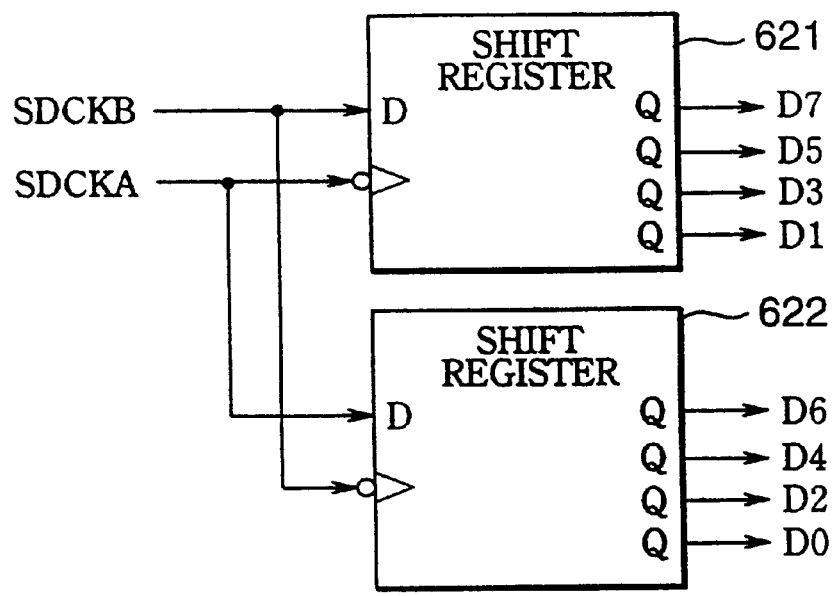
FIG. 28 is a block circuit diagram illustrating the operational principles of an alternate shift register (serial-to-parallel conversion)
Figure 29:
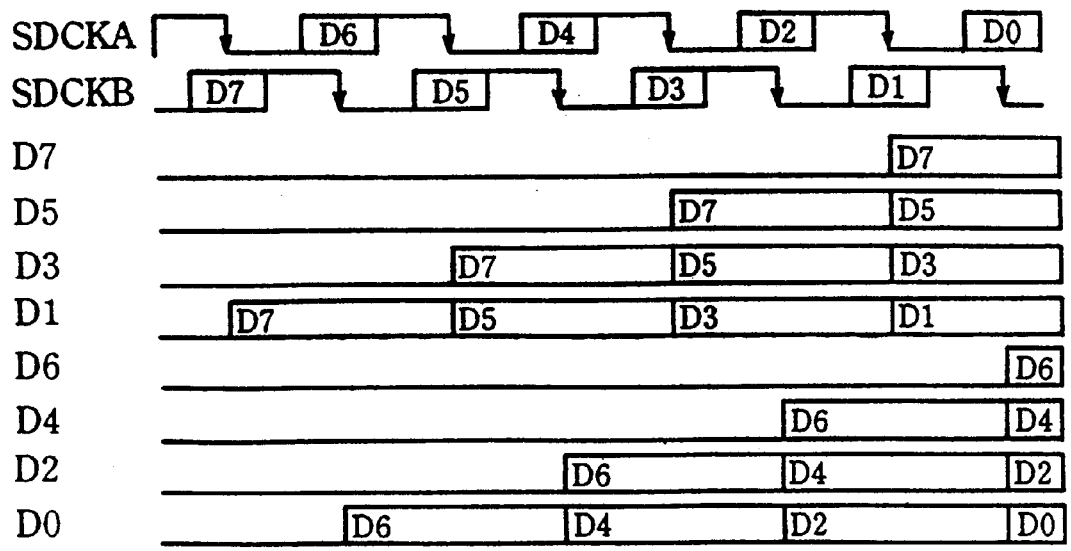
FIG. 29 is a timing chart illustrating the operation of an alternate shift register.

FIG. 28 shows a compositional example of the alternate shift register 62. In this diagram, serial data SDCKB is supplied to the data input terminal D of a shift register 621, and SDCKA is supplied to the shift clock input thereof. The shift register 621 reads in the data sections of SDCKB successively at the falling edges of SDCKA, as illustrated in FIG. 29. Serial-to-parallel converted data is arranged at the parallel output terminals D7, D5, D3, D1 of the shift register 621 by four clock edges of SDCKA.

Similarly, serial data SDCKA shown in FIG. 29 is supplied to the data input terminal D of the shift register 622 shown in FIG. 28, and SDCKB is supplied to the shift clock input thereof. The shift register 622 reads in the data sections of SDCKA successively at the falling edges of SDCKB. Serial-to-parallel converted data is arranged at the parallel output terminals D6, D4, D2, D0 of the shift register 622 by four clock edges of SDCKB.

Figure 30:
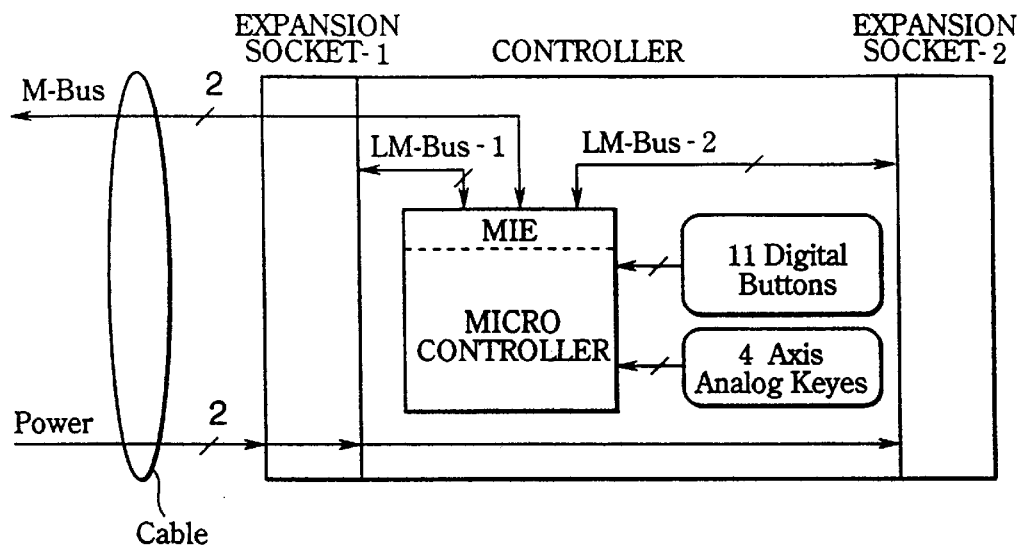
FIG. 30 is a block diagram giving an approximate illustration of the general composition of a standard controller.

FIG. 30 is an approximate general block diagram of a peripheral device to be connected to a game device, generally called a game controller, an input operation controller, or an operation input device, etc. A game controller will be described below. It is possible to add (couple) further peripheral devices (L-device functions) by providing two expansion sockets on the game controller. The game controller contains a one-chip micro-controller. It also comprises 11 switches for generating digital output, and analogue keys for generating a four-axis output. The output of these switches, etc. is processed by the micro-controller, and output to the host via an MIE section and an M bus.

Figure 31:
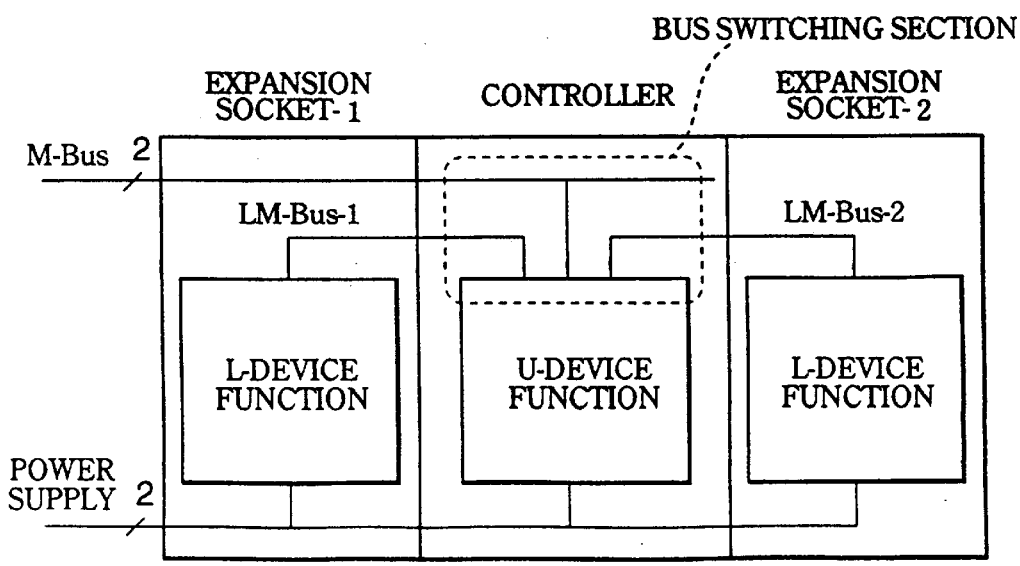
FIG. 31 is a block diagram illustrating a standard controller MIE.

FIG. 31 is a block diagram giving an approximate illustration of the composition of an MIE on the device function side, where the functions of a peripheral device are taken as the device functions.

In this diagram, the game controller is connected to a host (omitted from drawing) via an M bus. The game controller comprises a U-device function connected to the host via the M bus, and two L-device functions connected to the U-device function via LM buses.

Figure 32:
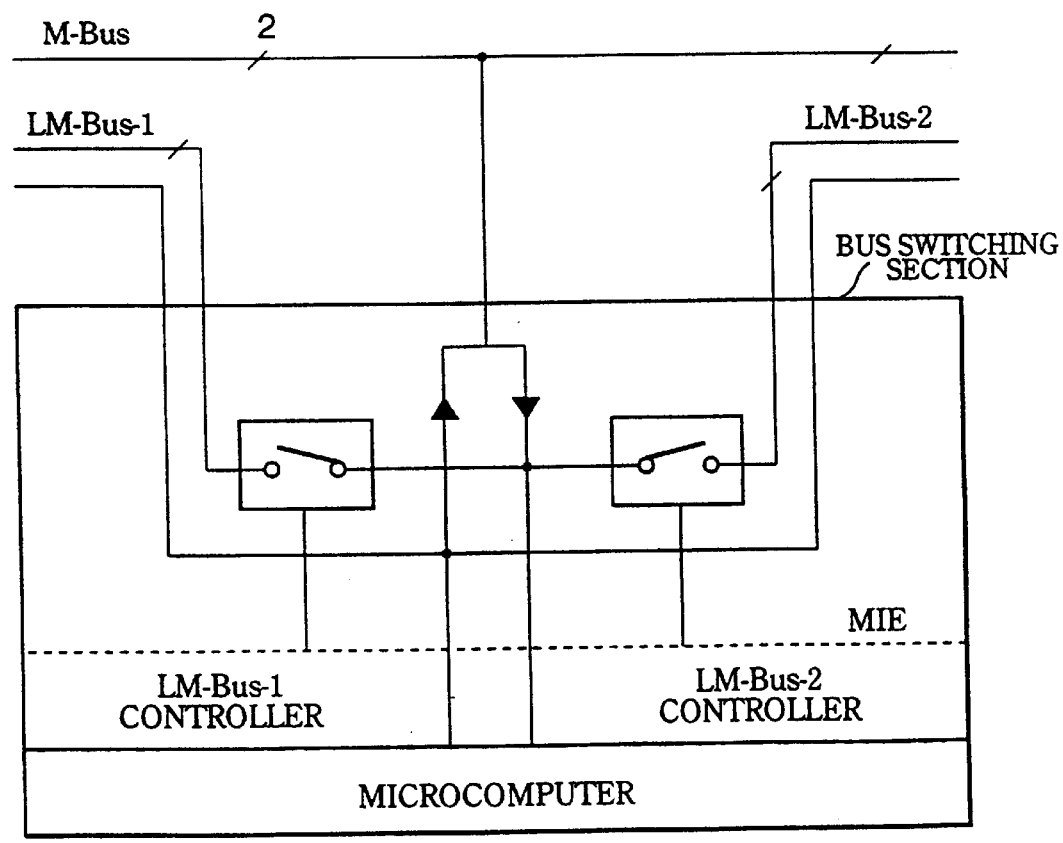
FIG. 32 is a block diagram illustrating a bus switching section which is data-permeable (position-permeable)

FIG. 32 is a block circuit diagram showing a bus switching section (selector) from FIG. 31. There are two M buses branching from the U-device function, and these are called LM bus 1 and LM bus 2, respectively. The switching operation to connect and disconnect the LM buses and M bus is performed by an MIE selector in the U-device function.

Figure 33:
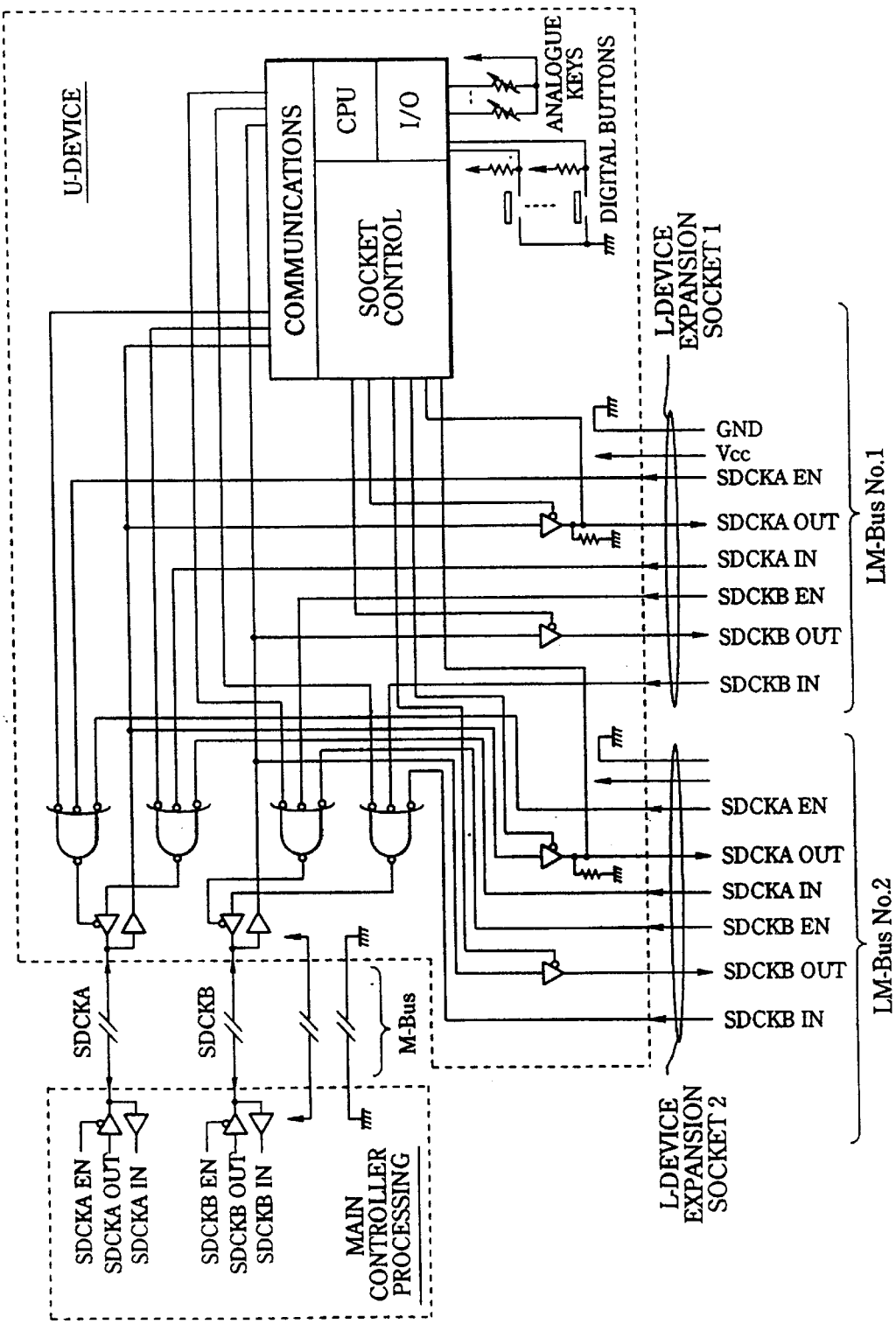
FIG. 33 is a block circuit diagram illustrating a U-device MIE.

FIG. 33 is an approximate block diagram of a hardware section of the U-device function. The transmission processing section, socket control section, CPU section, and I/O section are constituted by a one-chip micro-controller. The transmission processing block forms an interface with the host. The CPU section controls the signal processing in the peripheral device, such as a game controller, or the like. The I/O section is an external input interface for digital buttons, analogue keys, or the like. The socket control section is used for controlling expansion sockets. In this example, hardware expansion sockets (two-slot) for two L-device functions are prepared.

Figure 34:
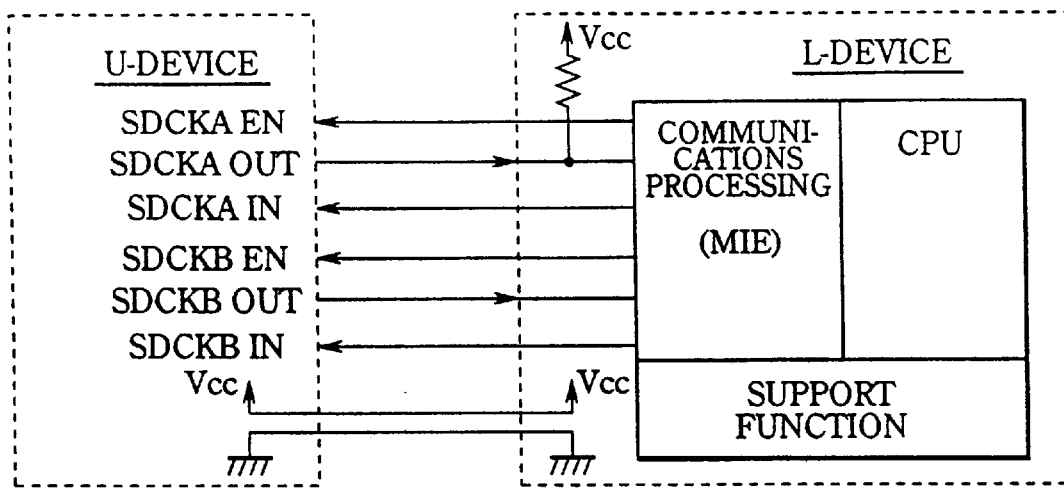
FIG. 34 is a block circuit diagram illustrating an L-device MIE.
Figure 35:
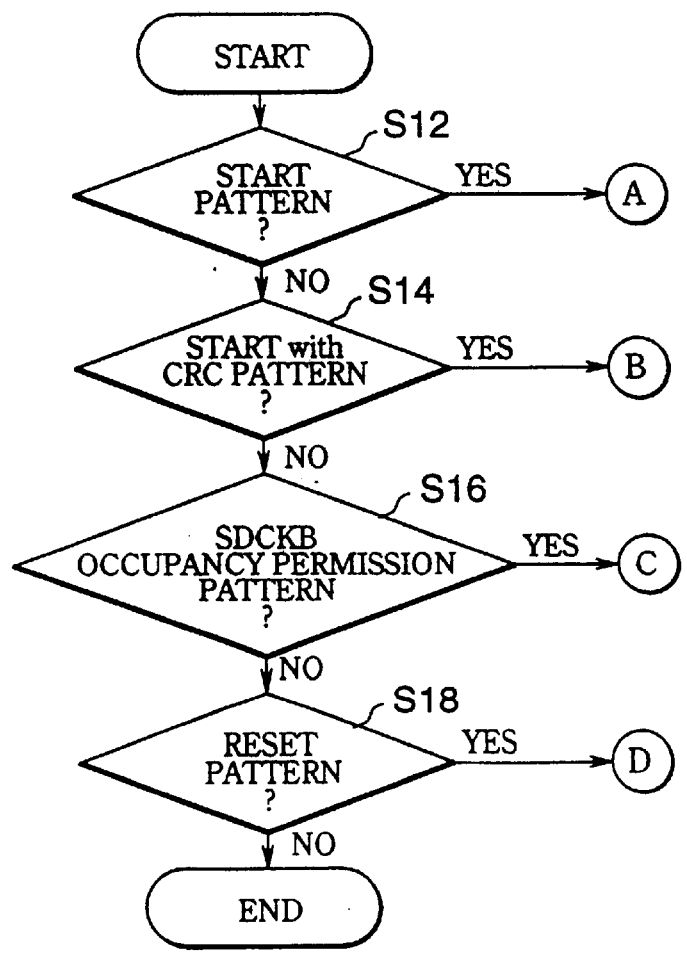
FIG. 35 is a flowchart illustrating identification of a transmission pattern in an MIE.
Figure 36:
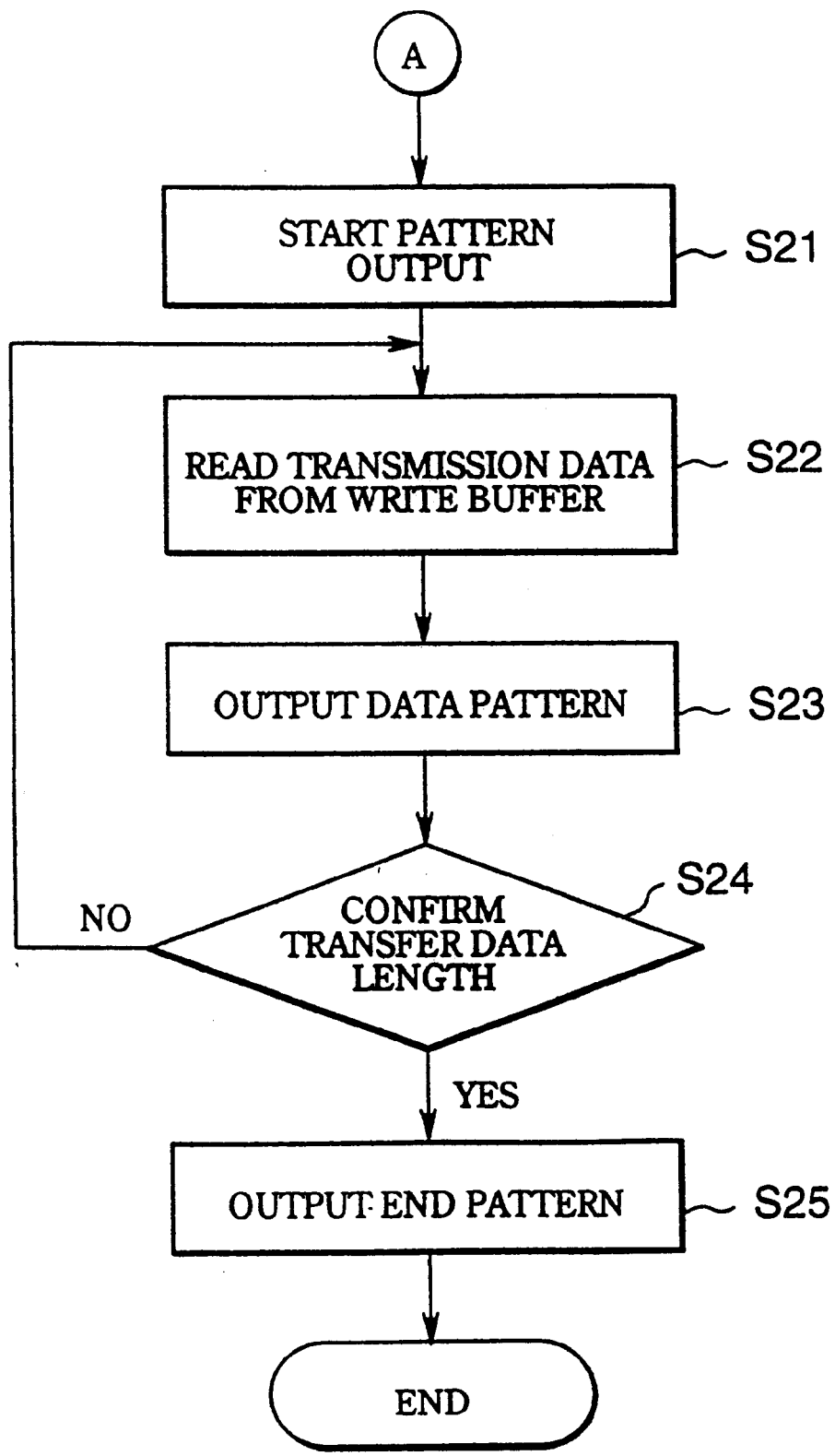
FIG. 36 is a flowchart illustrating the formation of a standard format frame signal.
Figure 37:
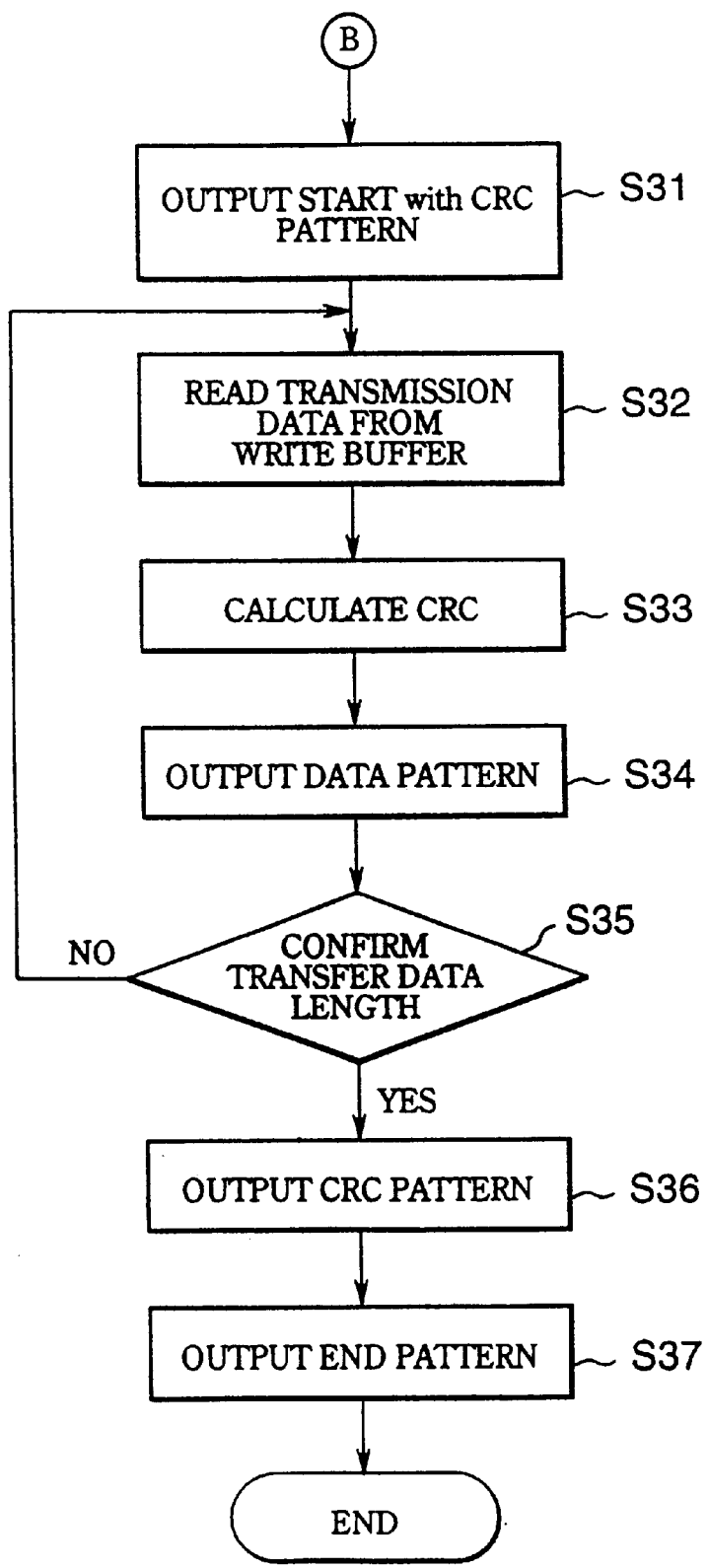
FIG. 37 is a flowchart illustrating formation of a frame signal of a format with CRC option.
Figure 38:
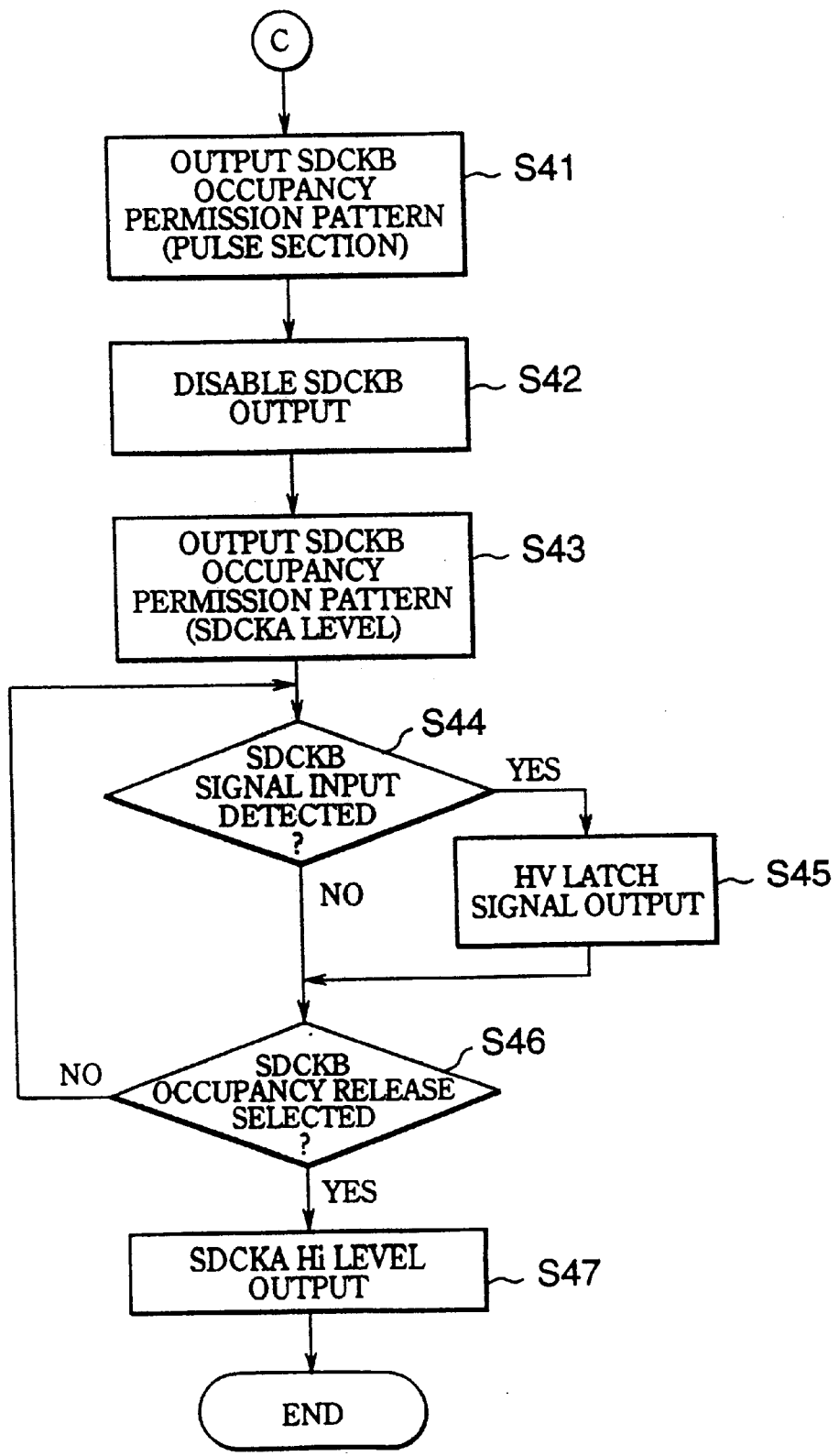
FIG. 38 is a flowchart illustrating operation by means of an SDCKB occupy pattern.
Figure 39:
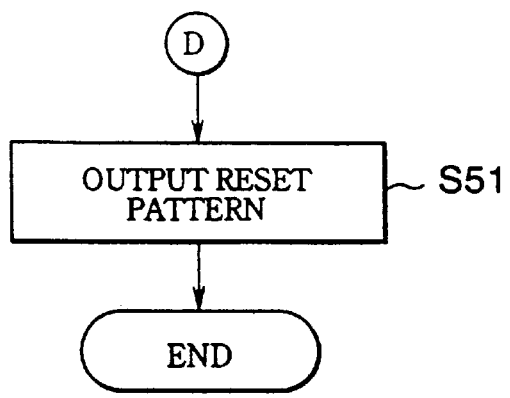
FIG. 39 is a flowchart illustrating transmission of a reset pattern.

FIG. 34 is an approximate block diagram of an L-device function. A transmission processing section, CPU section, and support function section are constituted by a single-chip microcomputer. The transmission processing section forms an interface with the U-device function (MIE for L-device function). The CPU section carries out processing relating to the L-device function. The support function block realizes the function of the L-device function, for example, a circuit for performing the trigger function of a light gun, memory function, or vibrating function, etc.

Next, the operation of the MIE on the device function side is described with reference to FIGS. 33 and 34. In the initial state where APs are not allocated, a three-state buffer is controlled by the socket controller shown in FIG. 33, and SDCKA OUT and SDCKB OUT transmitted to expansion socket 1 and expansion socket 2 are disabled. Here, the socket controller performs the functions of an LM bus 1 controller and LM bus 2 controller.

With SDCKA OUT in a disabled state, when no L-device function is connected to the expansion socket, SDCKA OUT assumes level "L" due to the pull-down resistance connected to the output terminal of the three-state buffer. The socket controller can identify that no L-device function is connected to the U-device function by detecting the "L" level of this output terminal.

On the other hand, a power supply is connected via a pull-up resistance to the hardware SDCKA OUT input terminal of the L-device function, as illustrated in FIG. 34. Therefore, if L-device function hardware is connected to the expansion socket, the SDCKA OUT terminal (three-state buffer in disconnected state) will be raised to level "H" by the relatively high resistance of the pull-down resistance shown in FIG. 33 and the low resistance of said pull-up resistance. By detecting the "H" level of this output, the socket controller can identify that hardware containing an L-device function has been connected to the hardware comprising a U-device function.

An AP is allocated to the U-device function by means of an AP Assign command from the host, and when an LM-Bus Connect command is received, the SDCKA OUT and SDCKB OUT at expansion socket 1 assume an enabled state. Thereby, commands from the host are transmitted to the U-device function and the L-device function linked to expansion socket 1.

If the host allocates an AP to the L-device function at expansion socket 1 and transmits an LM-Bus Connect command to the U-device function, the U-device function will set the SDCKA OUT and SDCKB OUT at expansion socket 2 to an enabled state. After the process of AP allocation to the L-device function at expansion socket 2 has been completed, commands from the host are transmitted to the U-device function and all the L-device functions equally. The U-device function and L-device functions compare the AP value contained in a command, determine whether they themselves have been selected, and respond appropriately.

FIGS. 35–39 are flowcharts illustrating control operations implemented by the MIE during transmission.

A sequence of processing commands are given from the host application via an API to the bus driver software. The bus driver translates these processing commands into instructions controlled by the MIE, and sets them in the instruction register 52 of the MIE.

The frame controller 58 determines whether the commands (instruction) set in the instruction register instruct the output of signal of standard transmission format pattern (S12), the output of a signal of with-CRC-option format (S14), the output of an SDCKB occupancy permission pattern (S16), or the output of a reset pattern (S18).

If a standard transmission format pattern is to be output (S12; Yes), then the frame controller 58 selects the output of the frame encoder 59 by means of selectors 64 and 65 and causes a start pattern to be output from the frame encoder 59 (S21), in accordance with the sequence shown in FIG. 36. Thereupon, it selects the output of the alternate shift register 60 by means of selectors 64 and 65, causes transmission data to be written from the write buffer 53 into the alternate shift register 60 (S22), and causes a data pattern to be output from the alternate shift register 60 (S23).

The frame controller 58 confirms that the transmitted data comprises 256 bytes, for example (S24). If it does not meet 256 bytes (S24; No), then the processes of reading from the write buffer (S22) and outputting data (S23) are repeated. If 256 bytes have been transmitted (S24; Yes), then the output of the frame encoder 59 is selected by selectors 64 and 65, and the frame encoder 59 is caused to transmit an end pattern. In this way, data is transmitted in a standard pattern.

If the code set in the instruction register 52 commands the output of a signal of with-CRC-option format (S14; Yes), then the frame controller 58 selects the output of the frame encoder 59 by means of the selectors 64 and 65 and causes a start pattern with CRC to be output by the frame encoder 59 (S31), in accordance with the sequence shown in FIG. 37. Thereupon, the output of the alternate shift register 60 is selected by selectors 64 and 65, and transmission data is read from the write buffer 53 into the alternate shift register 60 (S32). Furthermore, the frame controller 58 causes the CRC calculating section in the alternate shift register to perform CRC calculations on the data read in (S33). It then causes a data pattern to be output from the alternate shift register 60 (S34).

The frame controller 58 confirms that the transmitted data comprises 256 bytes, for example (S35). If it does not meet 256 bytes (S35; No), then the processes of read-out from the write buffer (S32), CRC-calculation (S33) and data output (S34) are repeated.

If 256 bytes have been sent (S35; Yes), then the frame controller.58 causes the alternate shift register 60 to transmit CRC data after the data (S36). it then selects the output of the frame encoder 59 by means of switches 64 and 65, and causes the frame encoder 59 to transmit an end pattern (S37).

In this way, data is transmitted in a pattern containing CRC.

If the frame-controller 58 identifies an output command for an SDCKB occupancy permission pattern (S16; Yes), then it selects the output of the frame encoder 59 by means of switches 64 and 65 and causes the frame encoder 59 to output an SDCKB occupancy permission pattern (S41), in accordance with the sequence shown in FIG. 38. The buffer 68 is controlled via the port controller 57 and prohibits output of SDCKB (S42). Thereupon, the frame encoder 59 outputs an SDCKB occupancy permission pattern, wherein SDCKA is set to level "L" (S43).

Thereafter, the HV latch controller 63 is enabled. The HV latch controller 63 monitors the SDCKB line (S44). If there is a reply from the device side (S44; Yes), then the HV latch controller 63 generates a latch output of the HV counter (S45). After generating a latch output (S45), or if there is no response from the device side (S44; No), it then identifies whether the command setting SDCKB occupancy mode is still present in the register 52 (S46). If it is still present (S46; No), then steps S44–S46 are repeated, and latch outputs are generated successively in accordance with responses from the device side.

If the command setting SDCKB occupancy mode has been cancelled (S46; Yes), then SDCKA reverts to level "H", and the system resumes a state whereby SDCKA and SDCKB can be used for transmission (S47).

In this way, SDCKB occupancy mode is implemented. If the frame controller 58 identifies that the code set in the command register is a reset pattern output command (S18), then it causes the frame encoder 59 to output a reset pattern (S51), as shown by the sequence in FIG. 39.

In this way, signals of various formats can be transmitted.

Next, the operation of the MIE during reception will be described.

Figure 40:
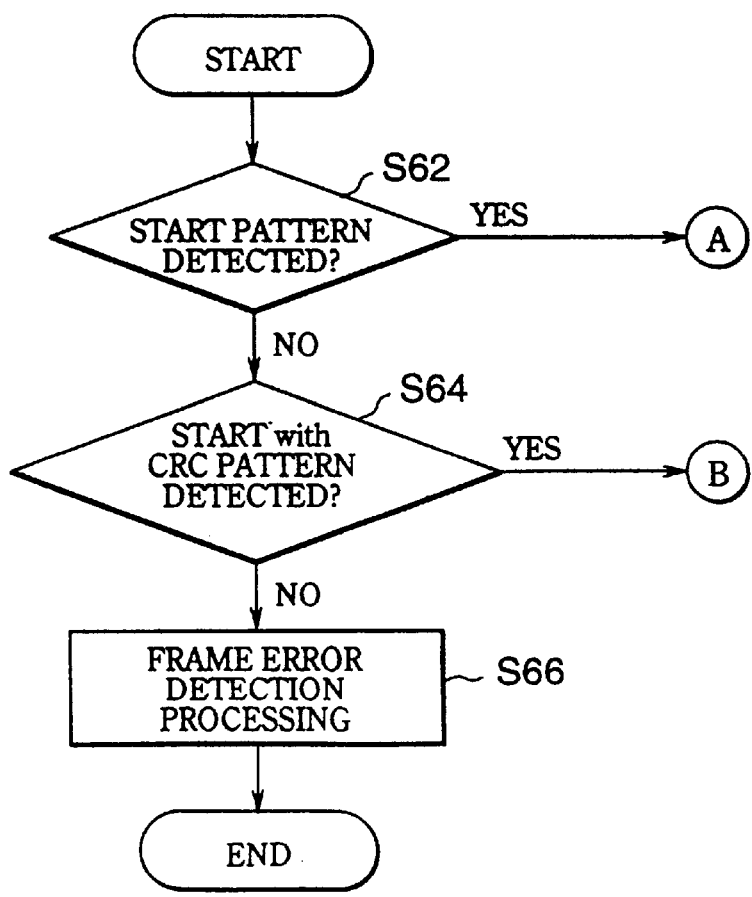
FIG. 40 is a flowchart illustrating a reception operation in an MIE.

As shown by the sequence in FIG. 40, the frame decoder 61 decodes the received SDCKA and SDCKB, and identifies whether the received signals comprise a start pattern (S62), a start pattern with CRC (S64), or a frame error corresponding to neither of these patterns (S66).

Figure 41:
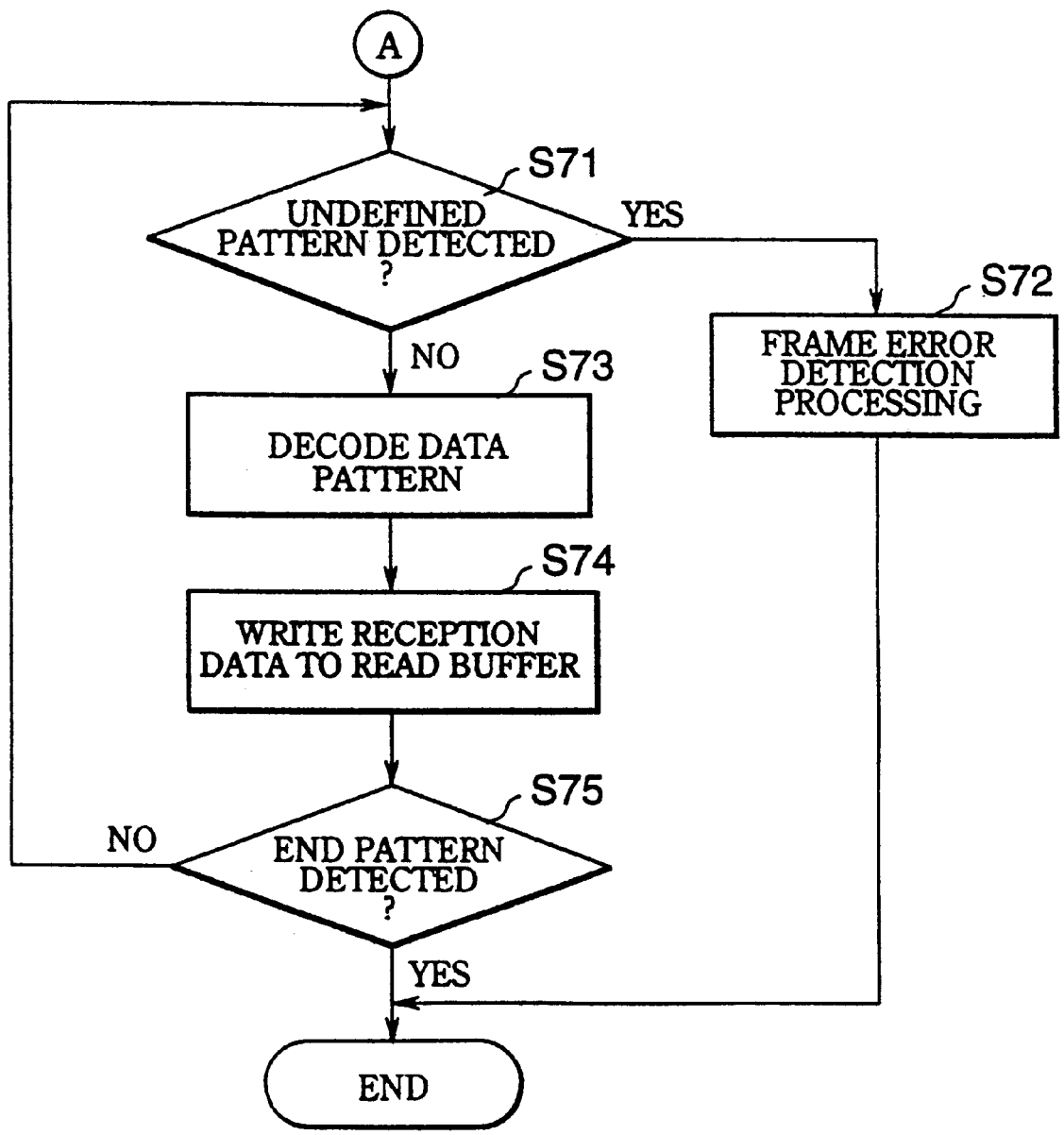
FIG. 41 is a flowchart illustrating processing in a case where a start pattern is detected.
Figure 42:
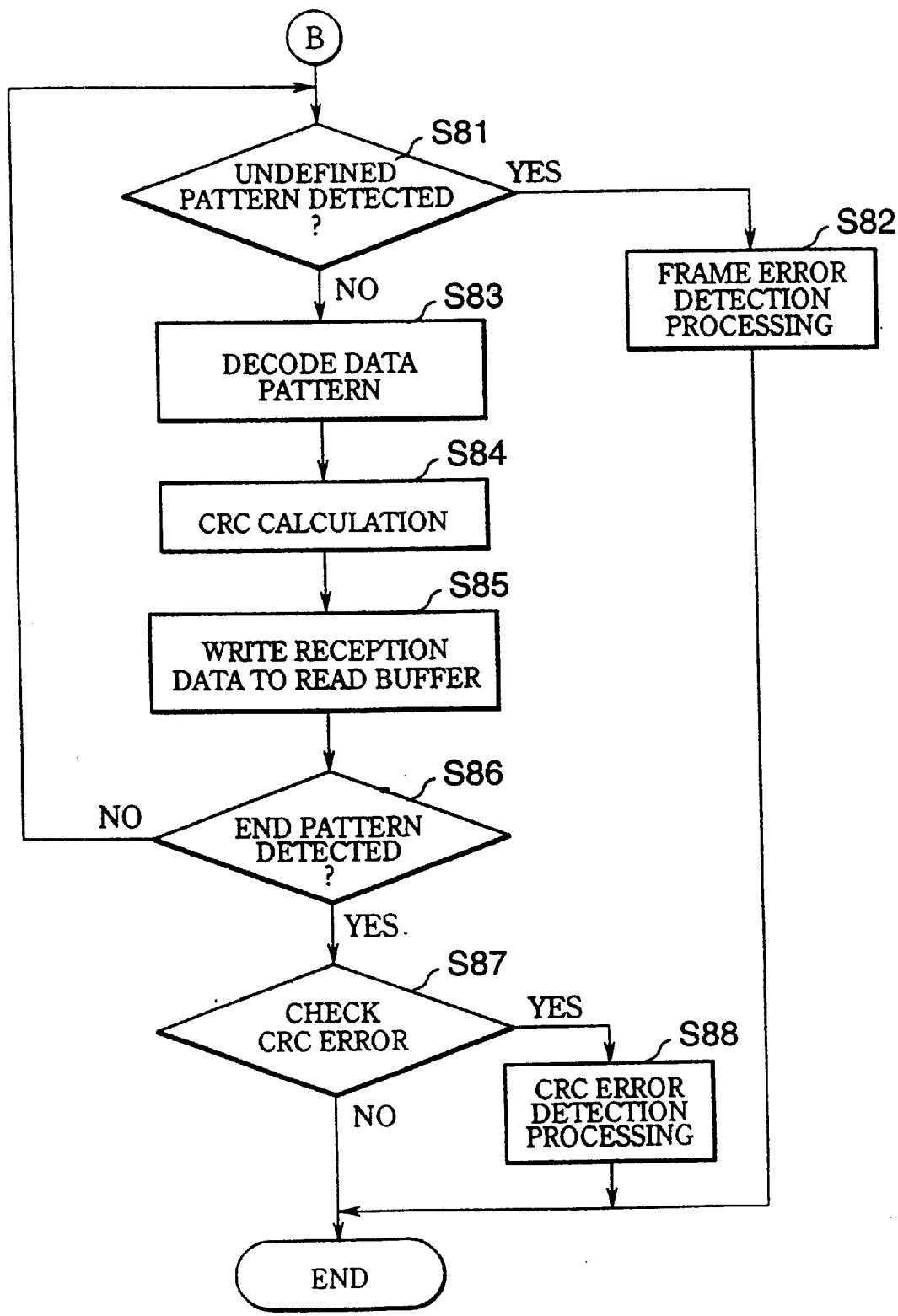
FIG. 42 is a flowchart illustrating processing in a case where a start pattern comprising CRC is detected.

If a start pattern is detected (S62; Yes), then it is identified whether it is an undefined start pattern (S71), as shown by the sequence in FIG. 41. If it is an undefined start pattern (S71; Yes), then a frame error detection flag is set in the status register, and prescribed frame error detection processing is implemented by the driver software, or the like.

If it is a previously defined start pattern (S71; No), then a start pattern detection flag is set in the status register. Thereby, the alternate shift register 62 is activated, and data is successively extracted from the received SDCKA and SDCKB signals, the extracted serial data being demodulated into parallel data (S73). This data demodulation/transfer is repeated until the frame decoder 61 detects an end pattern (S71–S75). When an end pattern is detected (S75; Yes), an end pattern detection flag is set in the status register 55, and reception is terminated.

On the other hand, if a start pattern containing CRC is detected, it is identified whether this is an undefined start pattern (S81). If it is an undefined start pattern (S81; Yes), then a frame error detection flag is set in the status register, and prescribed frame error detection processing is conducted by the driver software, or the like (S82).

If it is a previously defined start pattern (S81; No), then a detection flag for start pattern with CRC is set in the status register. By this means, the alternate shift register 62 is activated, data is extracted successively from the received SDCKA and SDCKB signals, and the extracted serial data is demodulated into parallel data (S83). CRC calculation is then conducted for the demodulated data (S84), and the demodulated data is written to the read buffer 56 (S85). This data demodulation and transfer is repeated until the frame decoder 61 detects an end pattern (S81–S86). When an end pattern is detected (S86; Yes), the CRC calculation for the received data is compared with the CRC data appended after the data section to determine whether there is a CRC error (S87).

If a CRC error is detected (S87; Yes), then a CRC error detection flag is set in the status register 55, and CRC error detection processing, such as a data retransmission request (Transmit Again), or the like, becomes possible. If no CRC error is detected, the data reception process by a signal pattern containing CRC is completed (S87; No).

Figure 43:
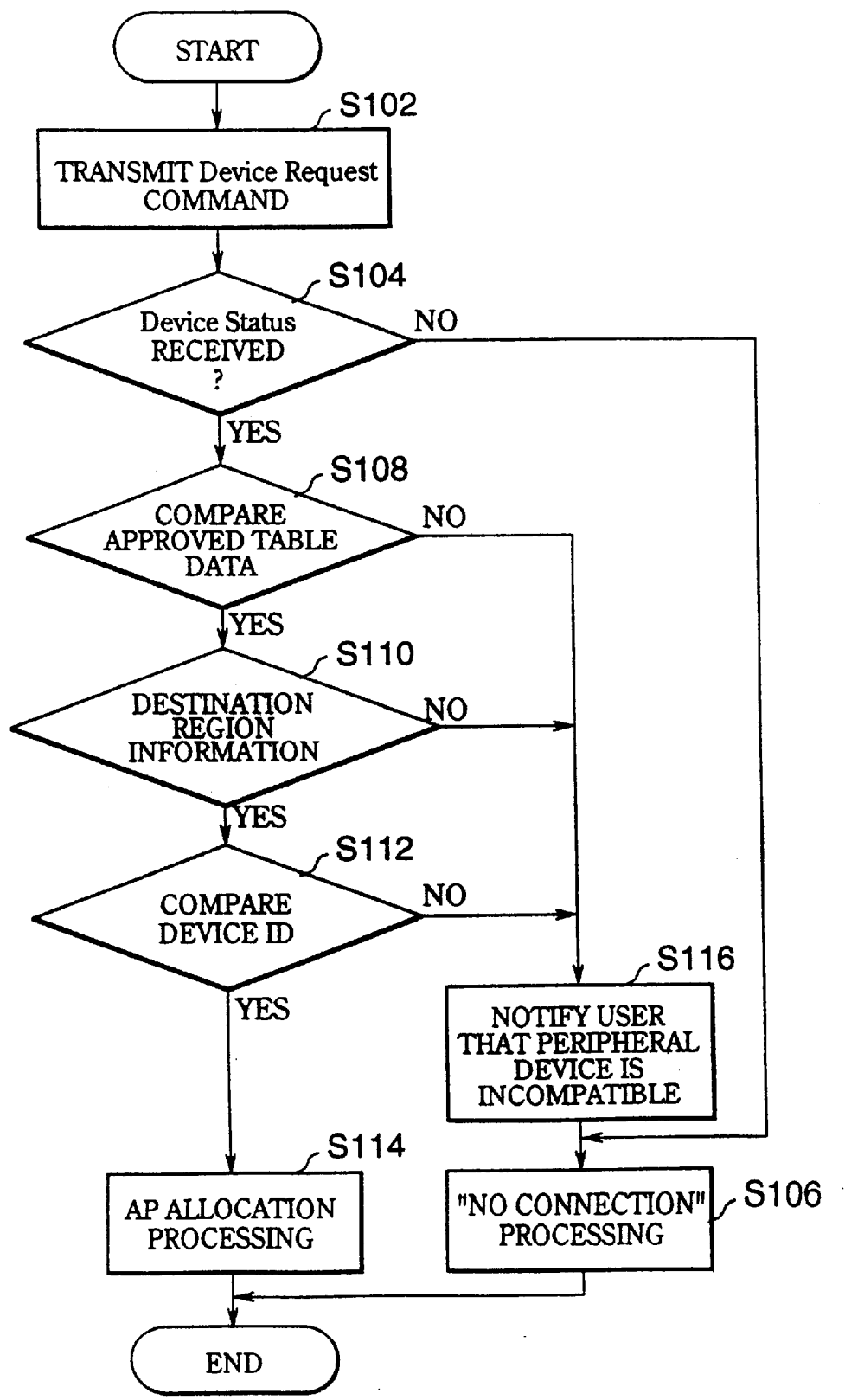
FIG. 43 is a flowchart illustrating an example where inherent information held by the device is read out by the host.

FIG. 43 is a flowchart illustrating the procurement and use of inherent information (Fixed Device Status) relating to a peripheral device (device function) by means of programs incorporated in applications (software) such as game programs.

The application program supplied from a data storage medium such as a CD-ROM is stored in memory and performed by the CPU. The application program causes a Device Request command to be transmitted to the device function (S102), and then awaits a response from the device function. If no Fixed Device Status has been received from the device function even after a prescribed time period has elapsed, it is determined that no device function is connected to the bus (S104; No), and 'no connection' processing is implemented. (S106).

If Fixed Device Status is received from the device function (S104; Yes), then the licence description information (S108), destination region information (S110), and device ID are compared with the information held by the application of the game program, etc., supplied from the data storage medium such as a CD-ROM (S112). If this comparison produces a match (S112; Yes), then processing for allocating an AP to that device function is implemented (S114).

However, if the comparison does not produce a match, then processing is implemented for informing the user that the connected device functions (or connected peripheral devices) do not correspond to the application (S116). Thereupon, processing for disconnecting these device functions from the host is carried out (S106), and the routine ends.

These functions are used as PL (product liability) countermeasures for the peripheral devices. In a shooting game, for example, an imitation gun is used, but there is a risk that a device modelled accurately on a gun may be mistaken for a real gun. In certain countries, for example, this type of use may not cause a problem, but in other countries, it may do so. In such cases, in the relevant countries only a "gun" whose external appearance clearly indicates that it is an imitation gun may be used.

Therefore, in applications which must take consideration of customs and circumstances etc. in particular countries or regions, it is desirable if the type and model of peripheral device usable with that application can be restricted, by means of the Fixed Device Status described above.

In this way, according to the connection standard for a game device and related peripheral devices according to the present invention, it is possible to connect a game device and a plurality of peripheral devices by means of a small number of bus lines.

Furthermore, if a user connects a game peripheral device to game device by means of a cable wire or cord, then since the game device automatically identifies the connected device and initializes and starts up the connected peripheral device such that it corresponds to the application, it is possible to eliminate special procedures and setting operations involving the user, therefore providing a suitable connection standard between a game device and peripheral devices.

Furthermore, in the above-described embodiment, since the peripheral devices do not have the right to access other devices connected to the bus, but rather data communications are conducted in a format whereby peripheral devices respond to access from the game device, so regulation of access timing between the game device and a plurality of peripheral devices becomes obsolete. As access of a peripheral device to another peripheral device is prohibited, regulation of access timing between the peripheral devices is also unnecessary. Therefore, only a relatively simple structure is required for the I/O hardware and software.

Moreover, a plurality of peripheral devices and various types of peripheral devices can be connected. For example, it is possible to connect a game device controller, joystick, keyboard, CD-ROM drive, DVD drive, voice input/output device, memory pack, FDD device, modem, ISDN terminal device, or the like.

Furthermore, since data communications are conducted according to a command format between the game device and peripheral devices, it is possible for a game application to obtain the data required at that time and situation in correspondence with the game development from a game controller (peripheral device), or the like.

Furthermore, since small data volumes are transmitted intermittently, the noise induced by the connecting cables is reduced.

Since data transmission is controlled by a bus driver, commands can be added or new peripheral devices can be developed readily, by updating the driver.

Since data can be transmitted between a game device and peripheral devices, it is possible to transfer multimedia data, such as sound output, sound input, still screens, animated screens, etc., by a pair of cables.

Since a game device main unit or application can utilize the inherent information of a peripheral device, it can distinguish between peripheral devices which can be used with an application and peripheral devices which cannot be used with that application, from a plurality of connected peripheral devices, and desirably, it should be able to suspend the operation of peripheral devices which are not compatible.

Second Mode of Implementation

Outline

Below, a second peripheral interface standard for an M bus is described. Of all the processing implemented on the M bus, this standard determines interface specifications between host MIE and M bus driver, interface specifications between function and MIE controller, communications protocol specifications, and data format.

Firstly, the physical topology and logical topology of the second interface will be described following a similar procedure to the foregoing explanation of the first interface standard.

(1) Physical Connection Topology

Figure 44:
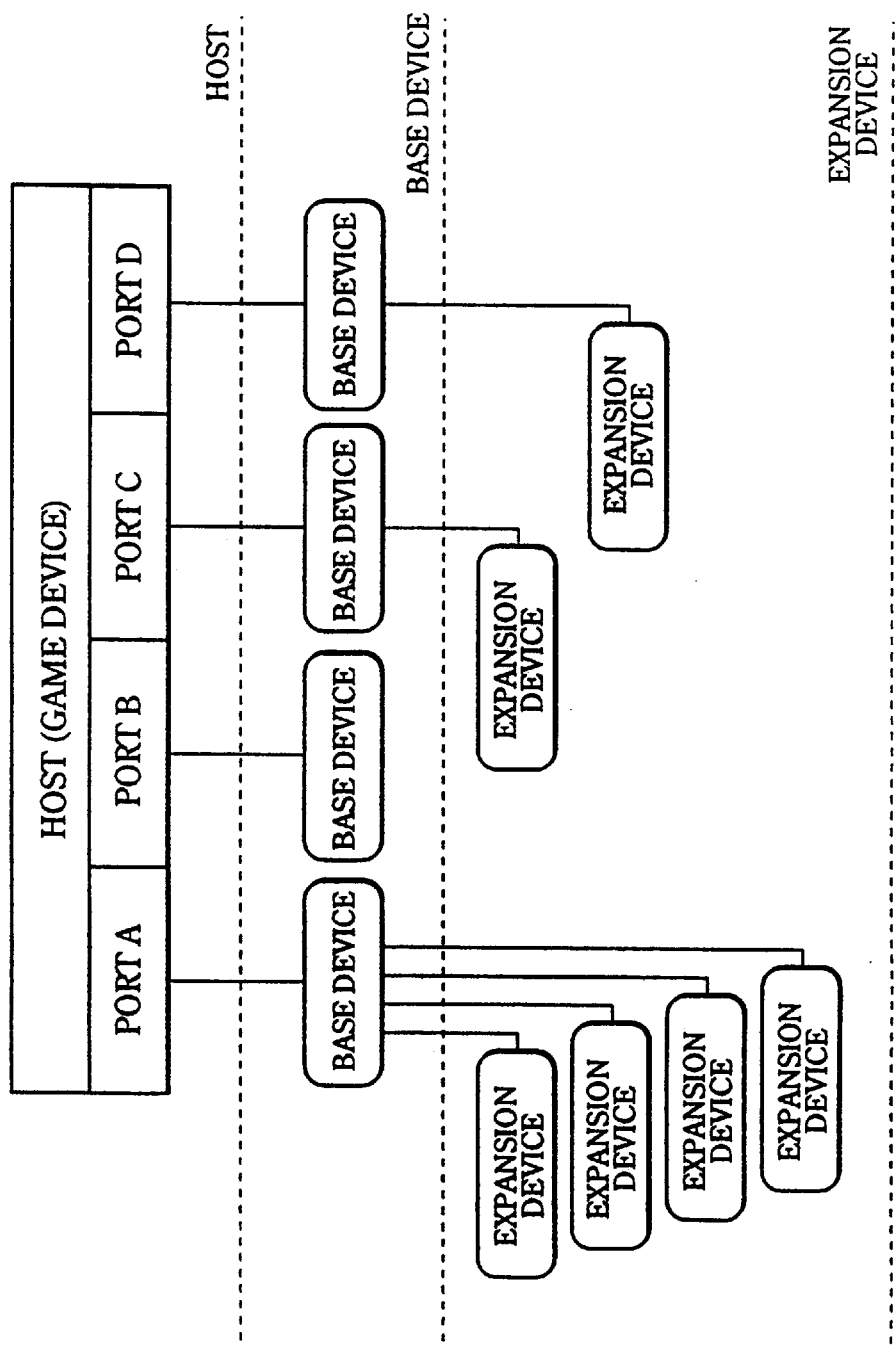
FIG. 44 is a diagram illustrating a plurality of modes for connecting a host, base devices and expansion devices.

FIG. 44 gives an approximate illustration of the physical connection topology according to this second mode of implementation. The physical connection mode comprises a host—base device (peripheral device)—expansion device (peripheral device) configuration. The base devices represent hardware (peripheral device) connected directly to the host. The expansion devices represent hardware (peripheral devices) connected to the host via a base device. In any one system, there is a single host (e.g., a game machine). The host is capable of having a maximum of four ports for connecting to peripheral devices. One base device is connected to one port. A maximum of four external expansion devices can be connected to any one base device. The host and base devices are connected by designated cables.

However, the following types of connections are not permitted: a) direct connection from host to expansion device; b) connection from base device to base device; c) connection from base device to expansion device; d) connection from expansion device to expansion device. These statements are not intended to limit the present invention to the embodiments.

(2) Logic Connection Topology

Figure 45:
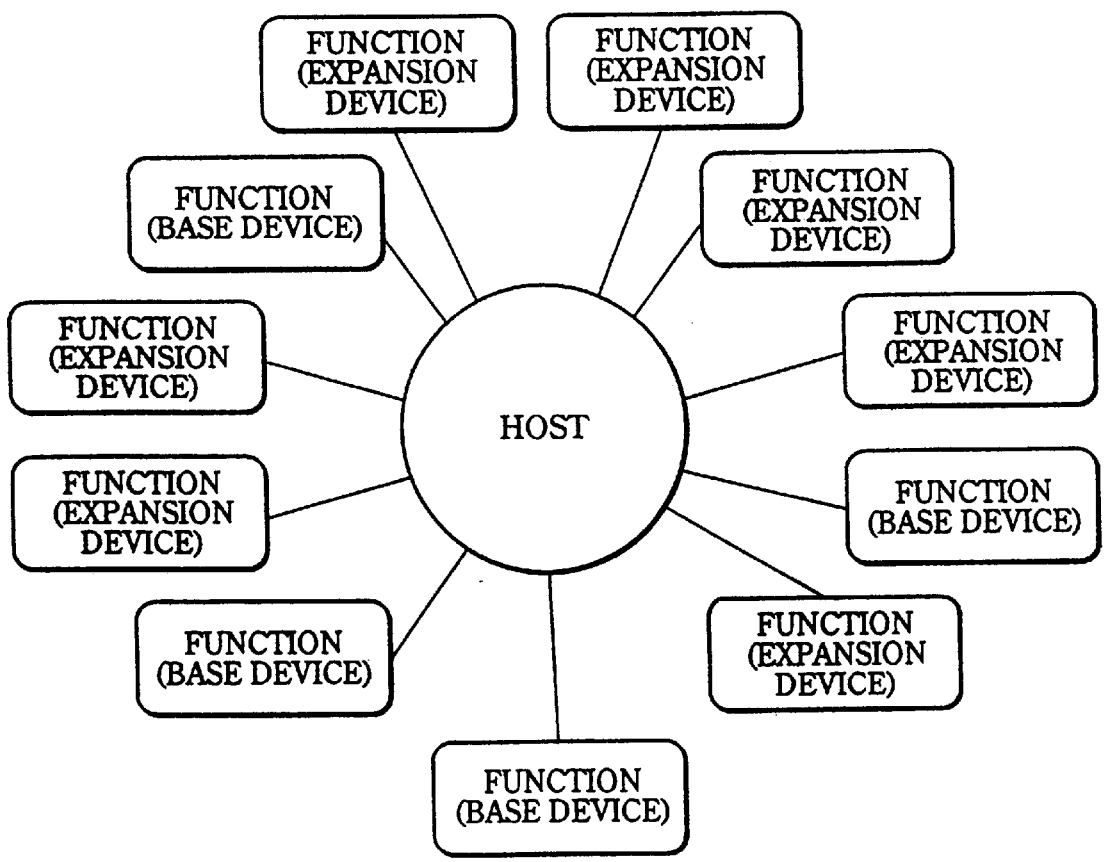
FIG. 45 is a diagram giving a conceptual illustration of the relationship between a host and functions (base devices and expansion devices).

FIG. 45 is a figurative diagram illustrating the logic connection topology according to the second mode of implementation. As this diagram shows, the logic connection between each function (formed by base device and expansion device hardware) and the host forms a so-called star connection with the host at the centre. The host controls signal transmission and reception.

Layer Structure and Communication Flow

Figure 46:
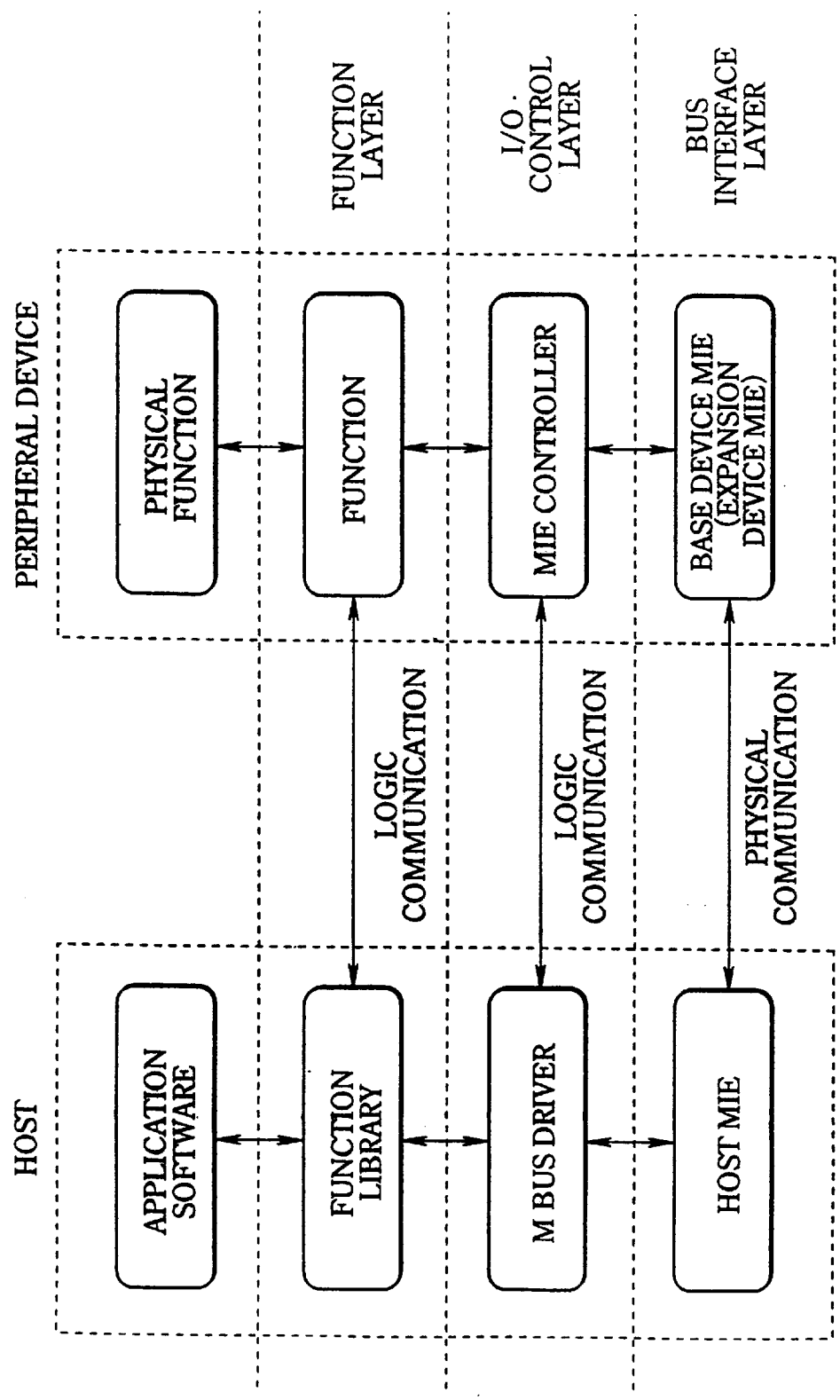
FIG. 46 is a diagram illustrating data communications between a host, base device and expansion device, by means of a layered model.

FIG. 46 is a figurative diagram for describing the layer structure between a host and peripheral devices. As the diagram shows, the host and peripheral devices form a layered structure for data communications therebetween.

In FIG. 46, the function layer utilizes each function in a peripheral device, and conducts data transmission and reception in accordance with the data format. A peripheral device can have up to a maximum of three functions. The I/O control layer controls data transmission and reception in frame units and it also controls the MIE (M-bus I/F Engine) which is described later. The bus interface layer conducts physical connection and signal transmission and reception between the host and base devices (or expansion devices). Data procurement (data transmission) and control between the application in the host and the physical functions of the peripheral devices are implemented by means of a function library, bus library, host MIE, connection lines, base (or expansion) device MIEs, MIE controller, and functions.

Peripheral Type

Peripheral devices (peripherals) are classified and distinguished as follows. Firstly, peripheral devices are classified into two device types: base devices and expansion devices. Base devices and expansion devices are then further divided into game controllers and other peripherals. Examples of the game controller type of peripheral device include standard components of game devices, such as standard game controllers, joysticks, steering wheels, and the like, associated with game devices. Examples of 'other peripherals' include: keyboard, mouse, gun (imitation gun), and the like. An expansion device is a peripheral of a controller expansion system, examples of which include: a sound input, back-up memory, gun (imitation gun), and the like. The controller system has a set standard data format, so that it can be used with any application software. Since the other base devices and expansion devices have different data formats depending on the device, a function library is prepared for each respective function.

Description of Terminology

Below, the terminology used in the description of the second mode of implementation is explained. For the sake of convenience, this overlaps partially with the description in the first mode of implementation. Firstly, data which is expanded along a time series is called "serial data". A signal line (flow) which conducts the exchange of data in a serial fashion is called a "serial bus". A serial bus which connects a game device with peripheral devices in accordance with the standard relating to the present invention is called an "M bus". A parameter group indicating the function of a peripheral device and allocated to each respective peripheral device is called a "device ID". A device ID contains 16 bytes, including the attributes of the peripheral device, and the functions (data format and functional elements) it comprises. The device ID can be obtained by means of a Device Status command, as described later.

A terminal of the M bus where a peripheral device of the game device can be connected is called a "port". In a port terminal, there are a standard four pins, comprising power supply terminals (VCC, GND) and data lines (SDCKA, SDCKB), or five pins, comprising a further shield line. In the "M bus" according to the standard of the second mode of implementation, a maximum of four ports (port A; port B; port C; port D) are supported.

The game device is known as the "host", and the functions realized by peripheral devices connected thereto are called "function". A function does not refer to a product itself, but rather to an element which constitutes a product, and therefore one product may comprise a plurality of functions. A peripheral device forms a collection of functions, and access from the host is conducted in peripheral device units, access to functions being specified by function type. A plurality of functions can be used in a single peripheral device, but with the "M bus" according to the second mode of implementation, for example, a maximum of three functions can be used.

Figure 47:
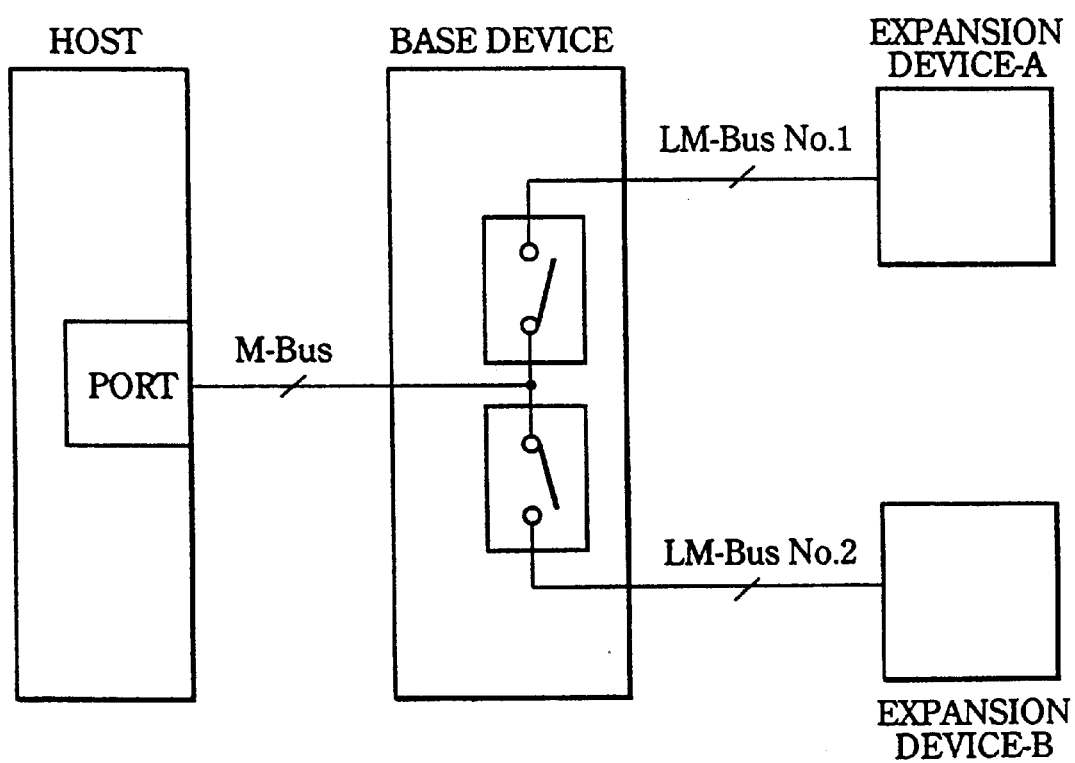
FIG. 47 is a diagram illustrating connection relationships ween a base device and expansion devices.

As shown in FIG. 47, peripheral devices are divided physically into two types: "base devices" and "expansion devices". A base device is a peripheral device which is connected to the host and has the function of controlling expansion devices. A base device automatically identifies and connects an expansion device linked thereto. An expansion device is a peripheral device connected to a base device, which cannot operate if it has no base device. An M bus linking a base device to an expansion device is called an "LM bus". An LM bus is the same as the M bus in logic (signal) terms, but it is different physically. Of the peripheral devices, base devices principally comprise game controller systems and expansion devices comprise expansion devices of the game controller systems. For example, only one base device may be connected to one port of the host, but the base device may manage up to five expansion devices (up to five LM buses).

In the case of a base device and a plurality of expansion devices at a single port, an identification number is assigned to each base device and expansion device according to the point where it is connected, so that it can be accessed directly. This assigned number is called an "absolute position AP". On the "M bus", the AP is a single fixed byte having the following structure:

(Maximum 4 ports(2 bit))×(Maximum no. APs assigned to 1 port=6(6 bit))=(1 byte(8 bit))

The allocated AP is determined according to the connection mode and whether the device is a base device or expansion device, as described later. This AP is used for accessing the base device or expansion device.

Data exchange between the host and functions is not conducted using a conventional one sided communication system, but rather by using certain specified instructions, such that data appropriate to the situation and time can be transmitted and received. These instructions are called "commands", and the object data of the command is called a "parameter". A "parameter" is constituted by the AP of the destination device, the AP of the source device, the data size, and data. On the M bus, a maximum of 254 basic commands can be prepared, and a maximum of 1020 bytes of data can be transmitted or received in a single access operation.

Figure 48:
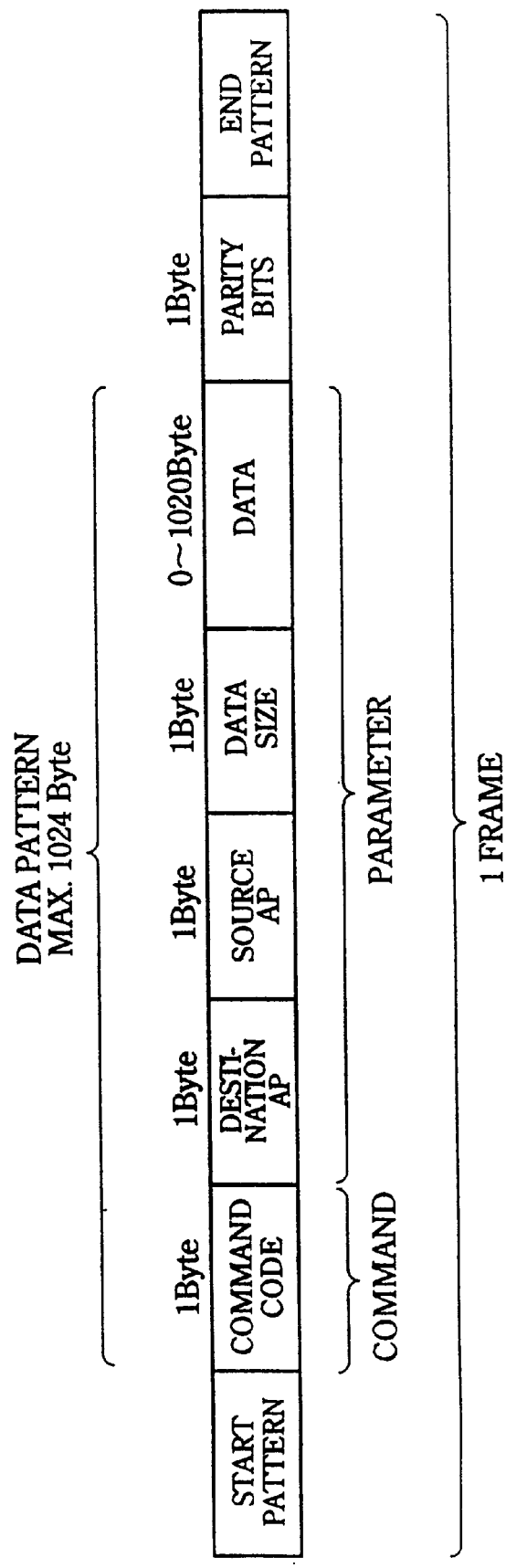
FIG. 48 is a diagram illustrating the composition of frame data.

Data transmission conducted by means of a port is carried out in "frame" units. FIG. 48 gives an example of the composition of a frame. One frame is constituted by a start pattern, command code, parameter (destination AP, source AP, data size, data, and the like), parity bits, and an end pattern. One frame is transmitted in a single access operation. One access is made to one device within one interval (INT). The start pattern, parity bits and end pattern are added by the MIE (described later).

Figure 49:
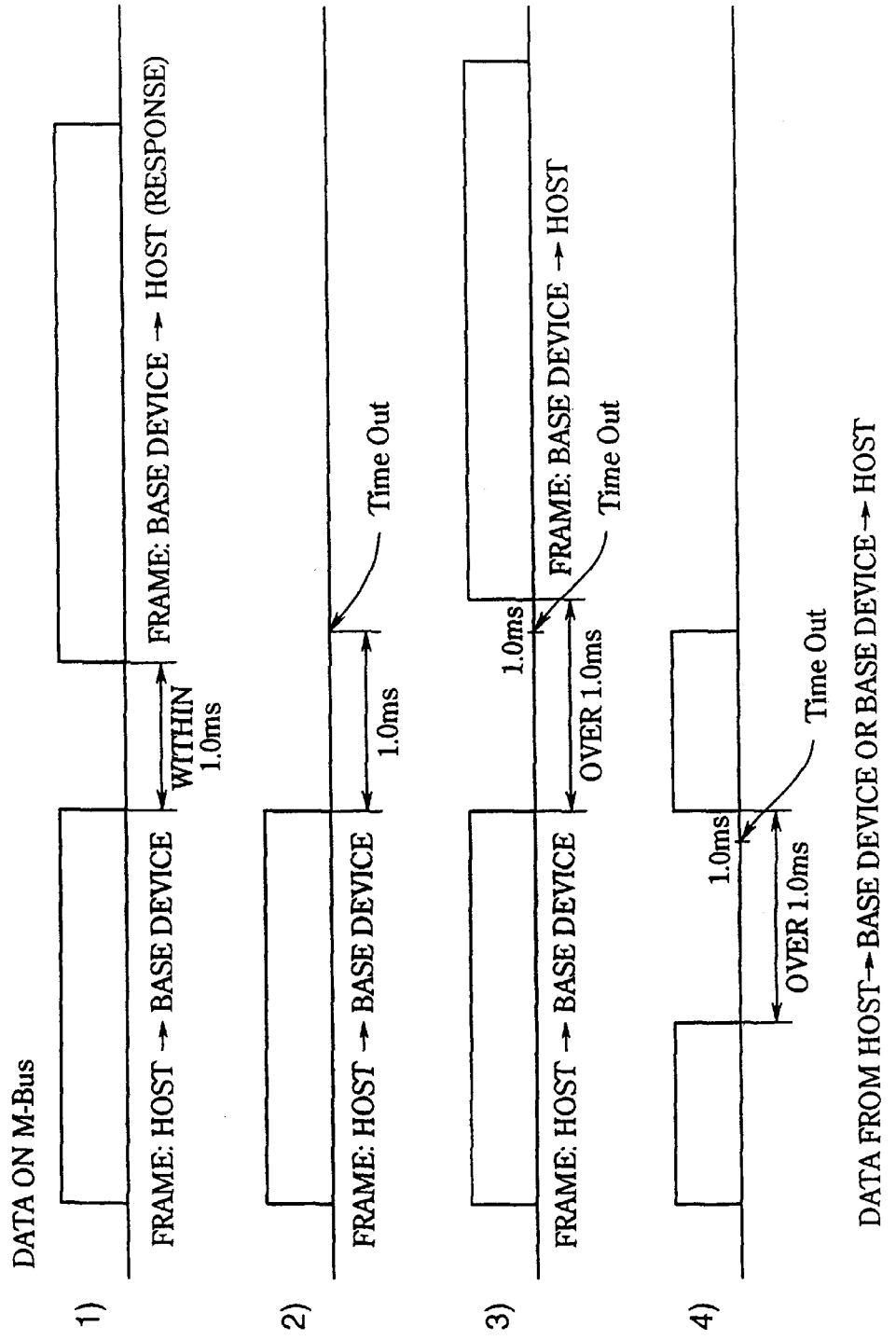
FIG. 49 is diagram illustrating a Time Out.

FIG. 49 is a figurative diagram illustrating response and "Time Out" processing in an M bus. The reply transmitted when a host sends a command to a base device or expansion device is called a "response". After transmitting a command, the host waits for a response for a certain period of time, and if there is still no response after waiting, this state is called "Time Out". A base (or expansion) device which has been timed out is regarded by the host as having been disconnected. Furthermore, if a base (or expansion) device performs a Time Out when receiving, a software reset is implemented. The time period until a Time Out (response time) may be 1.0 ms, for example.

In FIG. 49, in case (1), the response from the base (or expansion) device is within the response time and is therefore normal. In case (2), there is no response, so a Time Out occurs. In case (3), there is no response within the response time period, so a Time Out occurs. In case (4), the interval during transmission data exceeds the response time, so a Time Out occurs. The port to which a peripheral device which has been timed out is connected implements a hardware reset.

A place for connecting an expansion device in order to expand the functions of the controller is called an "expansion socket". An expansion device connects to an expansion socket. The "M bus" can have a maximum of four expansion sockets. This is because the correspondence between expansion sockets and LM buses is implemented according to the logic of two ID lines, which are described later. The number of LM buses and the number of expansion sockets do not have to be the same.

A circuit which converts the data to serial data for the M bus such that it can be transmitted and received via the M bus is called an "MIE (M-bus I/F engine)". All M-bus standard devices have this MIE. The host has a host MIE, the base devices have a basic device MIE, and the expansion devices have an expansion device MIE. An MIE only converts data, so the process of extracting data from a frame is carried out by the M bus driver (described later) at the host, and by software (firmware) called an MIE driver at the device.

The operation of the host accessing a peripheral device is conducted via software "M bus driver" and "function library" which control the peripheral devices (base devices and expansion devices). The M bus driver controls and manages frames, whilst the operations of controlling each peripheral device (function) by commands and managing parameters (data format) are carried out by a function library. There is only one type of M bus driver for all peripheral devices, whereas function libraries are provided corresponding to each respective function. Up to three function libraries indicated by device ID can be used for any one peripheral device.

On the "M bus", all base devices and expansion devices record information particular to themselves according to a prescribed format.

Information relating to a base device or expansion device is called "Device Status". The Device Status records management data, such as product name, device ID, licence, model number, production lot, destination region, etc., and electrical data, such as standby current consumption, maximum current consumption, and the like. Device Status is managed and utilized by means of a device library and the application software. For example, it is possible to reject illegal product copies by means of the product name and licence information, and to control the current for the whole port according to the information on maximum current consumption.

Data Transfer Pattern

Physical data transmission on the M bus is now described. The same format is used for this data transmission as in the first mode of implementation. In other words, data is transmitted by a synchronized serial format. There is a total of four lines: Vcc for supplying power; a ground line GND; data line SDCKA (two-way) for transmitting an SDCKA signal; and data SDCKB (two-way) for transmitting an SDCKB signal. The two-way data communication uses a half-duplex system, and the transfer rate is, for example, 2 Mbps at maximum. If necessary, a signal shield wire can be added.

Principles of Transmission

Figure 50:
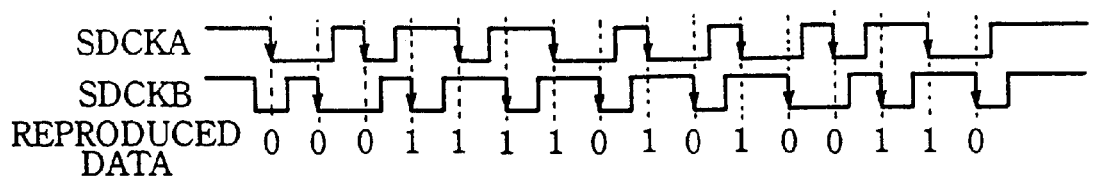
FIG. 50 is a diagram illustrating data transmission by means of an SDCKA signal and SDCKB signal.

FIG. 50 shows data patterns for SDCKA and SDCKB. The signals transmitted by the serial data clock A (SDCKA) and serial data clock B (SDCKB) are formed such that their falling edges are always present alternately when data is being transmitted. At the receiving side, one signal is latched at the falling edge (or rising edge) of the other signal, and the latched signal level is demodulated to give digital data. The data is transferred starting from the MSB, and at the start position, SDCKA provides clock information and SDCKB provides data information.

Information Patterns According to SDCKA and SDCKB

Figure 51:
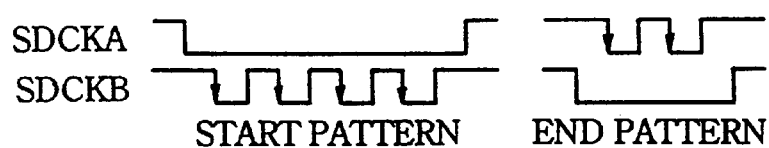
FIG. 51 a diagram illustrating a start pattern and an end pattern.

FIG. 51 shows an example of a synchronizing pattern. The synchronizing pattern comprises a start (START) pattern and an end (END) pattern. The start pattern is a synchronizing pattern transmitted prior to the data pattern. When the receiving side detects the falling edge (or rising edge) of SDCKB four times (four negative pulses) in the period from the fall of SDCKA to its subsequent rising edge, it concludes that the following pattern is a data pattern. When the receiving side detects the falling (or rising) edge of SDCKA two times (two negative pulses) in the period from the fall of SDCKB to its subsequent rising edge, it confirms that the data pattern has ended, and concludes that the operation has been completed normally.

SDCKB Occupancy Permission Pattern (light gun)

Figure 52:
FIG. 52 is a diagram illustrating an SDCKB occupancy permission pattern.

FIG. 52 shows an example of an SDCKB occupancy permission pattern. If the receiving side detects the falling edge of SDCKB eight times (8 negative pulses) in the period from the fall of SDCKA to its subsequent rise, the SDCKB can be occupied from the next fall of SDCKA until it rises. The occupancy of SDCKB must be released by a rising edge of SDCKA. This pattern is used, for example, with a light gun in a shooting game.

Reset Pattern

Figure 53:
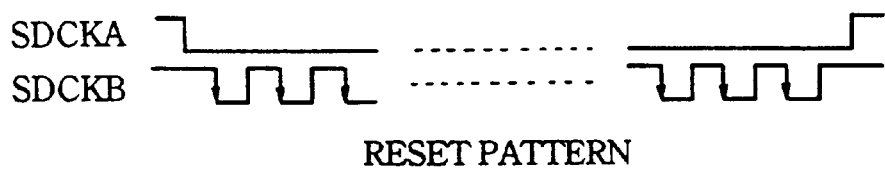
FIG. 53 is a diagram illustrating a reset pattern.

FIG. 53 shows an example a reset pattern. If the receiving side detects the falling edge of SDCKE 14 times (14 negative pulses) in the period from the fall of SDCKA until its subsequent rising edge, it concludes that there is a reset request from the transmitting side, and implements a reset.

Transmission Format

Figure 54:
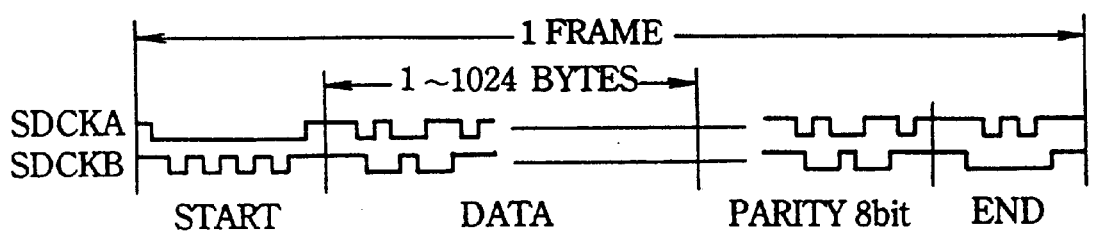
FIG. 54 is a diagram illustrating a frame format.

FIG. 54 shows an example of a transmission format. Data transmission is conducted in frame units (minimum unit). The content of a frame starts with a start pattern indicating the beginning of data transmission, and further comprises a data pattern of maximum length 1024 bytes, parity, and an end pattern. The parity comprises 8 bits in a horizontal direction, and it is added automatically by the hardware during transmission and erased during reception.

Protocol

The communications protocol between the host and peripheral devices is now described. Commands are indicated by "command name", and details are described later.

Figure 55:
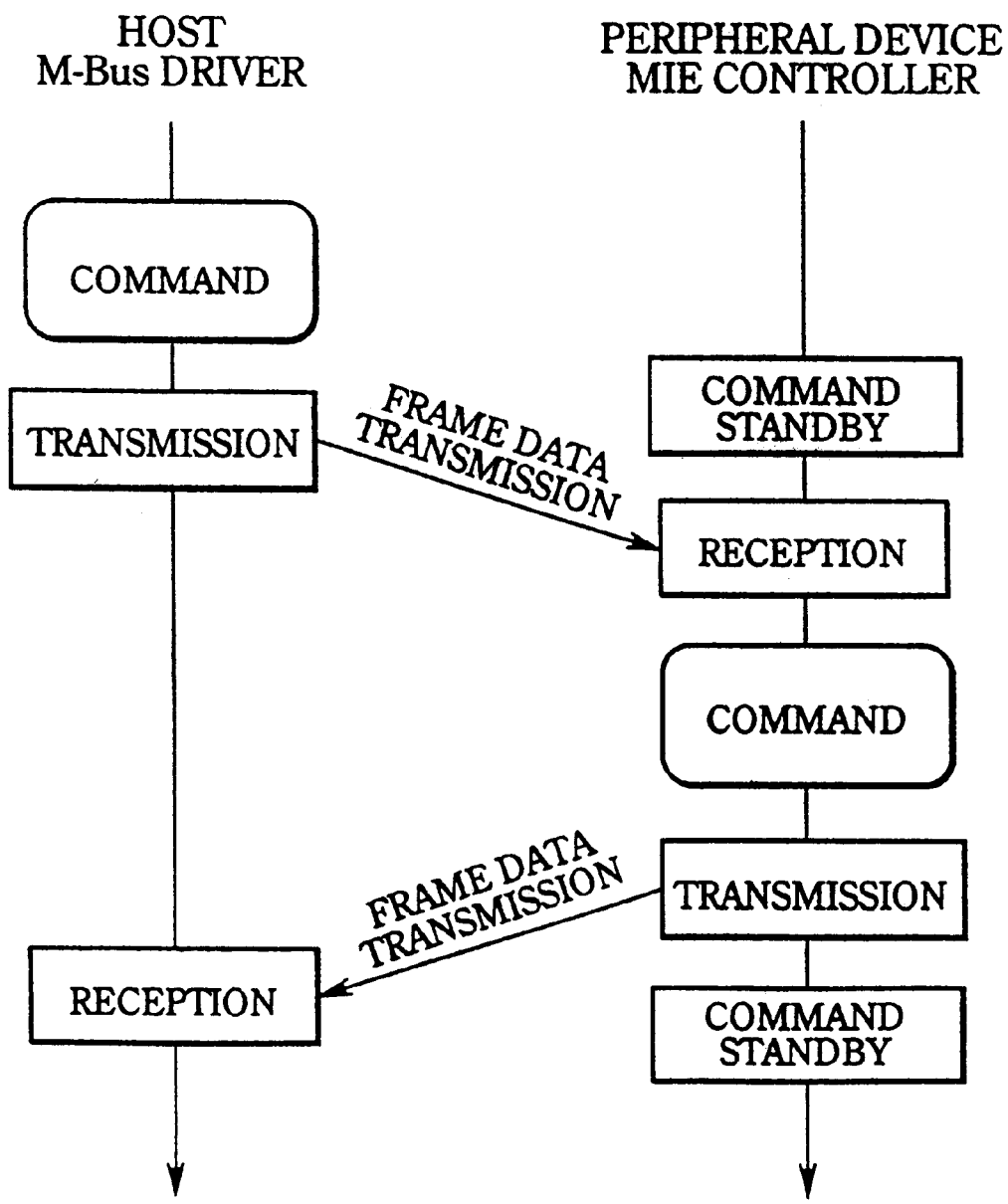
FIG. 55 is a diagram giving an approximate illustration of data transmission between a host and peripheral device (base device or expansion device)

FIG. 55 is a figurative diagram giving an outline of the communications protocol. Firstly, the right of priority to transmit commands in a processing sequence lies with the host. Therefore, initially, the peripheral devices (base or expansion devices) assume a command standby state. All communications between the peripheral devices and host are conducted in frame units, as described above. The host executes an application program and generates commands to the peripheral devices. These commands are transmitted to the peripheral devices via the M bus as frame data. An instruction is given to a peripheral device by means of the command and parameters in a frame. When a peripheral device corresponding to the destination AP in the frame receives frame data, it responds accordingly. Namely, the peripheral device generates a corresponding command and creates frame data, which it transmits to the host via the M bus. Thereupon, the peripheral device assumes a state of standby awaiting the next data transmission. The host receives the frame data from the peripheral device and extracts the command (reply). This command is then passed to the application. The application implements the subsequent action using the information transmitted by this command. Data communications between the host and peripheral device are conducted by repeating this procedure. FIG. 56(*a*) gives an illustration of this kind of intermittent data communication between a host and a plurality of peripheral devices via an M bus and LM buses. Furthermore, FIG. 56(*b*) illustrates an example where it is not possible to send all the data to be transmitted in a single transmission frame, and therefore the long data is divided up and transmitted intermittently by a plurality of transmission frames (see FIG. 70 below).

The aforementioned data communications process has the following characteristic features. The host can access a base device and expansion device directly using the same protocol, without the need for data conversion, or the like, during the operation. The AP data required for access is determined according to the host port, base device and expansion socket, where the function is connected. When accessing a base device, the connection state of expansion devices on that base device can be confirmed. Peripheral devices can be connected or disconnected even if the host is in an operational state. In order to obtain information relating to a peripheral device, the host requests a Device Status. If no Device Status is requested, a peripheral device will not start operation, but remain in a standby state. There are two types of peripheral device resetting operation, namely, a software reset (reset command) and a hardware reset (reset pattern), which are described later. A software reset only resets particular peripheral devices connected to a port. A hardware reset resets all peripheral devices. Data transfer is conducted in frame units containing a maximum of 1024 bytes. Up to three functions can be used by a single peripheral device, and functions are accessed by specifying the respective function types. A maximum of one access operation to one function is possible within one interval (1 INT), and one frame of data can be communicated by one access. A single port is not accessed in a continuous fashion. The manner in which these features are achieved is described later.

Frame Data

A maximum of one access operation is possible to one function during one internal INT period, and the amount of data which can be transferred by one access operation is 1 frame of data transmission and 1 frame of data reception. FIG. 54 described above shows examples of frame data, wherein one frame comprises a start pattern, data pattern, parity bits, and an end pattern.

The start pattern, parity bits and end pattern, are designated by the data transmission pattern, and they are processed automatically by the MIE. The data pattern in the frame is constituted by 4-byte units, and it contains a minimum of four bytes and a maximum of 1024 bytes. At the minimum of 4 bytes, it comprises only a command code, destination AP, source AP, and data size (=00h). The command code indicates the code of the command to be issued to the destination device. The destination AP indicates the AP of the device to which the frame is transmitted. In other words, the host specifies the AP of a base device or expansion device, and a base device or expansion device specifies the AP of a host port. The source AP indicates the transmitting device's own AP. The data size indicates the size of the transmission data in 4-byte units. The data is the data for transmission (data format, etc.) and is stored in 4-byte units.

Command Codes

Command codes comprise 1 byte and store the codes for commands.

TABLE 1

Composition of Command Code

| Bit | 7 | 6 | 5 | 4 | 3 | 2 | 1 | 0 |
|---|---|---|---|---|---|---|---|---|
| Data | $COM_7$ | $COM_6$ | $COM_5$ | $COM_4$ | $COM_3$ | $COM_2$ | $COM_1$ | $COM_0$ |

Here, $COM_0$–$COM_7$ are command codes. The command codes are specified in a range from 01h to FEh. The various types of command code are described later.

The data described with reference to this table is stored in a suitable location in an internal memory or register, etc. which is not shown in the drawings.

Absolute Position AP

Figure 57:
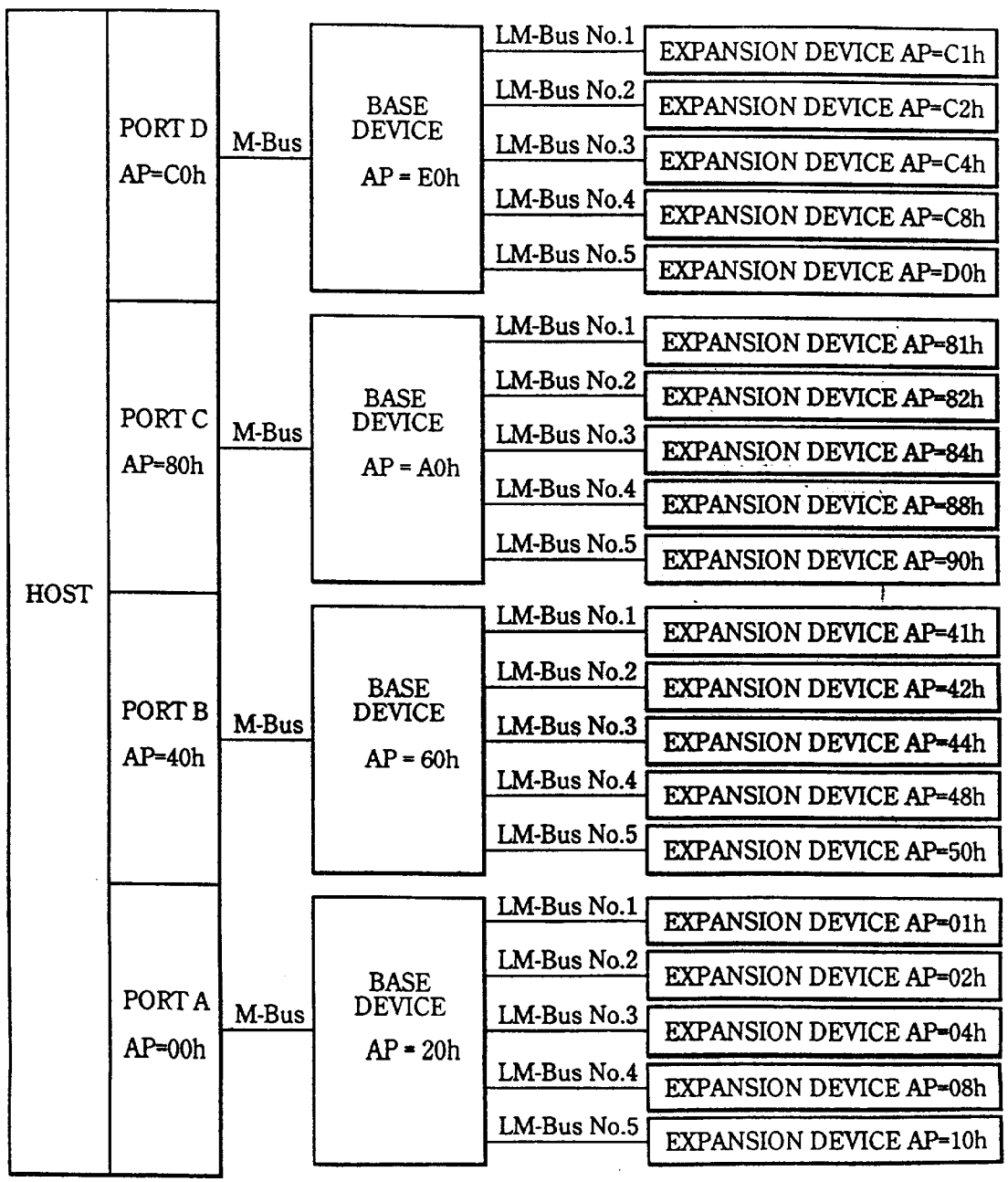
FIG. 57 is a diagram illustrating all AP values for a host, base devices and expansion devices.

Next, AP will be described. There are three types of AP: the AP of a basic or expansion device itself; an AP indicating a destination for data (destination AP); and an AP indicating a source of data (source AP). The AP of a base or expansion device is the AP of the device itself, and it is compared with the destination AP in a frame transmitted by the host and used to identify whether or not the data from the host is addressed to that device. The source AP of a device is data written to the third byte of a frame, when a base or expansion device sends back data to the host (FIG. 48). It indicates to the host which device transmitted data has been sent by. In the device source AP, the least significant five bits indicate the previous connection state of the LM bus. The host accesses a base device, and examines the source AP in the reply command (frame from base device) to see which LM buses of the base device have expansion devices connected thereto. The AP value is determined according to the port, base device, and expansion device connection configuration (fixed socket number system), as illustrated in FIG. 57, which is described later.

AP Bit Composition

Table 2 shows an AP bit composition held in an internal register. The AP comprises 1 byte (8 bits). The seventh and sixth bits of the AP are the port setting bits $PO_1$ and $PO_2$, which indicate the input/output port of the port that the base device is connected to. The fifth bit of the AP is a base device/expansion device setting bit, which indicates whether the device is a base device or expansion device. The fourth to zero AP bits are LM bus setting bits $LM_4$–$LM_0$, which indicate the number of an LM bus.

TABLE 2

Composition of AP

| Bit | 7 | 6 | 5 | 4 | 3 | 2 | 1 | 0 |
|---|---|---|---|---|---|---|---|---|
| Data | $PO_1$ | $PO_0$ | D/E | $LM_4$ | $LM_3$ | $LM_2$ | $LM_1$ | $LM_0$ |

Examples of the use of port setting bits $PO_0$ and $PO_1$ are shown in Table 3. Any port from port A–port D is specified by means of the two port setting bits $PO_0$ and $PO_1$.

TABLE 3

Port Setting Bits

| Selected port | $PO_1$ | $PO_0$ |
|---|---|---|
| Port A | 0 | 0 |
| Port B | 0 | 1 |
| Port C | 1 | 0 |
| Port D | 1 | 1 |

As shown in Table 4, the base device/expansion device setting bit is "1" when the AP is set for a base device, it is "0" when an expansion device is set, and it is "0" when a port is set.

TABLE 4

Base Device/Expansion Device Setting Bits

| Set device | D/E |
|---|---|
| Base device | 1 |
| Expansion device | 0 |
| Port | 0 |

The LM bus setting bits $LM_4$–$LM_0$ are as shown in Table 5. If the AP specifies a base device or port, $LM_4$–$LM_0$ are all set to "0". If an expansion device is connected to an LM bus, or an expansion device is accessed, then the setting bit $LM_n$ for the corresponding bus is set to "1". Furthermore, if there is no expansion device connected, then the setting bit $LM_n$ of the corresponding LM bus is set to "0". When an expansion device is accessed, only the setting bit of the LM bus number of the expansion device being accessed is set to "1".

TABLE 5

LM-Bus No Setting Bits

| Transfer destination | $LM_4$ | $LM_3$ | $LM_2$ | $LM_1$ | $LM_0$ |
|---|---|---|---|---|---|
| Base device | 0 | 0 | 0 | 0 | 0 |
| Expansion device | | the table listed below | | | |
| Port | 0 | 0 | 0 | 0 | 0 |

| LM-Bus No. | Setting bit | Access or connected state | Unconnected state |
|---|---|---|---|
| No. 1 | $LM_0$ | 1 | 0 |
| No. 2 | $LM_1$ | 1 | 0 |

TABLE 5-continued

LM-Bus No Setting Bits

| No. 3 | $LM_2$ | 1 | 0 |
| No. 4 | $LM_3$ | 1 | 0 |
| No. 5 | $LM_4$ | 1 | 0 |

The source AP when there is a response from a base device comprises the AP of the base device automatically combined by an OR gate with the expansion device connection state setting bits for respective LM buses.

For example, if the host accesses a base device from port A (00h), then the destination AP will be "00100000" (20h), and the source AP will be "00000000" (00h). Here, h indicates hexadecimal notation. If expansion devices are connected to the base device at LM buses Nos. 1 and 3, then the response from the base device at port A will be: destination AP="00000000" (00h), source AP ="00100101" (25h). The source AP adds (by OR operation) the connection state of the expansion devices ($LM_0$ and $LM_2$="1") to the AP of the base device ("00100000").

Next, when the host accesses an expansion device connected to LM bus No. 1 from port B, the destination AP is "01000001" (41h), source AP is "01000000" (40h). The response from the expansion device connected to LM bus No. 1 is destination AP="01000000" (40h), source AP="01000001" (41h).

FIG. 57 gives a table of APs (hexadecimal notation) for base devices and expansion devices when accessed by the host. The source AP when a base device responds is the sum (all OR sums) of the AP of the base device itself, plus the AP values of the expansion devices connected to it. Therefore, the source AP from a base device will contain information on the connection of expansion devices. The host can tell from the source AP of the base device if an expansion device or expansion devices are connected.

Initial Setting Procedure for Base Device APs

Figure 58:
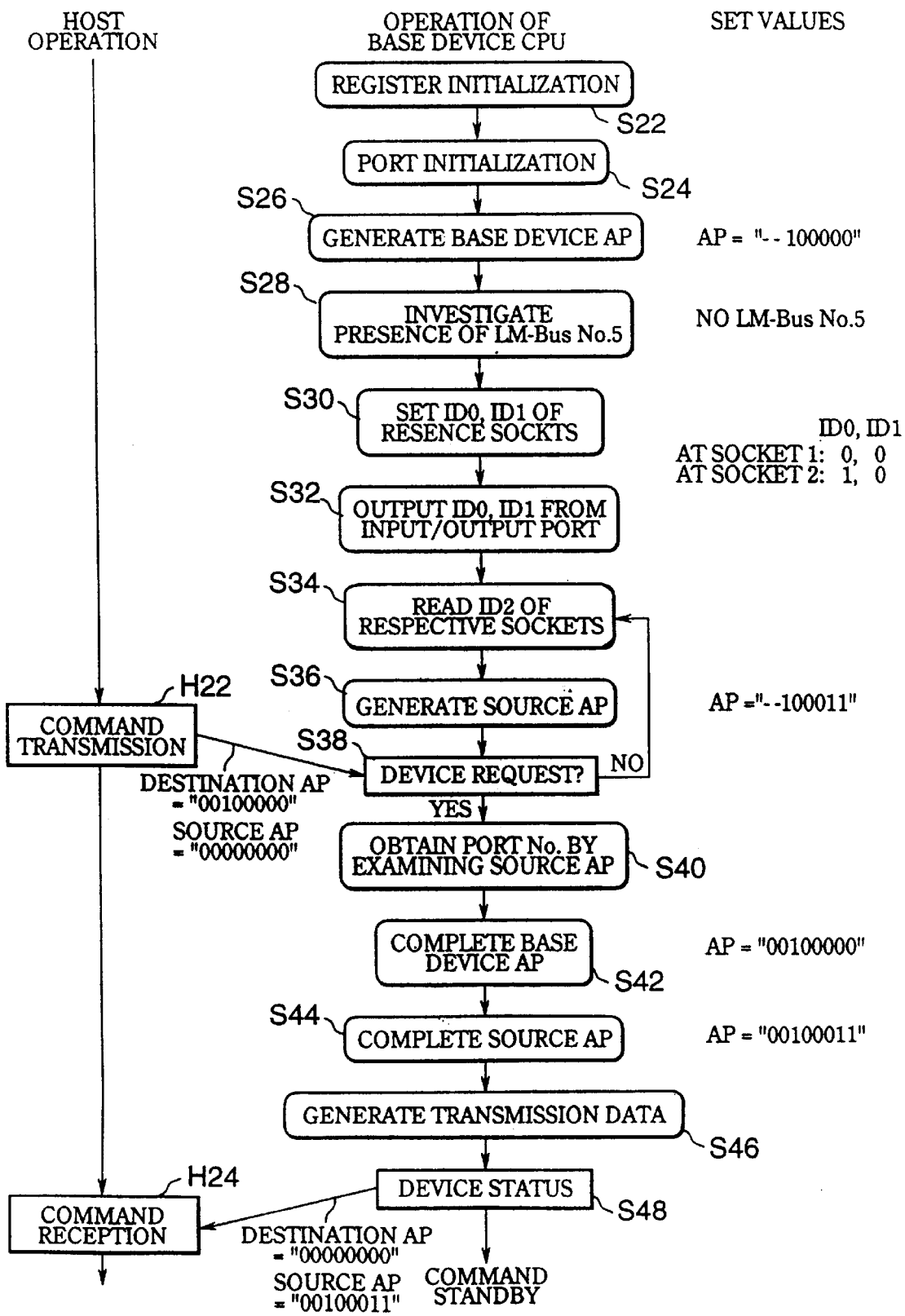
FIG. 58 is a diagram illustrating an AP setting procedure (absolute address for a base device.

Next, a procedure for initial setting of APs will be described. The person playing a game can connect base devices to any port of the host, and can also connect expansion devices to any LM bus on the base device. Therefore, before starting the game, the host must discover whether a base device or expansion device is connected to any of the ports of the host, and it must identify the AP of these devices. A procedure for initial setting of base device APs is now described with reference to the flowchart in FIG. 58. FIG. 58 shows an example of a case where a base device is connected to port A of the host and expansion devices are connected to LM buses No. 1 and 2 of the base device. The diagram illustrates the operation of the host and the base device CPU.

Figure 64:
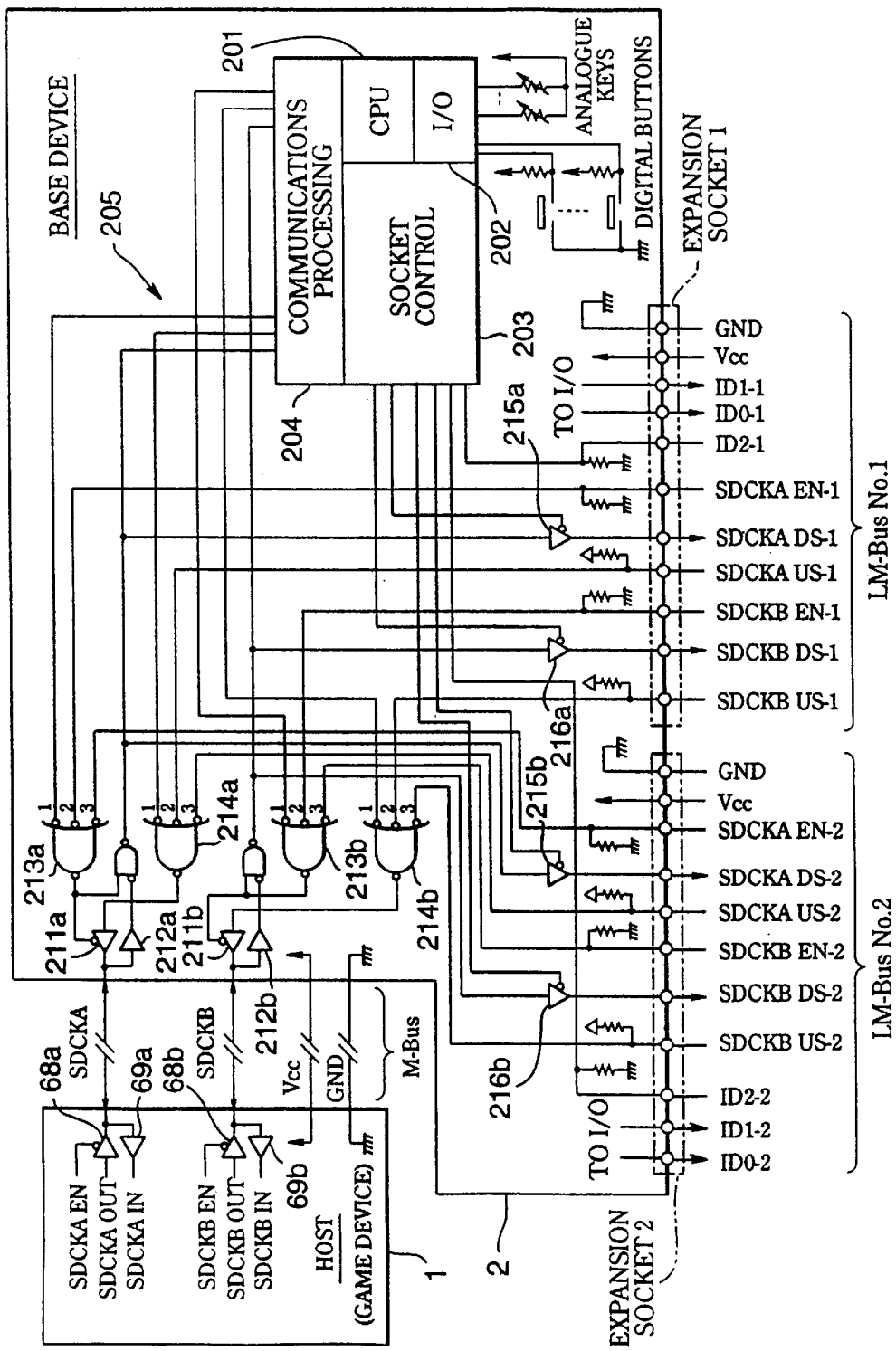
FIG. 64 is a block diagram illustrating the composition of a base device.
Figure 66:
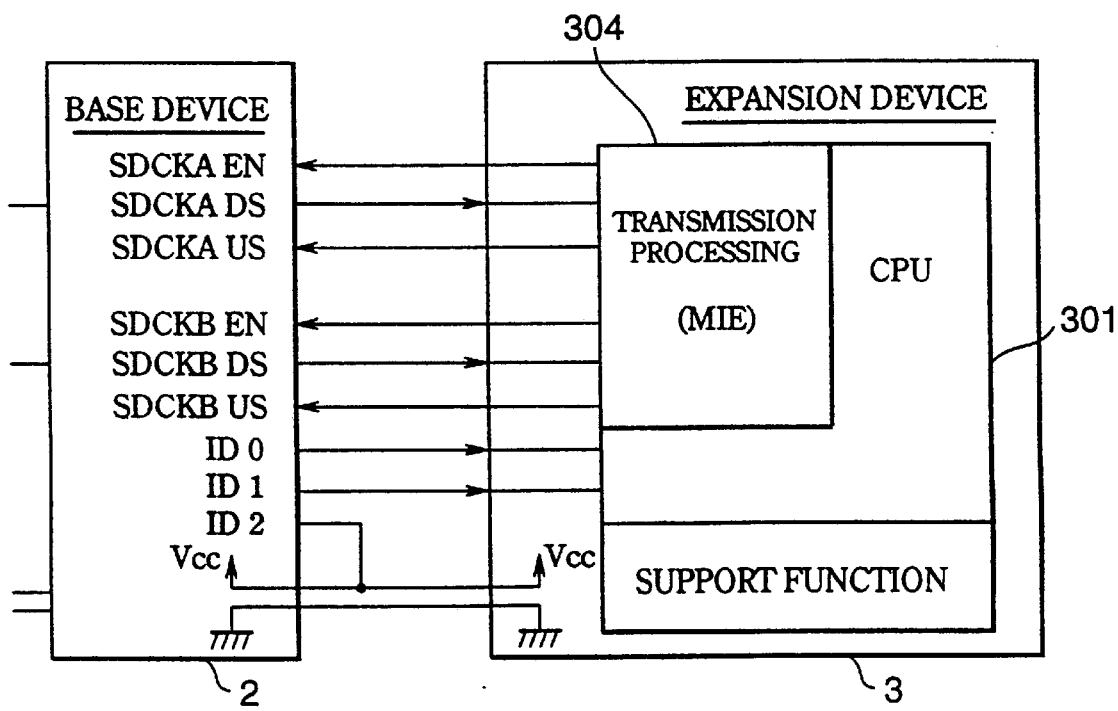
FIG. 66 is a block diagram illustrating a connection between a base device and an expansion device.

Firstly, the host, base device and expansion device are mutually connected by means of communications lines, and when the power supply for the devices is turned on, initialization programs are booted from a ROM to the CPU in each device. The base device MIE is illustrated in FIG. 64 below, and the expansion device MIE is illustrated in FIG. 66. In accordance with these programs, the base device (CPU) initializes the interface register and port, which are described later (S22, S24). Thereupon,the base device generates an AP for itself. In this case, since the AP relates to the device itself, only bit 5 of the AP is set to "1", giving an AP of "--100000". Here, the "-" symbol indicates an undefined value (S26). Next, the base device investigates whether an LM bus No. 5 is provided. Unlike the other LM buses, LM bus No. 5 is a bus connection or logic connection. This is because uses are envisaged where the functions of the base device itself are expanded, by installing an expansion device within the base device, or using a base device and expansion device in combination. For example, if a game controller comprising a vibrating function is created, then the game controller would form the base device and a vibrating section would be connected to this via LM bus No. 5, the whole device thereby forming a game controller containing a vibrating section. The presence or absence of this No. 5 bus is already set in the base device CPU (this information is written into a ROM, etc.), and it does not particularly require configuration, or the like. In the example described here, it is supposed that there is no LM bus No. 5 (S28).

Next, the CPU of the base device sets the LM buses for the external sockets. As shown in FIG. 64, the base device generates a combination of voltage values corresponding to the relevant LM bus number at particular terminals, e.g. terminals $ID_0$, $ID_1$, of each LM bus socket, starting from the I/O section. Table 6 shows examples of the output logic to the terminals $ID_0$, $ID_1$ of each LM bus as set by the base device (S30).

TABLE 6

| ID0 | ID1 | LM-Bus No. | Socket No |
|---|---|---|---|
| 0 | 0 | 1 | 1 |
| 1 | 0 | 2 | 2 |
| 0 | 1 | 3 | 3 |
| 1 | 1 | 4 | 4 |

The base device outputs "0", "0" respectively to terminals $ID_0$, $ID_1$ of the LM bus No. 1 socket, and it outputs "1", "0" respectively to terminals ID, ID, of the LM bus No. 2 socket. These logic output voltages are supplied to expansion devices via the LM buses and I/O ports. An expansion device examines the logic output values from the base device, to identify which LM bus (expansion socket) it is connected to (S32).

The base device reads in the logic level from a specially reserved terminal, e.g. terminal $ID_2$, of each LM bus socket. Terminal $ID_2$ is grounded via a pull-down resistance, and when an expansion device is connected to this socket, a voltage Vcc is applied from the expansion device side. As a result, when an expansion device is connected to that socket, the logic level of terminal $ID_2$ becomes "1". Furthermore, if no expansion device is connected, then the logic level of terminal $ID_2$ becomes "0". By examining the logic level of $ID_2$ with respect to $ID_0$ and $ID_1$ output to the LM bus, the base device can identify whether or not a device is connected to the LM bus No. indicated by the logic output to the aforementioned terminals $ID_0$ and $ID_1$. By repeating this process, terminal $ID_2$ serves to confirm connection of expansion devices, and when $ID_2$ is "0", this indicates that no expansion device is connected, and when $ID_2$ is "1", this indicates that an expansion device is connected. In this example, $ID_2$ of LM bus No. 1 and $ID_2$ of LM bus No. 2 are "1" (S34).

Under certain conditions, the logic outputs to socket terminals $ID_0$, $ID_1$ serve as a reset signal from the base device to an expansion device. For example, if the base device reverses the outputs $ID_0$, $ID_1$ to the expansion device, this will form a 'halt operation' signal to the expansion device, and the expansion device will stop its operation. For example, if $ID_0$, $ID_1$ were "00" and were then reversed to $ID_0$, $ID_1$="11", the expansion device would halt its processing. Furthermore, if the base device reverses the outputs $ID_0$, $ID_1$ and then further reverses them back to their original values, this forms a reset signal to the expansion device and the expansion device will reset. For example, if $ID_0$, $ID_1$ were "00", and then $ID_0$, $ID_1$="11" (halt signal) was output to halt the expansion device, the base device would subsequently be reset. After the base device has reset, the expansion device is reset by switching to $ID_0$, $ID_1$="00" (reset signal) (return to original values). After resetting, the devices assume the same state as that following a software reset, which is described later. Next, when the base device is transmitting, it generates a source AP. The source AP has the form "--1xxxxx" depending on the AP of the base device and the state of terminal $ID_2$. The "x" symbols in bits 0–4 will be "0" or "1", depending on the connection states of the LM buses. In this example, devices are connected to LM bus Nos. 1 and 2 only, so the source AP is "--100011" (S36).

The base device waits to receive a Device Request, which is one type of command sent by the host. Unless the base device receives a Device Request, it remains in a standby state and repeats the processing from step 34 (S38; No). In this example, the base device is connected to port A of the host. The destination AP for this base device from the host is "00100000", which indicates that the base device is at port A. The "1" in the fifth bit indicates a base device, and the "00" in the sixth and seventh indicate port A.

The host, on the other hand, sends a command (Device Request) to each port in turn and waits for a response from a base device, so that it can identify whether base devices or expansion devices (peripheral devices) are connected to ports A to D (H22). When the base device at port A receives a command (Device Request) from the host (S38; Yes), it reads the source AP in the received frame, and gathers the port No. it is connected to from the sixth and seventh bits. In this example, this is port A, so these bits are "00" (S40).

At step S26, the base device completes its own AP (8 bits) using the 6 least significant bits created previously and the two most significant bits indicating the port (S42). Specifically, it combines the "00" (sixth and seventh bits) gathered for port A, and the AP previously created by the base device (="--100000") (zero to fifth bits), thereby completing the base device's own AP as "001000001" (20h in hexadecimal notation).

Thereupon, the base device completes the source AP for the transmission frame. The port bits are added in the most significant positions to the source AP previously completed up to only the least significant 6 bits in step 536. In this example, port bits "00" are added to the source AP ="--100011" to give a source AP "00100011" (S44). By looking at the code in this source AP, it can be seen that the base device is connected to port A, and that expansion devices are connected to LM buses No. 1 and 2 of this base device.

The base device creates a transmission frame in order to reply to the Device Reply (S46). The base device prepares a Device Status as a reply command to the Device Request command. The destination AP is "00000000" indicating port A, and the source AP is "00100011" as described above.

The base device sends a transmission frame containing Device Status, thereby returning a command to the host (S48). Thereafter, provided that the base device is not disconnected, its AP will be "00100000". The base device constantly monitors the state of terminal $ID_2$ of the LM bus sockets. If the connection state of expansion devices to the LM buses changes, then the bits in the source AP are changed, thereby maintaining a source AP which corresponds to the connection state of expansion devices.

The host receives transmission frames from the base device and identifies that there is a base device connected to port A and that expansion devices are connected to LM buses Nos. 1 and 2 of this base device (H24). The host can tell whether there exist expansion devices connected to the base device simply by accessing the base device. As described later, by means of the Device Status command, the host can also identify the details of the base device (type of peripheral device, etc.) connected to the port.

In the aforementioned AP setting process, the sockets whereby expansion devices connect to the base device have fixed numbers, and it is checked whether or not an expansion device is connected to each of the sockets (fixed socket number (LM bus number) system). In other words, (a) after initialization of the base device itself, the base device first sets $ID_0$, $ID_1$ corresponding to the LM bus (socket) No. , and then (b) it examines the logic level of $ID_2$ at each socket to identify the presence or absence of an expansion device connection at each LM bus. Thereupon, (c) it determines which number LM buses expansion devices are connected to from the $ID_2$ connection information, and therefore it creates the least significant six bits of the source AP for the transmission frame on the basis of this information. (d) The base device obtains information indicating the port of the host that it is connected to from the source AP in the frame received from the host, and it adds the most significant two bits of the base device source AP, thereby completing the source AP.

On the other hand, it is also possible for the base device to run a prior check of $ID_2$ to identify the LM buses in use, and then to allocate LM bus numbers to the LM buses used (socket number (LM bus number) allocation system). Specifically, (a) after initialization of the base device itself, the base device examines the $ID_2$ logic to identify whether an expansion device is connected to a particular LM bus. (b) It then allocates $ID_0$, $ID_1$ to the LM buses identified by terminal $ID_2$ as having an expansion device connection. The numbers are allocated in ascending order so that there is no overlapping in the number allocation. Table 7 shows an example of $ID_0$, $ID_1$ and LM bus numbers. An LM bus whose connection state remains unchanged will retain its number from the previous state.

TABLE 7

| ID0 | ID1 | LM-Bus No. |
|---|---|---|
| 0 | 0 | 1 |
| 0 | 1 | 2 |
| 1 | 0 | 3 |
| 1 | 1 | 4 |

Thereupon, (c) the base device creates the least significant 6 bits of its source AP used when transmitting, on the basis of the information at $ID_2$, and $ID_0$, $ID_1$. (d) It then obtains information identifying the port of the host that it is connected to from the source AP in the frame received from the host, and adds the most significant two bits of the base device source AP, thereby completing its source AP.

Once the base device has established its source AP, if it then receives an instruction from the host which requires the AP to be updated, in the fixed socket number system, $ID_0$, $ID_1$ are already provided corresponding to each socket, so the processing implemented by the base device to update the AP starts at step (b) above. In the socket number allocation system, the socket numbers change, and therefore the processing in the base device to update the AP starts from step (a) above.

Figure 59:
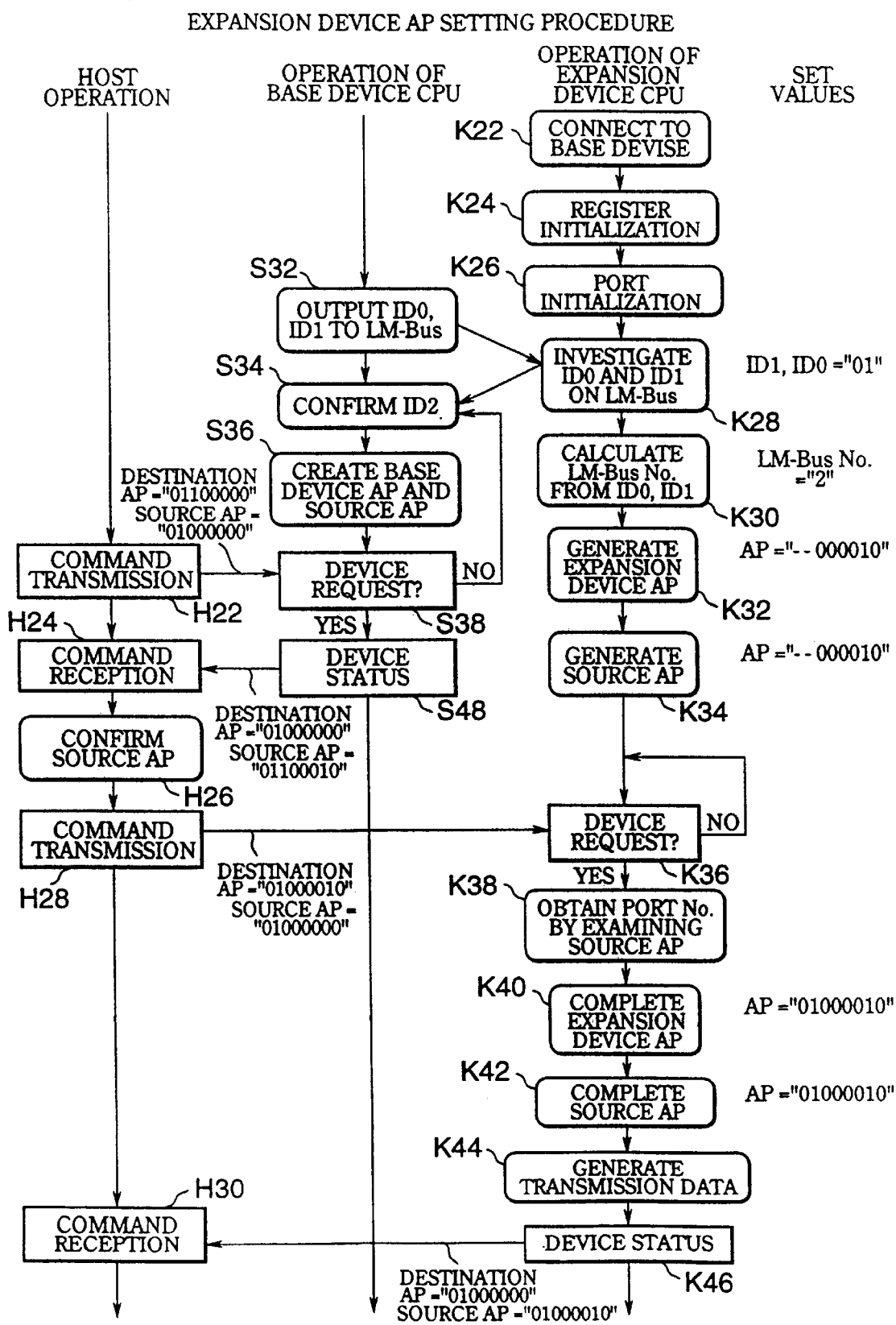
FIG. 59 is a diagram illustrating an AP setting procedure (absolute address) for an expansion device.

Initial setting procedure for expansion device APs A procedure for initial setting of APs for expansion devices is now described with reference to the flowchart in FIG. 59. In this diagram, the operations of the host, base device and expansion device are shown in parallel. Furthermore, the same step numbers are applied to sections corresponding to FIG. 58, and these sections are not described here. In the example described here, a base device is connected to port B of the host, and an expansion device is connected to LM bus No. 2 of the base device.

Firstly, the host, base device and expansion device are mutually connected, and power is supplied to each device (K22). The base device MIE and the expansion device MIE will be described later by means of FIG. 64 and FIG. 66, respectively. The expansion device is connected to the base device and when a so-called 'power on reset' is implemented, its internal register and LM bus port are initialized (K24, K25).

The expansion device (CPU) examines the LM bus according to a control program. As described above, logic levels corresponding to the LM bus number are output by the base device (CPU) to particular terminals, e.g. terminals $ID_0$, $ID_1$, of each LM bus connector. The expansion device reads the logic at terminals $ID_0$, $ID_1$ of the LM bus to which it is connected (K28). In this example, the expansion device is connected to socket 2, so the logic output of the socket terminals $ID_0$, $ID_1$ is set to "01". The expansion device identifies the LM bus number by referring to the logic output of terminals $ID_0$, $ID_1$ and Table 6. In this example, $ID_0$, $ID_1$="01", so the LM bus number is identified as "2" (K30).

The expansion device then creates its own AP. The expansion device knows that it is an expansion device. This is achieved by previously writing the necessary information to a ROM, or by writing it directly to the expansion device control program. Bit 5 (device/expansion device setting bit) of the AP in the register shown in Table 2 is set to "0", and bits 0–4 (LM bus number setting bits) are set to "1" in correspondence with the LM bus number that the expansion device is connected to. In this example, the LM bus is No. 2, so bit 1 is set to "1". Therefore, the AP of the expansion device itself is "--000010" (K32).

Thereupon, the expansion device creates an expansion device source AP. Unlike the base device, the expansion device does not conduct a connection check for the source AP, and therefore the "source AP=expansion device AP". In this example, the source AP=expansion device AP="--000010" (K34).

The expansion device then waits for an incoming frame from the host containing a Device Request command which specifies its own AP ("--000010") (K36). Unless a Device Request command is received, it continues to wait at standby (K36; No).

As described above, since the connection state of LM buses has already been reported to the host by the base device (S48), the host knows which LM buses have an expansion device connected to them (H26). Therefore, Device Request commands can only be transmitted to the expansion device so that the expansion device can be used, in applications which allow use of expansion devices. In this example, the source AP in the transmission frame sent by the host is "01000000" indicating port B, and the destination AP is "01000010" indicating an expansion device and LM bus No. 2 (H28).

The expansion device receives the frame containing the Device Request command (K36; Yes). It then reads the source AP of this frame data ("01000000") to gather the relevant port number of the host. Here, this is port B, so the port number is "01". The expansion device adds the bits indicating port B to the most significant positions of the expansion device AP previously completed to only the least significant 6 bits, thereby completing its own expansion device AP. In this example, the bits "01" for port B are added to the expansion device AP "--000010", thus producing an expansion device AP of "01000010".

Next, the expansion device source AP is completed. The port bits are added in the most significant positions to the source AP previously completed to only the least significant six bits. Here, the port bits "01" are added to the source AP "--000010" to give a source AP of "01000010" (K42). This expansion device source AP is the same as the expansion device AP, so this processing (K42) may be omitted.

The expansion device then creates a transmission frame in order to reply to the host (K44). It prepares a Device Status reply command in response to the Device Request command. The destination AP is "01000000" indicating port B of the host, and the source AP is "01000010". The expansion device sends the command to the host (K46). This command is a Device Status command. Thereafter, the expansion device maintains "01000010" as its own AP and source AP, unless the power supply or cables are disconnected.

The host obtains the details of the connected expansion device (various information relating to peripheral device) by receiving the Device Status command from the expansion device.

Data Size

The composition of the data size section contained in a transmission or reception frame is now described. The data size section comprises a single byte, as shown in Table 8.

TABLE 8

Composition of Data Size

| Bit | 7 | 6 | 5 | 4 | 3 | 2 | 1 | 0 |
|---|---|---|---|---|---|---|---|---|
| Data | $DS_7$ | $DS_6$ | $DS_5$ | $DS_4$ | $DS_3$ | $DS_2$ | $DS_1$ | $DS_0$ |

Here, the data $DS_0$–$DS_7$ in bit 0–bit 7 indicates the data size. The data size section indicates the size of data in 4-byte units, from a minimum of 0 bytes to a maximum of 1020 bytes. This is shown in Table 9.

TABLE 9

Data Size

| Bit | 7 | 6 | 5 | 4 | 3 | 2 | 1 | 0 |
|---|---|---|---|---|---|---|---|---|
| Specified data size | $DS_7$ | $DS_6$ | $DS_5$ | $DS_4$ | $DS_3$ | $DS_2$ | $DS_1$ | $DS_0$ |
| 0Byte | 0 | 0 | 0 | 0 | 0 | 0 | 0 | 0 |
| 4Byte | 0 | 0 | 0 | 0 | 0 | 0 | 0 | 1 |
| 8Byte | 0 | 0 | 0 | 0 | 0 | 0 | 1 | 0 |
| . | . | . | . | . | . | . | . | . |
| . | . | . | . | . | . | . | . | . |
| . | . | . | . | . | . | . | . | . |
| 508Byte | 0 | 1 | 1 | 1 | 1 | 1 | 1 | 1 |
| 512Byte | 1 | 0 | 0 | 0 | 0 | 0 | 0 | 0 |
| 516Byte | 1 | 0 | 0 | 0 | 0 | 0 | 0 | 1 |
| . | . | . | . | . | . | . | . | . |
| . | . | . | . | . | . | . | . | . |
| . | . | . | . | . | . | . | . | . |
| 1012Byte | 1 | 1 | 1 | 1 | 1 | 1 | 0 | 1 |
| 1016Byte | 1 | 1 | 1 | 1 | 1 | 1 | 1 | 0 |
| 1020Byte | 1 | 1 | 1 | 1 | 1 | 1 | 1 | 1 |

Data

The composition of the data section contained in a transmission or reception frame is now described. The data section stores data to be transferred to a size indicated by the data size (4-byte units). For example, in a controller system, it contains the function type and data format of the controller. The composition of the data section is shown in Table 10.

TABLE 10

Composition of Data

| Bit | 7 | 6 | 5 | 4 | 3 | 2 | 1 | 0 |
|---|---|---|---|---|---|---|---|---|
| 1st Data | $D1_7$ | $D1_6$ | $D1_5$ | $D1_4$ | $D1_3$ | $D1_2$ | $D1_1$ | $D1_0$ |
| 2nd Data | $D2_7$ | $D2_6$ | $D2_5$ | $D2_4$ | $D2_3$ | $D2_2$ | $D2_1$ | $D2_0$ |
| 3rd Data | $D3_7$ | $D3_6$ | $D3_5$ | $D3_4$ | $D3_3$ | $D3_2$ | $D3_1$ | $D3_0$ |
| 4th Data | $D4_7$ | $D4_6$ | $D4_5$ | $D4_4$ | $D4_3$ | $D4_2$ | $D4_1$ | $D4_0$ |
| . | . | . | . | . | . | . | . | . |
| . | . | . | . | . | . | . | . | . |
| . | . | . | . | . | . | . | . | . |

Data Transfer

An overview of data transmission between the host and a peripheral device (base device or expansion device) is now described. In this data transmission process, the rules are devised so that they are suitable for game devices. Firstly, data communications are essentially conducted according to a format whereby the host makes requests and the peripheral devices respond accordingly. Instructions and requests from the host to a peripheral device are all implemented by commands (frames). If a command (frame) is transmitted to a peripheral device, the peripheral device always sends back a command of some kind to the host. If a transmission error occurs, an error flag is invoked and error processing is implemented by the hardware functions.

After connection to the host, a peripheral device is activated upon receiving a Device Request command from the host for the purpose of gathering the details of the peripheral device. The peripheral device always sends back a command of some kind in response to a command from the host. The peripheral device (or a function provided by this peripheral device) may, for example, receive one command during one interval INT.

Figure 60:
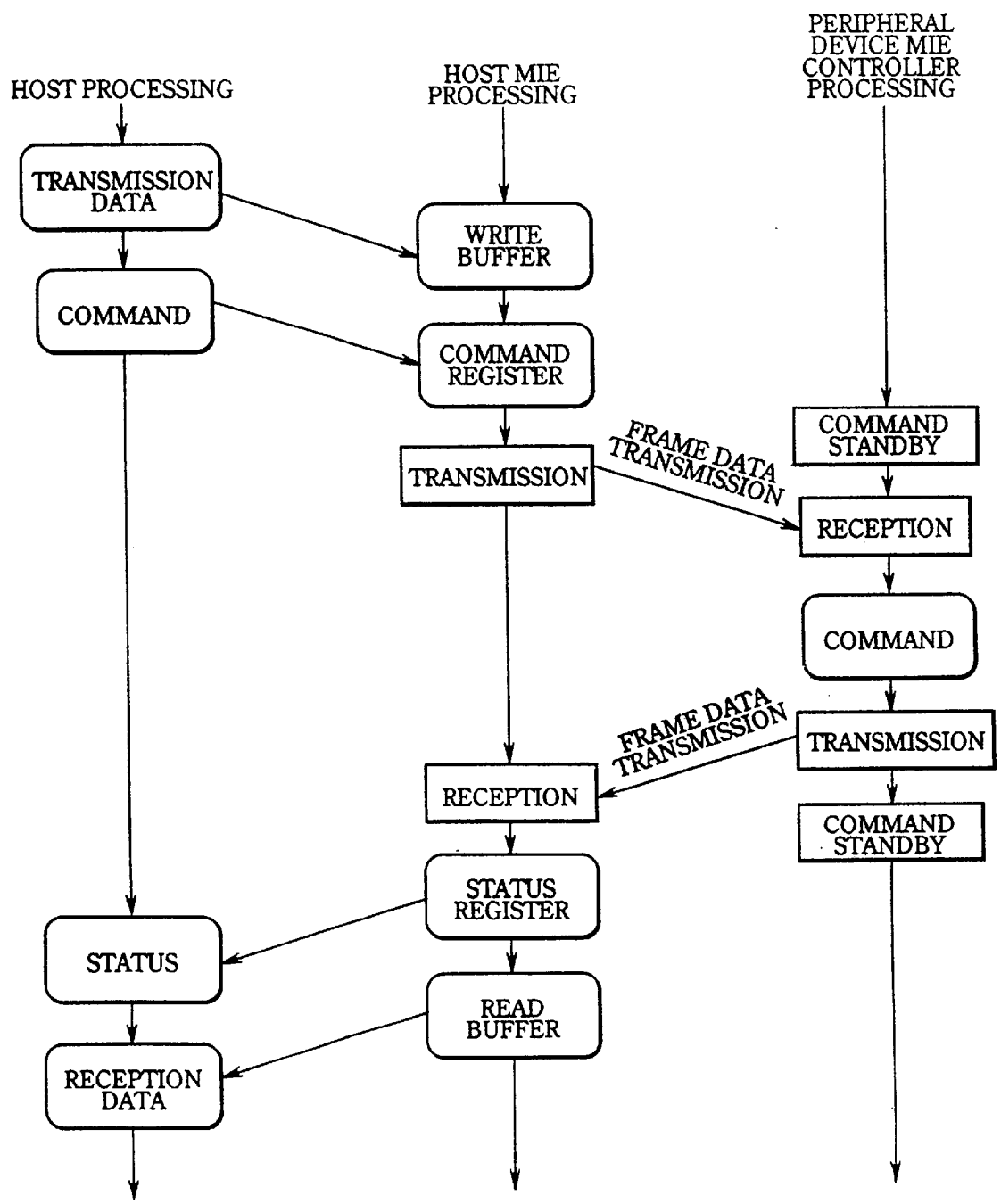
FIG. 60 is a diagram illustrating farmer data transfer between a host base device and expansion device.

FIG. 60 is a figurative diagram illustrating data transmission between a host and a peripheral device. As stated previously, the host and peripheral device (base device or expansion device) are interconnected, and when the power supply is turned on, their respective APs are established before data transmission commences. This yields their respective inherent device AP, source AP, and destination AP, which are required for data transmission.

By executing an application, the host CPU requires access to the peripheral device. The transmission data and transmission command output by the application are written respectively to a write buffer and command register of the host MIE. The transmission data and transmission command are constructed into a frame, as illustrated previously in FIG. 48, and this frame is transmitted to the peripheral device which is in a command standby state. Upon receiving this frame, the MIE in the peripheral device reads out the command and data, and supplies it to the peripheral device CPU. The peripheral device CPU reads out the command and conducts processing corresponding to the command to obtain a reply command and, if necessary, data which is to be sent back to the host. This data and command is constructed into a frame by the peripheral device MIE, and then sent to the host.

Thereupon, the peripheral device assumes a standby state awaiting the next command. When the host MIE receives the reply frame, it writes the communications status to the status register and it writes the received data to a read buffer. The host CPU then reads out data from both registers and continues the application. By repeating these operations, data communications are conducted between the host and peripheral device (base device or expansion device).

The concrete details of a communications process between the host MIE and peripheral device MIE are described later. If the hardware produces an error flag, then error processing is implemented. The details of the internal interface of the host are also described later.

Transfer Error

Here, transfer error occurring during data transmission will be described. Errors which can be detected by hardware include: parity errors, Time Outs, and data overflows. A parity error is an error detected when the data frame parity does not match. A Time Out is an error detected when a Time Out time period has elapsed whilst the SDCKA and SDCKB lines remain in a steady state. A data overflow is an error detected when the data volume exceeds the capacity of the transmission/reception buffer. Errors other than these (e.g. data corruption) are detected by software. If a hardware-detectable error occurs when a frame is received, this is indicated by an error flag, or the like.

Error Processing at the Host

If a reception error occurs at the host, a retransmit command is issued by means of the command sent to the peripheral device (base device or expansion device). The retransmit command is sent up to a maximum of three times. If an error still occurs, 'no connection' or error display processing, or the like, is implemented. The number of transmissions and the processing method vary according to the application software and the library. A retransmit command sent by the peripheral device is recognized up to three times for each transmission by the host, and thereafter 'no connection' or error display processing, or the like, is implemented. In 'no connection' processing, a hardware reset (reset pattern) is sent to the port where the error has occurred. Thereupon, if necessary, a Device Request is implemented.

Error Processing at Peripheral Device

If a transmission error occurs, the peripheral device (base device or expansion device) conducts a retransmit operation in response to requests from the host, but it does not carry out error processing, such as retransmission based on the decision of the peripheral device. If a reception error occurs, the peripheral device can send a retransmit command to the host. If a time out occurs during reception, the peripheral device implements a software reset. Time Outs are detected only by base devices, and reset signals are sent to expansion devices from a base device using the ID line.

Prohibited Operations

In this standard, certain prohibitions apply. Specifically, (1) if a plurality of peripheral devices (base devices and expansion devices) are connected to a host, direct access from one peripheral device to another is prohibited. In principle, access must be conducted via the host. (2) A peripheral device is not permitted to use commands which can only be issued by the host. (3) The same port must not be accessed in a continuous fashion.

However, these prohibitions are only given as examples in a standard according to an embodiment, and they are not intended to reduce the scope of the present invention or to restrict the application of the invention. It is of course possible to conduct data communications by means of a separate standard which allows these prohibited operations, and the like.

Connection and Disconnection of Peripheral Devices

Here, judgmental processing implemented in the host for connecting and disconnecting peripheral devices (base devices, expansion devices) will be described. In order to implement this judgement processing, the host transmits a Device Request command to the peripheral devices at each port. As stated previously, when the power supply is turned on after connecting a host and peripheral devices, the host, base devices and expansion devices each execute procedures for establishing their own respective AP. Therefore, prior to this judgement processing, the APs of destination peripheral devices are determined for each port. The interval at which a Device Request is transmitted is desirably 1 interval INT. If there has been a response from the peripheral device, then it is not necessary to transmit a subsequent Device Request command. Naturally, it is not necessary for the host to transmit a Device Request command to ports not used by the application software.

Base Device Connection Check

Connection checking at a base device is now described. If the host transmits a Device Request command to a particular port and the command Device Status is returned by the base device, then the host identifies that a base device described by the Device Status (explained later) is connected to that port. If there is no response at all from the base device (Time Out), then it is judged that there is no base device connected to that port. A Time Out is generated when there is no response within 1.0 ms, for example, from transmission of the command.

Expansion Device Connection Check

By accessing only the base devices connected to its respective ports, the host also receives from the base devices information on the connection state of expansion devices connected to those base devices (by means of the source APs), and therefore it is not necessary to perform a connection check for all expansion devices in the same way as base devices. Furthermore, if, when a base device is accessed, an expansion device connection setting bit which previously indicated no connection in the source AP contained in the reply from the base device has now changed to "1", this indicates that an expansion device indicated by that setting bit has been newly connected. Since the host can identify the connection state of expansion devices after accessing a base device, it also transmits a Device Request to the expansion devices, and waits for a Device Status response command. Here, if there is no Device Status response, a Time Out is generated, and it is judged that that no expansion device is connected.

Operation of Peripheral Device with Respect to Connection Check

All peripheral devices (base devices and expansion devices) assume a standby state immediately after connection and rather than starting their device operation, they obtain the least significant six bits only of their own AP. A peripheral device will not respond to any commands from the host until it receives a Device Request. The peripheral device then receives a Device Request command from the host. It records the port AP to which it is connected from the source AP in the received frame, completes its own AP and source AP, and then starts operation to send back a Device Request.

Base Device Disconnection Check

The host transmits a command to a connected base device (base device previously confirmed as being connected to a port), and if there is no response from the base device within a prescribed time period (Time Out), the host concludes that the base device has been disconnected. This disconnection is confirmed three times, and if it is still disconnected, a reset pattern is transmitted after 1 interval (1 INT).

Expansion Device Disconnection Check

If the host receives no response to a command transmitted to an expansion device, which has previously been confirmed as being connected to a port, (Time Out), then it is concluded that that expansion device has been removed and has assumed a disconnected state. This disconnection is confirmed three times, and if it is still disconnected, a reset pattern is transmitted after 1 interval (1 INT).

Furthermore, the host accesses the base device and receives a reply frame from the base device. Thereupon, if the host identifies that an expansion device connection setting bit in the source AP in the received frame has changed to "0", it concludes that the expansion device indicated by that connection setting bit $LM_n$ has been removed and has entered a disconnected state.

Operation of Peripheral Device with Respect to Disconnection

If a base device is removed from a host port, the power supply from the host to the base device connected to that port is interrupted. Therefore, the information relating to the connection port stored in the base device is lost. Consequently, even if a base device whose connector has been removed is then reconnected to the host port (hardware reset), the base device will not start to operate in this state.

Similarly, if an expansion device is detached from a base device socket, the power supply to the expansion device will be interrupted and therefore the stored information relating to the connection port will be lost. Consequently, even if the detached expansion device is reconnected to the base device socket, it will not start to operate.

Resetting

There are two types of reset: a hard reset (reset pattern) and a soft reset (reset command). Resets can only be implemented by the host. A hard reset is a reset by means of a reset pattern, and allows all the peripheral devices (base devices and expansion devices) connected to a certain port to be initialized. No response is sent by the peripheral devices. A soft reset is a reset by means of a Device Reset command, and it is capable of initializing a particular peripheral device. In this case, the peripheral device in question sends back a Device Reply command, whereupon the peripheral device implements a self initialization process.

The reset peripheral device (base device or expansion device) initializes its stored data, such as variables and RAM contents, etc. to the state immediately after power on, with the exception of some functions. Since the AP of the peripheral device is initialized, when it is to be reused, the host must transmit a Device Request.

Device ID

As described above, in a connection check, a peripheral device (base device or expansion device) which receives a Device Request from the host transmits a Device Status in return to the host. Various information relating to the device is stored in this Device Status data region, which forms fixed device information. One of these is the device ID. The device ID registers whether the device is a base device or expansion device, the function type, and function definition block text. All the peripheral devices have at least one device ID and one or more functions. Thereby, the host can identify the details of the peripheral device connected to it (type, function, signal format, etc.). The various types of command are described later.

Composition of Device ID

The device ID comprises 16 bytes (128 bit), as shown in Table 11.

TABLE 11

Composition of Device ID

| Bit | 7 | 6 | 5 | 4 | 3 | 2 | 1 | 0 |
|---|---|---|---|---|---|---|---|---|
| 1st Data | $FT_{31}$ | $FT_{30}$ | $FT_{29}$ | $FT_{28}$ | $FT_{27}$ | $FT_{26}$ | $FT_{25}$ | $FT_{24}$ |
| 2nd Data | $FT_{24}$ | $FT_{23}$ | $FT_{22}$ | $FT_{21}$ | $FT_{20}$ | $FT_{19}$ | $FT_{18}$ | $FT_{17}$ |
| 3rd Data | $FT_{15}$ | $FT_{14}$ | $FT_{13}$ | $FT_{12}$ | $FT_{11}$ | $FT_{10}$ | $FT_9$ | $FT_8$ |
| 4th Data | $FT_7$ | $FT_6$ | $FT_5$ | $FT_4$ | $FT_3$ | $FT_2$ | $FT_1$ | $FT_0$ |
| 5th Data | $FD1_{31}$ | $FD1_{30}$ | $FD1_{29}$ | $FD1_{28}$ | $FD1_{27}$ | $FD1_{26}$ | $FD1_{25}$ | $FD1_{24}$ |
| 6th Data | $FD1_{23}$ | $FD1_{22}$ | $FD1_{21}$ | $FD1_{20}$ | $FD1_{19}$ | $FD1_{18}$ | $FD1_{17}$ | $FD1_{16}$ |
| 7th Data | $FD1_{15}$ | $FD1_{14}$ | $FD1_{13}$ | $FD1_{12}$ | $FD1_{11}$ | $FD1_{10}$ | $FD1_9$ | $FD1_8$ |
| 8th Data | $FD1_7$ | $FD1_6$ | $FD1_5$ | $FD1_4$ | $FD1_3$ | $FD1_2$ | $FD1_1$ | $FD1_0$ |
| 9th Data | $FD2_{31}$ | $FD2_{30}$ | $FD2_{29}$ | $FD2_{28}$ | $FD2_{27}$ | $FD2_{26}$ | $FD2_{25}$ | $FD2_{24}$ |
| 10th Data | $FD2_{23}$ | $FD2_{22}$ | $FD2_{21}$ | $FD2_{20}$ | $FD2_{19}$ | $FD2_{18}$ | $FD2_{17}$ | $FD2_{16}$ |
| 11th Data | $FD2_{15}$ | $FD2_{14}$ | $FD2_{13}$ | $FD2_{12}$ | $FD2_{11}$ | $FD2_{10}$ | $FD2_9$ | $FD2_8$ |
| 12th Data | $FD2_7$ | $FD2_6$ | $FD2_5$ | $FD2_4$ | $FD2_3$ | $FD2_2$ | $FD2_1$ | $FD2_0$ |
| 13th Data | $FD3_{31}$ | $FD3_{30}$ | $FD3_{29}$ | $FD3_{28}$ | $FD3_{27}$ | $FD3_{26}$ | $FD3_{25}$ | $FD3_{24}$ |
| 14th Data | $FD3_{23}$ | $FD3_{22}$ | $FD3_{21}$ | $FD3_{20}$ | $FD3_{19}$ | $FD3_{18}$ | $FD3_{17}$ | $FD3_{16}$ |
| 15th Data | $FD3_{15}$ | $FD3_{14}$ | $FD3_{13}$ | $FD3_{12}$ | $FD3_{11}$ | $FD3_{10}$ | $FD3_9$ | $FD3_8$ |
| 16th Data | $FD3_7$ | $FD3_6$ | $FD3_5$ | $FD3_4$ | $FD3_3$ | $FD3_2$ | $FD3_1$ | $FD3_0$ |

Here, FT indicates the type of function provided by the peripheral. FD1 indicates a function definition block of a first function. FD2 indicates a function definition block of a second function. FD3 indicates a function definition block of a third function. FD1, FD2 and FD3 have different content meaning depending on the function indicated by FT.

Table 12 illustrates the contents of the aforementioned function types $FT_0$–$FT_{31}$. The FT function type indicates a function provided by a peripheral device. There are 32 function types in total, each comprising set commands and data format.

TABLE 12

| Bit | Function | Bit | Function |
|---|---|---|---|
| $FT_{31}$ | Reserved | $FT_{15}$ | Reserved |
| $FT_{30}$ | Reserved | $FT_{14}$ | Reserved |
| $FT_{29}$ | Reserved | $FT_{13}$ | Reserved |
| $FT_{28}$ | Reserved | $FT_{12}$ | Reserved |
| $FT_{27}$ | Reserved | $FT_{11}$ | Reserved |
| $FT_{26}$ | Reserved | $FT_{10}$ | Reserved |
| $FT_{25}$ | Reserved | $FT_9$ | Reserved |
| $FT_{24}$ | Reserved | $FT_8$ | Reserved |
| $FT_{23}$ | Reserved | $FT_7$ | (Provisional) Light-Gun |
| $FT_{22}$ | Reserved | $FT_6$ | (Provisional) FFB |
| $FT_{21}$ | Reserved | $FT_5$ | (Provisional) Sound output |
| $FT_{20}$ | Reserved | $FT_4$ | (Provisional) Sound input |
| $FT_{19}$ | Reserved | $FT_3$ | (Provisional) Timer |
| $FT_{18}$ | Reserved | $FT_2$ | B/W LCD |
| $FT_{17}$ | Reserved | $FT_1$ | Storage |
| $FT_{16}$ | Reserved | $FT_0$ | Controller |

In a single peripheral device, for example, it is possible to set up to three types of function, and the setting bits corresponding to a provided function are set to "1". An order of priority exists for the setting bits: the most significant bit ($FT_{31}$) has highest priority, and the least significant bit ($FT_0$) has lowest priority. Up to three function libraries are set according to this order of priority.

In Table 11, $FD1_{31}$–$FD1_0$ indicate first function definition blocks. These are blocks defining the individual elements constituting the first function. The contents thereof vary depending on the function. The details are governed by the respective function specifications (omitted from drawings).

$FD2_{31}$–$FD2_0$ indicate second function definition blocks. These are blocks defining the individual elements constituting the second function. The contents thereof vary depending on the function. The details are governed by the respective function specifications.

Similarly, $FD3_{31}$–$FD3_0$ indicate third function definition blocks. These are blocks defining the individual elements constituting the third function. The contents thereof vary depending on the function. The details are governed by the respective function specifications.

Function Data Format and Definition Blocks

The data format and definition blocks for functions are now described. This shows the data format used for exchanging data with a peripheral device.

Firstly, the peripheral devices (peripherals) are classified and distinguished as shown in Table 13.

TABLE 13

| Types of Peripheral Device | | |
|---|---|---|
| Device type | Peripheral type | Examples |
| Base device | Controller | Standard controller, joystick, steering wheel |
|  | Other | Keyboard, mouse, gun |

TABLE 13-continued

| Types of Peripheral Device | | |
|---|---|---|
| Device type | Peripheral type | Examples |
| Expansion device | Expansion unit | Sound input, gun, back-up memory |

As the table shows, a game controller represents a typical base device. The function type of a game controller is "controller", and it is used by connecting it to a port of the host. The game controller uses a set standard data format so that it can be employed with a plurality of applications. The functional elements in a controller system are given below Digital direction key A: Ra, La, Da, Ua Digital direction key B: Rb, Lb, Db, Ub Digital buttons: A, B, C, D, X, Y, Z, START Analogue key: A1, A2, A3, A4

Analogue lever: A5, A6

Furthermore, it is a condition of controller-system peripheral devices that they are provided with the following elements:

Digital direction key A: Ra, La, Da, Ua

Digital buttons: A, B, START

Other Types of Base Device

These other types comprise peripheral devices of a function type other than game controller. Since the data content and format, and the read/write cycle, etc. vary depending on the peripheral device, each device has a data format and data libraries corresponding to its respective functions.

Expansion Devices

These are peripheral devices for expanding the functions of base devices. Since the data content and format, and the read/write cycle, etc. vary depending on the peripheral device, each device has a data format and data libraries corresponding to its respective functions.

Controller-type Functions

The function type indicates the controller data format and the device ID definition block.

A read data format is shown in Table 14. The read data format is a format used for reading controller data. The data format size is 8 byte.

TABLE 14

| Controller Read Format | | | | | | | | |
|---|---|---|---|---|---|---|---|---|
| Bit | 7 | 6 | 5 | 4 | 3 | 2 | 1 | 0 |
| 1st Data | Ra | La | Da | Ua | Start | A | B | C |
| 2nd Data | Rb | Lb | Db | Ub | D | X | Y | Z |
| 3rd Data | $A1_7$ | $A1_6$ | $A1_5$ | $A1_4$ | $A1_3$ | $A1_2$ | $A1_1$ | $A1_0$ |
| 4th Data | $A2_7$ | $A2_6$ | $A2_5$ | $A2_4$ | $A2_3$ | $A2_2$ | $A2_1$ | $A2_0$ |
| 5th Data | $A3_7$ | $A3_6$ | $A3_5$ | $A3_4$ | $A3_3$ | $A3_2$ | $A3_1$ | $A3_0$ |
| 6th Data | $A4_7$ | $A4_6$ | $A4_5$ | $A4_4$ | $A4_3$ | $A4_2$ | $A4_1$ | $A4_0$ |
| 7th Data | $A5_7$ | $A5_6$ | $A5_5$ | $A5_4$ | $A5_3$ | $A5_2$ | $A5_1$ | $A5_0$ |
| 8th Data | $A6_7$ | $A6_6$ | $A6_5$ | $A6_4$ | $A6_3$ | $A6_2$ | $A6_1$ | $A6_0$ |

In this table, the first data is digital button data (ON="0", OFF="1"). The second data is digital button data (ON="0", OFF="1"). The third data is analogue axis 1 data (value between 00h and FFh). The fourth data is analogue axis 2 data (value between 00h and FFh). The fifth data is analogue axis 3 data (value 80h ±7F). The sixth data is analogue axis 4 data (value 80h ±7F). The seventh data is analogue axis 5 data (value 80h ±7F). The eighth data is analogue axis 6 data (value 80h ±7F).

Write Data Format

There is no format for writing data to the controller. The data size is 0 bytes. If data is written, there is no response.

Function Definition Blocks

The definition blocks FD for the game controller indicate functions divided into elements used in the read format shown in Table 14. Table 15 shows an example of function definition blocks for a game controller.

TABLE 15

Composition of Controller Function Definition Blocks FD

| Bit | 7 | 6 | 5 | 4 | 3 | 2 | 1 | 0 |
|---|---|---|---|---|---|---|---|---|
| 1st Data | $RB_{15}$ | $RB_{14}$ | $RB_{13}$ | $RB_{12}$ | $RB_{11}$ | $RB_{10}$ | $RB_9$ | $RB_8$ |
| 2nd Data | $RB_7$ | $RB_6$ | $RB_5$ | $RB_4$ | $RB_3$ | $RB_2$ | $RB_1$ | $RB_0$ |
| 3rd Data | 0 | 0 | 0 | 0 | 0 | 0 | 0 | 0 |
| 4th Data | 0 | 0 | 0 | 0 | 0 | 0 | 0 | 0 |

In this table, $RB_n$ indicates a read format divided block. Table 16 shows an example of block division.

TABLE 16

Controller Read Format Block Division

| Bit | 7 | 6 | 5 | 4 | 3 | 2 | 1 | 0 |
|---|---|---|---|---|---|---|---|---|
| 1st Data | | $RB_1$ | | | | $RB_0$ | | |
| 2nd Data | $RB_9$ | $RB_8$ | $RB_7$ | $RB_6$ | $RB_5$ | $RB_4$ | $RB_3$ | $RB_2$ |
| 3rd Data | | | | $RB_{10}$ | | | | |
| 4th Data | | | | $RB_{11}$ | | | | |
| 5th Data | | | | $RB_{12}$ | | | | |
| 6th Data | | | | $RB_{13}$ | | | | |
| 7th Data | | | | $RB_{14}$ | | | | |
| 8th Data | | | | $RB_{15}$ | | | | |

This table corresponds to Table 14, and the setting bits for used blocks are set to "1" and those for unused blocks are set to "0". The unused blocks are ignored by the function library.

Device ID and Data Format for Standard Controller

Table 17 shows an example of device ID for a standard controller. This example relates to a device ID for a standard controller which only has controller functions.

TABLE 17

Standard Controller Device ID

| Bit | 7 | 6 | 5 | 4 | 3 | 2 | 1 | 0 |
|---|---|---|---|---|---|---|---|---|
| 1st Data | 0 | 0 | 0 | 0 | 0 | 0 | 0 | 0 |
| 2nd Data | 0 | 0 | 0 | 0 | 0 | 0 | 0 | 0 |
| 3rd Data | 0 | 0 | 0 | 0 | 0 | 0 | 0 | 0 |
| 4th Data | 0 | 0 | 0 | 0 | 0 | 0 | 0 | 1 |
| 5th Data | 0 | 0 | 1 | 1 | 1 | 1 | 0 | 0 |
| 6th Data | 0 | 0 | 0 | 1 | 1 | 1 | 1 | 1 |
| 7th Data | 0 | 0 | 0 | 0 | 0 | 0 | 0 | 0 |
| 8th Data | 0 | 0 | 0 | 0 | 0 | 0 | 0 | 0 |
| 9th Data | 0 | 0 | 0 | 0 | 0 | 0 | 0 | 0 |
| 10th Data | 0 | 0 | 0 | 0 | 0 | 0 | 0 | 0 |
| 11th Data | 0 | 0 | 0 | 0 | 0 | 0 | 0 | 0 |
| 12th Data | 0 | 0 | 0 | 0 | 0 | 0 | 0 | 0 |
| 13th Data | 0 | 0 | 0 | 0 | 0 | 0 | 0 | 0 |
| 14th Data | 0 | 0 | 0 | 0 | 0 | 0 | 0 | 0 |
| 15th Data | 0 | 0 | 0 | 0 | 0 | 0 | 0 | 0 |
| 16th Data | 0 | 0 | 0 | 0 | 0 | 0 | 0 | 0 |

The device ID shown in this table comprises, in sequence from the first data to the sixteenth data: 00h-00h-00h-01h-3Ch-1Fh-00h-00h-00h-00h-00h-00h-00h-00h-00h-00h.

Table 18 shows the data format (read format) in a standard controller.

TABLE 18

Standard Controller Read Format

| Bit | 7 | 6 | 5 | 4 | 3 | 2 | 1 | 0 |
|---|---|---|---|---|---|---|---|---|
| 1st Data | Ra | La | Da | Us | Start | A | B | C |
| 2nd Data | 1 | 1 | 1 | 1 | 1 | X | Y | Z |
| 3rd Data | $A1_7$ | $A1_6$ | $A1_5$ | $A1_4$ | $A1_3$ | $A1_2$ | $A1_1$ | $A1_0$ |
| 4th Data | $A2_7$ | $A2_6$ | $A2_5$ | $A2_4$ | $A2_3$ | $A2_2$ | $A2_1$ | $A2_0$ |
| 5th Data | $A3_7$ | $A3_6$ | $A3_5$ | $A3_4$ | $A3_3$ | $A3_2$ | $A3_1$ | $A3_0$ |
| 6th Data | $A4_7$ | $A4_6$ | $A4_5$ | $A4_4$ | $A4_3$ | $A4_2$ | $A4_1$ | $A4_0$ |
| 7th Data | 1 | 0 | 0 | 0 | 0 | 0 | 0 | 0 |
| 8th Data | 1 | 0 | 0 | 0 | 0 | 0 | 0 | 0 |

No write format is expected in a standard controller.

Storage-type Function

A storage-type function is a function type for storing data, and it indicates function definition blocks. Information other than function definitions (total capacity, etc.) is gathered by means of a Get Media Info command.

The function type is $FT_1=1$, and the function (storage) definition block is as shown in Table 19.

TABLE 19

Composition of Storage Function Definition Blocks

| Bit | 7 | 6 | 5 | 4 | 3 | 2 | 1 | 0 |
|---|---|---|---|---|---|---|---|---|
| 1st Data | $PT_7$ | $PT_6$ | $PT_5$ | $PT_4$ | $PT_3$ | $PT_2$ | $PT_1$ | $PT_0$ |
| 2nd Data | $BB_7$ | $BB_6$ | $BB_5$ | $BB_4$ | $BB_3$ | $BB_2$ | $BB_1$ | $BB_0$ |
| 3rd Data | $WA_7$ | $WA_6$ | $WA_5$ | $WA_4$ | $RA_3$ | $RA_2$ | $RA_1$ | $RA_0$ |
| 4th Data | RM | $FD_6$ | $FD_5$ | $FD_4$ | $FD_3$ | $FD_2$ | $FD_1$ | $FD_0$ |

In this table, $PT_0$–$PT_7$ represent partition numbers. The number of partitions may be set between 1 and 256. The partition number=(PT+1). $BB_0$–$BB_7$ represent 1 block byte numbers. These can be set from 32 bytes to 8192 bytes. The byte number in one block=(BB+1)×32 (bytes). $RA_0$–$RA_3$ represent 1 block read access numbers. These set the number of times access must be made to read the data in one block. The access number can be set between 1 and 15. The data volume for one access is the volume of one block divided equally by the access number. The access number=RA (times), and the volume in one access=volume of one block/RA (bytes). RA=0 indicates that there is no read access. $WA_3$–$WA_0$ represent 1 block write access numbers. These set the number of times access must be made to write the data in one block. The access number can be set between 1 and 15. The data volume for one access is the volume of one block divided equally by the access number. The access number=WA (times), and the volume in one access=volume of one block/WA (bytes). WA=0 indicates that there is no write access. RM represents a removable media. This sets whether media storing data is removable (FD or flash memory card, etc.). An example of RM settings is shown in Table 20.

TABLE 20

RM Values

| Media | RM |
|---|---|
| Fixed | 0 |
| Removable | 1 |

$FD_6$–$FD_0$ in Table 19 represent reserved bits. A reserved bit is a setting bit which is reserved for future use. Usually, all these bits are set to "0".

B/WLCD-type Function

A B/WLCD-type function indicates a monochrome dot-matrix liquid crystal display function, and a function definition block. Information other than the function definition (resolution, etc.) is obtained by a Get Media Info command.

The function type FT2="1". A B/WLCD-type function definition block may be, for example, as shown in Table 21.

TABLE 21

Composition of B/W LCD Function Definition Blocks

| Bit | 7 | 6 | 5 | 4 | 3 | 2 | 1 | 0 |
|---|---|---|---|---|---|---|---|---|
| 1st Data | $PT_7$ | $PT_6$ | $PT_5$ | $PT_4$ | $PT_3$ | $PT_2$ | $PT_1$ | $PT_0$ |
| 2nd Data | $BB_7$ | $BB_6$ | $BB_5$ | $BB_4$ | $BB_3$ | $BB_2$ | $BB_1$ | $BB_0$ |
| 3rd Data | $WA_3$ | $WA_2$ | $WA_1$ | $WA_0$ | 0 | 0 | 0 | 0 |
| 4th Data | H/V | B/W | $FD_5$ | $FD_4$ | $FD_3$ | $FD_2$ | $FD_1$ | $FD_0$ |

In Table 21, $PT_7$–$PT_0$ represent LCD numbers. They can be set between 1 and 256. The LCD number=(PT+1). $BB_7$–$BB_0$ represent byte numbers for a single block transfer. They can be set between 32 bytes and 8192 bytes. The number of bytes in one block=(BB+1)×32 (bytes). $WA_3$–$WA_0$ represent one block write access numbers. These set the number of times access must be made in order to write one block of data. The access number can be set between 1 and 15. The data volume for one access is the volume of one block divided equally by the access number. The access number=WA (times), and the volume in one access=volume of one block/WA (bytes). WA=0 indicates that there is no write access.

H/V indicates whether the string of LCD data is horizontal or vertical. This is shown in Table 22.

TABLE 22

H/V Value

| Data Sequence | H/V |
|---|---|
| Horizontal | 0 |
| Vertical | 1 |

In Table 21, B/W indicates whether the liquid crystal display is normally black or normally white. This is shown in Table 23.

TABLE 23

B/W Value

| Normally | B/W |
|---|---|
| Black | 0 |
| White | 1 |

Other Functions

The details of data format and function definition blocks for functions other than controller-type functions are determined by the individual specifications for each function (omitted from drawings).

Example of Actual Access to Peripheral Device

Below, an example of an actual method of accessing a peripheral device is described.

Processing after Connection (1) The host confirms the destination region, product name, licence, operating current, etc. given in the Device Status command returned by the base device, and checks to see if the peripheral device is incompatible with the host destination region, not supported by the application, or inoperable by the hardware, etc. If the base device is not compatible, the host implements a hard reset of the base device, or conducts processing to prevent the base device in question from being accessed thereafter.

(2) The host confirms the function type of the base device from the data given in the Device Status. The host searches from the most significant of the function type setting bits, and it calls out up to three of the most significant function libraries. Thereupon, data required for the function definition blocks is prepared.

(3) If the host identifies from the source AP value that an expansion device is connected, it transmits a Device Request to that expansion device and repeats the processing from (1).

Access to Functions

After connecting, the host enters into communications with the peripheral device, and accesses the functions of the peripheral device. This will now be described using an example where the peripheral device connected to port A is a standard (game) controller.

(1) The host requests data from the standard controller. A Get Condition command is used. This command requires the physical condition of the function to be transmitted back to the host. The host requests the conditions of buttons, keys and levers relating to the game controller. Desirably, the interval between command transmissions is 1 interval (INT), for example, and faster access than this is prohibited. An example of transmission data sent from the host to a peripheral device (controller) is shown in Table 24.

TABLE 24

Transmission Data from Host to Peripheral Device

| Transmission order | Data | Setting sequence | Description |
|---|---|---|---|
| 1st | Command code | 09h | Specifies "Get Condition" |
| 2nd | Destination AP | 20h | Specifies device at port A |
| 3rd | Source AP | 00h | Transmits from port A |
| 4th | Data size | 01h | Data size = 4 Bytes |
| 5th | Function type | 00h | Function type indicates 'controller'. |
| 6th | | 00h | |
| 7th | | 00h | |
| 8th | | 01h | |

(2) Data is transmitted from the controller to the host in accordance with the data format. A Data Transfer command is used. Table 25 shows an example of data transmitted from a peripheral device (controller) to the host.

TABLE 25

Transmission Data from Peripheral Device to Host

| Transmission order | Data | Setting sequence | Description |
|---|---|---|---|
| 1st | Command code | 08h | Specifies "Data Transfer" |
| 2nd | Destination Ap | 00h | Specifies port A |
| 3rd | Source AP | 20h | No expansion device |
| 4th | Data size | 03h | Data size = 12 Bytes |
| 5th | Function type | 00h | Function type indicates 'controller'. |
| 6th | | 00h | |
| 7th | | 00h | |
| 8th | | 01h | |
| 9th | Read format | FFh | Controller data is stored according to controller format. Blocks used are already described by Device ID. |

TABLE 25-continued

Transmission Data from Peripheral Device to Host

| Transmission order | Data | Setting sequence | Description |
|---|---|---|---|
| 10th | | FFh | |
| 11th | | 00h | |
| 12th | | 00h | |
| 13th | | 80h | |
| 14th | | 80h | |
| 15th | | 80h | |
| 16th | | 80h | |

The function type stores directly the type transmitted by the host, and the read format is appended in accordance with this. The controller read format comprises 8 bytes.

Exceptional Processing

Exceptional processing refers to special processing prepared for devices which cannot control data transmission and reception by means of commands. A typical example is a light gun.

Light Gun (1) If the host determines that the peripheral device has the device ID of a light gun or shooting gun used in a shooting game, it switches the M bus from normal mode to SDCKB occupancy mode when the light gun is used. Mode switching is not possible from the peripheral device side. If the host transmits an SDCKB occupancy pattern (see FIG. 52) and the port switches to SDCKB occupancy mode, then all of the peripheral devices at that port switch to SDCKB occupancy mode and only peripheral devices operating in SDCKB occupancy mode can function. If a plurality of devices having the device ID of a light gun are connected to one port, then the host indicates this to the user by means of a warning message, or the like, and informs the user by display or sound to reduce the number of such devices connected to one port.

(2) In order to return the M bus from SDCKB occupancy mode, the host conducts cancellation processing. When the SDCKB occupancy mode is finished, the M bus immediately returns to normal mode.

(3) In the case of a light gun, SDCKB occupancy mode represents the time period taken for 1 interval (INT) of screen writing, minus the vertical blanking period, in other words, the time period during which the TV screen is drawn. When the screen drawing time period ends and a blanking period starts, the M bus immediately switches to normal mode, and data can be transmitted and received by the other peripheral devices at that port.

(4) In order to realize the function of a light gun, a section comprising a photoreceptor element is taken as one function (also possible using an expansion device), and a section comprising the trigger, direction keys, analogue keys, etc. is taken as a different function (also possible using an expansion device). By this means, it is possible to overcome conventional problems, such as disabling of the direction keys when the light gun is used.

(5) In SDCKB occupancy mode, no Time Out processing is implemented.

Host Internal Interface

The interface between the M bus driver and the host MIE will now be described (see FIG. 46 and FIG. 63).

Outline of Host Internal Interface

Figure 63:
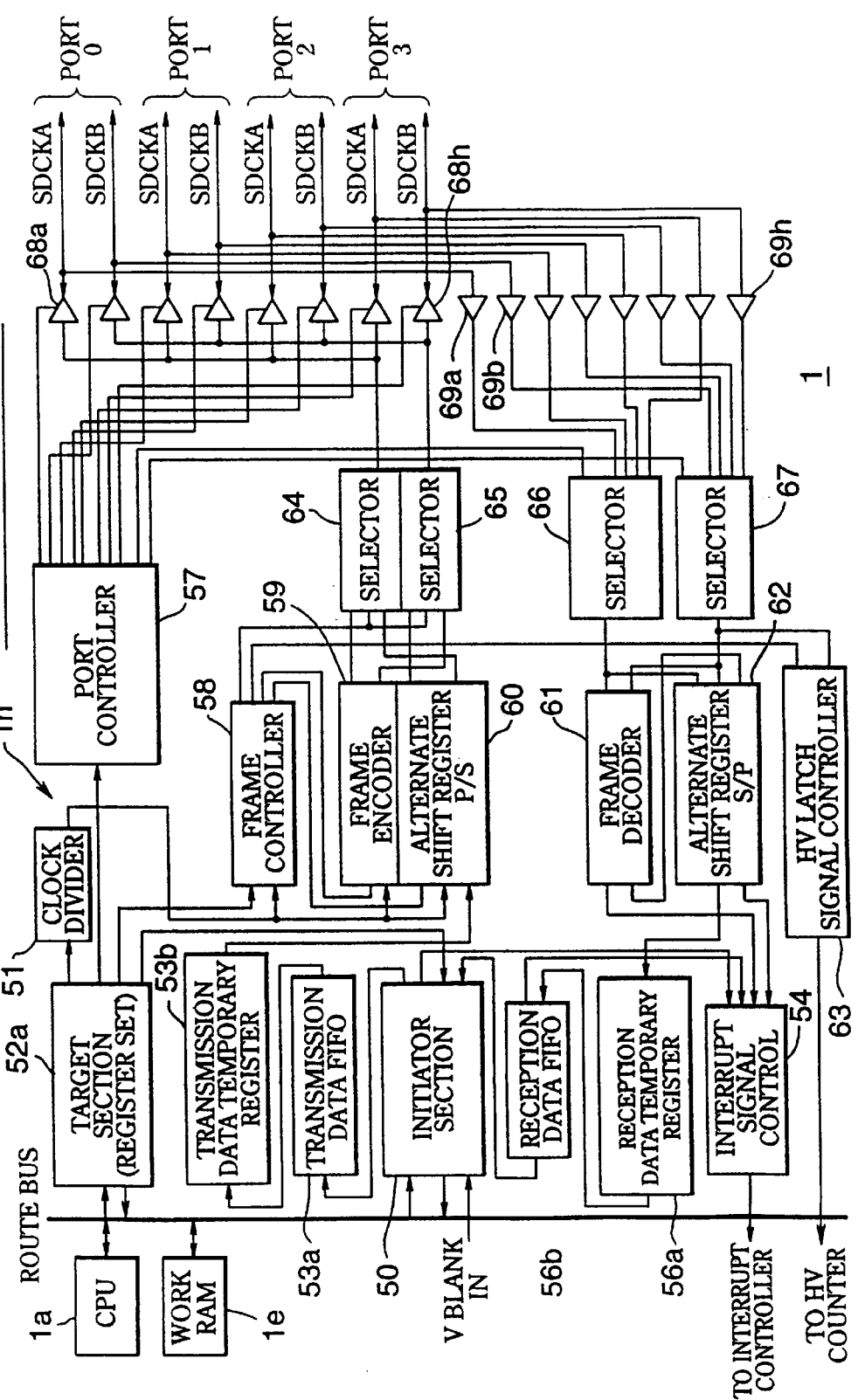
FIG. 63 is a block diagram illustrating a host MIE.

The peripheral controller shown in FIG. 63 comprises a register set consisting of a plurality of registers inside a target section 52a. Specifically, the peripheral controller comprises: a 32-bit DMA instruction table address register; a DMA trigger selection register; a DMA enable register; a DMA start/status register; a system control register; a status register; a hard trigger clear register; a work RAM area protection register; and the like.

Below, the basic operation of the peripheral interface in the host is described. The peripheral controller loads transmission data in the work RAM indicated by the DMA instruction table address. register to the transmission data FIFO in synchronism with the V_BLANK signal (start-up delay can be set in system control register). The work RAM can be formed by allocating a particular area of the main memory. The transmission data comprises: instruction+reception data store address+outgoing data.

The instruction is a command to the peripheral controller, and when the instruction is completed, the output port and transmission data length, etc. are set. Furthermore, if the instruction has not completed, as soon as the transmission data FIFO becomes empty, the transmission data in the work RAM is loaded to the transmission data FIFO (conducted in 32 byte units). A header address where the received data is stored is set in the reception data store address. The transfer data is the data actually transferred to a peripheral device governed by the application protocol (4-byte units). The reception data from the peripheral device is in 4-byte units, and as soon as the reception data FIFO becomes full (32 bytes), it is transferred successively to the work RAM area indicated by the reception data store address. Here, even if the FIFO is not full, as soon as reception is completed, it is transferred compulsorily as 32 bytes (valid data+invalid data).

Furthermore, if the peripheral device produces a Time Out (e.g., 1 ms) due to a disconnection or breakdown etc., the 32-bit ffff_ffffh is written to the header reception data store address corresponding to that instruction. When this sequence of operations is completed, the peripheral controller halts its operation, and reflects the status of the DMA start/status register.

Register Map

DMA Instruction Table Address Register

The DMA instruction table address register is a readable and writeable register comprising 32 bits. The constituent elements are: a command (instruction) to the peripheral controller; a reception data store address; and bits indicating a header address for the transmission data group ($Ct_{31}$–$Ct_5$).

DMA Trigger Selection Register

The DMA trigger selection register is a readable and writeable register comprising 32 bits. The constituent element is a selection bit (Ts) relating to whether the transmission and reception start trigger is a software start-up or a hardware start-up (V blank-out).

DMA Enable Register

The DMA enable register is a readable and writeable register comprising 32 bits. The constituent element is a transmission/reception enable and disable selection bit (Tn). In the event of a software trigger, this bit is enabled and transmission or reception is started by setting the DMA start bit shown in the DMA start/status register to "1". In the event of a hardware trigger, this bit is enabled and transmission and reception is started as soon as the hard trigger (V blank-out) is detected. Furthermore, in the enabled state, it is possible to implement a compulsory termination by writing "0".

DMA Start/Status Register

The DMA start register is a readable and writeable register comprising 32 bits. The constituent element is a bit (Ss) for implementing a software start for transmission/reception. Furthermore, when reading, it becomes a status register indicating transmission/reception status. Only when a software trigger is selected as the start-up trigger, is it valid for "1" to be input, thereby starting transmission.

System Control Register

The system control register is a readable and writeable register comprising 32 bits. The constituent elements are: Time Out setting bits ($To_{15}$–$To_0$) from the data transmission to a peripheral device; a selection bit (Si) to select whether there is a start-up at each V blank-out in the event of a hardware trigger, or whether operation is suspended until the flag in the clear register is cleared; transfer rate setting bits ($Dc_3$–$Dc_0$); start-up timing setting bits ($Dt_3$–$Dt_0$) (setting delay from V blank-out) when there is a hardware start-up. The Time Out set time=20 ns×$To_{15}$–$To_0$. For example, it can be set to 300 $\mu s$=20 ns×3a98h. Si is a repetition setting bit for automatic start-up. When this bit is "0", a start-up is implemented at each interval. When it is "1", the next start-up is not implemented until the flag in the hard trigger clear register is cleared. $Dc_1$–$Dc_0$ indicate transfer rate setting bits.

Status Register

The status register is a read-only-register comprising 32 bits. The constituent elements are: a bit (Do) indicating that the peripheral controller is in operation (during transmission/reception); bits for monitoring an internal block state counter ($St_5$–$St_0$); and bits for monitoring the input/output line of each port ($La_3$–$La_0$, $Lb_3$–$Lb_0$). This register is used for hardware debugging, and not for the application.

Hard Trigger Clear Register

The hard trigger clear register is a write-only register comprising 32 bits. The constituent element of this register is a cancellation bit (Tc) for a single hardware automatic start-up halt in the peripheral controller. The automatic halt is cleared by writing "1" to this bit.

Work RAM Area Protection Register

The work RAM area protection register is a write-only register comprising 32 bits. The constituent elements of this register are bits setting: a 16-bit write security code; a range header for the reception data store address (Ha); and a termination (Ta) address.

Transmission Data Address Counter Register

The transmission data address counter register is a read-only register comprising 32 bits. The constituent elements indicate an address point for transmission data in the work RAM, which is read by the peripheral controller. Since this register is for debugging, it is not used by the application.

Reception Data Address Counter Register

The reception data address counter register is a read-only register comprising 32 bits. The constituent elements indicate an address point for reception data in the work RAM, which is written by the peripheral controller. Since this register is for debugging, it is not used by the application.

Reception Data Base Address Register

The reception data base address register is a read-only register comprising 32 bits. The constituent elements indicate a header address for reception data in the work RAM, which is written by the peripheral controller. Since this register is for debugging, it is not used by the application.

Transmission Data

Next, transmission data will-be described. One unit of transmission data comprises: an instruction, reception data store address, and outgoing data. Provided that this data is stored in the work RAM as: instruction+reception data store address+outgoing data+instruction+reception data store address+outgoing data . . . , the peripheral controller executes it in sequence.

Instructions

An instruction comprises 32 bits of data supplied to a peripheral controller by the application program in order to control the peripheral controller. The constituent elements are: an end bit indicating the end of the current instruction; active port selection bits ($Po_1$, $Po_0$) for transmission and reception; pattern selection bits ($Pn_2$–$Pn_0$); and outgoing data length selection bits ($Ln_8$–$Ln_0$). When the peripheral controller detects that the Ef bit is "1", the processing for that instruction is completed (the final command in transmission data must always be to set the Ef bit to "1"). Furthermore, if the peripheral controller detects that the Ef bit is "0", it executes the next instruction. When "START" is selected in the pattern selection bits, the outgoing data is output. When another pattern (SDCKB occupancy permitted, RESET, SDCKB occupancy cancelled) is selected, only information pattern output is valid at the port, and the specification of the outgoing data length becomes invalid. When the SDCKB occupancy permission pattern is selected, the Ef bit in that instruction must be set to "1". Execution of any subsequent instructions becomes invalid, with the exception of the SDCKB occupancy cancellation pattern.

Moreover, during SDCKB occupancy, the peripheral controller outputs the negative edges input by the SDCKB line as HV counter latch signals. The outgoing data length selection bit Ln can be set, for example, up to 1024 bytes, in 4-byte units.

Reception Data Store Address

The reception data store address is a setting bit (Ra) for the header address for storing reception data.

Outgoing Data

The outgoing data is the data actually transmitted to the peripheral device. The data length of the outgoing data must be equal to the outgoing data length size set by the aforementioned instruction (32 bit units).

Interrupt Register

The interrupt register is not contained in this interface. Rather, six signals are connected from the interface to an interrupt block. An interrupt occurs, for instance, when transmission or reception is completed (DMA completion), when a transmission or reception operation (DMA) extends into V BLANK IN, when the reception FIFO is full and it is sought to write further data to the reception FIFO, when there is a setting or start-up outside the protection area of the DMA instruction table address, and when there is an illegal instruction fetch operation, and the like.

HV Counter Register

The HV counter register in light gun mode is not contained in this interface. Rather, an HV latch signal is connected from the interface to a drawing block. The application reads the HV counter value in the drawing block during V BLANK.

Transmission/Reception Sequence

Next, the transmission and reception sequence will be described. The transmission/reception sequence comprises a normal sequence and an SDCKB occupation procedure, as described below.

Normal Sequence

Figure 61:
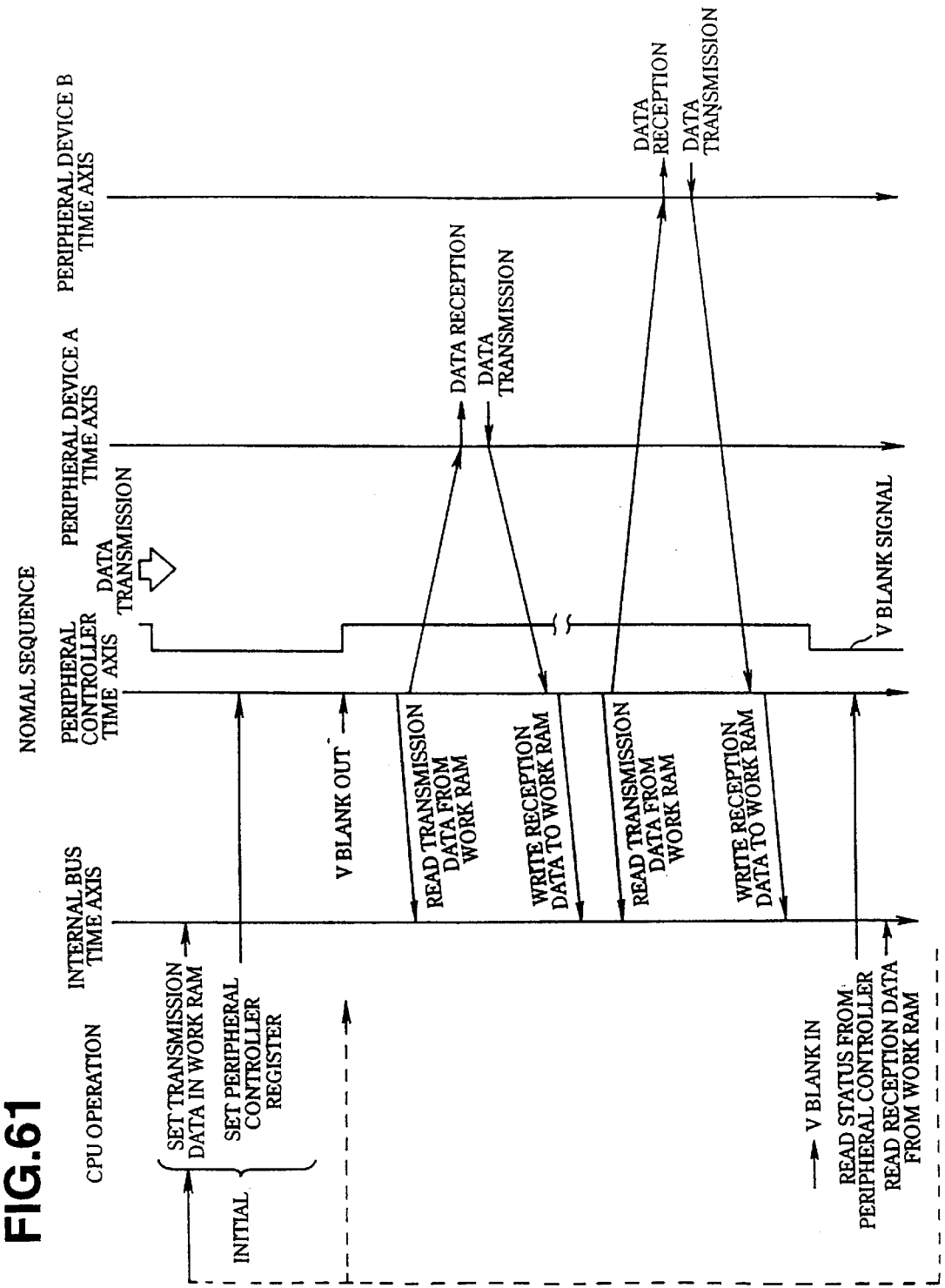
FIG. 61 is a diagram illustrating a normal communications procedure between a host and base device (or expansion device)

An example of a normal sequence is shown in FIG. 61. This diagram illustrates the flow of data transmission and reception between a host CPU and peripheral controller, which are shown in FIG. 63 described in detail below, and peripheral devices A and B illustrated in FIG. 64.

In FIG. 61, the host CPU determines whether a peripheral device is connected to any of its ports and identifies the destination APs for the relevant peripheral devices by the aforementioned AP setting operation. Thereupon, it gathers the details of each peripheral device by transmitting a Device Request to the peripheral devices and receiving corresponding replies. Next, for example, the CPU sets transmission data in the work RAM for DMA operation, in order to conduct data communications with peripheral device A in response to a request of the application, or the like, and various setting operations for instructions etc. are implemented in the registers inside the target section 52a of the peripheral controller. These instructions are commands supplied to the peripheral controller, and they set the end of an instruction, output port, outgoing data length, and the like. Moreover, if the end of an instruction is not indicated, the transmission data in the work RAM will continue to be loaded to the transmission FIFO 53a, as soon as the transmission FIFO 53a becomes empty. The loading operation is conducted in 32-byte units, for example.

The peripheral controller loads the transmission data in the work RAM indicated by the DMA instruction table address register to the transmission FIFO 53a in synchronism with the rise of the V BLANK signal in the supplied video signal (end of blanking period), for example. As stated previously, a start-up delay can be set by means of the system control register. The peripheral controller creates transmission data in the frame format illustrated in FIG. 48 on the basis of the instructions and data output by the CPU, and it sends this transmission data to the M bus of the relevant port.

Peripheral device A continually monitors the data signal on the M bus. When it confirms that the destination AP of the transmission data coincides with its own address (AP), it reads in this transmission data. The peripheral device A then implements processing corresponding to the command, and creates reply data in a prescribed frame format, which it sends to the M bus.

Upon receiving data from the peripheral device A, the peripheral controller first places the received data into a reception FIFO 56b, and then transfers it to the work RAM for DMA operation. The data received from the peripheral device is in 4-byte units, for example, and as soon as the reception FIFO 56b becomes full (32 bytes), the data is transferred to the work RAM indicated by the reception data store address.

However, even if the reception FIFO 56b does not become full, as soon as reception ends, the data is transferred compulsorily as 32 bytes (valid data+invalid data). Next, data remaining in the work RAM which is to be transmitted to peripheral device B is read out, placed in the transmission data FIFO 53a, and formed into transmission data addressed to peripheral device B. This is then transmitted to the M bus of the port to which peripheral device B is connected.

Similarly to peripheral device A, peripheral device B continuously monitors the data signal on the M bus. When it confirms that the destination AP in the transmission data coincides with its own address (AP), it reads in this transmission data. Peripheral device B then implements processing corresponding to the command, and creates reply data in a prescribed frame format, which it sends to the M bus.

Upon receiving data from peripheral device B, the peripheral controller first places the received data in the reception FIFO 56b, and then transfers it to the work RAM for DMA operation.

The CPU reads out the status from the peripheral controller in synchronism with the fall of the V BLANK signal in the supplied video signal (start of blanking period). Thereby, it can identify the presence of data from a peripheral device. It then reads the stored reception data from the relevant area of the work RAM, and supplies this data to the application.

Data communications between the host and peripheral devices are conducted by repeating this procedure. When a sequence of operations ends, the peripheral controller halts operation, and indicates its status to the DMA start/status register.

If the peripheral device produces a Time Out (e.g., 1 ms) due to disconnection or breakdown, etc., the peripheral controller writes a 32-bit ffff_ffffh to the header reception data store address register corresponding to that command. If a parity error occurs, a 32-bit ffff_ff00h is written. The CPU implements processing corresponding to this.

SDCKB Occupancy Procedure (light gun)

Next, the SDCKB occupancy procedure is described with reference to FIG. 62. The SDCKB occupancy procedure is used, for example, for data communications between the host and a light gun forming a peripheral device in a shooting game. As stated previously, the CPU determines whether a peripheral device is connected to any of its ports and identifies the destination APs of the relevant peripheral devices by means of the aforementioned AP setting operation. It then gathers the details of the peripheral devices by transmitting a Device Request to each peripheral device and receiving their corresponding replies. The CPU, for example, sets transmission data in the work RAM by DMA operation, in order to conduct data communications with the light gun in response to a request from the shooting game application, and carries out various setting operations for instructions etc. in the registers inside the target section 52 of the peripheral controller.

For example, if a gun game application requests SDCKB occupancy from the CPU, the CPU switches the port operation from normal mode to SDCKB occupancy mode.-By means of the aforementioned commands, transmission data containing the selected port and SDCKB occupancy permission is written to the work RAM. The data address in the work RAM is written to the DMA command table address register.

The peripheral controller loads the transmission data in the work RAM indicated by the DMA command table address register to the transmission data FIFO 53a in synchronism with the rise of the V BLANK signal in the supplied video signal, for example. The peripheral controller then reads out commands and data from the work RAM, creates an SDCKB occupancy permission pattern of the format illustrated in FIG. 52, and transmits this to the M bus of the relevant port.

Peripheral device A continually monitors the data signal on the M bus. Upon receiving the SDCKB occupancy permission pattern, peripheral device A is able to transmit its output to the M bus at a desired timing. If peripheral device A (light gun) is operated by the user (the trigger is pulled), then the peripheral device A (light gun) transmits a trigger signal to the M bus.

When the peripheral device receives trigger signal data from peripheral device A, it outputs a latch signal to the HV counter (omitted from drawings). The HV counter counts values corresponding to the position of the illumination point being scanned over the video screen. From the latched HV counter values, it is possible to identify the point of aim of peripheral device A (light gun) on the screen when the trigger was pulled.

If the peripheral device is a light gun, the CPU allocates the video screen drawing period of 1 interval of the supplied video signal as an SDCKB occupancy period. Thereupon, when the drawing period is ended and the V BLANK signal falls (start of blanking period), the CPU cancels the SDCKB occupancy mode and switches the operation of the relevant port from SDCKB occupancy mode to normal mode. For this purpose, the CPU writes transmission data containing the selected port and SDCKB occupancy cancellation to the work RAM by means of the aforementioned commands. The address of the data in the work RAM is written to the DMA command table address register.

The peripheral controller immediately loads the transmission data in the work RAM indicated by the DMA command table address register to the transmission FIFO. The peripheral controller reads out commands and data from the work RAM, creates an SDCKB occupancy permission cancellation pattern, and transmits this to the M bus of the relevant port. Peripheral device A continuously monitors the data signal on the M bus. If it receives an SDCKB occupancy cancellation pattern, then peripheral device A cancels its output enabled state.

In this way, SDCKB occupancy mode occupies the period during which the video screen is drawn in 1 interval of the video signal. Therefore, even if a peripheral device which produces output at random, such as a light gun, is used, it is still possible to use other peripheral devices connected to the same M bus.

Register Setting Method

Examples of register setting in the case of a soft start-up and a hard start-up (automatic start-up at each trigger) will be described.

In a soft start-up, prescribed register values are set in the following cases.

Initialization

1. Work RAM area protection register setting
2. System control register setting
3. DMA trigger selection register setting Implementation procedure
4. Data setting in work RAM (DMA command table)
5. DMA command table address register setting
6. DMA enable register setting
7. DMA start/status register setting Completion check
8. Confirmation of DMA start/status
9. Reception data interrupt to work RAM In a hard start-up (automatic start-up at every trigger), prescribed register values are set in the following cases.

Initialization

1. Work RAM area protection register setting
2. System control register setting
3. DMA trigger selection register setting Implementation procedure
4. Data setting to work RAM (DMA command table)
5. DMA command table address register setting
6. DMA enable register setting
7. DMA start/status register setting Completion check
8. Confirmation of DMA start/status
9. Reception data interrupt to work RAM Host MIE Block Diagram FIG. 63 is a block diagram showing the approximate composition of a peripheral controller (MIE) 1*h* in a host. In this diagram, sections which correspond to FIG. 21 are labelled with the same symbol.

In FIG. 63, an initiator section 50 performs the role of a bus master for accessing the work RAM, when the peripheral controller 1*h* has assumed an operational state. It reads out data to be transmitted to a peripheral device from the work RAM and writes data received from a peripheral device to the work RAM. Clock divider 51 is a clock dividing circuit for selecting the bit rate (transfer rate) of the transmission data. Target section 52*a* is a block which operates as a target on the route bus, and it is formed by the host CPU by means of the aforementioned group of readable and writeable 32-bit registers. Mainly, instructions, or the like, are written to this section. Transmission data temporary register 53*b* is a register for storing 32 bits of transmission data from the 3-byte transmission data FIFO 53*a*. The transmission data FIFO 53*a* is a 32-byte FIFO (First In First Out) register for storing transmission data temporarily. The reception data FIFO 56*b* is a 32-byte reception data FIFO register. The reception data temporary register 56*a* is a register for storing 32 bits of reception data. As soon as data reception is completed, the reception data is written to the reception data FIFO 56*b*. Interrupt signal control section 54 generates an interrupt signal of one clock pulse which is sent to an interrupt section under certain conditions. Frame controller 58 is a block which controls the transmission frame (start pattern, data pattern, end pattern, etc.) on the basis of instructions, and the like. Frame encoder 59 is a block for creating a frame pattern. Alternate shift register (parallel/serial) 60 is a circuit for converting parallel transmission data into two serial lines, alternately. Furthermore, the alternate shift register 60 performs a parity calculation for the transmission data and appends parity data (e.g., one byte of parity bits) to the end of the transmission data. Frame decoder 61 is a circuit for analyzing a frame of the reception signal. Alternate shift register (serial/parallel) 62 is a circuit for converting data received alternately from two serial lines into parallel data. Furthermore, the alternate shift register 62 performs a parity calculation for the reception data. These calculation results are compared with the received parity data to determine whether there is an error. If there is an error, a notification to this effect is sent to the CPU interrupt controller via the interrupt signal control section 54. Thereby, the CPU is able to conduct error processing, such as issuing a retransmit command, or the like. The HV latch signal controller 63 is a circuit for transferring an HV latch signal from the serial lines to an HV counter in a drawing processor section (video signal generating section) 1*f*. Port controller 57 controls the active port which relates to the transmission/reception process. In other words, the three-state buffer 68*a*–68*h* of the transmission port selected by the instruction is controlled such that the outputs SDCKA and SDCKB from selectors 64 and 65 are directed to the selected port. Selector 64 is controlled by the frame controller 58, and it forms an SDCKA signal by selecting the output of the frame encoder 59 or the output of the alternate shift register 60, and outputs this signal to an M bus line via the selected three-state buffer 68. Selector 65 is controlled by the frame controller 58, and it forms an SDCKB signal by selecting the output of the frame encoder 59 or the output of the alternate shift register 60, and outputs this signal to an M bus line via the selected three-state buffer 68. Selector 66 selects a reception port in accordance with commands from the port controller 57, and it supplies reception signal SDCKA, which has passed through a buffer amp 69, to the frame decoder 61 and alternate shift register 62. Selector 67 selects a reception port in accordance with commands from the port controller 57, and it supplies reception signal SDCKA, which has passed through a buffer amp 69, to the frame decoder 61 and alternate shift register 62.

Peripheral Device Internal Interface

Figure 65:
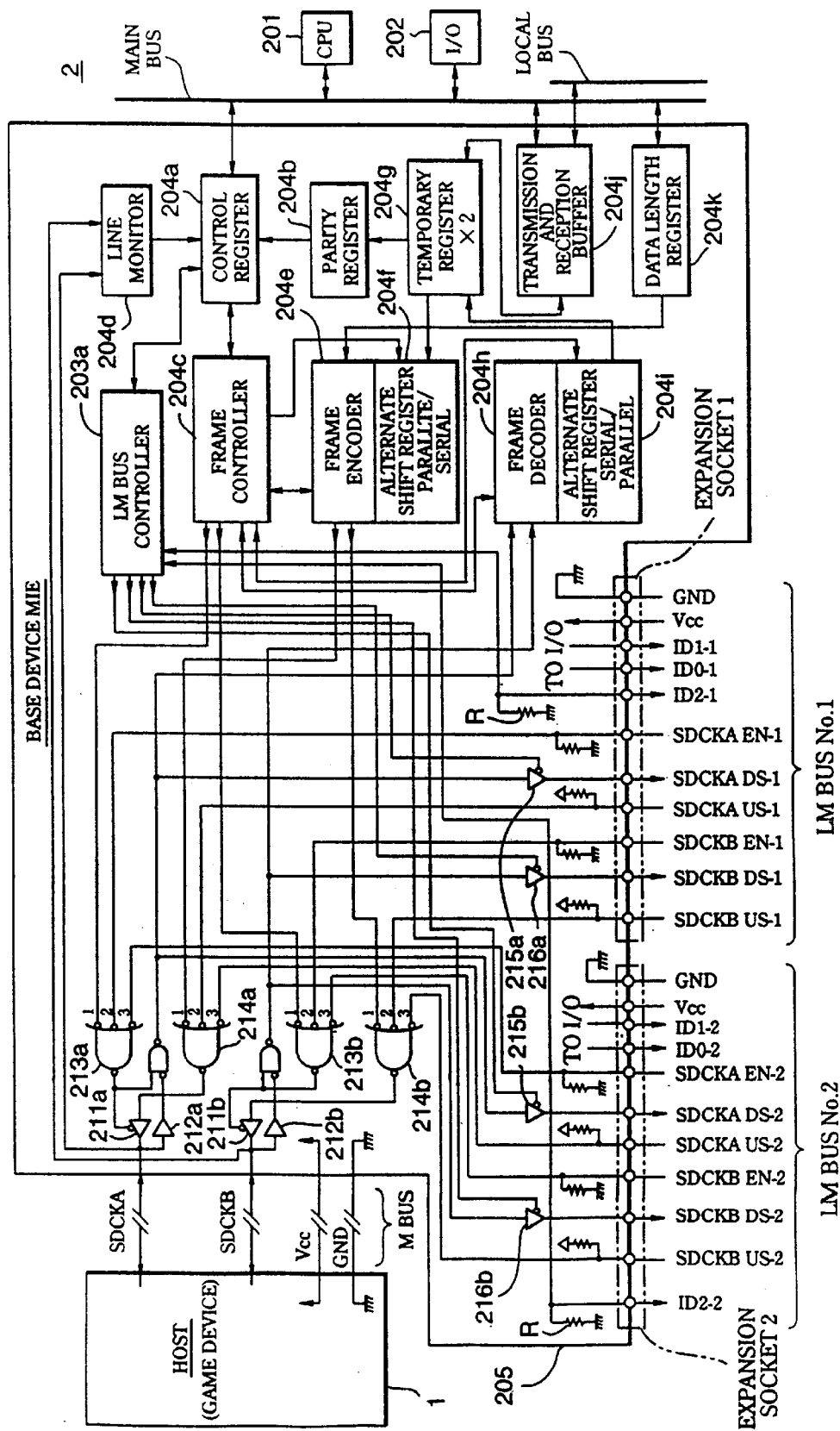
FIG. 65 is a block diagram illustrating the composition of a base device MIE.

FIG. 64 is a block circuit diagram giving an approximate illustration of the circuit composition of a peripheral device which is a base device. Furthermore, FIG. 65 is a block circuit diagram giving a more detailed illustration of the interface (base device MIE) between the socket control section 203 and communications processing section 204 shown in FIG. 64. In these examples, in order to simplify the description (illustration), only two external expansion sockets are depicted, but in actual fact, four external expansion sockets can be provided.

CPU block 201 performs the control functions of the base device, such as forming transmission data carrying input operating information, and processing reply data corresponding to requests from the host 1. This also includes initialization operations, such as establishing device APs and expansion device APs during set-up, as described previously. I/O block 202 converts operating information from the input means to a data signal. If the base device 2 is a control pad of a game device, then a plurality of digital buttons and analogue keys, etc. correspond to the input means. Furthermore, the I/O block 202 indicates an LM bus number to connected expansion devices via terminals ID0 and ID1 of each expansion socket, in accordance with the CPU output. The role of terminals ID0 and ID1 has been described above in the AP setting procedure for expansion devices, with reference to FIG. 59. Socket control block 203 determines the presence or absence of an expansion device connection at each expansion socket. Thereupon, the data lines SDCKA and SDCKB supplied to the device by the host are connected respectively to the LM bus data lines SDCKA and SDCKB, by means of the three-state buffers at the expansion sockets to which expansion devices are connected. Therefore, viewing the M bus from the host 1, this is equivalent to a plurality of peripheral devices (base devices and expansion devices) being connected to the M bus in parallel. The communications processing block 204 performs decoding of reception data and encoding of output data from the CPU, and the like. The CPU block 201 —communications processing block 204 can be constituted by a single integrated chip.

The communications processing section 204 performs the functions of demodulating frames received from the host, and framing (decoding) transmission data output by the CPU section 201. The communications processing section 204 and the socket control section 203 together form the main components of the MIE (input/output interface).

The SDCKA signal (downstream signal) output from the host to the M bus is supplied to the communications processing section 204 via a buffer amp 212a. Furthermore, having passed through the buffer amp 212a, the SDCKA signal forms an SDCKADS-1 signal and SDCKADS-2 signal via the respective three-state buffers 215a and 215b, which are supplied to LM buses 1 and 2.

The SDCKB signal (downstream signal) output by the host to the M bus is supplied to the communications processing section 204 via a buffer amp 212b. Furthermore, having passed through the buffer amp 212b, the SDCKB signal forms an SDCKBDS-1 signal and SDCKBDS-2 signal via the respective three-state buffers 216a and 216b, which are supplied to LM buses 1 and 2.

On the other hand, an SDCKA signal to the host (upstream) output by the device communications processing section 204 is output via (the first terminal of) an OR gate 214a and a three-state buffer 211a to the M bus data line SDCKA, where it is received by the host MIE. Moreover, an SDCKB signal to the host output by the communications processing section 204 is output via (the first terminal of) an OR gate 214b and a three-state buffer 211b to the M bus data line SDCKB, where it is received by the host MIE. When the communications processing section 204 transmits an SDCKA signal or SDCKB signal, an enable signal is supplied to the control terminal of the three-state buffer 211a via (the first terminal of) an OR gate 213a in order to open the gate 211a (turn it to ON), and an enable signal is supplied to the control terminal of the three-state buffer 211b via (the first terminal of) an OR gate 213b in order to open gate 211b. The respective input terminals of the three-input OR gates 213a and 213b are grounded via a resistance. If there is no input signal to an input terminal, that input terminal remains at ground level. Furthermore, the respective input terminals of the three-input OR gates 214a and 214b are connected to a power supply Vcc via a resistance. Therefore, input terminals to which there is no signal input are maintained at level "H".

An SDCKA signal output by the first expansion device to LM bus 1 is output to the M bus data line SDCKA via terminal SDCKAUS-1 of expansion socket 1, the (second input terminal of) OR gate 214a and the three-state buffer 211a. An SDCKB signal output by the first expansion device to LM bus 1 is output to the M bus data line SDCKA via terminal SDCKBUS-1 of expansion socket 1, the (second input terminal of) OR gate 214b and the three-state buffer 211b. When the first expansion device transmits an SDCKA signal or SDCKB signal, it supplies an enable signal to the control terminal of the three-state buffer 211a, via the LM bus 1 signal line SDCKAEN1 and the (second input terminal of) OR gate 213a, in order to open gate 211a. Furthermore, it supplies an enable signal to the control terminal of the three-state buffer 211b, via the LM bus 1 signal line SDCKBEN1 and the (second input terminal of) OR gate 213b, in order to open gate 221b.

Similarly, an SDCKA signal output by a second expansion device to the LM bus is output to the M bus data line SDCKA, via terminal SDCKAUS-2 of expansion socket 2, the (third input terminal of) of OR gate 214a and the three-state buffer 211a. An SDCKB signal output by the second expansion device to the LM bus is output to the M bus data line SDCKB via terminal SDCKBUS-2 of expansion socket 2, the (third input terminal of) OR gate 214b and the three-state buffer 211b. When the second expansion device transmits an SDCKA signal or SDCKB signal, it supplies an enable signal to the control terminal of the three-state buffer 211a, via the LM bus 2 signal line SDCKAEN2 and the (third input terminal of) OR gate 213a, in order to open gate 211a. Furthermore, it supplies an enable signal to the control terminal of the three-state buffer 211b, via the LM bus 2 signal line SDCKBEN2 and the (third input terminal of) OR gate 213b, in order to open gate 211b.

An operating power supply is supplied to the base device from the host by means of the power lines Vcc and GND of the M bus. The power supply to expansion devices is supplied by the base device via the power lines Vcc and GND on the LM buses. As shown in FIG. 65, the socket control section 203 is constituted by an LM bus controller 203a. The LM bus controller monitors the voltage of a particular terminal provided for checking connections at the expansion sockets. In this example, the voltage of pin ID2 of the expansion sockets is monitored. On the base device side, pin ID2 is connected to the earth supply GND of the base device via a resistance R. As shown in FIG. 66, when an expansion device is connected to an expansion socket the power supply Vcc and GND are supplied to the expansion device 3 via terminals Vcc and GND of the expansion socket. This power supply Vcc to the expansion device side is applied via terminal ID2 of the base device expansion socket to the resistance R. The LM bus controller 203a determines whether or not an expansion device is connected to a socket from the presence or absence (or magnitude) of the voltage produced in resistance R. The LM bus controller 203a indicates the connection or non-connection of an expansion device at each LM bus to a control register 204a. The LM bus controller 203a also opens the gate of the three-state buffers of the expansion socket LM bus to which the expansion device is connected, and respectively connects the M bus data lines SDCKA and SDCKB to the LM bus data lines SDCKADS and SDCKBDS. The LM bus controller 203a is able to control activation of the expansion connector buses independently of the operation of other sections, but it is also possible to make this dependent on the judgement of the CPU. Namely, the LM bus controller 203a detects connection of an expansion device and sets a detection output in the control register 204a. The CPU 201 identifies connection of an expansion device to an LM bus by monitoring the control register 204a. If the CPU 201 permits connection of the expansion device, it sets a flag LMC instructing connection of the relevant LM bus in the control register 204a. The LM bus controller 203a opens (turns ON) the three-state buffers 215, 216 of the LM bus corresponding to the flag LMC. By means of these operations, as shown in FIG. 47, when an expansion device is connected to a. base device, the base device automatically recognizes connection of the expansion device and connects the expansion device to the M bus.

The communications processing block 204 comprises: a control register 204a; parity register 204b; frame controller 204c; line monitor 204d; frame encoder 204e; alternate shift register P/S 204f; temporary register 204g; frame decoder 204h; alternate shift register S/P 204i; transmission/reception buffer 204j; and data length register 204k.

The control register 204a is a register for storing various flags, etc. for controlling data transmission and reception. These various flags are described later with reference to Table 26. The parity register 204b is a table buffer for parity calculation and calculations relating to serial/parallel and parallel/serial conversion. The transmission and reception buffer 204j is a register for storing data used in data transmission and reception. The frame controller 204c controls transmission and reception of frames by monitoring the various flags in the control register 204a. Furthermore, it also sets relevant flags in the control register 204a in response to detection of a start pattern, end pattern, SDCKB occupancy pattern, reset pattern, or the like. The frame encoder 204e generates frames by appending pattern sections to data. The alternate shift register P/S 204f performs a parallel/serial conversion to convert parallel data to serial data. The line monitor 204d monitors the SDCKA and SDCKB signal lines. The data length register 204k is a register indicating the data size of transmission data when transmitting.

The interface with the MIE viewed from the CPU section 201 of the peripheral device comprises: 21 control flags (CFLAG), a data length register (LREG) 204k, and a maximum 1024-byte transmission and reception buffer (TRBF) 204j. The capacity of the transmission and reception buffer is optimized to suit the device.

Here, the interface between an MIE controller (CPU 201) and a base device MIE (socket control 203, transmission processor 204) according to the foregoing composition will be described.

Frame data transmitted from the host via data lines SDCKA and SDCKB is received by the frame decoder 204h. The frame decoder 204h demodulates the frame data from the SDCKA and SDCKB signals, and separates the pattern section and data sections from the frame data. When the frame decoder 204h detects pattern sections, such as a start pattern, end pattern SDCKB occupancy pattern, reset pattern, or the like, it transfers the detected information in that pattern section to the frame controller 204c. As well as controlling the reception operation, the frame controller 204c also sets flags in the control register corresponding to the pattern detection. These flags include: a reception flag RXB; reception completed flag RFB; SDCKB occupancy mode flag POS; and reset pattern reception flag HRES.

The separated data sections are transferred to the alternate shift register 204i. The shift register 204i has a serial/parallel data conversion function, and converts the separate serial data signals to parallel data, which it sends to a temporary register 204g. The temporary register 204g performs a parity check calculation for the received data. It also extracts the parity bit section from the received data and stores it in a parity register 204b. The parity check result is compared with the parity bits in the parity register 204b, and if an error is detected, a parity error flag PERR is set in the control register 204a. The error-checked data is then stored in the transmission and reception buffer 204j. If the volume of reception data exceeds the capacity of the transmission and reception buffer 204j, then a buffer overflow flag BFOV is set in the control register 204a. The overflowing data is not stored in the transmission and reception buffer 204j. When reception is completed, a reception completion flag RFB is set in the control register 204a. The CPU 201 monitors the contents of the control register 204a, and reads out reception data stored in the transmission and reception buffer 204j in response to the reception completion flag RFB.

When the CPU 201 transmits data, the transmission data is stored in the transmission and reception buffer, and the transmission data volume is written to the data length register 204k. The CPU 201 sets transmission flag TXB and end pattern transmission flag ENP (if there is no subsequent transmission data) in the control register 204a. The transmission data in the transmission and reception buffer 204j is sent to the temporary register 204g, where a parity calculation is carried out. The temporary register 204g stores the parity calculation result as one byte of parity bits, which it appends to the end of the transmission data. The transmission data is then supplied from the temporary register 204g to the alternate shift register 204f, where it is converted to serial data and then supplied to the frame encoder 204e. The frame encoder 204e creates a transmission frame by appending a start pattern and an end pattern respectively to the start and end of the transmission-data and parity data. The frame controller 204c opens the respective three-state buffers 211a and 211b by means of the OR gates 213a and 213b. The transmission frame is encoded by the frame encoder 204e into the SDCKA signal and SDCKB signal. The SDCKA signal and SDCKB signal are output respectively to the M bus data lines SDCKA and SDCKB.

The line monitor 204d continually monitors data line SDCKA and data line SDCKB. The results from this (whether or not there is a signal) are set in the control register 204a as an SDCKA line monitor flag and an SDCKB line monitor flag. The CPU 201 is able to investigate a Time Out for data transmitted by the host by referring to these flags.

Figure 62:
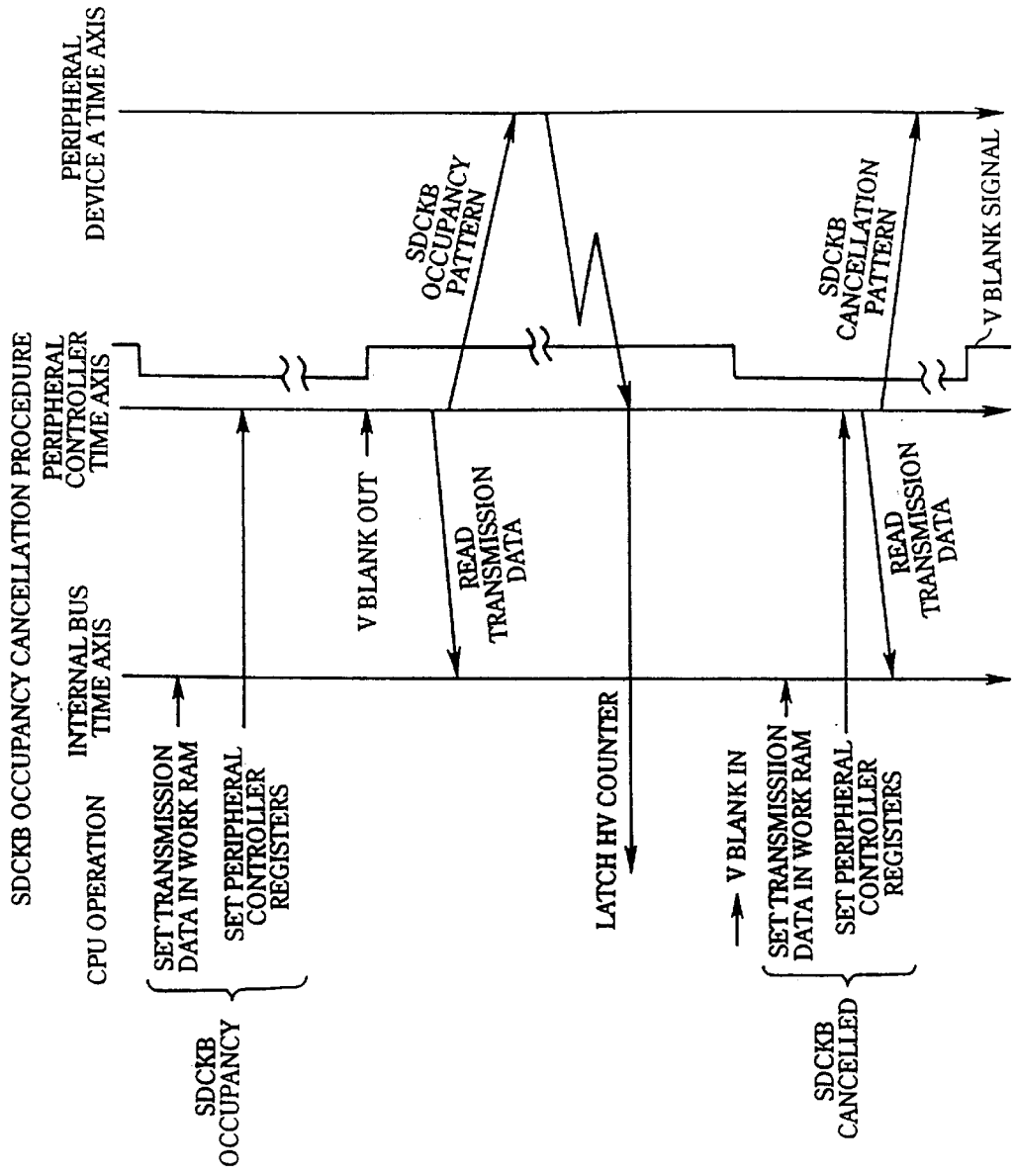
FIG. 62 is a diagram illustrating an SDCKB occupancy procedure between a host and base device.

As shown in FIG. 62, the expansion device MIE is composed similarly to the base device MIE, but it does not comprise a socket control section. The support function section in this diagram corresponds to the input means and I/O section 202 in the base device, and it performs the characteristic functions of, for example, an LCD display, a sound output cartridge, a sound input cartridge, a light gun cartridge, a vibrating cartridge, a memory cartridge, and the like. The CPU section 301 and the communications processing section 304 correspond respectively to the device CPU section 201 and communications processing section 204.

Next, the composition of the control register 204a, data length register 204k and transmission and reception buffer (TRBF) provided in the MIE of a base device (or expansion device) is described.

Table 26 shows the composition of a control register 204a containing various control flags (CFLAG). These control flags comprise 21 flags for controlling data transmission and reception. The types of flag used to make up this register differ according to the type of peripheral device.

monitor flag (only provided in base device). SDBM is an SDCKB line monitor flag (only provided in base device). SDAM and SDBM indicate the state of the data lines SDCKA and SDCKB, respectively. LMC1–4 are connection flags for LM buses 1–4 (provided only in base device). The flags LMC1–4 indicate a connection (="1") or disconnection (="0") at LM buses 1–4. LMM1–4 are LM bus 1–4 connection monitor flags (provided only in base device). These flags LMM1–4 indicate the use status of LM buses 1–4. The MIE controller investigates a Time Out for data from the host by checking the flags SDAM and SDBM. Time Out processing is conducted only by base devices and not by expansion devices.

Data Length Register (LREG)

Table 27 shows the composition of the data length register. The data length register is a single byte register for indicating the size of a single frame during transmission.

TABLE 26

Composition of CFLAG

| Dir | R/W | R/W | R/W | R/W | R/W | R/W | R/W | R/W | R/W | R/W | R/W |
|---|---|---|---|---|---|---|---|---|---|---|---|
| Data Ini | HRES 0 | CTXB 0 | TFB 0 | TXB 0 | BFOV 0 | RFB 0 | ENDP 0 | LMC1 0 | LMC2 0 | LMC3 0 | LMC4 0 |

| Dir | R | R | R | R | R | R | R | R | R | R |
|---|---|---|---|---|---|---|---|---|---|---|
| Data Ini | RXB 0 | EMP 0 | SDAM — | SDBM — | PERR 0 | POS 0 | LMM1 — | LMM2 — | LMM3 — | LMM4 — |

In this table, R/W indicates that the flag is readable and writeable. R indicates that the flag is read-only. "Ini" represents the initial setting. HRES represents a reset pattern reception flag. The reset pattern reception flag HRES becomes "1" when a reset pattern is received, and it prompts initialization of the MIE controller. TXB is a transmission flag. If TXB is written during transmission or reception, the corresponding data contents are not guaranteed. CTXB is a continued transmission flag. If a data volume exceeding the capacity of the transmission and reception buffer 204j is transmitted, then after storing the continuation of the data in the transmission and reception buffer 204j, this data is transmitted with the continued transmission flag CTXB, rather than the transmission flag TXB. TFB is a transmission completion flag. BFOV is a transmission and reception buffer overflow flag. The overflow flag BFOV is cleared when reception or transmission is started. When the transmission and reception buffer 204j produces an overflow, the overflow flag BFOV is set to "1". RFB is a reception completion flag. ENDP is an end pattern transmission flag. When an end pattern is appended to the transmission data, ENDP is set to "1". RXB is a reception flag, which changes when data is received. EMP is an empty flag. If the data transmitted to the transmission and reception buffer 204j during transmission disappears (becomes empty), then the empty flag EMP is set to "1". PERR is a parity error flag. When the parity in the received frame does not match, this parity error flag PERR is set to "1", and under normal conditions, it is cleared to "0". POS is an SDCKB occupancy mode flag. The SDCKB occupancy mode flag POS indicates whether the M bus is in normal mode (POS="0") or SDCKB occupancy mode (POS="1"). SDAM is an SDCKA line

TABLE 27

Composition of LREG

| Bit | 7 | 6 | 5 | 4 | 3 | 2 | 1 | 0 |
|---|---|---|---|---|---|---|---|---|
| Dir | R/W | R/W | R/W | R/W | R/W | R/W | R/W | R/W |
| Data | $Ln_7$ | $Ln_6$ | $Ln_5$ | $Ln_4$ | $Ln_3$ | $Ln_2$ | $Ln_1$ | $Ln_0$ |
| Ini | — | — | — | — | — | — | — | — |

In this table, R/W indicates that a bit is both readable and writeable. In its initial state, all bits are undefined. Ln represents the data length, where 00h≦Ln≦FFh. The relationship between the value of Ln and the data length is illustrated in Table 28.

TABLE 28

Data Length

| Bit | 7 | 6 | 5 | 4 | 3 | 2 | 1 | 0 |
|---|---|---|---|---|---|---|---|---|
| Data Length | $Ln_7$ | $Ln_6$ | $Ln_5$ | $Ln_4$ | $Ln_3$ | $Ln_2$ | $Ln_1$ | $Ln_0$ |
| 4Byte | 0 | 0 | 0 | 0 | 0 | 0 | 0 | 0 |
| 8Byte | 0 | 0 | 0 | 0 | 0 | 0 | 0 | 1 |
| : | : | : | : | : | : | : | : | : |
| 512Byte | 0 | 1 | 1 | 1 | 1 | 1 | 1 | 1 |
| 516Byte | 1 | 0 | 0 | 0 | 0 | 0 | 0 | 0 |
| : | : | : | : | : | : | : | : | : |
| 1020Byte | 1 | 1 | 1 | 1 | 1 | 1 | 1 | 0 |
| 1024Byte | 1 | 1 | 1 | 1 | 1 | 1 | 1 | 1 |

During data transmission and reception and after data reception, the data length register (LREG) is undefined. The data length can be specified in four byte units.

Next, the data buffer will be described. The aforementioned transmission and reception buffer (TRBF) 204j is used as the data buffer. The transmission and reception buffer 204j is a buffer region where one frame of transmission data and reception data are stored. The capacity is from a minimum of 4 bytes to a maximum of 1024 bytes, in 4 byte units. The capacity is optimized for each peripheral device. The buffer is shared for transmission and reception, and it is divided into regions for a command code, destination AP, source AP, data size, and data.

Table 29 shows the composition of the transmission and reception buffer. In this table, R/W indicates that a bit is readable and writeable. In the initial state, the buffer contents are undefined. Data is transmitted in sequence starting from the 1st Data, and received data is written into the buffer in sequence starting from the first data storage region. The 1st Data–4th Data sections are regions where the data to be stored is specified.

TABLE 29

Composition Of TRBF

| Bit | 7 | 6 | 5 | 4 | 3 | 2 | 1 | 0 |
| --- | --- | --- | --- | --- | --- | --- | --- | --- |
| Dir | R/W | R/W | R/W | R/W | R/W | R/W | R/W | R/W |
| 1st Data | $D1_7$ | $D1_6$ | $D1_5$ | $D1_4$ | $D1_3$ | $D1_2$ | $D1_1$ | $D1_0$ |
| 2nd Data | $D2_7$ | $D2_6$ | $D2_5$ | $D2_4$ | $D2_3$ | $D2_2$ | $D2_1$ | $D2_0$ |
| 3rd Data | $D3_7$ | $D3_6$ | $D3_5$ | $D3_4$ | $D3_3$ | $D3_2$ | $D3_1$ | $D3_0$ |
| 4th Data | $D4_7$ | $D4_6$ | $D4_5$ | $D4_4$ | $D4_3$ | $D4_2$ | $D4_1$ | $D4_0$ |
| 5th Data | $D5_7$ | $D5_6$ | $D5_5$ | $D5_4$ | $D5_3$ | $D5_2$ | $D5_1$ | $D5_0$ |
| 6th Data | $D6_7$ | $D6_6$ | $D6_5$ | $D6_4$ | $D6_3$ | $D6_2$ | $D6_1$ | $D6_0$ |
| 7th Data | $D7_7$ | $D7_6$ | $D7_5$ | $D7_4$ | $D7_3$ | $D7_2$ | $D7_1$ | $D7_0$ |
| 8th Data | $D8_7$ | $D8_6$ | $D8_5$ | $D8_4$ | $D8_3$ | $D8_2$ | $D8_1$ | $D8_0$ |
| : | : | : | : | : | : | : | : | : |

In this table, the first data section (1st Data) is a region for storing command codes. The second data section (2nd Data) is a region for storing destination AP values. The third data section (3rd Data) is a region for storing source AP values. The fourth data section (4th Data) is a region for storing data size. When the value in the fourth data values $D4_0$–$D4_7$ is "00h", this indicates that there is no data. The fifth data section (5th Data) onwards are regions for storing parameter data. The number of data bytes stored is the byte number indicated by the data size. The contents of the data regions beyond the data size are undefined.

Data Transfer Procedure between Host MIE and Base Device MIE

Data reception and data transmission by means of the host MIE and base device MIE having the foregoing compositions is now described. Since a similar data transfer procedure is used in expansion devices, no description is given here of the data transmission procedure between the host MIE and an expansion device MIE.

Data Reception Procedure

Firstly, a summary of a data reception in a base device is described. Data reception is carried out automatically by the respective MIEs of the host and base device. When the host transmits a data signal and the base device starts the reception process, the transmission flag TXB, the transmission completion flag TFB, and the reception completion flag RFB are all cleared to "0" by the MIE. When the reception flag RXB is "1", this indicates that the MIE is in the process of receiving data, and when RXB is "0", this indicates that reception has ended. When data reception is completed normally and the data is stored in the transmission and reception buffer (TRBF), whilst the parity error state is stored by the parity error flag PERR, the reception completion flag RFB is set to "1" (in the case of interrupt processing, a reception interrupt is generated at this point), and the reception process ends. If the reception flag RXB and reception completion flag RFB are both "1", then this indicates that an error has occurred during reception.

Furthermore, if the reception data exceeds the capacity of the transmission and reception buffer, then the transmission and reception buffer overflow flag BFOV is set to "1", and the reception data from the start of reception up to the capacity of the transmission and reception buffer is stored in the transmission and reception buffer. If there is a parity mismatch in the frame data, then PERR is set to "1", and if the parity is normal, then PERR is cleared to "0".

Figure 67:
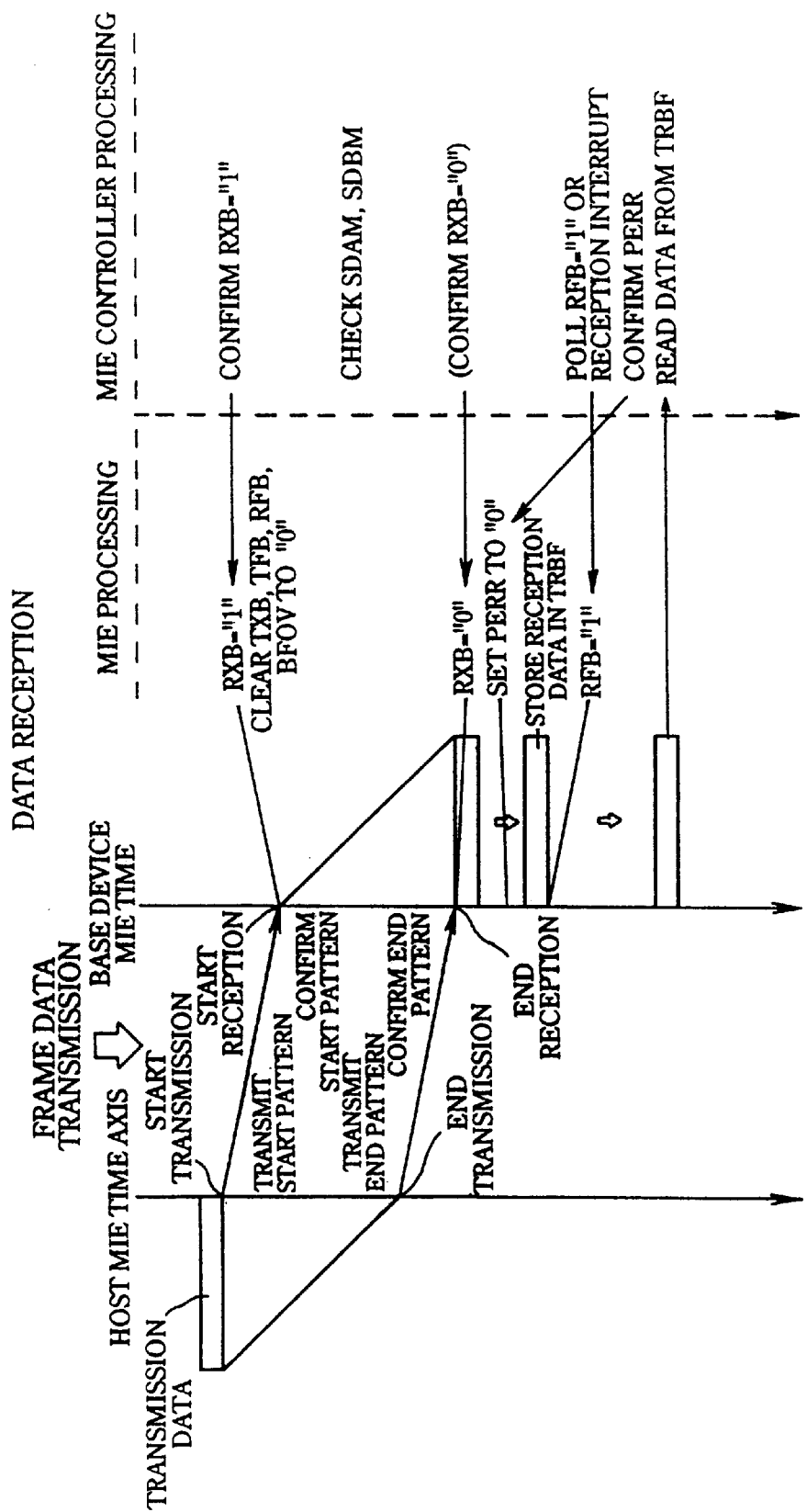
FIG. 67 is a diagram illustrating a procedure in a case where a base de e receives data from a host.

FIG. 67 is a diagram illustrating data reception at the device MIE, in a case where the volume of data transmitted from the host to the device (peripheral device) does not exceed the capacity of the transmission and reception buffer 204j.

Firstly, on the host side, the transmission data to be sent is created in the work RAM 1e, and the host MIE forms frame data containing this data and starts to transmit it to the M bus. The device MIE receives this frame data and decodes it by means of a frame decoder 204h. The data section (data pattern) and parity data in the frame data are serial-to-parallel converted by an alternate shift register 204i, and the parity is checked (parity calculation) by a temporary register 204g. The checked data section is then stored in a transmission and reception buffer 204k, and the parity data is stored in a parity register 204b.

When the frame decoder 204h detects a start pattern in the frame data, the frame controller 204c clears the transmission flag TXB, transmission completion flag TFB, and the reception completion flag RFB in the control register 204a to "0". As stated previously, when the reception flag RXB is "1", it indicates that the MIE is in the process of receiving data, and when RXB is "0", it indicates that data reception has ended. The CPU section 201 reads out the fact that reception flag RXB is set to "1", and concludes that data is being received. Furthermore, the CPU section 201 is also capable of monitoring the use of data lines SDCKA and SDCKB by checking the flags SDAM and SDBM. When the frame decoder 204h detects an end pattern in the frame data, the frame controller 204c concludes that data reception has ended, and it sets the reception flag RXB to "0".

The parity register section 204b compares the parity check results for the reception data with the received parity data, to determine if there is a parity error. The occurrence or absence of an error is written to the parity error flag PERR in the control register 204a. When frame data reception is completed normally, and the data is stored in the transmission and reception buffer 204j, whilst the parity error state is stored in the parity error flag PERR of the control register 204a, the reception completion flag RFB is set to "1", and the reception process ends. The reception completion flag RFB can be taken as an interrupt signal to the CPU section 201.

By monitoring the reception completion flag RFB periodically, or alternatively, receiving an interrupt signal when the reception completion flag RFB is set to "1", the CPU section 201 executes a program for processing the reception data. Firstly, it confirms that the parity error flag PERR in the control register 204a is not indicating that there is an error. Next, it reads in reception data from the transmission and reception buffer 204j to the main memory in the CPU section 201. The CPU section 201 then implements processing corresponding to the commands and parameters transmitted by the host, and processing for creating reply data, and the like.

If both the reception flag RXB and the reception completion flag RFB are set to "1", then since these are essentially incompatible states, the CPU identifies that an error has occurred during reception, and it implements relevant processing. Furthermore, if the parity error flag PERR indicates that there is an error, the CPU section 201 carries out processing for sending a retransmission request command to the host, for example.

Figure 68:
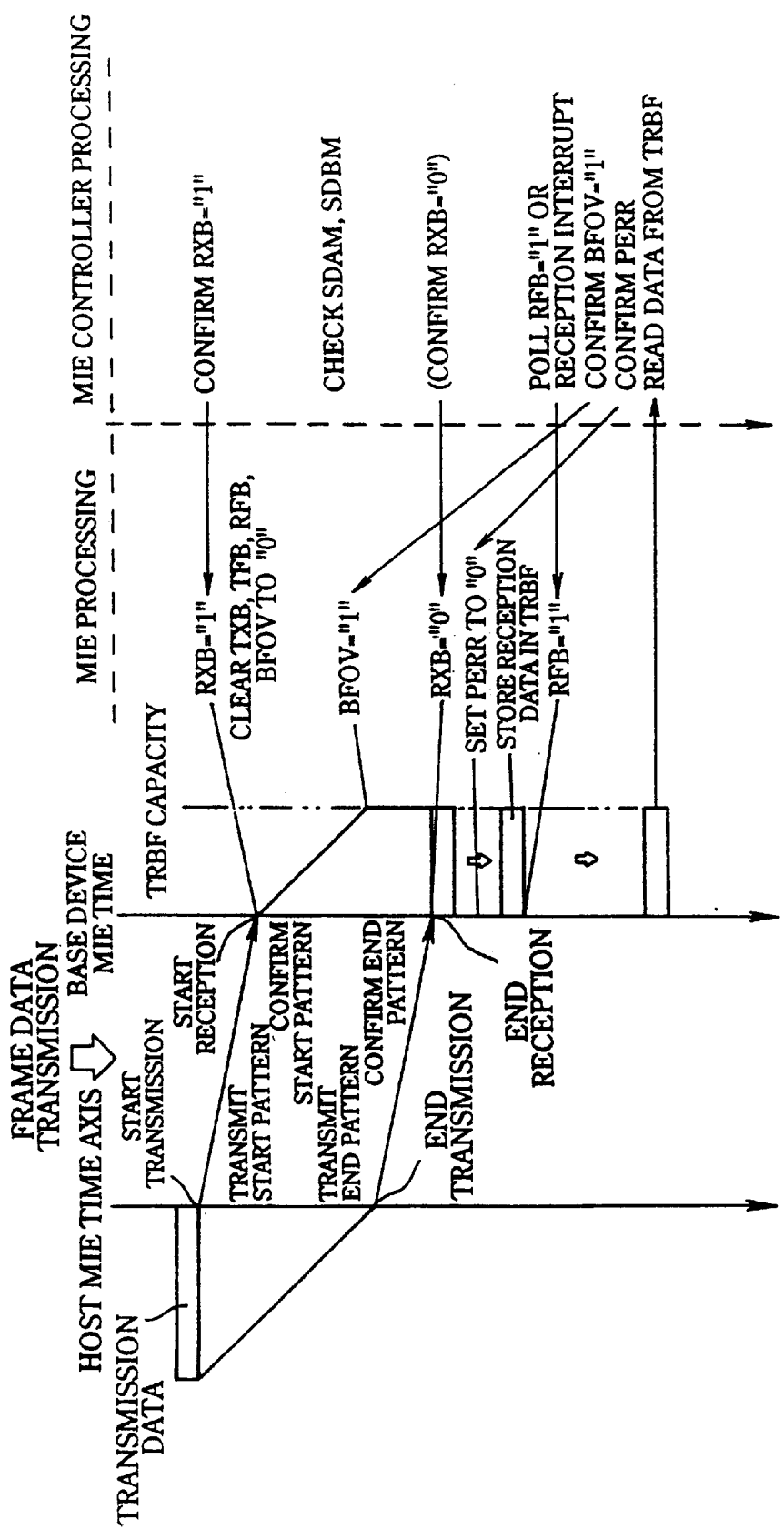
FIG. 68 is a diagram illustrating a procedure in a case where a base device receives data of a volume larger than the transmission and reception buffer from the host.

FIG. 68 is a diagram illustrating data reception at a base device MIE in a case where the volume of transmission data from the host to the base device (peripheral device) exceeds the capacity of the transmission and reception buffer TRBF. When the reception data exceeds the capacity of the transmission and reception buffer 204j, the transmission and reception buffer overflow flag BFOV is set to "1", and the reception data from the start of reception up to the capacity of the transmission and reception buffer is stored in the transmission and reception buffer. The operations implemented in this case are now described.

Firstly, similarly to FIG. 67, the transmission data to be sent by the host is created in the work RAM 1e, and the host MIE forms frame data containing this data and starts to transmit it to the M bus. The MIE at the base device receives this frame data and decodes it by means of a frame decoder 204h. The data section (data pattern) and parity data in the frame data is serial-to-parallel converted by the alternate shift register 204i, and a parity check (parity calculation) is performed by the temporary register 204g. The check data section is then stored in the transmission and reception buffer 204j, and the parity data is stored in the parity register 204b.

When the frame decoder 204h detects a start pattern in the frame data, the frame controller 204c clears the transmission flag TXB, transmission completion flag TFB, and reception completion flag RFB in the control register 204a to "0". As stated previously, when the reception flag RXB is "1", it indicates that the MIE is in the process of receiving data, and when RXB is "0", it indicates that transmission has ended. The CPU section 201 reads the fact that the reception flag RXB is set to "1", and concludes that data is being received.

Furthermore, the CPU section 201 is able to monitor the use of the data lines SDCKA and SDCKB by checking the flags SDAM and SDBM.

If the reception data exceeds the capacity of the transmission and reception buffer 204j, then the transmission and reception buffer 204j sets the transmission and reception buffer overflow flag BFOV in the control register to "1". For this purpose, an overflow is detected by, for example, generating a detection output when an address counter in the transmission and reception buffer 204j reaches the maximum address value in the memory. Even after the volume of reception data has exceeded the transmission and reception buffer 204j, the reception data is still supplied to the transmission and reception buffer 204j via the temporary register, but the transmission and reception buffer does not read in this data. Therefore, only a parity calculation is implemented for all the data. The parity data section of the reception data is stored in the parity register.

When the frame decoder 204h detects an end pattern in the frame data, the frame controller 204c identifies that reception has ended and it sets the reception flag RXB to "0". The parity register section 204b compares the parity check results for the reception data with the received parity data, to determine if there is a parity error. The occurrence or absence of error is written to the parity error flag PERR in the control register 204a. When the data is set in the transmission and reception buffer 204j and the parity error state is set in the parity error flag PERR of the control register 204a, the reception completion flag RFB is set to "1" and the reception process ends. The reception completion flag RFB can be taken as an interrupt signal to the CPU section 201.

The CPU section 201 identifies that it must implement a program for processing reception data by periodically monitoring the reception completion flag RFB of the control register, or by receiving an interrupt signal when the reception completion flag RFB is set to "1". Furthermore, the CPU section 201 confirms that the parity error flag PERR in the control register 204a does not indicate that there is an error. It also checks that the transmission and reception buffer overflow flag BFOV is set to "1". Upon identifying that the data is midway through transmission, the CPU section 201 reads in the reception data from the transmission and reception buffer 204j to the main memory of the CPU section 201, and then implements relevant processing.

Data Transmission Method

Figure 69:
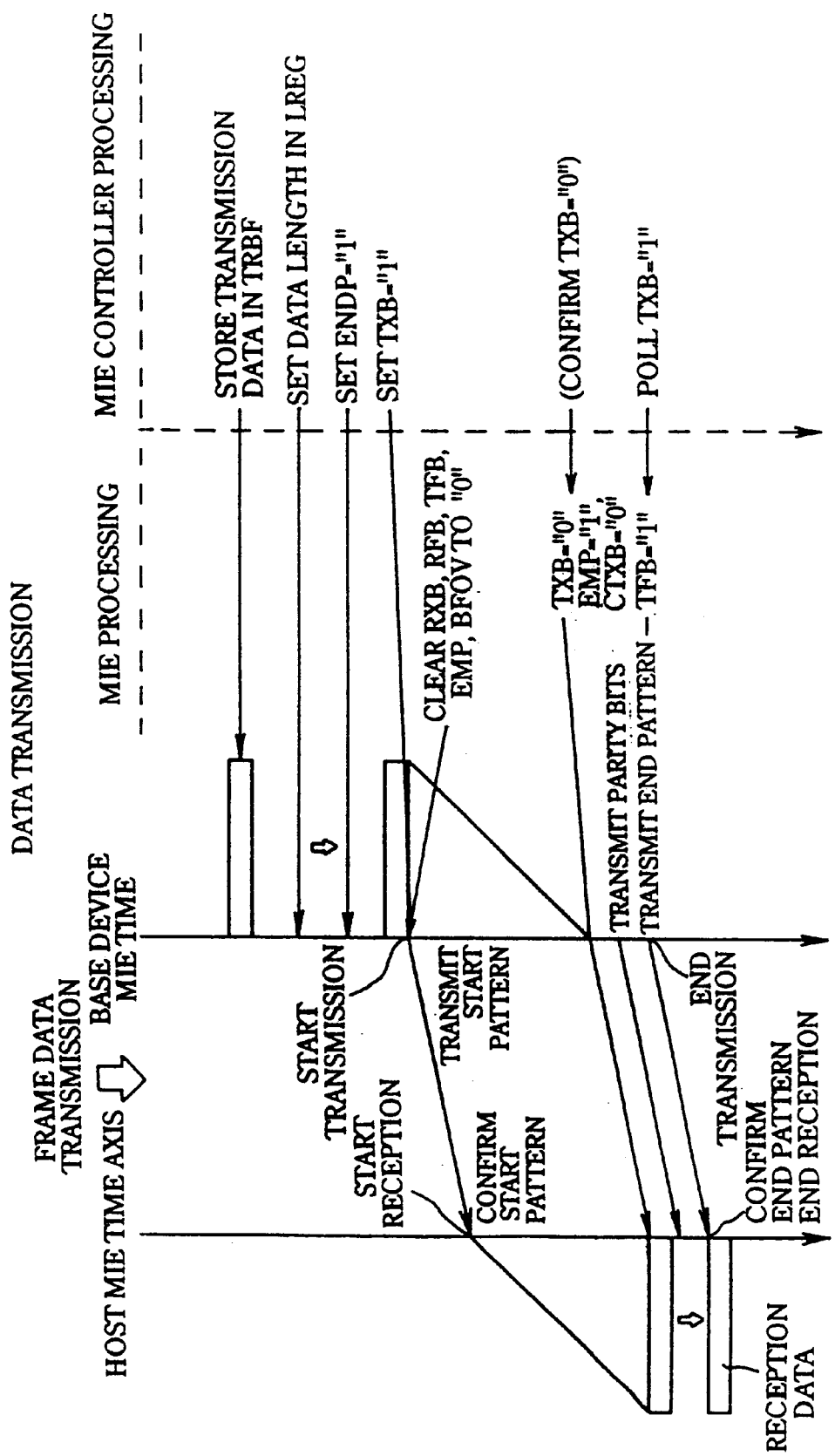
FIG. 69 is a diagram illustrating a procedure in a case where data is transmitted from a base device to a host.

Next, a data transmission procedure from a base device to the host is described with reference to FIG. 69. The data transmission procedure from expansion device to host is similar to the data transmission procedure from base device to host, so it is not described here.

When the base device receives a command from the host, it creates reply data in order to respond to the command, and it sends this reply data to the host. As stated previously, if there is no response within a predetermined time period (e.g., 1.0 ms) after transmission of the command, the host concludes that there is no connection. Therefore, the base device must send back a command within this time period.

Firstly, the CPU section 201 of the base device writes transmission data (command, parameters) to the transmission and reception buffer 204j. Thereupon, it writes the data volume of the transmission data to the data length register 204k and sets the end pattern flag ENDP in the control register to "1".

When the CPU section 201 sets the transmission flag TXB in the control register 204a to "1", the MIE starts a transmission operation in order to transmit data of the size indicated by the data length register. If the transmission flag TXB is set to "1", then the reception flag RXB, reception completion flag RFB, transmission completion flag TFB, and transmission and reception buffer overflow flag BFOV in the control register 204a are all set (cleared) to "0". If the data volume set in the data length register 204k exceeds the capacity of the transmission and reception buffer 240j, the transmission and reception buffer overflow flag BFOV switches to "1", and all the data in the transmission and reception buffer 204j is transmitted.

The frame controller 204c allows transmission of the data stored in the transmission and reception buffer 204j in response to the transmission flag TXB being set to "1". The temporary register 204g performs a parity calculation for the transmission data, and the data is then parallel-to-serial converted by the alternate shift register 204f and transmitted to the frame encoder 204e. Parity data is appended to the end of the transmission data by the temporary register 204g. The frame encoder 204e transmits in sequence a start pattern, transmission data (command, parameters), parity data and end pattern, under the control of the frame controller 204c. The transmission frame constituted by these data items is sent to the M bus by means of the aforementioned SDCKA signal and SDCKB signal. When the final data item is output from the transmission and reception buffer 204j, the transmission flag TXB in the control register is set to "0", the empty flag EMP is set to "1", and the continued transmission flag is set to "0". The contents of the transmission and reception buffer 204j after transmission has been completed are undefined. The frame controller 204c transmits an end pattern and if data transmission is completed normally, the transmission completion flag TFB in the control register 204a is set to "1". The base device MIE then assumes a standby state awaiting an input from the M bus. The CPU section 201 confirms that transmission is completed by monitoring the transmission completion flag TFB in the control register 204a periodically to see if it is set to "1". Moreover, if the transmission flag TXB indicating that transmission is in progress and the transmission completion flag TFB are both set to "1", then the CPU section 201 identifies that an error has occurred.

The host MIE, on the other hand, receives the frame data transmitted by the base device. When the frame decoder 61 detects the start pattern in the data, a signal is sent via the interrupt signal control section 54 to the interrupt controller in the host CPU 1a, to notify the CPU that data is being received. The reception data is serial-to-parallel converted by the alternate shift register 62, whereupon it is transmitted from the initiator section 50 via the reception data temporary register 56a and reception data FIFO 56b to the work RAM 1e. In the reception data storage location in the work RAM 1e, the reception data store address predetermined by the CPU 1a is taken as the leading bit position. When the frame decoder 61 detects an end pattern, reception ends, and the interrupt signal control section 54 sends a signal indicating the completion of the reception process to the interrupt controller. Thereby, the CPU is notified that reception has ended, and it is able to access and process the reception data in the work RAM 1e.

Figure 70:
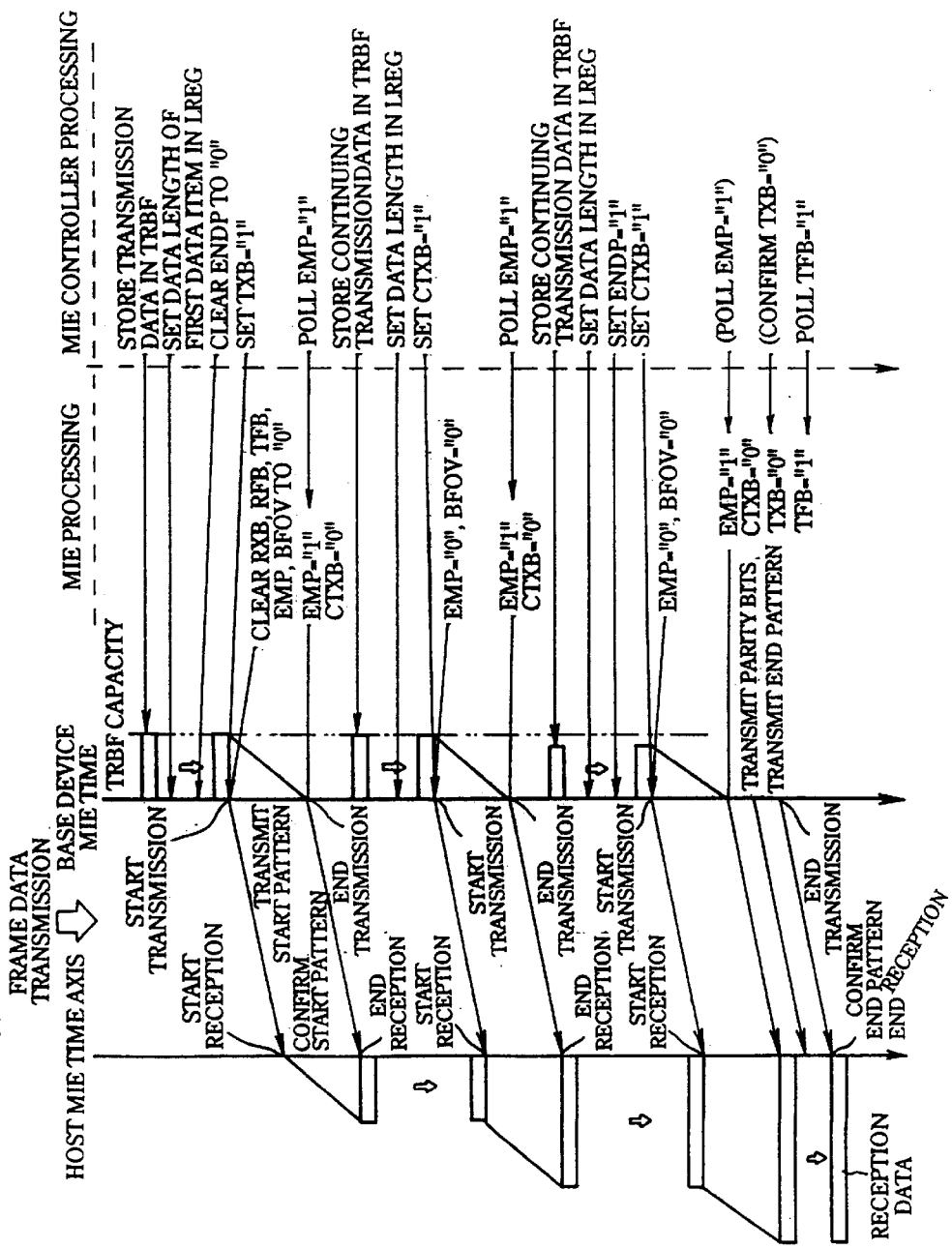
FIG. 70 is a diagram illustrating a procedure in a case where data of a volume larger than the capacity of the MIE transmission and reception buffer is transmitted from a base device to a host.

Next, data transmission in a case where the transmission data from the base device exceeds the capacity of its transmission and reception buffer 204j is described with reference to FIG. 70. In an expansion device, a similar procedure to that in a base device is implemented. If the transmission data exceeds the capacity of the transmission and reception buffer 204j, the CPU section 201 in the base device is able to transmit the data by dividing it into a number of blocks according to the capacity of the transmission and reception buffer 204j.

If the CPU section 201 in the base device receives a command from the host, it forms reply data in order to. respond to this, and sends this data to the host. If there is no response within a predetermined time period (for example, 1.0 ms) after transmission of the command, the host concludes that there is no connection. Therefore, the base device must send back a command and parameters within this time period.

Firstly, the CPU section 201 of the base device compares the volume of the data to be transmitted with the capacity of the transmission and reception buffer 204j to identify whether the transmission data volume is large. The CPU section 201 then divides the transmission data into lengths equal to or less than the capacity of the transmission and reception buffer 204j (e.g., 1024 bytes) and writes data to the transmission and reception buffer 204j (data blocking).

Thereupon, the data volume of the transmission data stored in the transmission and reception buffer 204j is written to the data length register 204k, and the end pattern flag ENDP in the control register 204a is set to "0".

When the CPU section 201 sets the transmission flag TXB in the control register 204a to "1" (transmission mode), the MIE starts a transmission operation in order to transmit data of the size indicated by the data length register. When the transmission flag TXB is set to "1", the frame controller 204c sets (clears) the reception flag RXB, reception completion flag RFB, transmission completion flag TFB, empty flag EMP and transmission and reception buffer overflow flag BPOV in the control register 204a to "0".

The frame controller 204c allows transmission data stored in the transmission and reception buffer 204j to be transmitted in response to the transmission flag TXB being set to "1". A parity calculation is made for the transmission data in the temporary register 204g, and the data is then parallel-to-serial converted by the alternate shift register 204f and transmitted to a frame encoder 204e. The frame encoder 204e transmits the start pattern and transmission data (command and parameters) successively, in accordance with commands from the frame controller 204c. Since the flag ENDP is set to "0", parity data and an end pattern are not appended to the end of this data block. A transmission frame comprising the aforementioned data items is transmitted to the M bus by means of the SDCKA signal and SDCKB signal. When the final data item is output from the transmission and reception buffer 204j, the empty flag EMP in the control register is set to "1" and the continued transmission flag is set to "0".

The CPU section 201 monitors the empty flag EMP in the control register 204a periodically. If it confirms that the empty flag EMP has changed to "1", it divides the continuation of the transmission data to a size equal to or less than the capacity of the transmission and reception buffer and stores it in the transmission and reception buffer 204j. The length of this data is set in the data length register 204k. Thereupon, the CPU section 201 sets the continued transmission flag CTXB in the control register 204a to "1".

When the continued transmission flag CTXB is set to "1", the frame controller 204c sets (clears) the empty flag EMP and the transmission and reception buffer overflow flag BFOV in the control register 204a to "0".

The frame controller 204c allows transmission data stored in the transmission and reception buffer 204j to be transmitted in response to the transmission flag TXB being set to "1" . A parity calculation is made for the transmission data in the temporary register 204g, and the data is then parallel-to-serial converted by the alternate shift register 204f and sent to the frame encoder 204e. The frame encoder 204e transmits the transmission data (command, parameters) successively under the control of the frame controller 204c. These data items, and the like, are transmitted to the M bus by means of the aforementioned SDCKA signal and SDCKB signal. When the final data is output from the transmission and reception buffer 204j, the empty flag EMP in the control register is set to "1", and the continued transmission flag CTXB is set to "0".

The CPU section 201 identifies that the empty flag EMP has switched to "1" by monitoring the control register at periodic intervals. The CPU section 201 divides the remaining (untransmitted) transmission data to a size equal to or less than the capacity of the transmission and reception buffer 204j, and stores it in the transmission and reception buffer 204j. In the case of this example, the remaining data is less than the capacity of the transmission and reception buffer 204j, so all of the remaining data is stored in the transmission and reception buffer 204j. The length of this data is set in the data length register 204k. Moreover, since the final data block is being transmitted, the end pattern transmission flag ENDP is set to "1" so that an end pattern is appended to the end of the data. Thereupon, the CPU section 201 sets the continued transmission flag CTXB in the control register 204a to "1".

When the continued transmission flag CTXB is set to "1", the frame controller 204c sets (clears) the empty flag EMP and the transmission and reception buffer overflow flag BFOV in the control register 204a to "0".

The frame controller 204c allows transmission data stored in the transmission and reception buffer 204j to be transmitted in response to the transmission flag TXB being set to "1". A parity calculation is made for the transmission data in the temporary register 204g, and the data is then parallel-to-serial converted by the alternate shift register 204f and sent to the frame encoder 204e. The temporary register 204g takes the results of the parity calculation for all the transmission data as parity data (one byte of parity bits), which it adds to the end of the transmission data. The frame encoder 204e transmits the transmission data (command, parameters), parity data, and an end pattern, successively, under the control of the frame controller 204c. These data items, and the like, are transmitted to the M bus by means of the aforementioned SDCKA signal and SDCKB signal. When the final data item is output from the transmission and reception buffer 204j, the empty flag EMP in the control register is set to "1", and the continued transmission flag CTXB is set to "0". Since transmission has ended, the transmission flag TXB and the transmission completion flag TFB are both set to "0". The CPU section 201 identifies that the transmission of all data has been completed from the state of the various flags, by monitoring the control register 204a periodically.

The host MIE, on the other hand, starts a reception operation when it receives a start pattern, and it stores reception data (command, parameters) successively in the work RAM 1e. The storage location in the work RAM 1e is previously specified by the DMA register. The original transmission data is restored by linking together each of the received data blocks in the work RAM 1e. When the host MIE ultimately receives an end pattern, it ends data reception.

As described above, when transmission data is divided up and transmitted as blocks, the initial block uses the transmission flag TXB, and the second and subsequent blocks use the continued transmission flag CTXB to transmit the remaining data. If the time period from sending one block of data to sending the next block exceeds a prescribed time period, e.g. 1.0 ms, then a Time Out will be generated at the host, so the device transmits the second and subsequent blocks within this time period. The size of the blocks can be set in block units. The block size is set in the data length register 204k for each block transmission. With the exception of the final block, the end pattern flag is set to "0" when the block is transmitted, so no end pattern is appended. When sending the final block, the end pattern flag is set to "1", so an end pattern is appended to the end of the transmission data.

In this way, the base device can transmit data which exceeds the capacity of its own transmission and reception buffer. The same applies to expansion devices.

Relationship Between Flags and Communications State

The relationships between the flags in the control register 204a of the base device and its communications state is now described.

(1) State of Base Device Flags (when the base device is communicating with the host)

(a) When base device is transmitting data to the host

TABLE 30

Data Transmission to Host

| Bit | Transmission start | In transmission | Transmission end | Transmission error |
|---|---|---|---|---|
| TXB | 1 | 1 | 0 | 1 |
| TFB | 0 | 0 | 1 | 1 |

TABLE 30-continued

Data Transmission to Host

| Bit | Transmission start | In transmission | Transmission end | Transmission error |
|---|---|---|---|---|
| RXB | 0 | 0 | 0 | 0 |
| RFB | 0 | 0 | 0 | 0 |

If both the transmission flag TXB and the transmission completion flag TFB are set to "1", this represents a transmission error.

(b) When base device is receiving data from the host

TABLE 31

Data Reception from Host

| Bit | In reception | Reception end | Reception data stored | Reception error |
|---|---|---|---|---|
| TXB | 0 | 0 | 0 | 0 |
| TFB | 0 | 0 | 0 | 0 |
| RXB | 1 | 1 | 0 | 1 |
| RFB | 0 | 0 | 1 | 1 |

When both the reception flag RXB and the reception completion flag RFB are set to "1", this represents a reception error.

(2) State of Base Device Flags (when an expansion device is communicating with the host)

(a) When an Expansion Device is Transmitting Data to the Host

TABLE 32

States of Individual Flags with respect to Transmission State of Other Peripheral Device

| Bit | Transmission start | In transmission | Transmission end | Transmission error |
|---|---|---|---|---|
| TXB | 0 | 0 | 0 | 0 |
| TFB | 0 | 0 | 0 | 0 |
| RXB | 0 | 0 | 0 | 0 |
| RFB | 0 | 0 | 0 | 0 |

If any of the expansion devices (transmitting devices) transmit data to the host, it is possible for that expansion device to occupy an LM bus. This occupancy is made possible by controlling the OR gates 213, 214 by means of the transmitting device. In cases of this kind, base-devices and expansion devices other than the transmitting device are excluded from the bus, so it is not necessary to monitor data reception, thereby reducing the load accordingly.

(b) When the Expansion Device Receives Data from the Host

TABLE 33

States of Individual Flags with respect to Reception State of Other Peripheral Device

| Bit | In reception | Reception end | Reception data stored | Reception error |
|---|---|---|---|---|
| TXB | 0 | 0 | 0 | 0 |
| TFB | 0 | 0 | 0 | 0 |
| RXB | 1 | 1 | 0 | 1 |
| RFB | 0 | 0 | 1 | 1 |

When the reception flag RXB and reception completion flag RFB are both set to "1", this represents a reception error.

Error Processing

Error processing is now described. As stated previously, if the transmission flag TXB and the transmission completion flag TFB are both set to "1", then there is a transmission error. If the reception flag RXB and the reception completion flag RFB are both set to "1", then there is a reception error. If an error occurs during transmission processing, the MIE may indicate that there is an error by setting both the transmission flag TXB and the transmission completion flag TFB to "1". The same applies if an error occurs during reception processing. If a parity error arises, then the parity error flag PERR is set to "1". If the received data exceeds the capacity of the transmission and reception buffer (overflow) during data reception, or if a data length exceeding the buffer capacity is specified during transmission, then the transmission and reception buffer overflow flag BFOV is set to "1".

Examples of error processing in a base device in cases where errors of these kinds occur will now be described.

(a) If an error occurs when transmitting to the host, no operation is implemented with respect to the error, but rather the transmission flag TXB and transmission completion flag TFB are simply cleared.

(b) If an error occurs when receiving data from the host, firstly, if the data destination corresponds to that base device, then the base device can send a retransmit command to the host. If the data destination indicates another device, then the base device clears its own reception flag RXB and reception completion flag RFB.

(c) If the error during data reception from the host is a Time Out, then both the base device and expansion devices are reset. In other words, a) the IDs to expansion devices are reversed to form halt operation signals to the expansion devices, thereby causing the expansion devices to halt processing. b) The base device resets and then reverses its ID (returns it to original ID). When the ID is reversed, the expansion devices are reset. c) After resetting, the device assumes the same state as after a soft reset.

Command Reference

The various commands used in a frame are now described. 254 command codes from 01h –FEh can be used. 00h and FFh cannot be used. These codes are reserved for use to indicate "communication error: data not secure". The commands include control commands and error commands.

Control Commands

The command code range from 01h–DFh can be used for control commands. These commands are used for controlling data transmission and reception. The various function libraries in the host, base devices and expansion devices must not provide different commands for the same command code. If further commands are added, it is desirable that compatibility with the standards is sought by prior application to the party managing the standards. Below, control commands are described.

Figure 71:
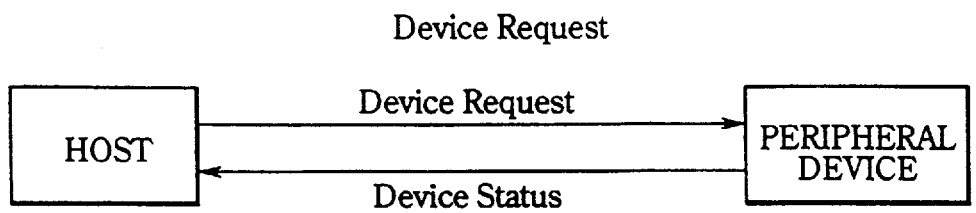
FIG. 71 is a diagram illustrating a "Device Request" command.

Device Request (FIG. 71)

Right to issue: Host

Command code: 01h

Data size: 00h

Data region: none

Expected reply value: Device Status

Description: A command to a peripheral device at the destination AP requesting a Device Status. Also used to check connection status at ports.

Figure 72:
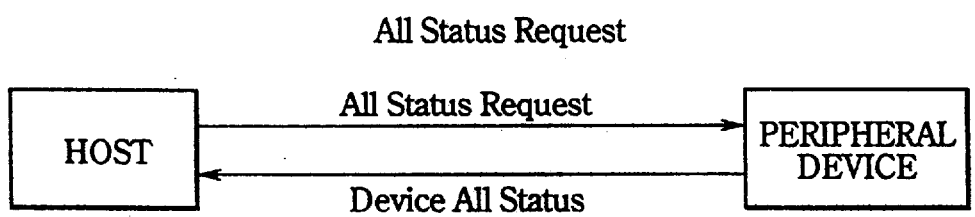
FIG. 72 is a diagram illustrating an "All Status Request" command.

All Status Request (FIG. 72)

Right to issue: Host

Command code: 02h

Data size: 00h

Data region: none

Expected reply value: Device All Status

Description: A request to a peripheral device at the destination AP for all Device Status (both Fixed Device Status and Free Device Status).

Figure 73:
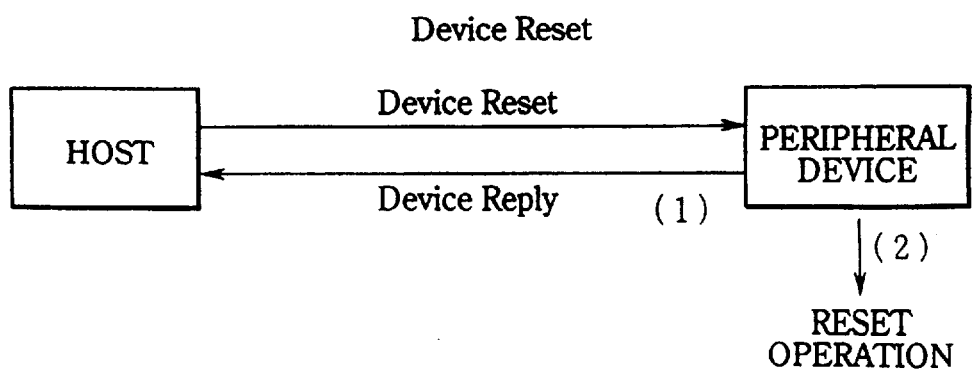
FIG. 73 a diagram illustrating a "Device Reset" command.

Device Reset (FIG. 73)

Right to issue: Host

Command code: 03h

Data size: 00h

Data region: none

Expected reply value: Device Reply

Description: Allows initialization of peripheral device specified by destination AP.

Operational procedure: (1) Peripheral device sends back Device Reply. (2) Peripheral device resets itself.

Figure 74:
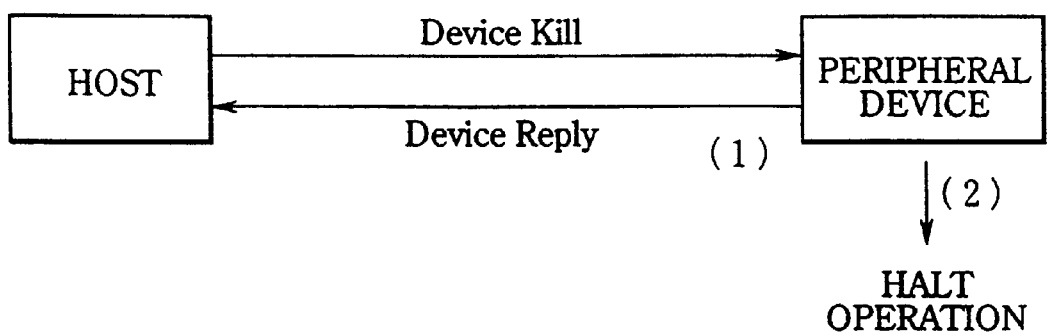
FIG. 74 is a diagram illustrating a "Device Kill" command.

Device Kill (FIG. 74)

Right to issue: Host

Command code: 04h

Data size: 00h

Data region: none

Expected reply value: Device Reply

Description: Prohibits operation of peripheral device specified by destination AP. Peripheral device then waits at standby current consumption and does not accept any commands.

To actuate the peripheral device, it is necessary either to perform a hard reset, or to reactivate it by cutting the power supply.

Operational procedure: (1) Peripheral device sends back Device Reply. (2) Peripheral device halts operation.

Device Status

Right to issue: Peripheral device

Command code: 05h

Data size: 1 Ch (28)

Data region: Device ID: 16 bytes; destination region code: 1 byte; product name: 31 bytes; licence: 60 bytes; standby current consumption: 2 bytes; maximum current consumption: 2 bytes Description: Fixed Device Status data is sent in response to a Device Request from the host. The details of the data contents are described in the peripheral device information given below.

Device All Status

Right to issue: Peripheral device

Command code: 06h

Data size: 1 Ch+(n/4)

Data region: Fixed Device Status: 112 bytes; device ID: 16 bytes; destination region code: 1 byte; product name: 31 bytes; licence: 60 bytes; standby consumption current 2 bytes; maximum current consumption: 2 bytes; Free Device Status: n bytes Description: Both a Fixed Device Status and Free Device Status are sent in response to an All Status Request from the host. The details of the data contents are described in the peripheral device information given below.

Device Reply

Right to issue: Peripheral device

Command code: 07h

Data size: 00h

Data region: none

Description: Used as a reply from peripheral device.

Figure 75:
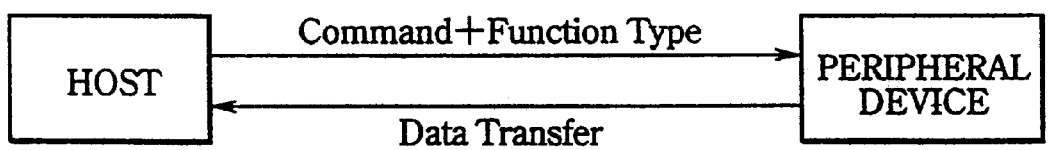
FIG. 75 is a diagram illustrating a "Data Transfer" command.

Data Transfer (FIG. 75)

Right to issue: Peripheral device

Command code: 08h

Data size: n (01h$\leqq$n$\leqq$FFh)

Data region: Function type: 4 bytes; data: (n−1)×4 bytes

Expected reply value: none

Description: Sends data regarding function type specified by host. The data varies depending on the requested command.

Figure 76:
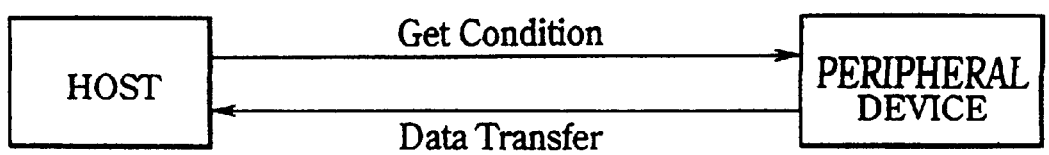
FIG. 76 is a diagram illustrating a "Get Condition" command.

Get Condition (FIG. 76)

Right to issue: Host

Command code: 09h

Data size: 01h

Data region: Function type: 4 bytes

Expected reply value: Data Transfer

Description: Requests physical state of function specified by function type of peripheral device. Peripheral device sends back by same type as function type transmitted by host. Only one function type can be designated at one time.

Figure 77:
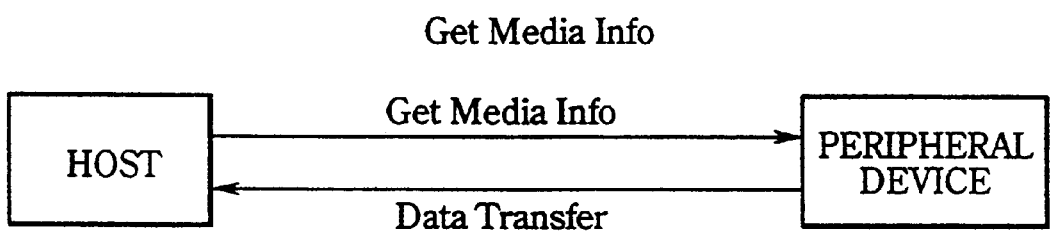
FIG. 77 is a diagram illustrating a "Get Media Info" command.

Get Media Info (FIG. 77)

Right to issue: Host

Command code: 0Ah

Data size: 02h

Data region: Function type: 4 bytes; PT (partition): 4 bytes (of which 3 are dummy bytes)

Expected reply value: Data Transfer

Description: Requests media information on function specified by peripheral device function type and PT. The details depend on the specifications of the respective function types.

Figure 78:
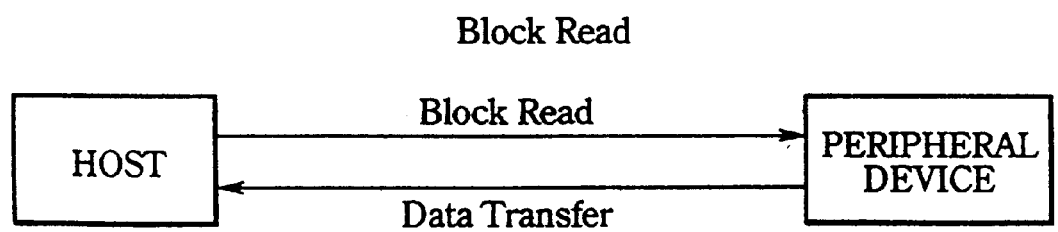
FIG. 78 is diagram illustrating a "Block Read" command.

Block Read (FIG. 78)

Right to issue: Host

Command code: 0Bh

Data size: 02h

Data region: Function type: 4 bytes; partition (PT): 1 byte; Phase: 1 byte; Block No.: 2 bytes Expected reply value: Data Transfer Description: Requests data at location specified by peripheral device function type and information storage medium partition, phase and block number (e.g., data storage location on FDD, HDD, memory, CD-ROM, etc.) The details depend on the specifications of the respective function types.

Figure 79:
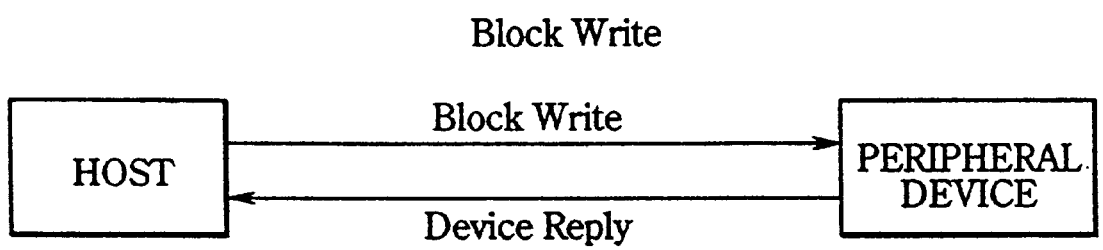
FIG. 79 is a diagram illustrating a "Block Write" command.

Block Write (FIG. 79)

Right to issue: Host

Command code: 0Ch

Data size: 02h+n

Data region: Function type: 4 bytes; partition: 1 byte; phase:

1 byte; block number: 2 bytes; write data: n×4 bytes

Expected reply value: Device Reply

Description: Writes data to a location specified by the peripheral device function type, and the partition, phase and block number. The details depend on the specification of the respective function types.

Figure 80:
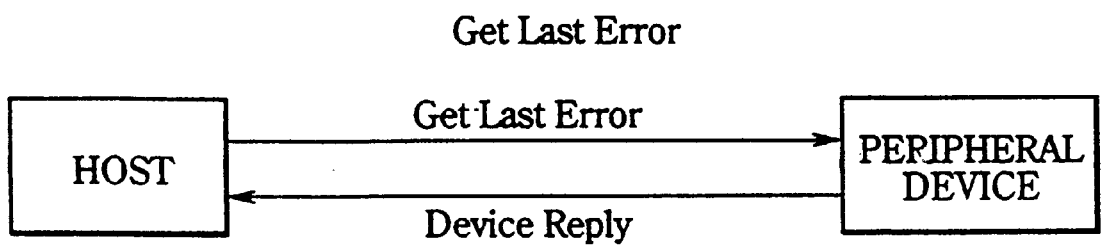
FIG. 80 is a diagram illustrating a "Get Last Error" command.

Get Last Error (FIG. 80)

Right to issue: Host

Command code: 0Dh

Data size: 02h

Data region: Function type: 4 bytes; partition: 1 byte; phase: 1 byte; block number: 2 bytes Expected reply value: Device Reply Description: Investigates whether error occurred in immediately previous command. If there is no error, it sends back Device Reply, and if there is an error, is sends an error command. The partition and block number retain the same values as in the immediately previous command, and the phase is incremented by 1. The details depend on the specifications of the respective function types.

Error Commands

Next, error commands are described. The command code range from E0h–FEh is used for error commands. An error command reports that an error has occurred in data transmission and reception or processing. It is prohibited for the respective function libraries in the host, base devices and expansion devices to provide different commands for the same command code. It is desirable for compatibility with the standards to be sought by prior application to the party managing the standards. Error commands are described below.

Function Type Unknown

Right to issue: Peripheral device

Command code: FEh

Data size: 00h

Data region: none

Description: Issued when the function specified by the transmitted function type is not present in the peripheral device.

Conceivable causes: (1) Function-type specification is incorrect. (2) Data description is incorrect. (3) Device ID data corrupted. (4) Data corrupted during communications.

Action: (1) Correct function type specification. (2) Correct data description. (3) Transmit Device Request again and obtain device ID. (4) Try to transmit again (up to maximum of three times, whereupon same processing as Time Out).

Command Unknown

Right to issue: Peripheral device

Command code: FDh

Data size: 00h

Data region: none

Description: Issued when the command transmitted is not provided in the functions on the peripheral device side. Conceivable causes: (1) Command specification is incorrect. (2) Data description is incorrect. (3) Device ID data corrupted. (4) Data corrupted during communications.

Action: (1) Correct command specification. (2) Correct data description. (3) Transmit Device Request again and obtain device ID. (4) Try to transmit again (up to a maximum of three times, whereupon same processing as Time Out).

Transmit Again

Right to issue: Host; peripheral device

Command code: FCh

Data size: 00h

Data region: none

Description: Requests that same data is transmitted again, when an error of some kind occurs in the transmission data. Conceivable causes: (1) Parity error occurs. (2) Data overflows. (3) Data corrupted during communications.

Action: Transmit again (up to maximum of three times, whereupon same processing as Time Out).

File Error

Right to issue: Peripheral device Command code: FBh

Data size: 01h

Data region: Function error code

Description: Issued when error occurs in File Function. A detailed error is transmitted by means of the function error code.

Conceivable causes:

TABLE 34

File Function error code

| Bit | 7 | 6 | 5 | 4 | 3 | 2 | 1 | 0 |
|---|---|---|---|---|---|---|---|---|
| 1st Data | $FE_{31}$ | $FE_{30}$ | $FE_{29}$ | $FE_{28}$ | $FE_{27}$ | $FE_{26}$ | $FE_{25}$ | $FE_{24}$ |
| 2nd Data | $FE_{23}$ | $FE_{22}$ | $FE_{21}$ | $FE_{20}$ | $FE_{19}$ | $FE_{18}$ | $FE_{17}$ | $FE_{16}$ |
| 3rd Data | $FE_{15}$ | $FE_{14}$ | $FE_{13}$ | $FE_{12}$ | $FE_{11}$ | $FE_{10}$ | $FE_9$ | $FE_8$ |
| 4th Data | $FE_7$ | $FE_6$ | $FE_5$ | $FE_4$ | $FE_3$ | $FE_2$ | $FE_1$ | $FE_0$ |

In this table, an item which has produced an error is set to "1", and an item which produces no error is set to "0". $FE_0$ represents a partition error (PT error); $FE_1$, a Phase Error; $FE_2$, a Block Error; $FE_3$, a Write Error; $FE_4$, a Length Error; and $FE_5$, a CRC Error. The bits thereafter are reserved.

LCD Error

Right to issue: Peripheral device

Command code: FAh

Data size: 01h

Data region: Function error code

Description: Issued when an error occurs in the LCD Function. A detailed error is transmitted by means of the function error code.

Conceivable causes:

TABLE 35

LCD function error code

| Bit | 7 | 6 | 5 | 4 | 3 | 2 | 1 | 0 |
|---|---|---|---|---|---|---|---|---|
| 1st Data | $FE_{31}$ | $FE_{30}$ | $FE_{29}$ | $FE_{28}$ | $FE_{27}$ | $FE_{25}$ | $FE_{25}$ | $FE_{24}$ |
| 2nd Data | $FE_{23}$ | $FE_{22}$ | $FE_{21}$ | $FE_{20}$ | $FE_{19}$ | $FE_{18}$ | $FE_{17}$ | $FE_{16}$ |
| 3rd Data | $FE_{15}$ | $FE_{14}$ | $FE_{13}$ | $FE_{12}$ | $FE_{11}$ | $FE_{10}$ | $FE_9$ | $FE_8$ |
| 4th Data | $FE_7$ | $FE_6$ | $FE_5$ | $FE_4$ | $FE_3$ | $FE_2$ | $FE_1$ | $FE_0$ |

In this table, an item which has produced an error is set to "1", and an item which produces no error is set to "0". $FE_0$ represents a partition error (PT error); $FE_1$, a Phase Error; $FE_2$, a Block Error; $FE_3$, a Write Error; $FE_4$, a Length Error; and $FE_5$, none. The bits thereafter are reserved.

Peripheral Device Information

The inherent information (Device Status) relating to a base device or an expansion device is now described. The data in the Device Status is stored such that it cannot be overwritten or erased. The Device Status comprises: Fixed Device Status and Free Device Status. The Fixed Device Status is a predetermined Device Status having a 112-byte format, which must always be defined. Unless all the items therein are defined, operation and connection cannot be guaranteed. The Free Device Status is a Device Status which can be used freely by the individual devices. It has a maximum capacity of 912 bytes.

Fixed Device Status

All of the following items must be defined in the Fixed Device Status.

(1) Device ID

Volume: 16 bytes

Description: Indicates peripheral device attributes and data format (function). There is information relating to device ID in the protocol section.

(2) Destination Region

Volume: 1 byte

Description: Indicates the destination of the product (region of sale). Table 36 shows the composition of the destination region setting bits. Table 37 shows the relationship between the destination region setting bits and the destination regions.

TABLE 36

Setting bits formation for the destination region

| Bit | 7 | 6 | 5 | 4 | 3 | 2 | 1 | 0 |
|---|---|---|---|---|---|---|---|---|
| data | $DES_7$ | $DES_6$ | $DES_5$ | $DES_4$ | $DES_3$ | $DES_2$ | $DES_1$ | $DES_0$ |

TABLE 37

Setting bits for the destinations

| destination regions | setting bits |
|---|---|
| North America | $DES_0 = $ '1' |
| Japan | $DES_1 = $ '1' |
| Asia | $DES_2 = $ '1' |
| Europe | $DES_3 = $ '1' |
| reserved area 1 | $DES_4 = $ '1' |
| reserved area 2 | $DES_5 = $ '1' |
| reserved area 3 | $DES_6 = $ '1' |
| reserved area 4 | $DES_7 = $ '1' |

For example, in the event of a common global destination, DES="1111111"=FFh, and the case of a common destination of Japan and Asia, DES="00000110"=06h. It is prohibited for DES to be set to 00h.

(3) Product Name

Volume: 31 bytes

Description: Gives product name in English or Roman alphabet. Em or en size is usable. Space codes (20h) are inserted into spare volume (bits). This product name is previously registered.

(4) Licence

Volume: 60 bytes

Description: ASCII code description of product licence in English or Roman alphabet. Space codes (20h) are inserted into spare bits. For example, "Produced By or Under License From XXXXX, LTD.".

(5) Standby Current Consumption

Volume: 2 bytes

Description: States current consumption during temporary halt in 0.1 mA units, in hexadecimal notation. For example, if the value is 10.5 mA, then the data is 00–69h.

(6) Maximum Current Consumption

Volume: 2 bytes

Description: Describes maximum current;,consumption in 0.1 mA units, in hexadecimal notation. For example, if the value is 127.9 mA, the data is 04-FFh.

Free Device Status

The Free Device Status is a region which can be written freely by the product planner, developer, designer, programmer, or the like, and it can be retrieved by the host by means of an All Device Request. When using application software, etc., it is necessary to match the data configuration, and the like.

Other examples of base devices and expansion devices using the present invention are now described with reference to the drawings.

Figure 81:
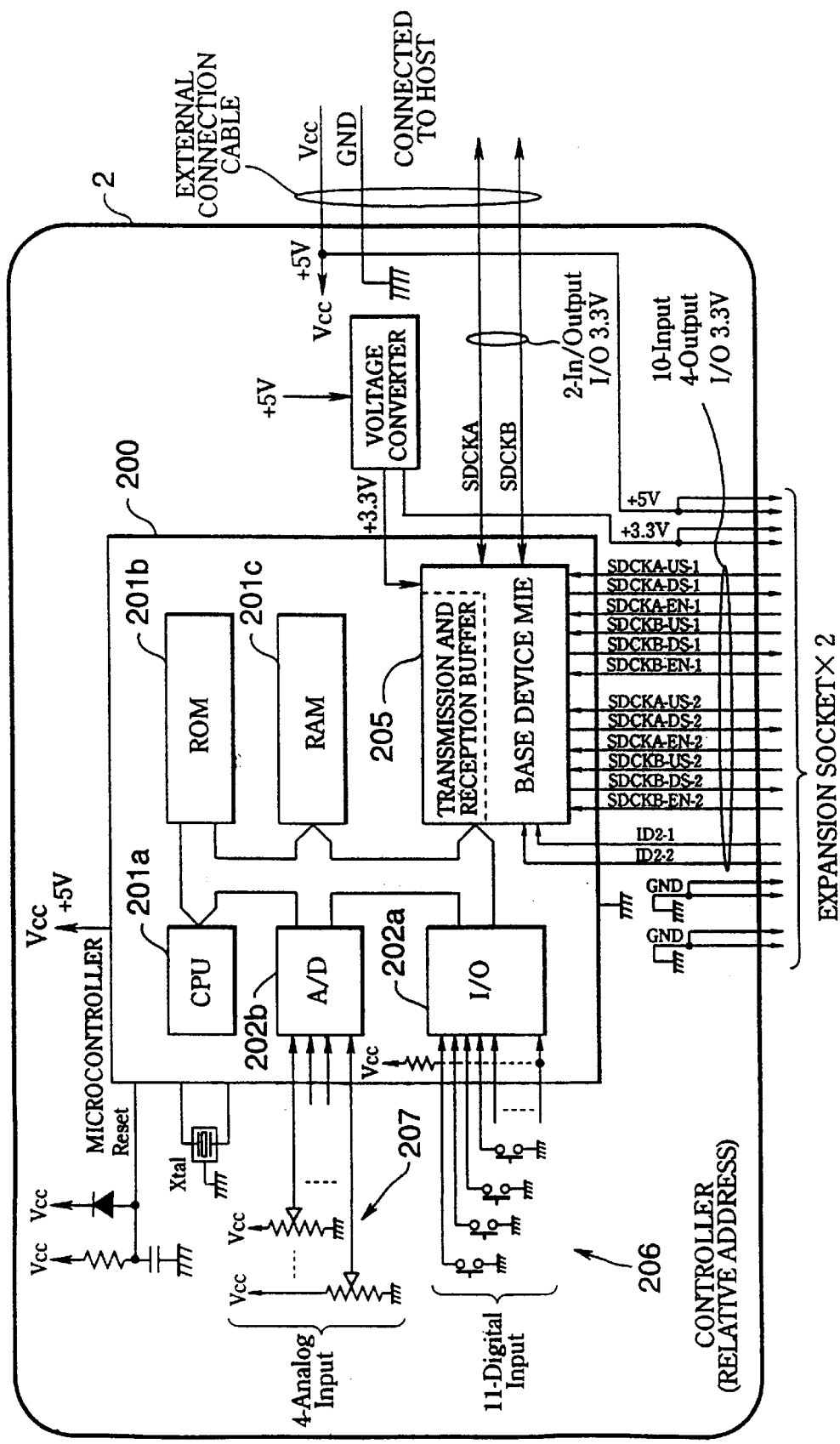
FIG. 81 is a block diagram showing an example of a base device (game controller) having a relative address.

FIG. 81 gives an approximate illustration of a compositional example of a further base device (controller) relating to the first mode of implementation, which uses relative addresses. In the compositional example of a U-device function illustrated in FIG. 33, where a relative address system is used, the absence or presence of an expansion device connection is judged by the SDCKA OUT terminal (connected to resistance), but in the present example, a terminal ID2 connected to resistance R is provided at each expansion connector, similarly to the example in FIG. 64, and the presence or absence of an expansion socket connection is judged by identifying the voltage generated at this terminal. In FIG. 81, the control circuit of a base device (game controller) 2 can be constituted by a so-called single-chip microcomputer system 200. The computer system 200 comprises: a CPU 201a for controlling each section; a ROM 201b for storing control programs and data libraries for the CPU 201a; a RAM 201c used for storing CPU programs and data and implementing data processing; an I/O section 202a for converting pressing operations at 11 digital switches 206 to code data; an A/D converter 202b for converting variable level outputs from four analogue switches 207 to a data signal; and a base device MIE 205 for conducting data communications between the base device and host and supporting data communications between an expansion device and the host. Furthermore, the computer system 200 comprises: a reset signal generating circuit, comprising resistors, capacitors and diodes, for generating a reset signal when the power is turned on; a crystal oscillator for generating various clock signals for the system; and a voltage converting circuit for generating a 3.3V signal voltage for the base device MIE 205 and for the expansion devices from a power supply Vcc (+5V). The power supply Vcc (+5V) to the base device is supplied by the game device via an external connection cable. The external connection cable comprises the signal line SDCKA, signal line SDCKB, power supply line Vcc, and earth line GND. The power supply Vcc (+5V) supplied from the game device via the external connecting cable is fed to expansion devices (omitted from the drawings) along with the aforementioned signal power supply (+3.3V) by means of the expansion connector.

The CPU section 201a, ROM 201b and RAM 201c correspond to the CPU in FIG. 33, the A/D converter 202b and I/O section 202a correspond to I/O in FIG. 33, and the base device MIE 205 corresponds to the communications processing section, the socket control section and the gates in FIG. 33. The power supply Vcc and the earth GND are supplied to the base device 2 from the host by means of an M bus. Furthermore, data communications are conducted by means of the signal lines SDCKA and SDCKB. The base device and expansion device are connected by means of; signal lines SDCKA-US-1, SDCKA-DS-1, SDCKA-EN-1, SDCKB-US-1, SDCKB-DS-1, SDCKB-EN-1, SDCKA-US-2, SDCKA-DS-2, SDCKA-EN-2, SDCKB-US-2, SDCKB-DS-2, SDCKB-EN-2, power supply Vcc (+5V, 3.3V) and the earth lines GND (four lines). In this example, a base device having two expansion connectors has been described, but as stated previously, it is possible for four external expansion connectors to be provided. In this case, four ID2 terminals ID2-1–ID2-4 are used to confirm whether or not a terminal device is connected. The operation of the base device 2 is the same as the U-device function illustrated in FIG. 33, and therefore description thereof is omitted here.

Figure 82:
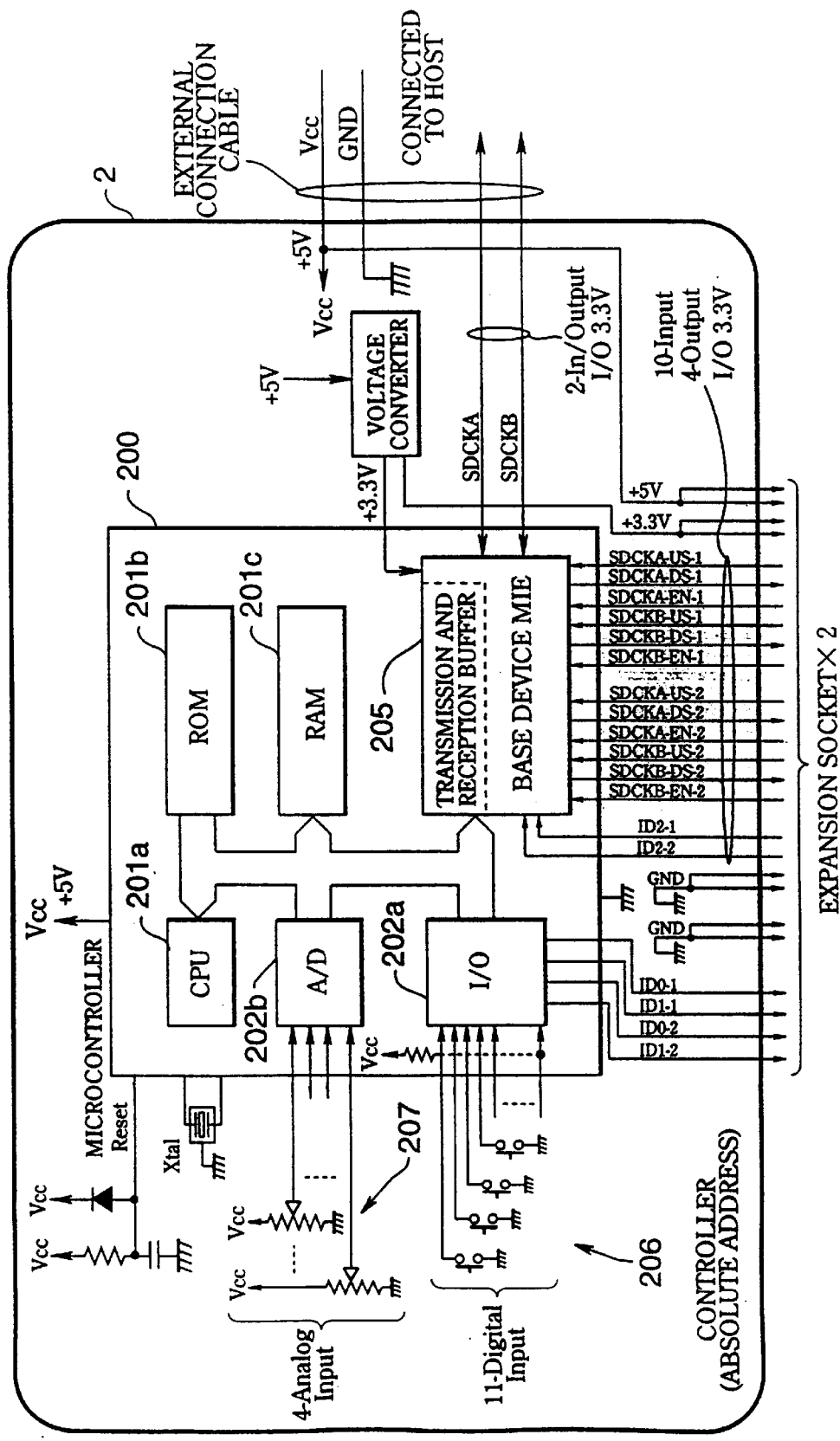
FIG. 82 is a block diagram showing an example of a base device (game controller) having an absolute address.

FIG. 82 shows a further compositional example of a base device (controller) relating to a second mode of implementation using absolute addresses, and it corresponds to the example in FIG. 81 which uses relative addresses. In this diagram, the sections corresponding to FIG. 65 or FIG. 81 are similarly labelled and are not described here. In a base device employing an absolute address system, the I/O block 202a indicates an LM bus number to an expansion device connected via the ID0 and ID1 terminals of any of the expansion sockets, in accordance with an output from the CPU. The role of the terminals ID0, ID1 was described in the expansion device AP setting procedure relating to FIG. 59. From the I/O 202a, terminals ID0-1 and ID1-1 are provided in the first expansion socket and terminals ID0-2 and ID1-2 are provided in the second expansion socket.

Figure 83:
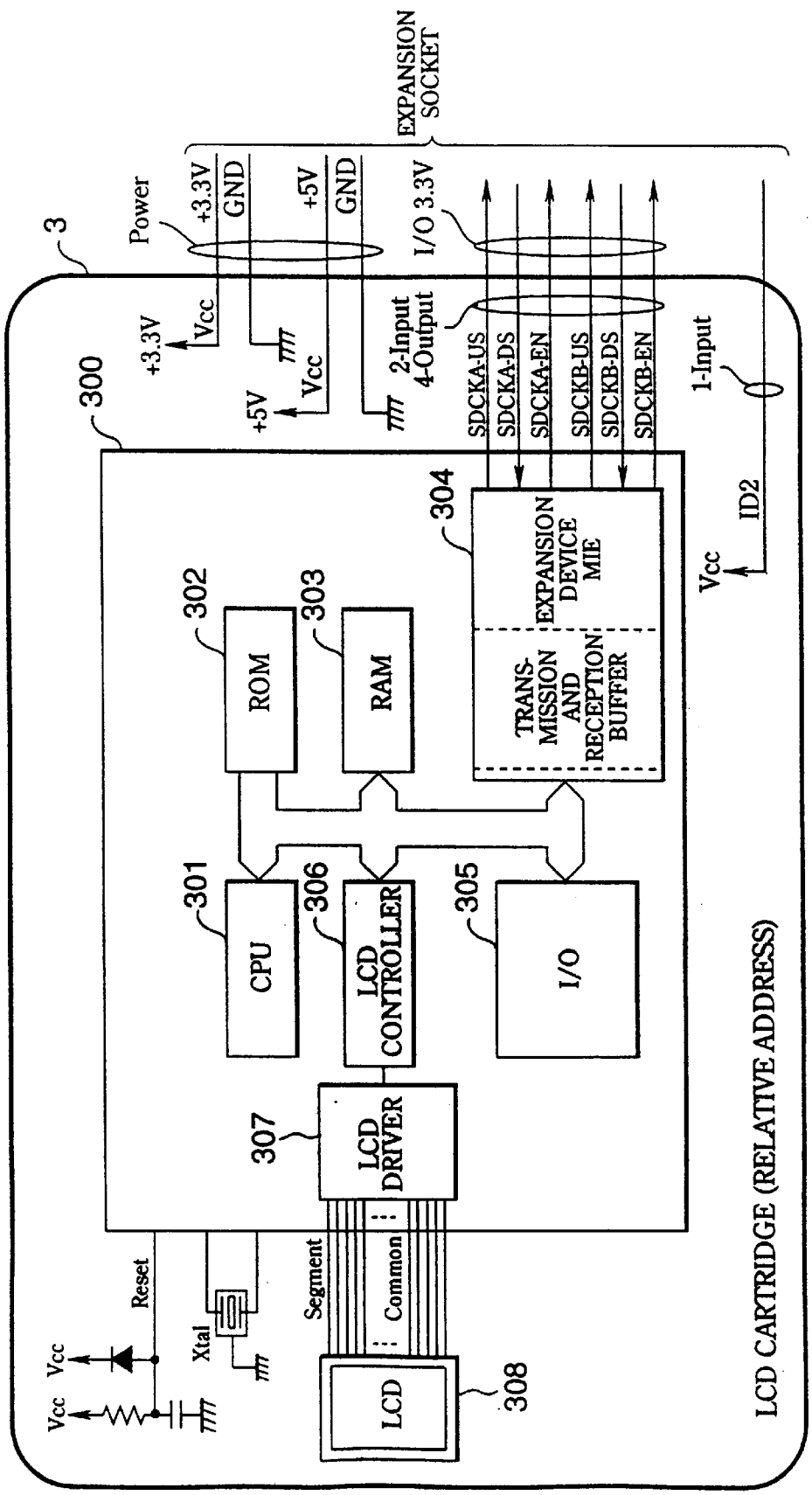
FIG. 83 is a block diagram showing an example of an expansion device (LCD cartridge) having a relative address.
Figure 84:
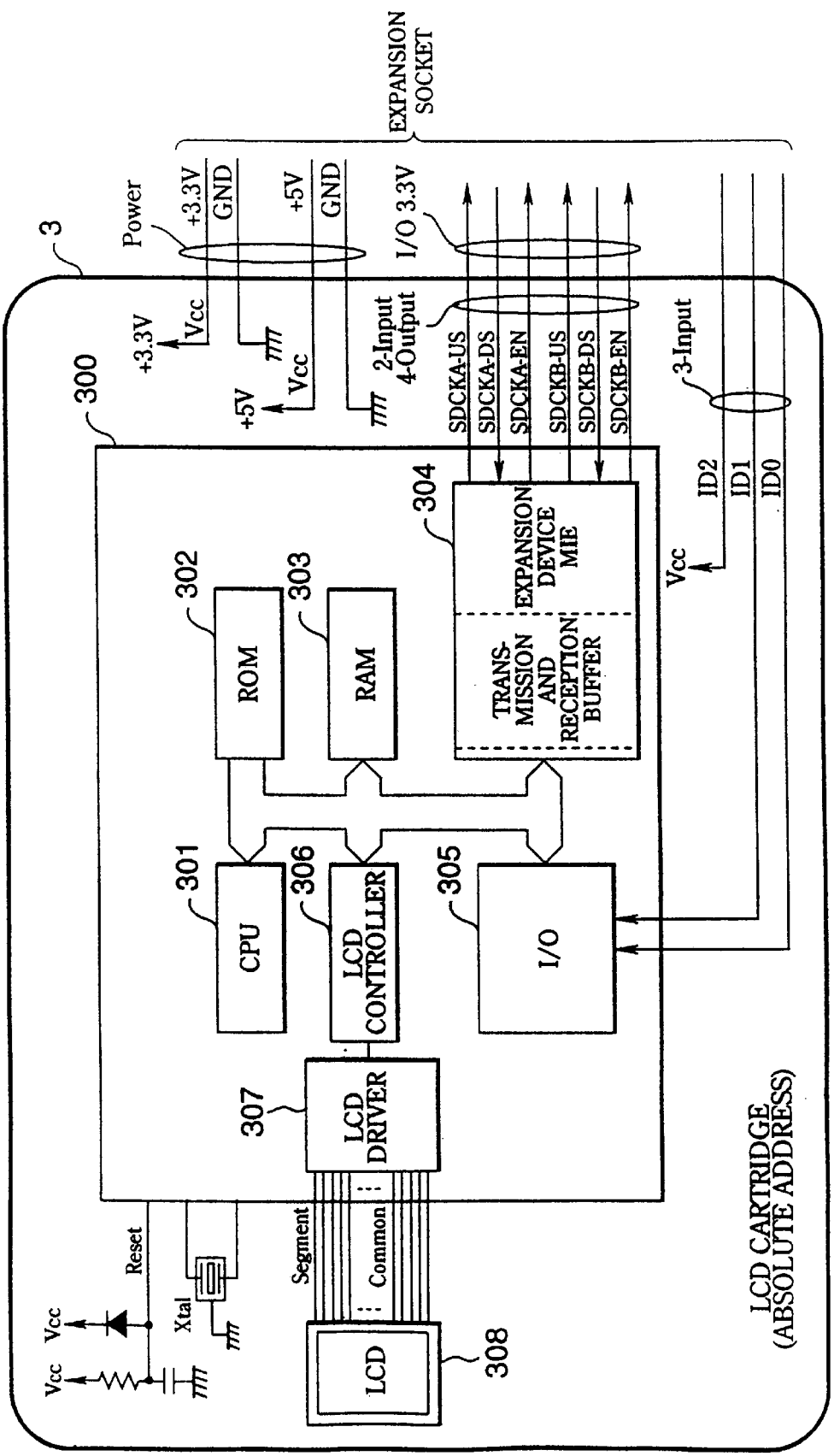
FIG. 84 is a block diagram showing an example of an expansion device (LCD cartridge) having an absolute address.

FIG. 83 and FIG. 84 show examples of an expansion device provided with an LCD device (LCD cartridge) in a relative address system and absolute address system, respectively. In this diagram, the control circuit of the expansion device (LCD cartridge) 3 can be constituted by a so-called single-chip microcomputer system 300. The computer system 300 comprises:

a CPU 301 for controlling each section; a ROM 302 for storing control programs and data libraries for the CPU 301; a RAM 303 used for storing CPU programs and data and implementing data processing; an expansion device MIE 304 for conducting data communications between the expansion device and host; an I/O section 305 performing an input and output interface; an LCD controller 306 for controlling the display of LCD 308; and an LCD driver 307 for driving the LCD element.

The expansion device MIE 304 is constituted similarly to the base device MIE, but it is note provided with an LM bus controller 203a or gates relating thereto. The LCD cartridge stores text data, still image data, animated image data (including LD, CD-V, DVD and TV video information) and the like transmitted in frame format from the host via the M bus, LM bus and MIE 304 in a RAM 303. This data to be displayed is then supplied by the CPU 301 to the LCD controller 306 and converted to images.

Furthermore, the computer system 300 also comprises a reset signal generating circuit for generating a reset signal when the power supply is turned on, a crystal oscillator for generating a clock signal and, provided if necessary, a voltage converting circuit (omitted from drawings) for generating a 3.3V voltage for the device MIE 205 signal, or the like, from the power supply Vcc (+5V). The power supply Vcc (5V, 3.3V) is supplied by the base device, but it is possible for the expansion device to generate the voltages it requires to achieve its intended functions by means of an internal circuit. On signal line ID2, the power supply voltage Vcc is applied to the expansion device side. In the expansion device in the absolute address system, as stated previously, terminals ID0 and ID1 for indicating the LM bus number are connected to the I/O section 305.

Figure 85:
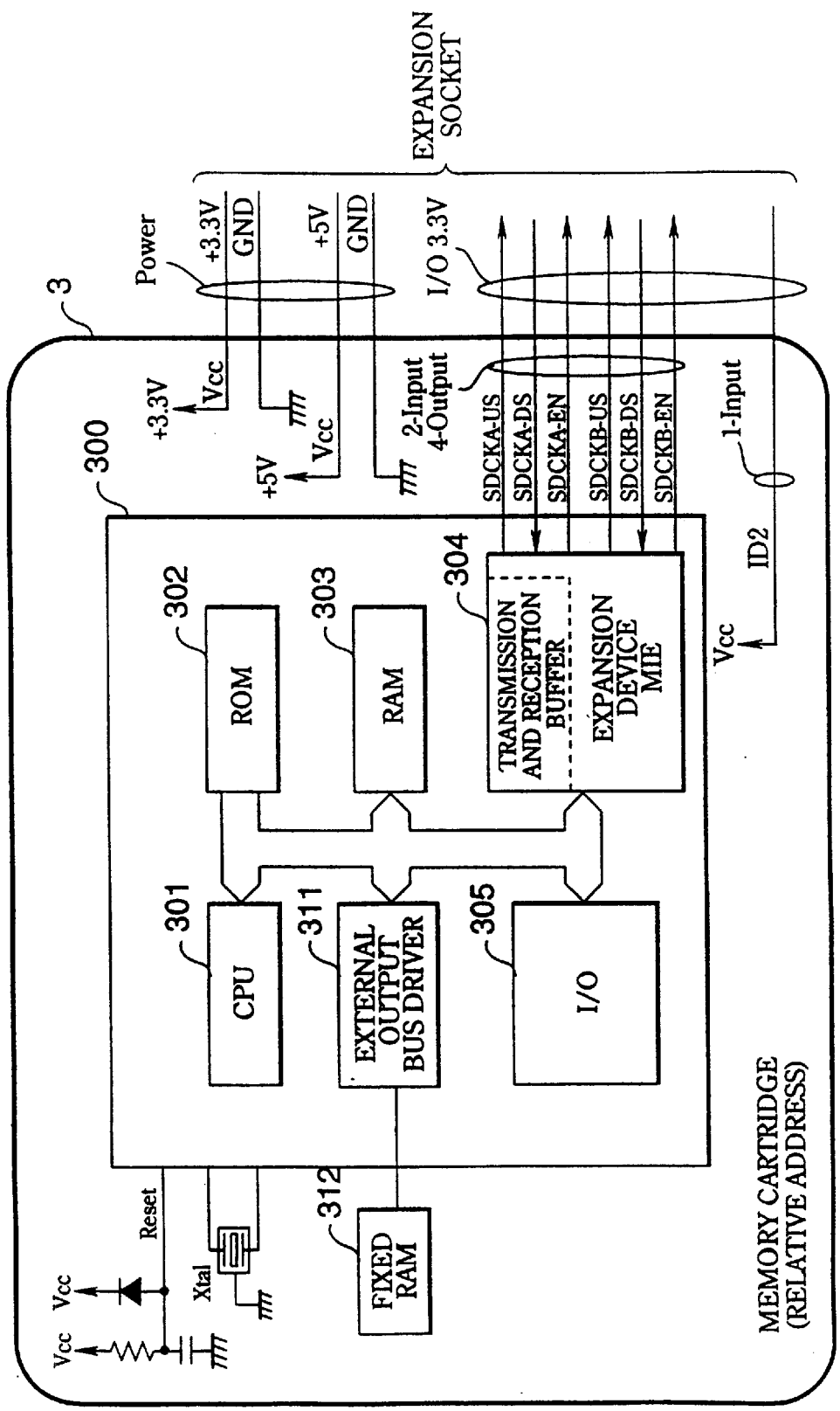
FIG. 85 is a block diagram showing an example of an expansion device (memory cartridge) having a relative address.
Figure 86:
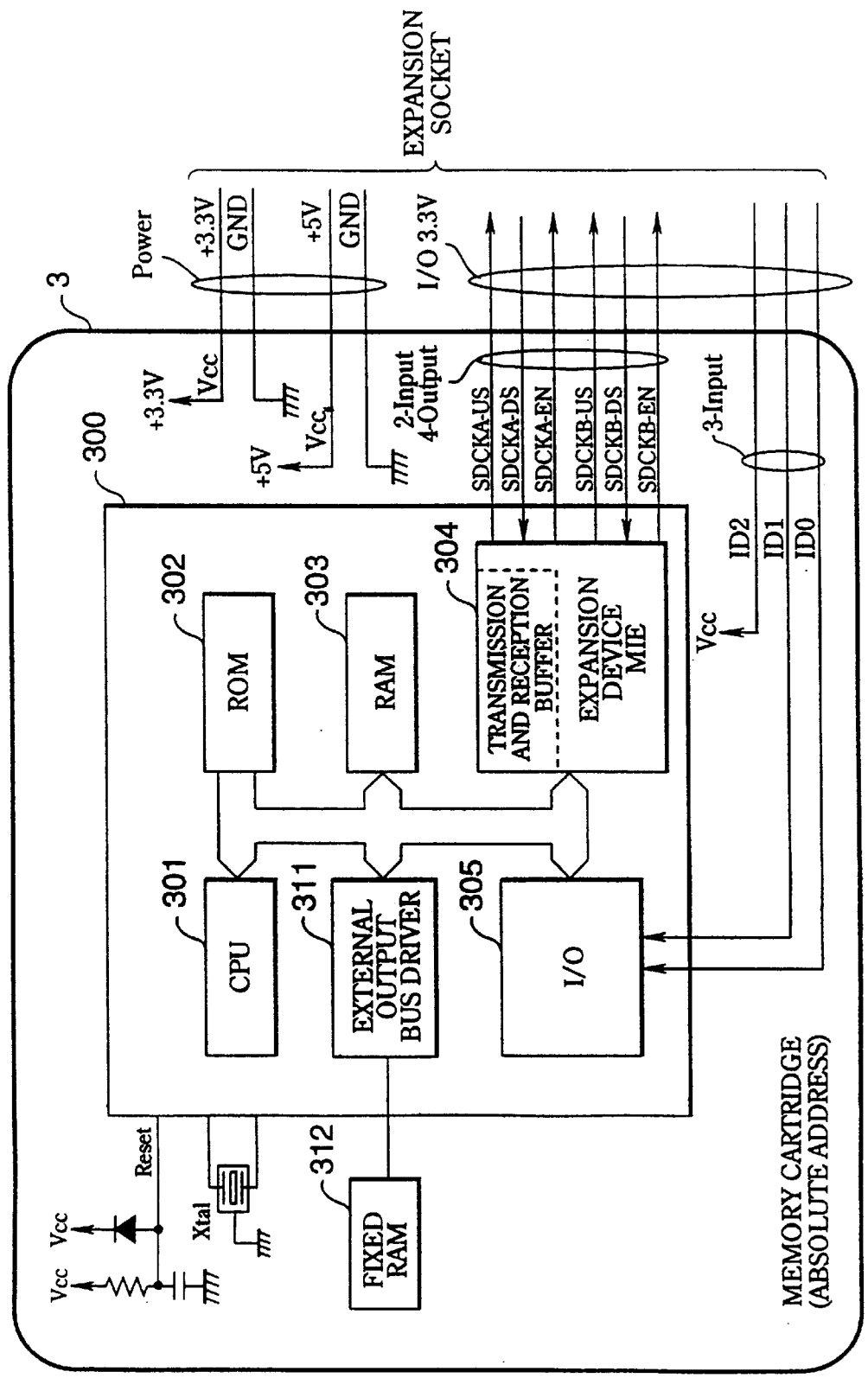
FIG. 86 is a block diagram showing an example of an expansion device (memory cartridge) having an absolute address.

FIG. 85 and FIG. 86 show examples of memory. cartridges (expansion devices) in a relative address system and absolute address system, respectively. In these diagrams, sections corresponding to FIG. 83 and FIG. 84 are labelled with the same symbols, and description of these sections is omitted.

In this example, a fixed RAM 312, such as an EEPROM or memory with battery back-up, etc., is provided. Data to be retained is stored in the RAM 303 by means of the MIE 304. The CPU 301 writes the stored data to the fixed RAM 312 via the external output bus driver 311. Furthermore, in accordance with instructions from the host, the CPU 301 also reads out data written in RAM 312 to a RAM 303, and then transfers it to the host via the MIE 304. For example, if the player halts the game midway through, by storing the game parameters transmitted by the host up to that midway point of the game, it is possible to start the next game from that midway point. The fixed RAM 312 connects to the bus driver 311 via a socket and it can be exchanged for a plurality of fixed RAMs 312 in card form. It is also possible to provide the fixed RAM 312 in the computer system 300.

Figure 87:
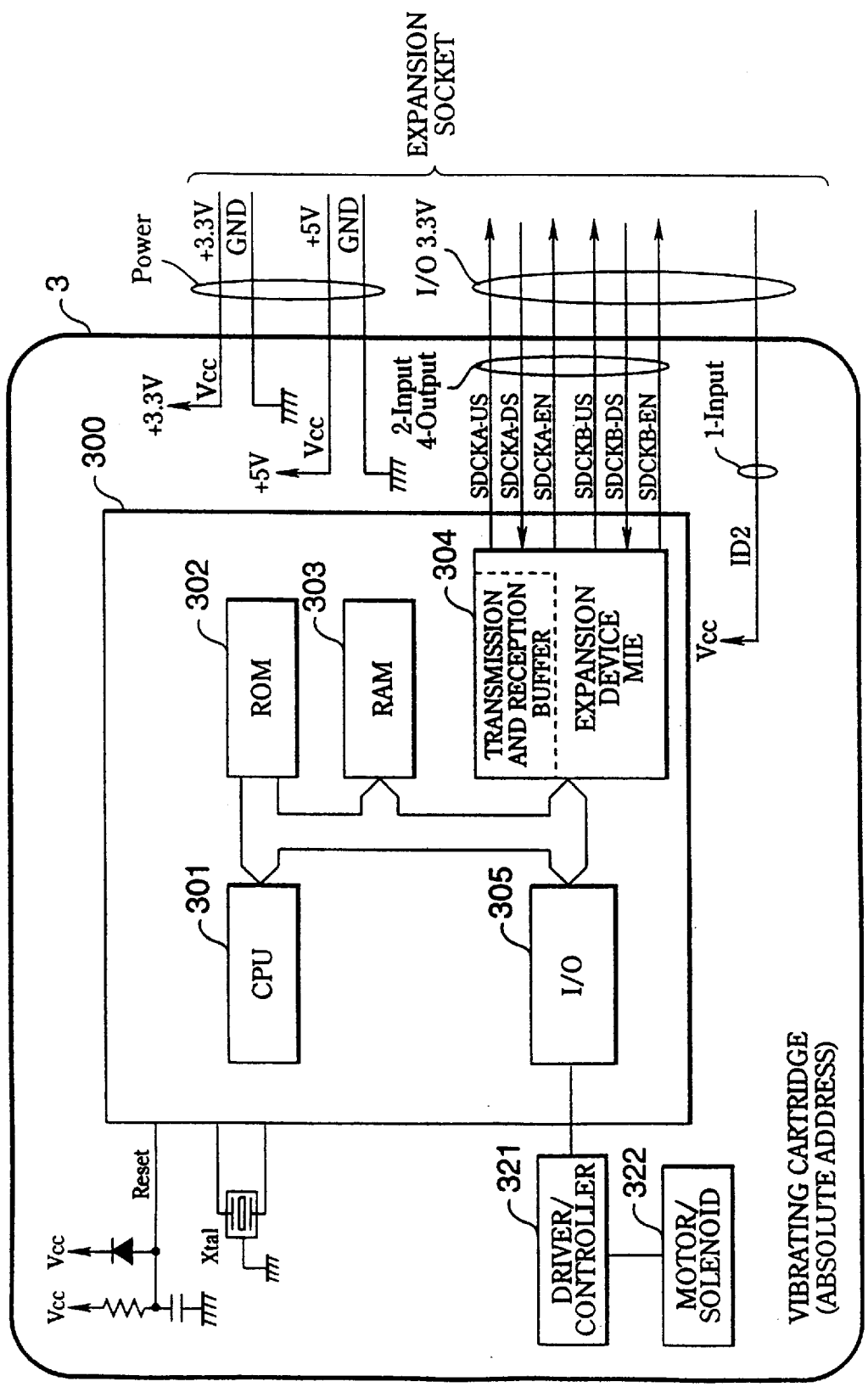
FIG. 87 is a block diagram showing an example of an expansion device (vibrating cartridge) having a relative address.
Figure 88:
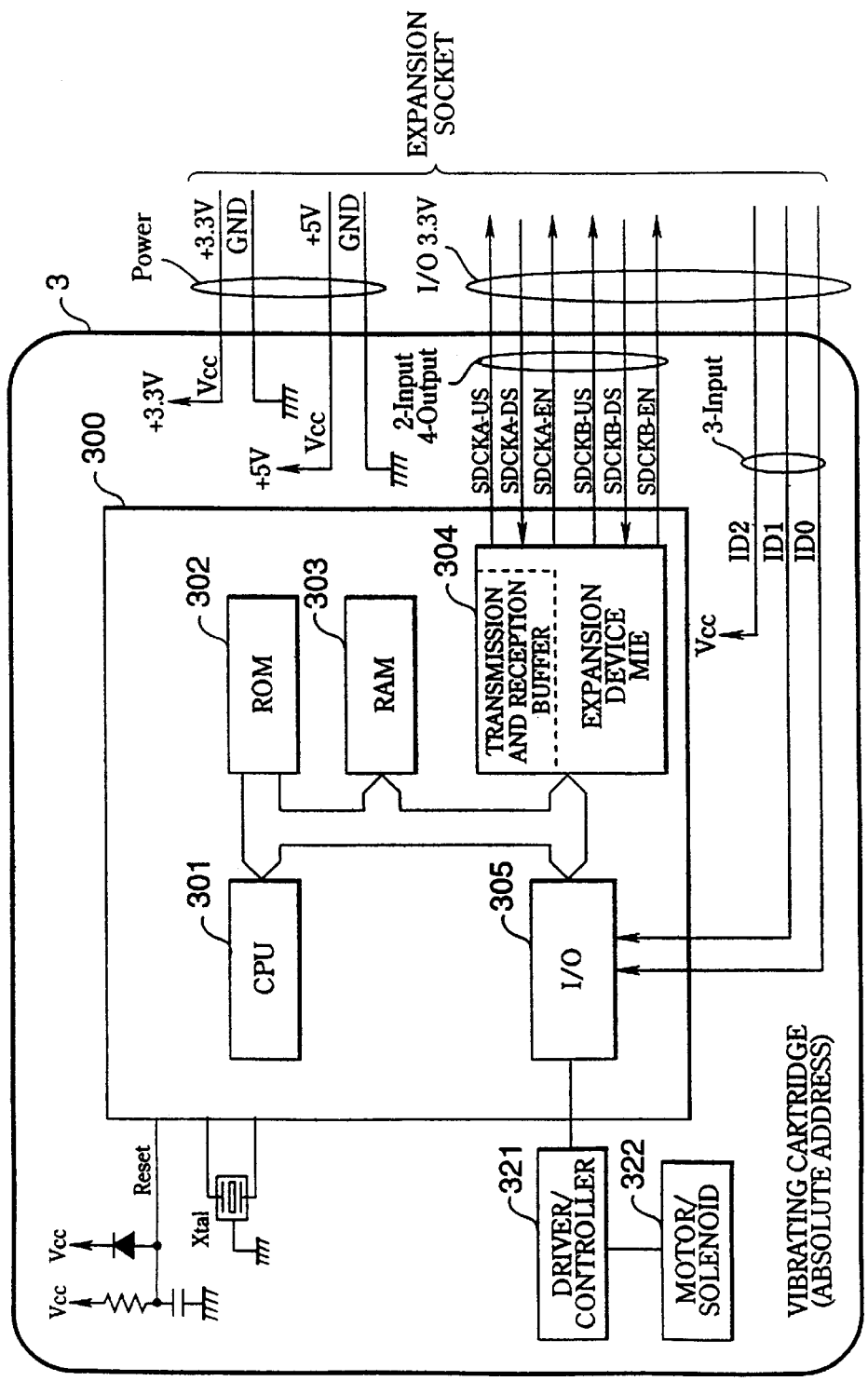
FIG. 88 is a block diagram showing an example of an expansion device (vibrating cartridge) having an absolute address.

FIG. 87 and FIG. 88 show examples of vibrating cartridges (expansion devices) in a relative address system and absolute address system, respectively. In these diagrams, sections corresponding to FIG. 83 and FIG.84 are similarly labelled, and these sections are not described here.

In these examples, a driver/controller section 321 is provided for driving a vibrating unit 322 by means of a motor, solenoid, or the like, which causes an eccentric weight to rotate, thereby generating a vibration. An activation command signal or activation halt command signal for the vibrating unit is stored in the RAM 303 by the host via the MIE 304, and it is supplied by the CPU 301 to the driver/controller section 321 via the I/O section 305.

Figure 89:
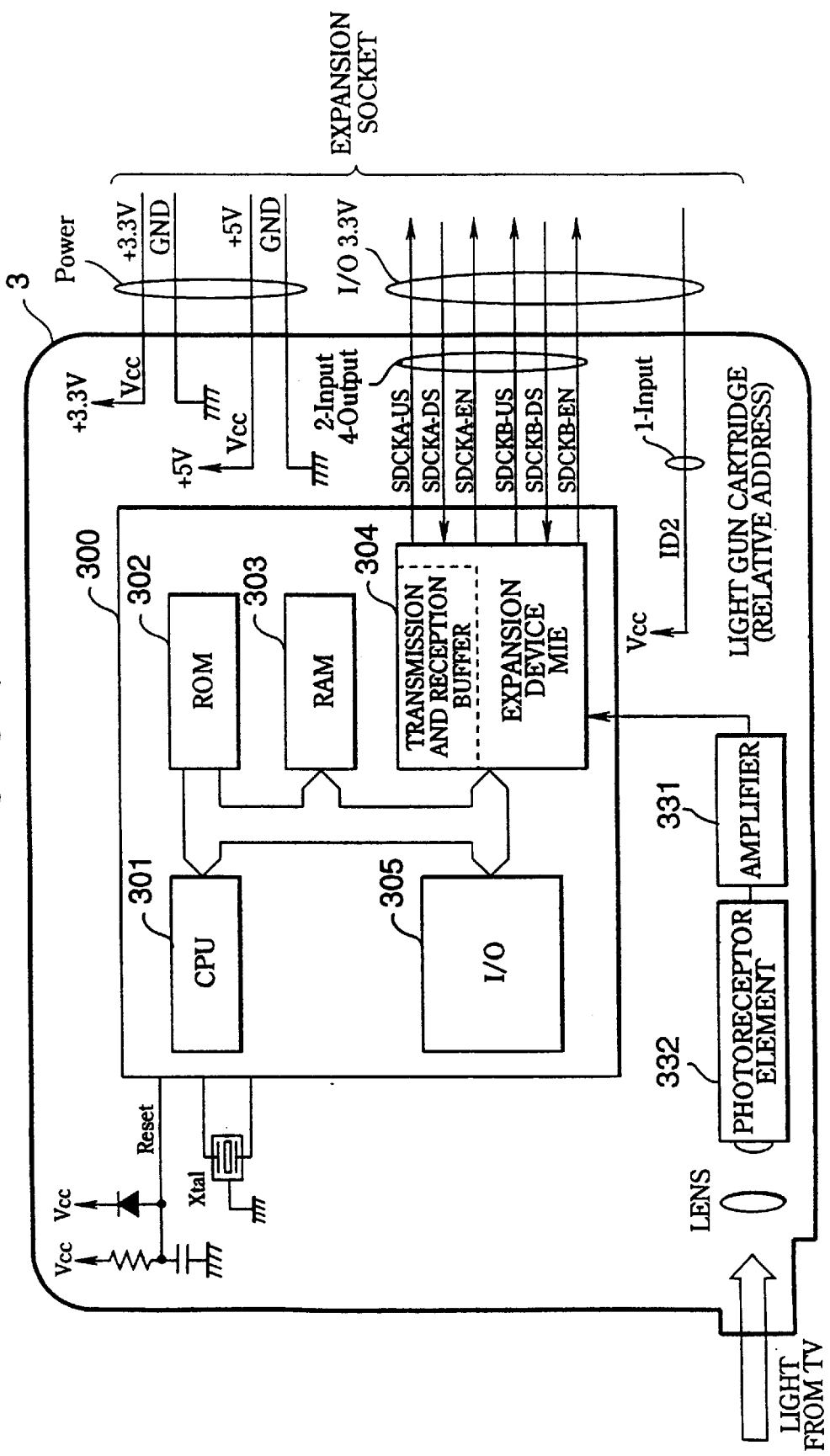
FIG. 89 is a block diagram showing an example of an expansion device (light gun cartridge) having a relative address.
Figure 90:
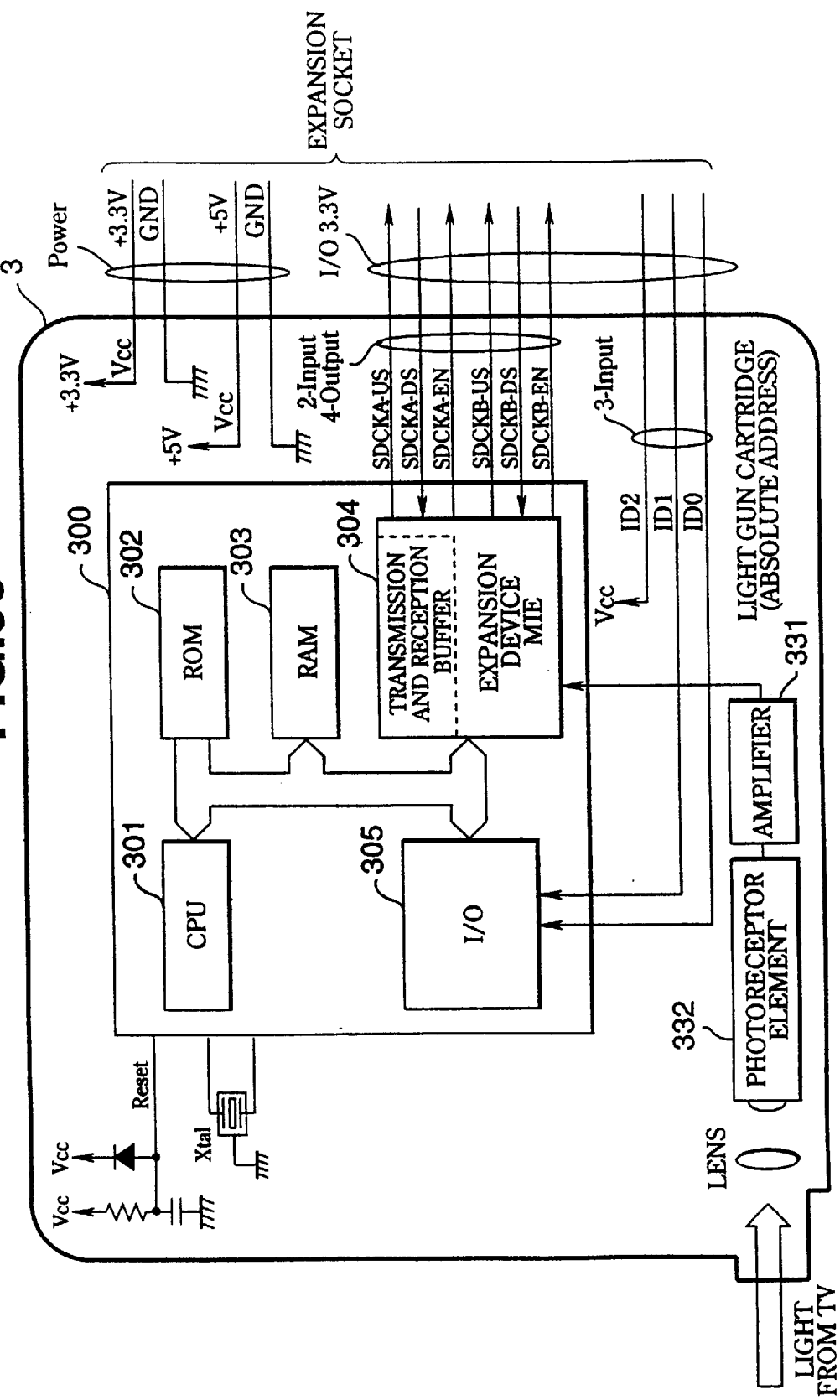
FIG. 90 is a block diagram showing an example of an expansion device (light gun cartridge) having an absolute address.

FIG. 89 and FIG. 90 show examples of light gun cartridges (expansion devices) in a relative address system and absolute address system, respectively. In the diagrams, the sections corresponding to FIG. 83 and FIG. 84 are similarly labelled, and these sections are not described here.

In these examples, the point of illumination of an electron beam scanning a certain portion (aim point of light gun) of a video screen, is read by a photoreceptor element 332 via a lens of the light gun cartridge. The level of the photoreceptor signal is amplified by an amplifier 331. When the trigger (e.g., element 2d in FIG. 97(b) described later) of the game controller is operated, a trigger signal is generated, and the output from the amplifier 331 is supplied as a detection signal to the MIE 304. This signal is transferred to the host and used as a latch signal for the HV counter.

Figure 91:
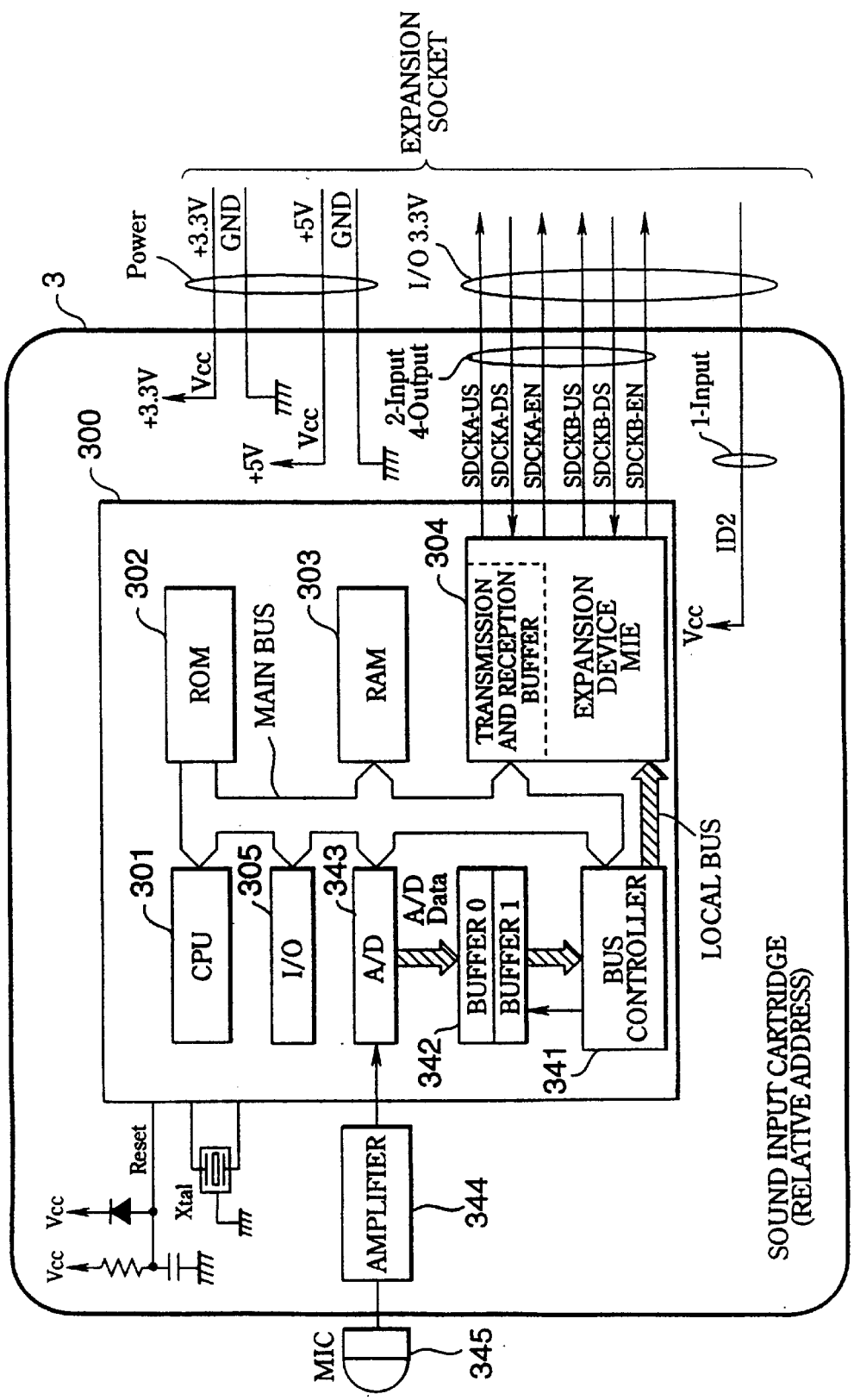
FIG. 91 is a block diagram showing an example of an expansion device (sound input cartridge) having a relative address.
Figure 92:
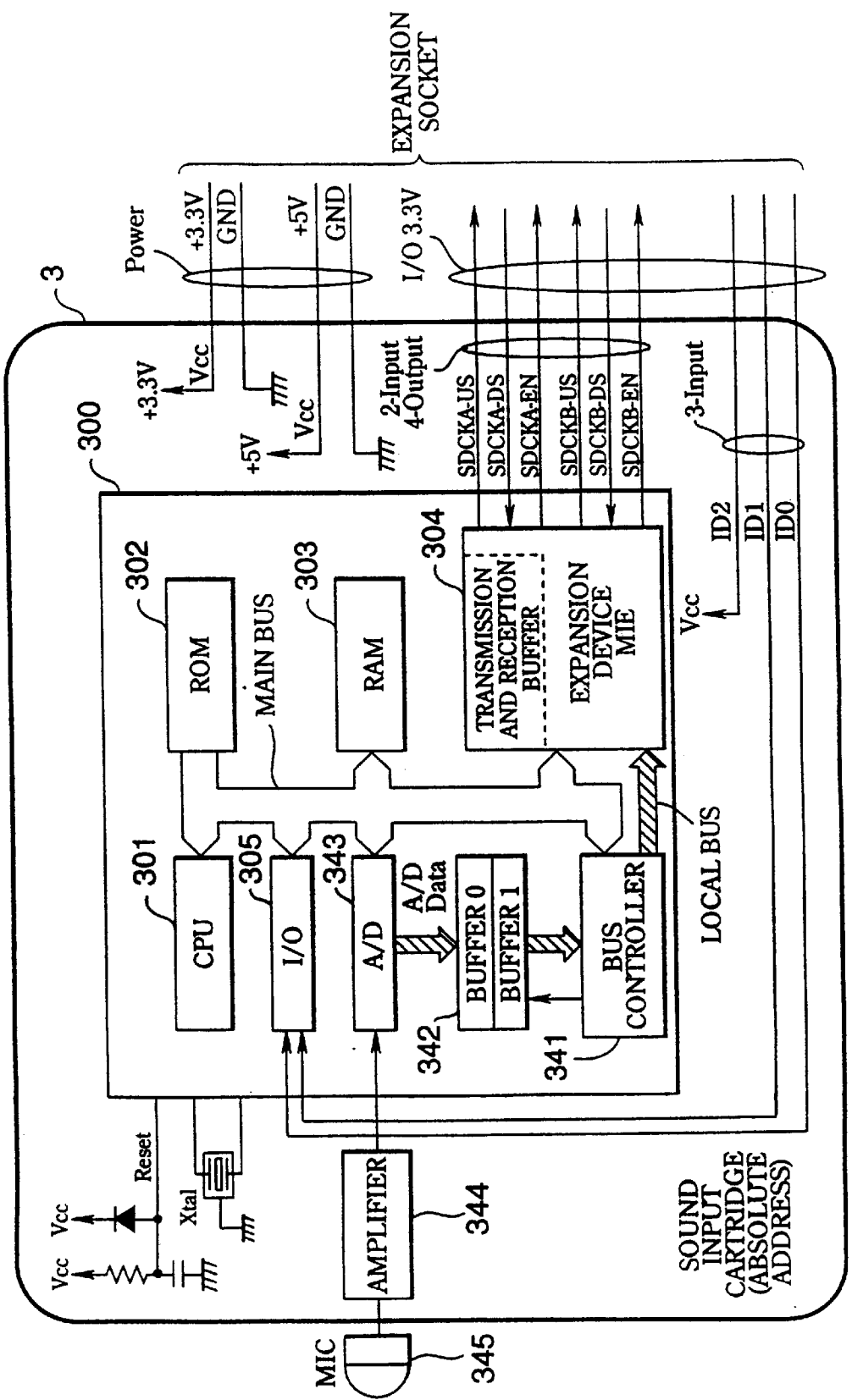
FIG. 92 a block diagram showing an example of an expansion device (sound input cartridge) having an absolute address.

FIG. 91 and FIG. 92 show examples of sound input cartridges (expansion devices) in a relative address system and absolute address system, respectively. In the diagrams, sections which correspond to FIG. 83 and FIG. 84 are similarly labelled, and these sections are not described here.

In these examples, the output of a microphone 345 is amplified to a suitable level by an amplifier 344 and then sampled by an A/D converter 343. The sampled sound data is stored alternately in first and second registers (FIFO) of a buffer memory 342. This data is read out by a bus controller 341 and transmitted to the transmission and reception buffer of the MIE 304. The sound data is formed into frames by the MIE 304 and transmitted to the host (game device). This function makes it possible to use the host as a sound input, "karaoke," telephone, or communications device.

Figure 93:
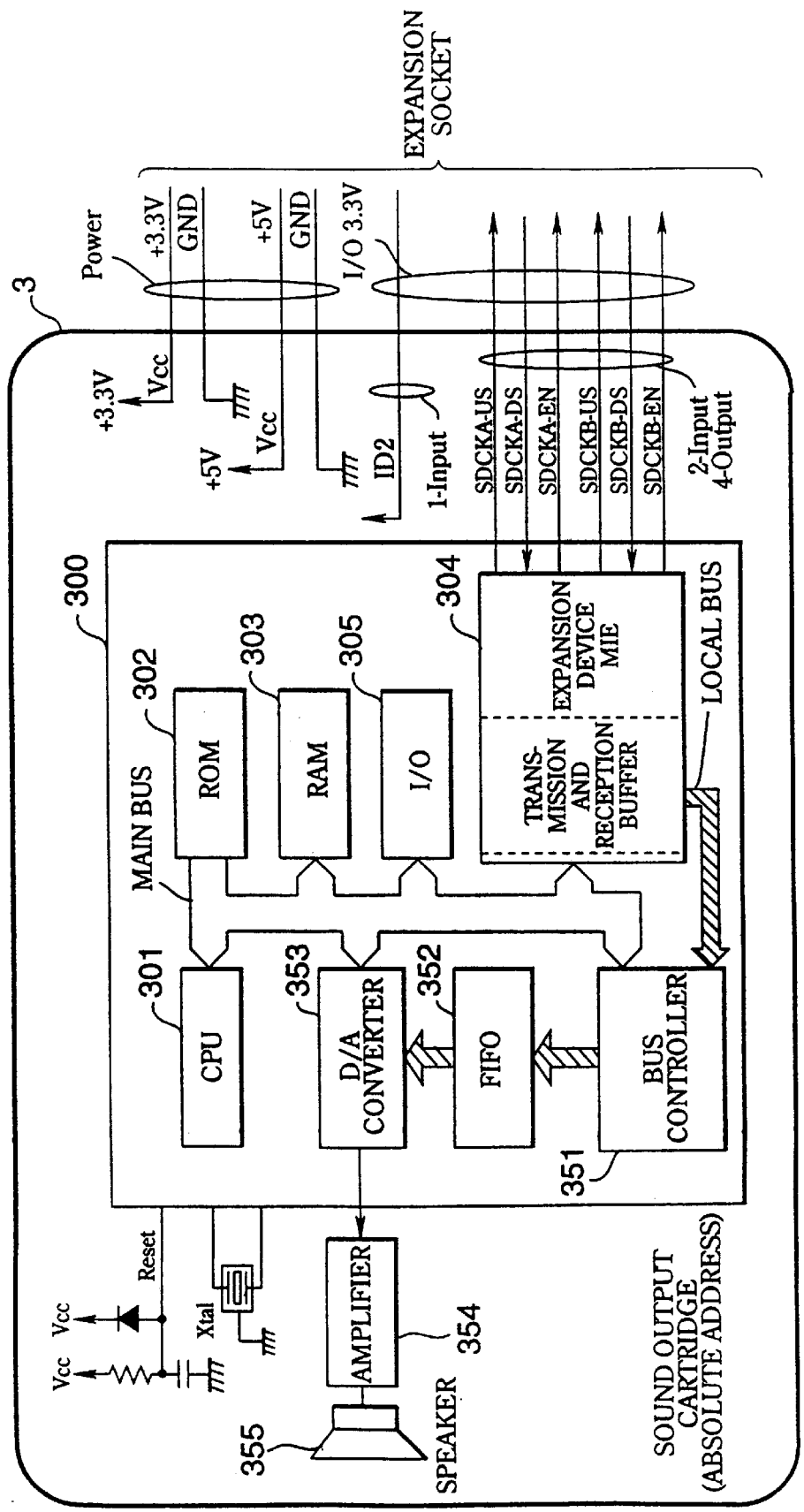
FIG. 93 is a block diagram showing an example of an expansion device (sound output cartridge) having a relative address.
Figure 94:
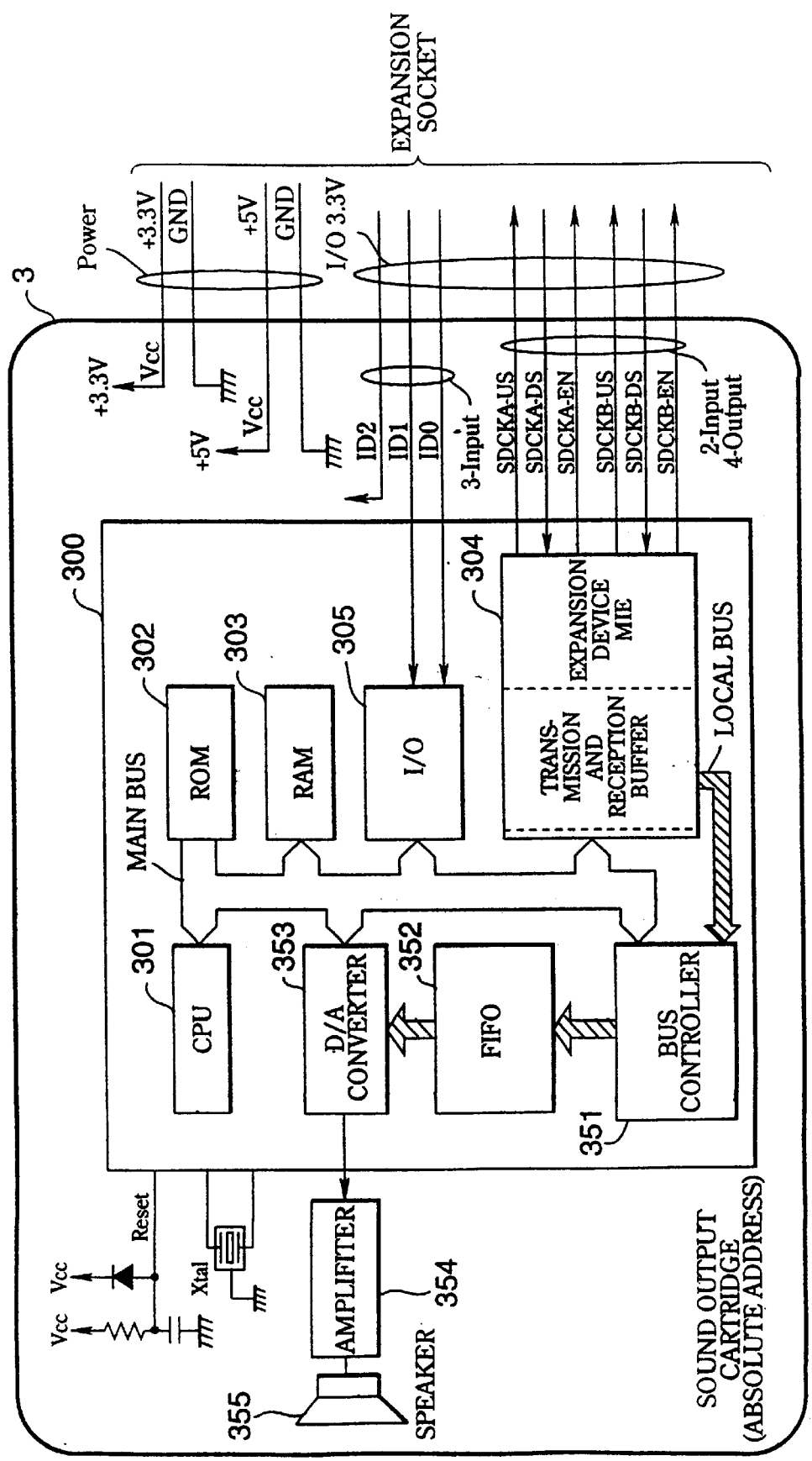
FIG. 94 is a block diagram showing an example of an expansion device (sound output cartridge) having an absolute address.

FIG. 93 and FIG. 94 show examples of sound output cartridges (expansion devices) in a relative address system and absolute address system, respectively. In the diagrams, sections which correspond to FIG. 83 and FIG. 84 are similarly labelled, and these sections are not described here.

In these examples, sound data transmitted by the host is supplied from the MIE 304 to a bus controller 351 via a local bus. The bus controller 351 stores sound data in a memory 352 based on a FIFO (First In First Out) operation, and it links together successively transmitted sound data. The sound data output by the memory 352 is converted to a sound signal by a D/A converter 352, its level is amplified by an amplifier 354, and it is output as sound from a speaker 355. This type of function enables the host to function as a sound response (sound output) device, game sound effects device (particularly sound effects using a plurality of speakers), "karaoke" device, telephone receiver, or the like.

The foregoing modes for implementing the present invention describe two standard formats, but it is also possible to combine elements of the first mode of implementation with elements of the second mode of implementation, provided that this produces no technological incompatibilities. Furthermore, the present invention is not restricted to game device applications, but can also be used with small-scale computer systems, computer networks, computer appliances, portable communications terminal devices, and the like.

Figure 95:
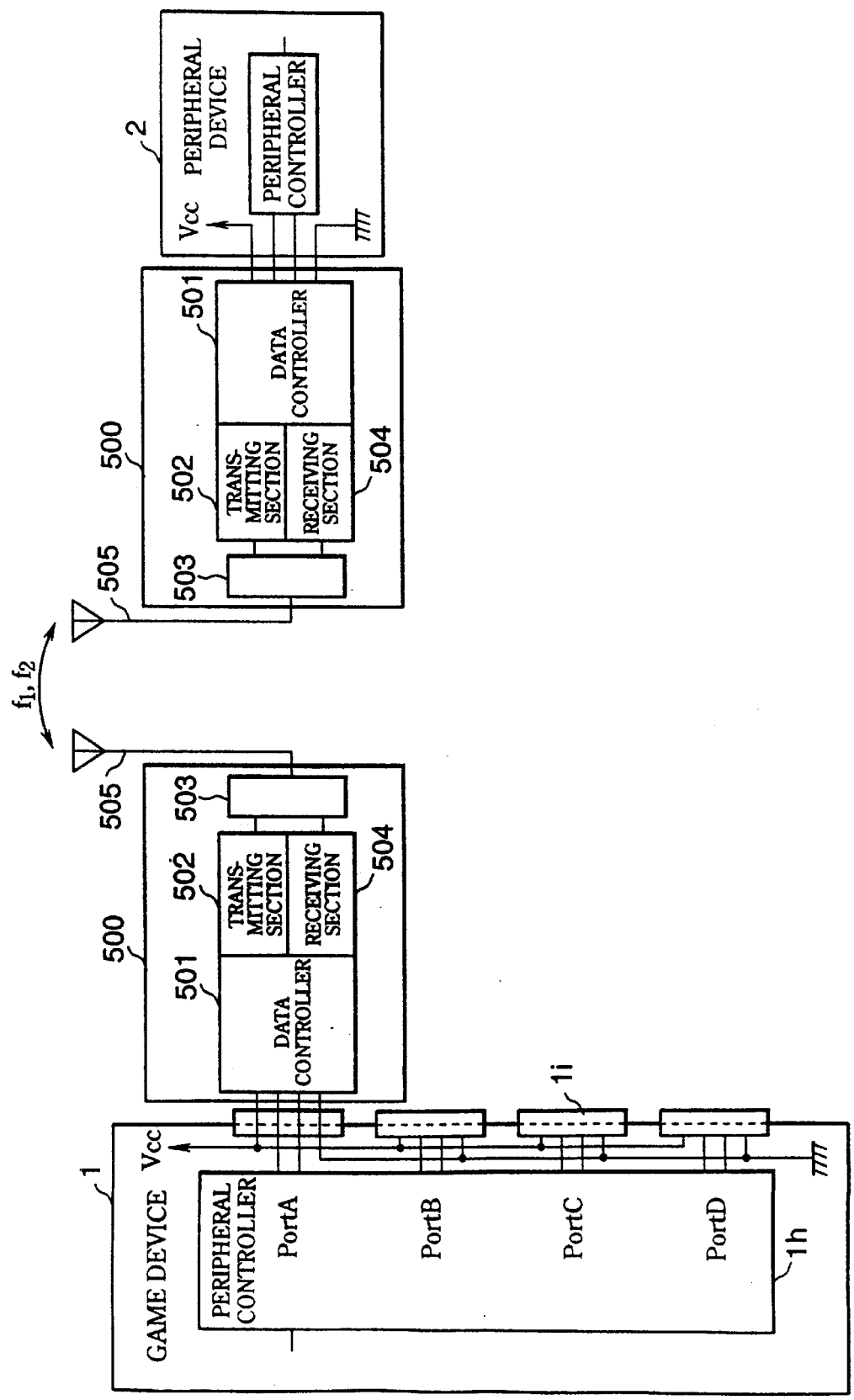
FIG. 95 is a diagram illustrating an example where an M bus is constitute by a wireless-system (radio)
Figure 96:
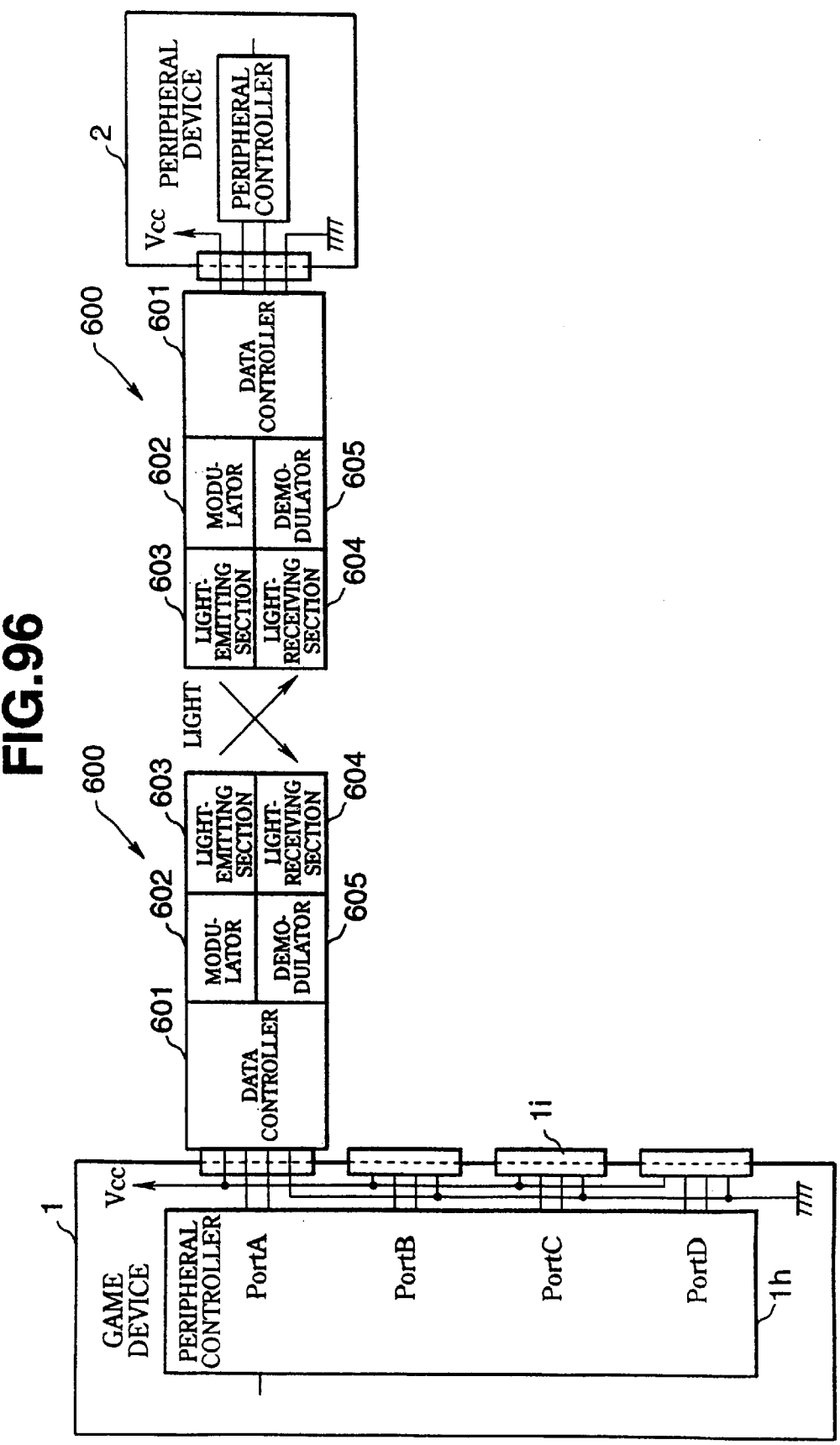
FIG. 96 is a diagram illustrating a further example where an M bus is constituted by a wireless system (optical transmission)

FIG. 95 and FIG. 96 illustrate further modes of implementation, wherein the M bus connecting the host to the peripheral devices has a wireless construction. In these diagrams, sections corresponding to the first and second modes of implementation are similarly labelled, and these sections are not described here.

In FIG. 95, radio modem devices 500 are connected respectively to the peripheral controller 1h of a host (game device) 1 and the peripheral controller of a peripheral device (base device) 2. The radio modem devices 500 comprise a data controller 501, transmission section 502, duplexer. 503, reception section 504, antenna 505, and the like, and they relay transmission data between the host and peripheral device. In this case, the peripheral device 2 can be battery operated.

The data controller 501 performs a multiple-value modulation of the SDCKA signal and SDCKB signal to be transmitted, for example, in order to transmit by $\pi/4$ shift QPSK modulation, the data is processed to create an I signal component and a Q signal component. These orthogonal data components are supplied to the transmission section 502. Furthermore, the data controller 501 creates an SDCKA signal and SDCKB signal from the I and Q data components decoded by the reception section 504, and supplies these signals to the peripheral controller 501. The transmission section 502 comprises a multiple-value modulator, for example, an orthogonal modulator for $\pi/4$ shift QPSK modulation, and it creates a carrier signal of frequency $f_1$, to carry the frame data. This carrier signal is fed to the antenna 505 by the duplexer 503, and transmitted into free space as an electromagnetic wave. At the peripheral device 2, on the other hand, the electromagnetic wave received at antenna 505 forms a carrier signal, which is supplied to the reception section 504 by the duplexer 503. The reception section 504 comprises, for example, a synchronous wave detector, which separates the I signal component and Q signal component from the carrier signal, and demodulates the multiple-value data. As stated previously, the data controller 501 creates an SDCKA signal and SDCKB signal from this multiple-value data, which it supplies to the peripheral controller 501.

Consequently, cables and the like for the M bus connecting the host and peripheral device become obsolete. The wireless peripheral device 2 increases freedom in the use specifications and separate layout design from the host. The aforementioned wireless modem device 500 may also make use of a portable telephone device (or PHS device). In this case, IC chips can be procured relatively inexpensively, and not only is wireless use of the peripheral device possible, but also a competitive game or the Internet can be used by connecting the host to a communications circuit.

The transmission system and reception system may be duplexed in accordance with the two signals SDCKA and SDKCB, or a composition employing two transmission channels $f_1$, $f_2$ may be used. Furthermore, after returning the SDCKA signal and SDCKB signal to a serial data frame signal, the data may be transmitted to the other side by means of a single communications channel $f_1$, the SDCKA signal and SDCKB signal being decoded from the demodulated frame signal on the receiving side.

FIG. 96 shows an example where the wireless composition shown in FIG. 95 is constituted by means of optical communications. In this diagram, the sections corresponding to FIG. 95 are similarly labelled, and these sections are not described here.

In this example, an infrared modem device 600 is constituted by a data controller 601, modulator 602, light-emitting section 603, light-receiving section 604, demodulating section 605, and the like. The data controller 601 returns the SDCKA signal and SDCKB signal to a serial data frame signal. The modulator 602 modulates the drive current by means of a frame signal. Level modulation or frequency modulation may be selected, for example. The drive current is supplied to a light-emitting element of the light-emitting section 603, for example, an infrared-emitting LED to flash the LED on and off. The flashing LED light is transmitted externally via an optics system. This transmitted light is input to the light-receiving section 604 of the other infrared modem device 600. The input light is converted to an electrical signal by a photoreceptor element, for example, a phototransistor, and then demodulated to a digital data signal by the demodulating section 605. This data signal is returned to an SDCKA signal and SDCKB signal by means of the data controller 601, which are transmitted to the peripheral controller. The peripheral controller in the host (game device) 1 or peripheral device 2 has been described already. In this way, the M bus may be constituted by a radio (wireless) system rather than a wired system.

Figure 97A:
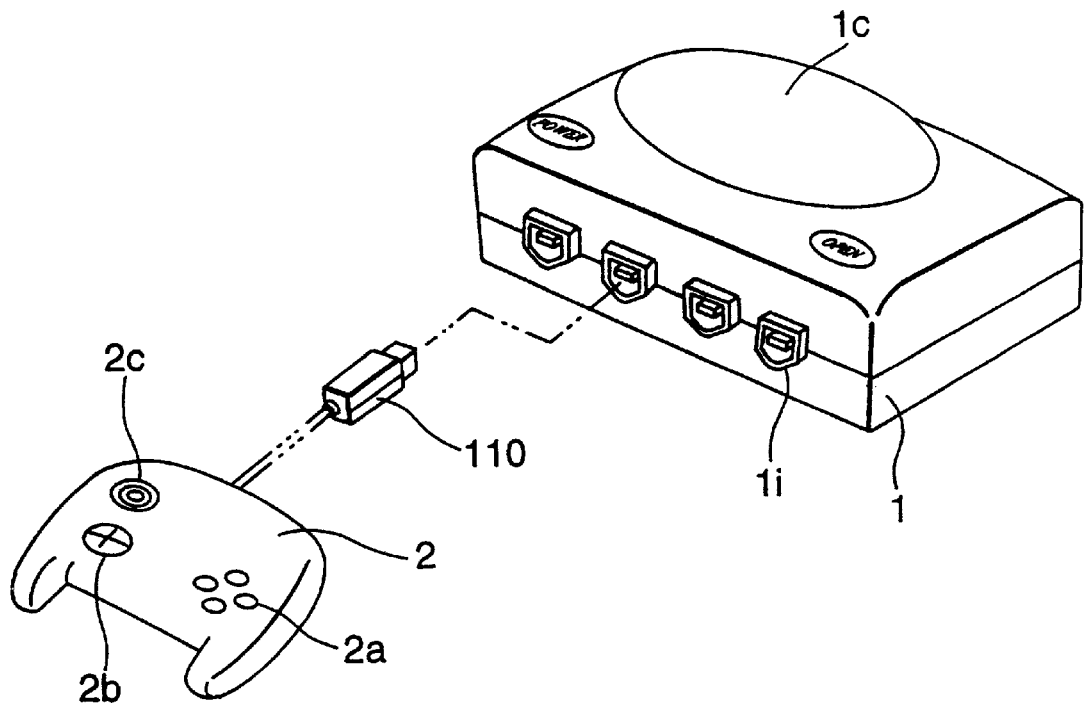
FIG. 97 (a) is a diagram illustrating an M bus connector of a game controller.
FIG. 97(b) is a diagram illustrating an LM bus connector of a game controller.

Next, the connectors and the like in the host and peripheral device are described with reference to FIG. 97. FIG. 97(a) is an illustrative diagram showing an M bus connector which connects a game device 1 forming the host to a base device (game controller) 2 forming a peripheral device. In this diagram, the sections corresponding to FIG. 1 are similarly labelled.

Figure 97B:
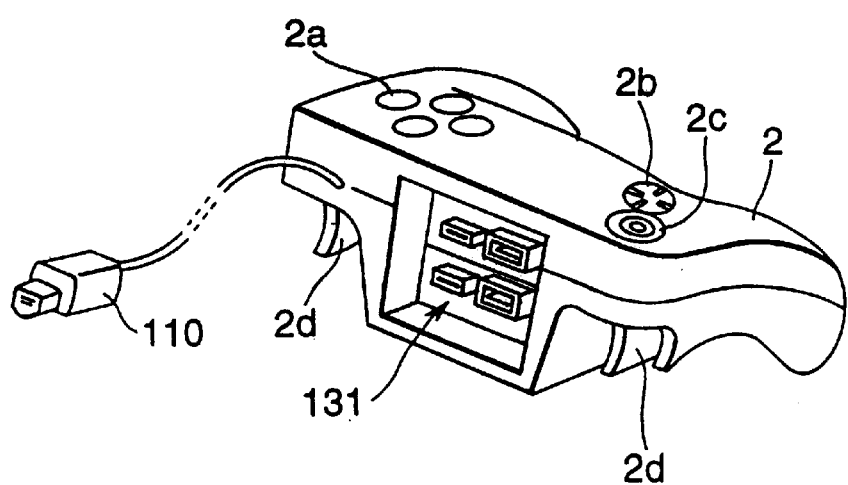

In the example in FIG. 97, four connectors (sockets) 1i are provided on the side face of the game device. Connectors (plugs) 110 of the game controller 2 are connected to any of the connectors 1i. The sockets 1i and plugs 110 are each of the following format comprising 5 terminals (pins). Buttons A, B, C and D (A, B, C, D switches) 2a and a cross-shaped key 2b (up/down left/right direction indicator switch) are, provided on the upper face of the game controller 2, and a trigger lever (trigger switch) 2d is provided on the holding section of the game controller 2 (see FIG. 97(b)). These various buttons actuate digital input switches 206. Furthermore, analogue buttons (analogue keys) 2c are provided for actuating analogue switches 207 in order to conduct analogue input. The analogue keys are used, for example, for moving cursors and pointers on the screen.

FIG. 97(b) is an illustrative diagram for describing an LM bus connector 131 connecting the base device (game controller) 2 with an expansion device 3 (omitted from drawings). In this diagram, the sections corresponding to FIG. 97(a) are similarly labelled, and these sections are not described here. On the rear side of the game controller 2 facing the game device 1c, there are provided two LM bus connectors (sockets) 131.

Figure 98A:
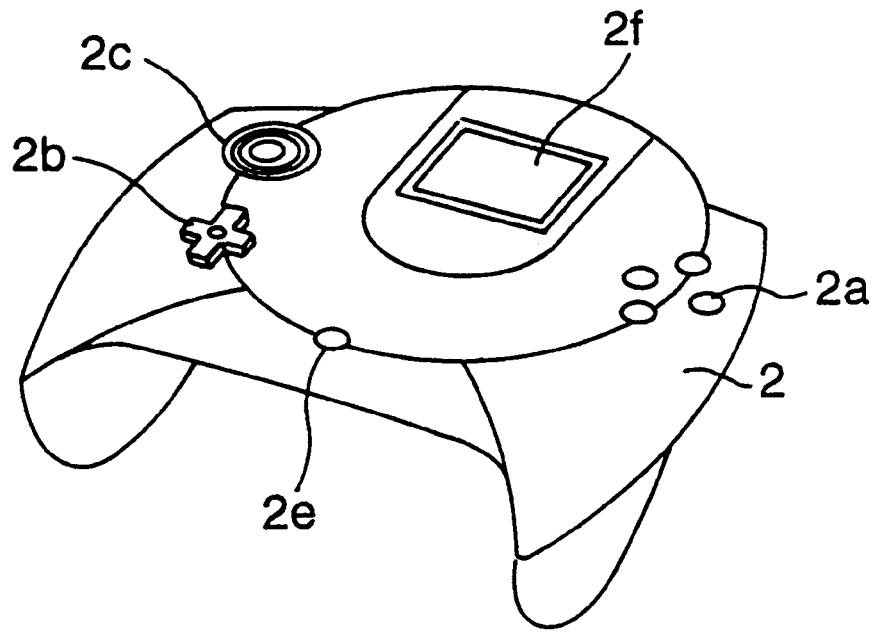
FIG. 98 is a diagram illustrating a further example of a game controller.

FIG. 98(a) shows a further example of a game controller. This game controller has functions which incorporate a game controller.

In this diagram, the game controller 2 comprises A, B, C, D buttons 2a, a cross-shaped key 2b, analogue keys 2c, lever 2d (see FIG. 97(b) described above), and start button (start switch) 2e. Moreover, a slot is provided for inserting an expansion device into the rear side of the game controller (see FIG. 97(b)). A window 2f is provided in the centre of the upper face of the game controller 2, towards the rear side thereof.

Figure 98B:
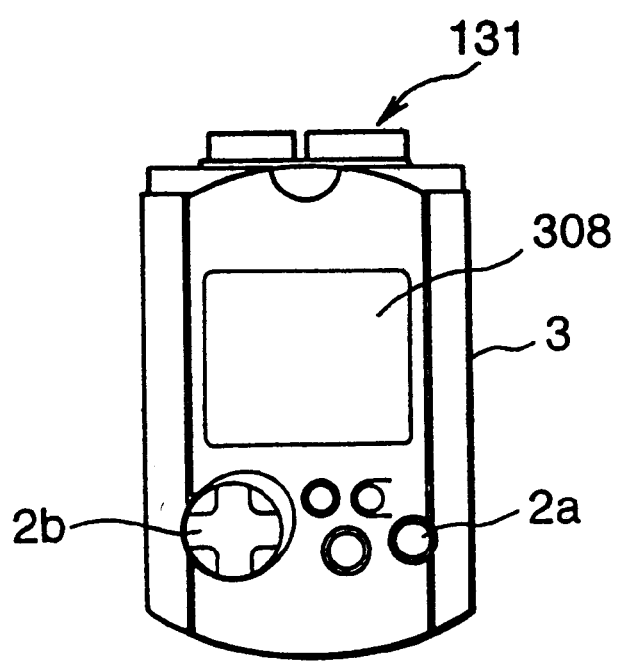

FIG. 98(b) shows an example of an LCD cartridge forming an expansion device 3. The LCD cartridge is composed such that, when the LCD cartridge 3 is inserted into the aforementioned slot and connected to the game controller 2 via the expansion connector 131, the LCD panel 308 is positioned directly below the window 2f. Consequently, when an LCD cartridge 3 is connected to the game controller 2, it is possible to view video images and the like transmitted from the game device 1 on the game controller 2. Furthermore, this LCD cartridge 3 is also provided with a cross-shaped key 2b, A, B, C, D buttons 2a, and the like, such that the LCD cartridge 2 as a unit can be used as a portable game device.

Figure 99:
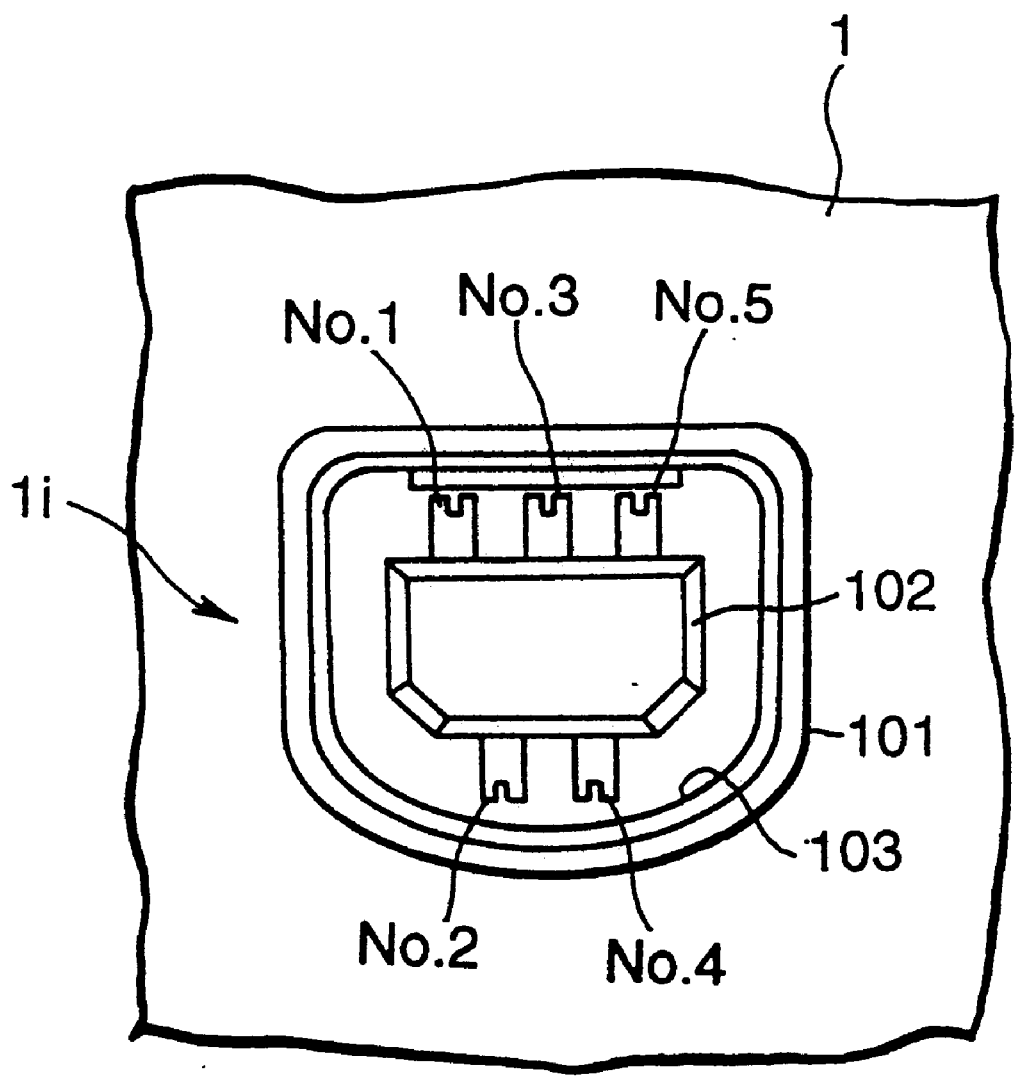
FIG. 99 is a side view illustrating an example of a socket of an M bus connector.
Figure 100A:
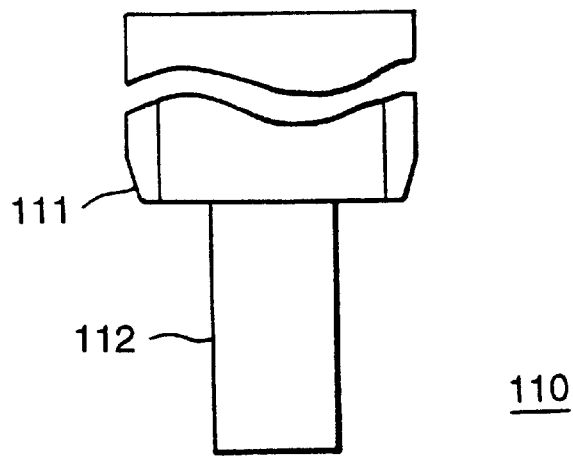
FIG. 100 (a) is a side view illustrating an M bus connector plug.
FIG. 100(b) is a top view of this plug.
FIG. 100(c) is a front view of this plug.
Figure 100B:
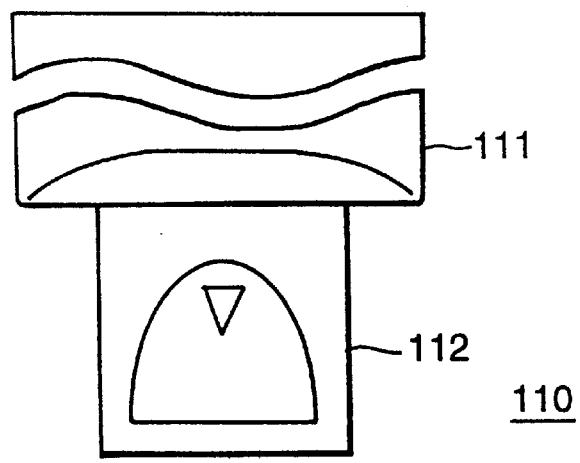
Figure 100C:
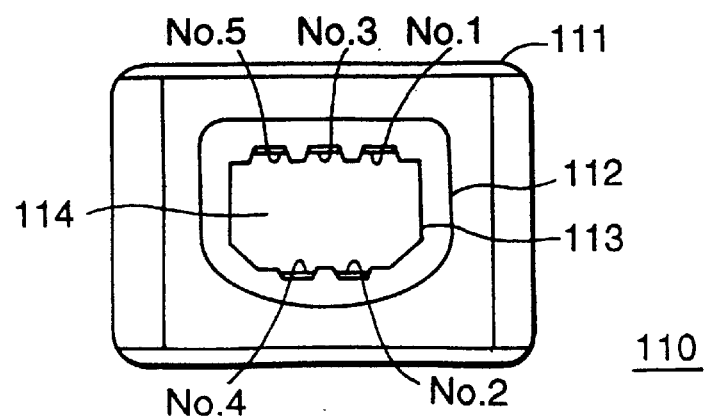
Figure 101:
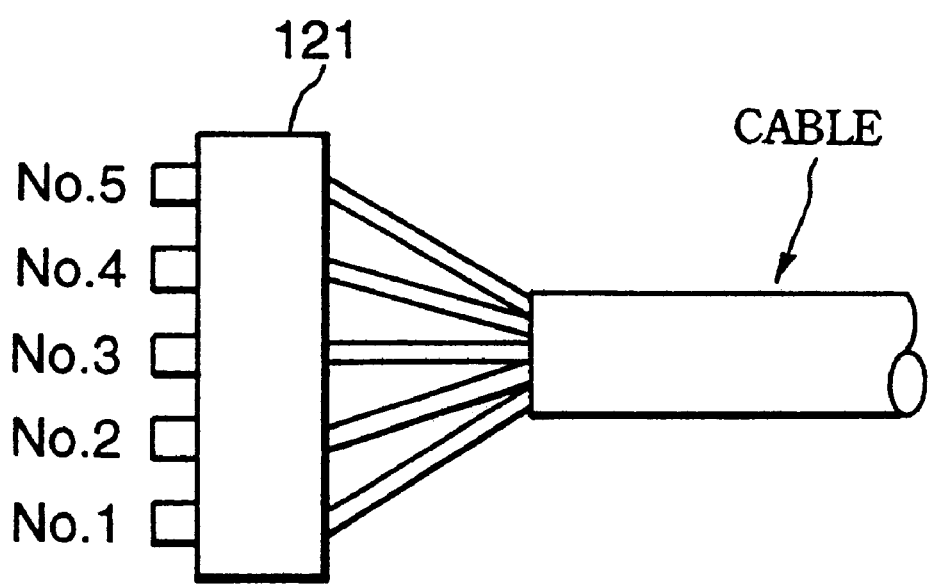
FIG. 101 is a diagram of a connector provided on the peripheral device (base device) side of an M bus cable.

FIG. 99–FIG. 101 are diagrams showing the composition of an M bus connector used in an M bus.

FIG. 99 gives an approximate illustration of the socket side of a bus connector 1i provided in the case of a host 1, viewed from the front direction (direction connector is inserted). The socket comprises an approximately D-shaped perimeter section 101, an approximately D-shaped hexagonal pin base 102, and an approximately D-shaped groove 103 formed between the perimeter section 101 and the pin base 102. The socket is an extruded moulding made from insulating plastic, and contact pins No. 1, No. 3, No. 5 are formed on the principal face (upper face) of the pin base 102, whilst contact pins No. 2 and No. 4 are formed on the opposite face (lower face) thereof, which is parallel to the principal face. Contact pin No. 2 is positioned opposite the insulating region between contact pins No. 1 and No. 3, such that it is not liable to produce capacitive coupling with contact pins No. 3 or No. 5. Each contact pin is a flexible metal component and is connected respectively to five circuit board connection terminals on the rear side of the pin base 102, which is omitted from the drawings. Contact pins No. 1 and No. 5 are connected respectively to data lines SDCKA and SDCKB. Contact pin No. 3 between contact pins No. 1 and No. 5 is connected to a shield wire, which prevents coupling between contact pins No. 1 and No. 5 connected respectively to the data lines. Contact pins No. 2 and No. 4 are power supply lines and are respectively connected to a power supply Vcc and an earth line GND. As stated previously, the metal surfaces of contact pins No. 2 and No. 4 are positioned such that they are not directly opposite the metal surfaces of the contact pins No. 1, No. 3 and No. 5, and therefore the power supply Vcc and the earth line GND have little effect on the data lines.

FIG. 100 shows the composition of the plug side of the bus connector 1i corresponding to this socket. FIG. 100(a) is a side view of the plug; FIG. 100(b) is a top view; and FIG. 100(c) is a front view. The plug is moulded from a plastic with good insulating properties, and 111 is a housing for containing the connecting sections between wires and contact pin terminals, 112 is an inserting section having an approximately D-shaped cross-section corresponding to the shape of the groove 103 in the socket, 113 is an approximately D-shaped inner wall of the inserting section, 114 is a groove of a shape corresponding to the outer shape of the pin base 102, and No. 1–No. 5 are contact pins provided in the inner wall 113. Each contact pin is a flexible metal component, and is provided corresponding to the respective pins in the socket. The two sets of contact pins No. 1–No. 5 are connected to each other by inserting the inserting section 112 of the plug into the groove 103 in the socket.

FIG. 101 is a side view illustrating a connector (plug) on the peripheral device (base device) side of an M bus cable. Plug 121 moulded from plastic having good insulating properties comprises terminals No. 1–No. 5 which connect to the different wires in the cable. The terminals are provided in a row on one side of an approximately rectangular or plate-shaped socket. This socket 121 is connected to the wires of a circuit board in the peripheral device by means of a connector (socket), or by direct soldering.

Figure 102A:
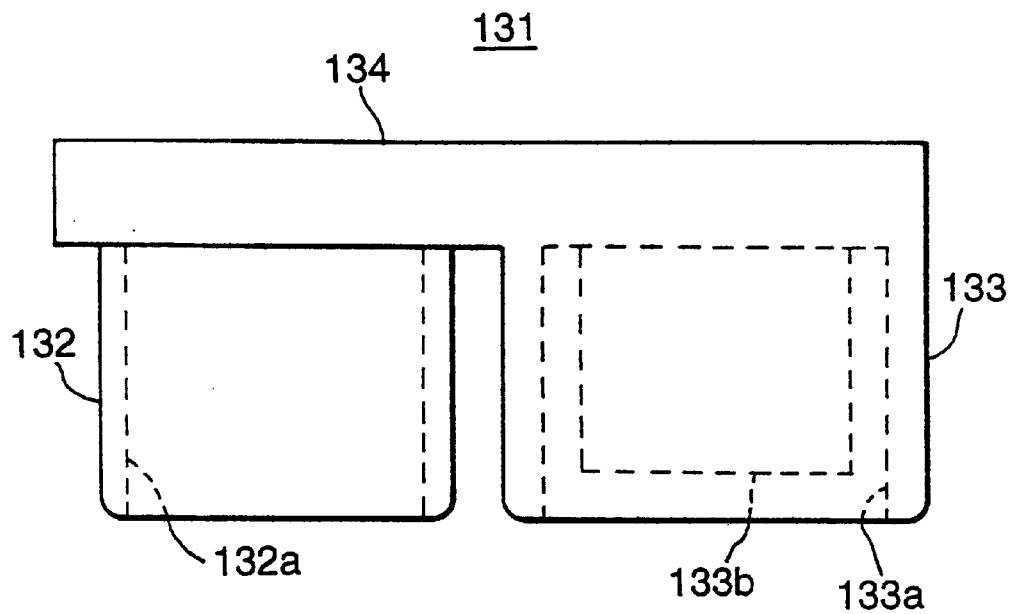
FIG. 102(a) is a top view of an LM bus connector socket.
Figure 102B:
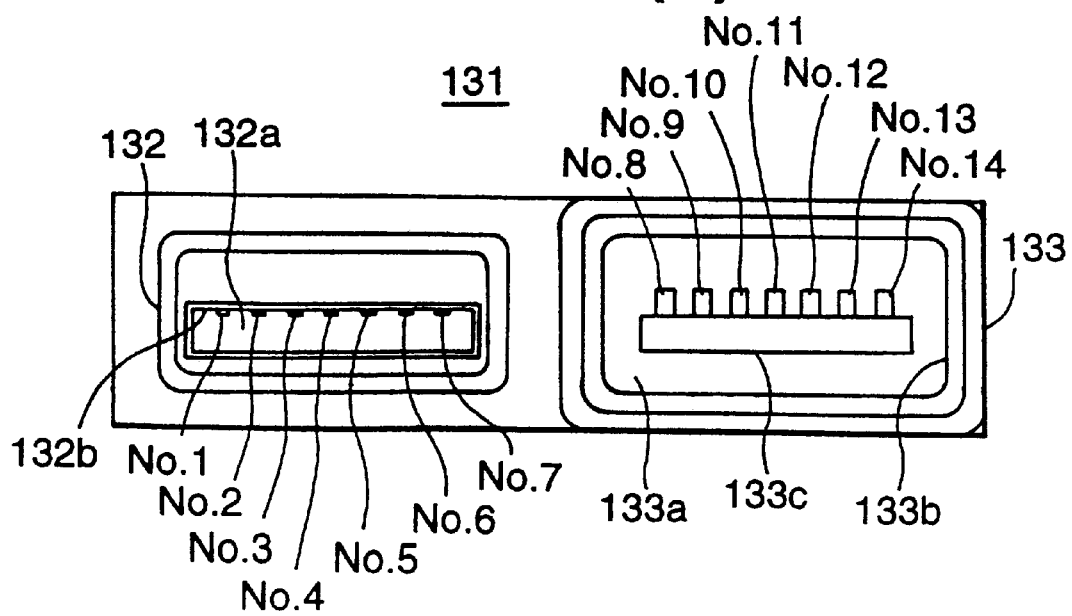
FIG. 102(b) is front view of this plug.
Figure 103A:
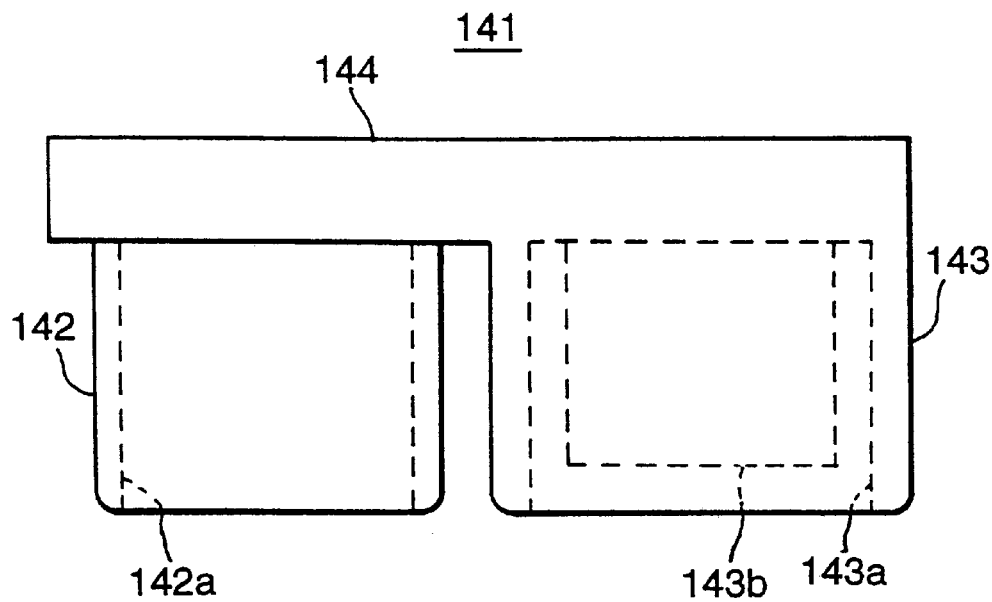
FIG. 103(a) is a top view of an LM bus connector plug.
Figure 103B:
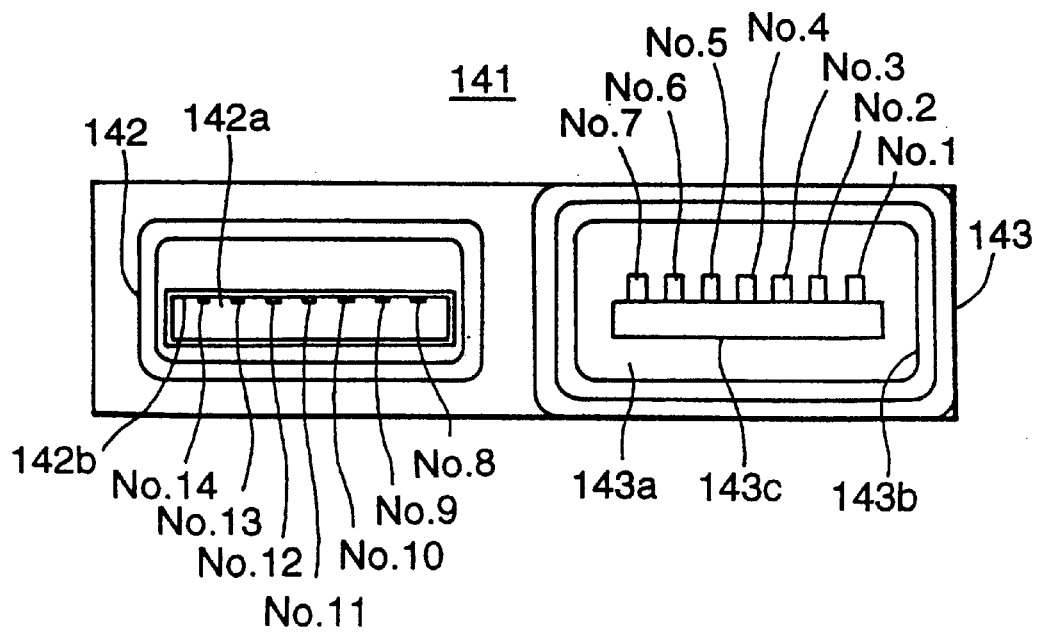
FIG. 103(b) is a front view of this plug.

FIG. 102 shows a compositional example of a socket 131 of an LM bus connector which connects a base device to an expansion device. FIG. 102(a) is a top view, and FIG. 102(b) is a front view. Furthermore, FIG. 103 shows a compositional example of a plug 141 in an LM bus connector. FIG. 103(a) is a top view, and FIG. 103(b) is a front view.

In general terms, the socket 131 comprises an inserting section 132, a receiving section 133 and a housing 134 which couples or accommodates these two sections. Similarly, the plug 141 also comprises an inserting section 142, a receiving section 143 and a housing 144 which couples or accommodates these two sections. The inserting section 132 of the socket 131 is inserted into the receiving section 143 of the plug 141, and the inserting section 142 of the plug 141 is inserted into the receiving section 133 of the socket 131.

The inserting section 132 of the socket 131 is a bar-shaped component projecting from the left side of the front face of the housing 134, and an inserting groove 132a having a thin rectangular shape extending in a lateral direction is formed on the front end of this bar-shaped component. The inserting groove is a groove provided for inserting the inserting section 132 into a groove 143a on the plug 141 such that it is positioned over a plate-shaped pin base 143c in the groove 143a. The inserting groove 132a is formed towards the bottom of the end of the bar-shaped component from the centre thereof in the vertical direction, in order to prevent incorrect insertion, and also in order to arrange the plurality of contact pins in approximately the centre of the bar-shaped component 132. Metal contact pins No. 1–No. 7 are provided in a row on the upper face of the inner wall 132b of the inserting groove 132a. These contact pins are located in an approximately central position in the vertical direction of the bar-shaped unit 132. Although not shown in the diagram, each of the contact pins No. 1–No. 7 extend to a plurality of connection terminals provided respectively corresponding to the contact pins No. 1–No. 7, on the rear side of the housing 134, and are thereby connected to circuit board wiring or a cable. Contact pins No. 1–No. 7 are connected respectively to power supply line Vcc (3.3V), power supply line Vcc (5V), control line SDCKA EN, data line SDCKB DS, data line SDCKA US, identification line ID1, and earth line GND.

The receiving section 133 in the socket 131 is a bar-shaped component projecting from the right side of the front face of the housing 134, and an O-shaped groove 133a surrounding the pin base 133c is formed on the front end of this bar-shaped component 133. The shape of the inner wall 133b of the groove 133a corresponds to the outer shape of the inserting section 142 of the plug 141. The pin base 133c in the centre of the groove is a plate-shaped component having a shape corresponding to the thin rectangular groove 142a which extends in a lateral direction. The upper face of the pin base 133c is formed such that it is in an approximately central position in the vertical direction of the end of the bar-shaped component 133, and flexible metal contact pins No. 8–No. 14 are arranged on this upper face. Although not illustrated in the diagram, the respective contact pins No. 8–No. 14 are connected respectively to an earth line GND, identification line ID2, data line SDCKB DS, data line SDCKB US, control line SDCKB EN and identification line ID0. Contact pin No. 14 is not used at present and forms a spare terminal.

The plug 141 inserted into the socket 131 is formed similarly to the socket 131. However, as shown in FIG. 103(a), contact pins No. 1–No. 7 are provided inside the receiving section 143, and contact pins No. 8–No. 14 are provided inside the inserting section 142.

Since the expansion connector having the aforementioned composition comprises inserting sections 132, 142 and receiving sections 133, 143 which are each formed separately and have mutually different external shapes, the user is able to identify at a glance the direction in which the socket 131 and plug 141 are to be connected. Furthermore, since connection is only possible in one direction (configuration), incorrect connection does not occur. Moreover, there is a, merit in that the user's hands do not touch the connecting pins directly.

As described above, according to the present invention, data communications can be conducted between a game. device (or host) and peripheral devices by means of two data lines and a relatively simple I/O circuit composition.

Furthermore, when conducting data communications, since addresses are set automatically for a plurality of devices connected to a network, peripheral devices can be connected freely to the game device (or host), and the game device can identify the details of a connected peripheral device, which is advantageous in a consumer-oriented computer system, such as a game device.

What is claimed is:

1. A game device comprising:

a peripheral port adapted to be connected to at least one peripheral device via a data transmission path contained therein and to receive and transmit data which is allocated in a first data signal and a second data signal, said first and second data signals being arranged in data frames;

one data frame of said first and second data signals including a start pattern, a data pattern and an end pattern;

said start pattern having a data format wherein, while said first data signal transmits a constant potential level, said second data signal transmits a first train of pulses;

said data pattern having a data format including a first clock signal in said first data signal and a second clock signal in said second data signal and data to be transmitted to said peripheral device being divided into a first data sequence and a second data sequence and added respectively to said first and second clock signals by inserting in order each bit of the first data sequence respectively between pulses of said first clock signal and by inserting in order each bit of the second data sequence respectively between pulses of said second clock signal, said second clock signal having the same frequency as, and a phase difference from, said first clock signal so that a data bit in one of said first and second data signals is located at a timing corresponding to a clock signal component of a clock pulse in the other of said first and second data signals;

said end pattern having a data format wherein, while said second data signal transmits a constant potential level, said first data signal transmits a second train of pulses;

wherein said game device transmits said data frame containing said start pattern, said data pattern and said end pattern as a transmission unit to said at least one peripheral device.

2. The game device according to claim 1, wherein said first and second data sequences comprise serial data, said first data sequence includes odd-numbered bits of said data to be transmitted to said at least one peripheral device, and said second data sequence includes even-numbered bits of said data to be transmitted to said at least one peripheral device.

3. The game device according to claim 1, wherein said phase difference is set such that a data bit contained in one of the first and second data signals is located at a timing corresponding to the pulse edge of the clock signal component of the clock signal contained in the other of said first and second data signals.

4. The game device according to claim 1, further comprising a plurality of peripheral ports and wherein said data pattern comprises a command and a parameter, said parameter comprises an address of the respective one of said plurality of peripheral devices connected to said game device, the address of the peripheral port with which said respective one of said plurality of peripheral devices is connected and data to be transmitted from the game device to the respective one of said plurality of peripheral devices.

5. The game device according to claim 1, wherein said signal transmission path comprises at least one pair of data signal lines being arranged such that said first and second data signals are transmitted separately through said at least one pair of data signal lines.

6. A game device comprising:

a main data transmission path;

a plurality of input/output ports adapted to be connected to a base peripheral device via said main data transmission path, said base peripheral device having a structure such that an expansion peripheral device is connectable thereto via an auxiliary data transmission path; and an input/output controller operatively connected to said plurality of input/output ports, said controller controlling data communications with the base peripheral device via the main data transmission path and with an expansion peripheral device via the main and auxiliary data transmission paths when an expansion peripheral device is connected to the base peripheral device, said data communications being conducted with data signals according to a data transmission format;

said data transmission format including a start pattern representing the start of a data pattern, a data pattern carrying transmission data, and an end pattern representing the end of a data pattern;

said data pattern including a command and a parameter;

said parameter including a destination address indicative of a device to which data is to be sent and a source address indicative of a device at which data to be sent is generated;

the game device generating the source address indicative of the game device so as to include the input/output port information representing the input/output port to which the base peripheral device is connected;

the base peripheral device generating the source address indicative of the base peripheral device based on the input/output port information supplied by the game device via said main data transmission path, identification information stored in, and indicative of, the base peripheral device being a master peripheral device to be connected directly with the game device via the main data transmission path, and connection status information identifying whether an expansion peripheral device is connected to said auxiliary data transmission path;

an expansion peripheral device generating the source address indicative of the expansion peripheral device, when the expansion peripheral device is connected to said auxiliary data transmission path, based on the input/output port information supplied by the game device via said main and auxiliary data transmission paths, the auxiliary transmission path information supplied by the base peripheral device indicative of the auxiliary transmission path to which the expansion peripheral device is connected, and identification information stored in, and indicative of, the expansion peripheral device being a slave peripheral device to be connected with said auxiliary data transmission path.

7. The game device according to claim 6, further comprising said base peripheral device, wherein said base peripheral device comprises a plurality of auxiliary data transmission paths, and said plurality of auxiliary data transmission paths are connected respectively in parallel and commonly to said main data transmission path.

8. The game device according to claim 6, further comprising said base peripheral device and said expansion peripheral device, wherein said base and expansion peripheral devices store information inherent thereto including information identifying each of the base peripheral device and the expansion peripheral device as a master peripheral device and a slave peripheral device, respectively, and said game device retrieves the inherent information via said main and auxiliary data transmission paths.

9. The game device according to claim 8, wherein compatibility between the base peripheral device and the expansion peripheral device and a game application being executed on the game device is determined based on said inherent information.

10. The game device according to claim 6, wherein said main data transmission path includes at least two data lines, and data to be transmitted is allocated into two data signals and said two data signals are transmitted via said two data lines, respectively.

11. The game device according to claim 1, further comprising said data transmission path, wherein said signal transmission path includes at least one pair of wireless communication channels being arranged such that said first and second data signals are transmitted separately through said at least one pair of wireless communication channels.

12. The game device according to claim 11, wherein said wireless communication channels are radio or optical communication channels.

13. A game device comprising:

a plurality of peripheral ports each being adapted to be connected to a peripheral device via a signal transmission path contained therein, the game device and the peripheral device transmitting data interactively through said signal transmission path by allocating the data bits of the data in a first data signal and a second data signal each including a data frame;

one data frame of said first and second data signals including a start pattern, a data pattern and an end pattern, said start pattern having a data format wherein one of the first and second data signals transmits a first train of pulses in a time period during which the other of the first and second data signals transmits a constant potential level;

said data pattern having a data format including a first clock signal in said first data signal and a second clock signal in said second data signal and the data bits of said data to be transmitted being divided into a first data sequence and a second data sequence and arranged relative to said first and second clock signals by sequentially allocating each data bit of the first data sequence respectively between pulses of said first clock signal and by sequentially allocating each bit of the second data sequence respectively between pulses of said second clock signal, said second clock signal having the same frequency as, and a phase shifted with respect to, said first clock signal so that a data bit in one of said first and second data signals appears at a timing corresponding to a clock signal component of a clock pulse in the other of said first and second data signals;

said data in the data pattern including a command and a parameter, said parameter including an address of a sending device which is sending data, and an address of a receiving device which is receiving data;

said end pattern having a data format arranged such that one of said first and second data signals transmits a second train of pulses having a different number of pulses than the number of pulses of said first train pulses in a time period during which the other of said first and second data signals transmits a constant potential level;

said sending device transmitting the first and second data signals with said data frame containing said start pattern, said data pattern and said end pattern as a transmission unit, and said receiving device receiving the first and second signals and retrieving the data out of the first and second data signals by alternately latching a potential level of one of the first and second data signals at a timing of a clock signal component of the other of the first and second data signals.

14. A game device according to claim 12, wherein, when the game device sends data to the peripheral device, the address of the sending device is the address of the peripheral port with which the peripheral device is coupled via the signal transmission path, the address of the receiving device is the address of the peripheral device to which the game device transmits data.

15. A game device according to claim 14, further comprising a peripheral device connectable to the game device, wherein, when the peripheral device sends data to the game device, the address of the sending device is the address of the peripheral device, the address of the receiving device is the address of the peripheral port with which the peripheral device is coupled via the signal transmission path.

16. A game system comprising:
a game device;
a peripheral device including a device function;
a transmission path connecting said game device and said peripheral device, said transmission path including a pair of transmission channels transmitting a pair of serial data signals, said transmission path being arranged to transmit data by allocating data bits of the data in said pair of serial data signals;
each of the pair of serial data signals including a data frame defining a transmission unit and including a start pattern, a data pattern and an end pattern;
said data pattern having a data format wherein said pair of serial data signals include clock pulses and the allocated data bits of the data to be transmitted so that the data bits of the data to be transmitted is alternately inserted in order between clock pulses of said pair of serial data signals, the sequence of clock pulses in one of said pair of serial data signals having the same frequency as, and a phase shifted from, the sequence of clock pulses in the other- of said pair of serial data signals so that a data bit in one of said pair of serial data signals occurs at a timing corresponding to a clock signal component of a clock pulse in the other of said pair of serial data signals;
the game device and the device function of the peripheral device interactively transmitting data by allocating data bits of the data in the pair of serial data signals with said data format and the receiving device receiving said pair of serial data signals and retrieving the data out of the received pair of serial data signals by alternately detecting in order a data bit in one of said pair of serial data signals occurring at a timing of a clock signal component of a clock pulse in the other of said pair of serial data signals.

17. A game system according to claim 16, wherein said start pattern includes a data format in which one of the pair of serial data signals transmits a first sequence of pulses during a time period in which the other of the pair of serial data signals transmits a constant potential level;
said end pattern includes a data format in which one of the pair of serial data signals transmits a second sequence of pulses during a time period in which the other of the pair of serial data signals transmits a constant potential level.

18. The game system according to claim 16, wherein the clock signal component is detected at an edge of at least one of a plurality of clock pulses of the pair of serial data signals.

19. The game system according to claim 17, wherein said constant potential level is one of a power source potential and a ground potential.

20. The game system according to claim 17, wherein said first and second sequences of pulses includes numbers of pulses which are different from each other.

21. The game system according to claim 16, wherein said pair of transmission channels include at least one pair of data signal lines arranged such that said pair of serial data signals are separately transmitted in a respective one of said at least one pair of data signal lines.

22. The game system according to claim 16, wherein said at least one pair of transmission channels includes at least one pair of wireless communication channels being arranged such that each of said first and second data signals is transmitted through a respective one of said at least one pair of wireless communication channels.

23. The game system according to claim 22, wherein said wireless communication channels are radio or optical communication channels.

24. A game system according to claim 16, wherein: the data pattern sent from the game device comprises a command which requests the device function to send data, the command being included in the data retrieved by the receiving device; and
the device function receives the pair of serial data signals and retrieves data out of the received pair of serial data signals and, in response to the command included in the retrieved data, transmits data generated in the device function by allocating the data bits of the data into a new pair of serial data signals in accordance with said data format via said transmission path to the game device.

25. A came system according to claim 24, further comprising a plurality of peripheral ports each defined with unique port information;

said peripheral device includes at least a device function, each device function has an address generated on the basis of peripheral device identification information which identifies a type of the peripheral device and is stored in the peripheral device and on the basis of information relating to the input/output port which information is sent from said game device when the peripheral device is connected to the port via said transmission path, the address generated being stored in the peripheral device while interactive communication between the game device and the device function is active;

the peripheral device compares the address stored therein with the address included in the data pattern sent from the game device, and transmits data generated in the device function with said data format to the transmission path in response to the data request by the game device when the address stored in the peripheral device is the same as the address included in the data pattern sent from the game device.

26. A peripheral device for use with a game device according to claim 1, comprising:

a random signal generator which outputs a signal randomly in response to manual operation;

wherein the peripheral device supplies the game device with identification information indicating that the peripheral device generates outputs randomly when the peripheral device is functionally coupled with a peripheral port of the game device via the signal transmission path so as to cause the game device to transmit the randomly generated signal via the transmission path at any time during a time period of transmission line occupation in response to a signal of transmission line occupation pattern transmitted from the game device.

27. The peripheral device according to claim 26, wherein the transmission line occupation pattern includes a data format such that one of said first and second data signals transmits a sequence of pulses at a time while the other of said first and second data signals transmits a constant potential level.

28. The peripheral device according to claim 26, wherein the randomly generated signal is a trigger signal.

29. The peripheral device according to claim 26, wherein said time period of the transmission occupation is one interval of a picture drawing period in a video signal.

30. The peripheral device according to claim 26, wherein the peripheral device is a model gun.

31. The peripheral device according to claim 26, wherein the peripheral device is a light gun.

32. The peripheral device according to claim 26, wherein the peripheral device is a slave type of peripheral device that communicates with the game device via a peripheral device that is a master type of peripheral device and is to be connected with the peripheral port of the game device.

33. A host device for a game system comprising:

a data generator generating data relating to operation of the game system; and a data signal converting device for converting the data into a first data signal and a second data signal, the first data signal including first clock pulses and odd-numbered bits of data obtained from the data and allocated between the first clock pulses of the first data signal, and the second data signal including second clock pulses and even-numbered bits of data obtained from the data and allocated between the second clock pulses of the second data signal, the first and second data signals having a relationship wherein a data bit from one of the first and second data signals is located at a clock pulse of the other of the first and second data signals.

34. The host device according to claim 33, further comprising a plurality of input/output ports for connection to at least one peripheral device.

35. The host device according to claim 34, further comprising:

a first data transmission path connectable to one of said input/output ports;

an expansion connector with which an expansion peripheral device is connectable to the host device;

a second data transmission path which operatively connects the expansion connector to the first data transmission path; and a controller operatively connected to the first and second transmission paths for controlling data communications with the host device.

\* \* \* \* \*